United States Patent
Vaysman et al.

(10) Patent No.: US 10,904,624 B2
(45) Date of Patent: Jan. 26, 2021

(54) METHOD AND APPARATUS FOR GENERATING MULTIPLE DYNAMIC USER-INTERACTIVE DISPLAYS

(75) Inventors: Arthur Vaysman, San Jose, CA (US); Eduard Zaslavsky, Issaquah, WA (US)

(73) Assignee: WEBTUNER CORPORATION, Redmond, WA (US)

( * ) Notice: Subject to any disclaimer, the term of this patent is extended or adjusted under 35 U.S.C. 154(b) by 0 days.

(21) Appl. No.: 13/098,663

(22) Filed: May 2, 2011

(65) Prior Publication Data
US 2011/0209179 A1    Aug. 25, 2011

Related U.S. Application Data

(63) Continuation of application No. 11/505,063, filed on Aug. 16, 2006.
(Continued)

(51) Int. Cl.
*H04N 21/47* (2011.01)
*H04N 7/16* (2011.01)
(Continued)

(52) U.S. Cl.
CPC ........... *H04N 21/47* (2013.01); *H04N 7/162* (2013.01); *H04N 7/17318* (2013.01);
(Continued)

(58) Field of Classification Search
CPC ........... H04N 21/2665; H04N 21/2747; H04N 21/4316; H04N 21/4532; H04N 21/47202;
(Continued)

(56) References Cited

U.S. PATENT DOCUMENTS 2,958,403 A    11/1960 Robertson et al.
4,264,924 A    4/1981 Freeman
(Continued)

FOREIGN PATENT DOCUMENTS

EP    1193969    4/2002
EP    1193976    4/2002
(Continued)

OTHER PUBLICATIONS

"Using SI Tables to Create Electronic Program Guide," Hewlett Packard.
(Continued)

*Primary Examiner* — Kunal Langhnoja
(74) *Attorney, Agent, or Firm* — Volpe Koenig

(57) ABSTRACT

The present invention teaches a method of creating and presenting a user interface comprising a Dynamic Mosaic Extended Electronic Programming Guide (DMXEPG) using video, audio, special applications, and service dynamic metadata. The system enables television or digital radio service subscribers to select and display of various programs including video, interactive TV applications, or any combination of audio or visual components grouped and presented in accordance with the dynamic program/show metadata, business rules and objectives of service providers, broadcasters, and/or personal subscriber choices, collectively referred to as mosaic element presentation criteria.

4 Claims, 156 Drawing Sheets

Related U.S. Application Data

(60) Provisional application No. 60/647,287, filed on Jan. 27, 2005, provisional application No. 60/678,773, filed on May 9, 2005.

(51) Int. Cl.

| | |
|---|---|
| *H04N 7/173* | (2011.01) |
| *H04N 21/2665* | (2011.01) |
| *H04N 21/2747* | (2011.01) |
| *H04N 21/431* | (2011.01) |
| *H04N 21/45* | (2011.01) |
| *H04N 21/472* | (2011.01) |
| *H04N 21/482* | (2011.01) |
| *H04N 21/61* | (2011.01) |
| *H04N 21/81* | (2011.01) |
| *H04N 21/84* | (2011.01) |

(52) U.S. Cl.
CPC ..... *H04N 21/2665* (2013.01); *H04N 21/2747* (2013.01); *H04N 21/4316* (2013.01); *H04N 21/4532* (2013.01); *H04N 21/47202* (2013.01); *H04N 21/482* (2013.01); *H04N 21/4821* (2013.01); *H04N 21/4828* (2013.01); *H04N 21/6125* (2013.01); *H04N 21/812* (2013.01); *H04N 21/84* (2013.01); *A63F 2300/409* (2013.01); *A63F 2300/50* (2013.01); *A63F 2300/552* (2013.01); *A63F 2300/57* (2013.01)

(58) Field of Classification Search
CPC ............. H04N 21/482; H04N 21/4821; H04N 21/4828; H04N 21/6125; H04N 21/812; H04N 21/42204; H04N 21/4221; H04N 21/42216; H04N 21/47; H04N 7/162; H04N 7/17318; H04N 21/84; A63F 2300/409; A63F 2300/50; A63F 2300/552; A63F 2300/05
USPC .................................................... 725/39, 41
See application file for complete search history.

(56) References Cited

U.S. PATENT DOCUMENTS

| | | |
|---|---|---|
| 4,332,998 A | 6/1982 | Boros |
| 4,381,522 A | 4/1983 | Lambert |
| 4,426,629 A | 1/1984 | Fouse |
| 4,529,006 A | 7/1985 | Block et al. |
| 4,561,233 A | 12/1985 | Harter et al. |
| 4,580,950 A | 4/1986 | Sumikawa et al. |
| 4,706,121 A | 11/1987 | Young |
| 4,745,549 A | 5/1988 | Hashimoto |
| 4,751,578 A | 6/1988 | Reiter et al. |
| 4,873,073 A | 10/1989 | Matsui et al. |
| 4,977,455 A | 12/1990 | Young |
| 4,982,343 A | 1/1991 | Hourvitz et al. |
| 4,996,642 A | 2/1991 | Hey |
| 5,047,867 A | 9/1991 | Strubbe et al. |
| 5,151,789 A | 9/1992 | Young |
| 5,161,109 A | 11/1992 | Keating et al. |
| 5,179,439 A | 1/1993 | Hashimoto |
| 5,223,924 A | 6/1993 | Strubbe |
| 5,253,275 A | 10/1993 | Yurt et al. |
| 5,307,173 A | 4/1994 | Yuen et al. |
| 5,323,240 A | 6/1994 | Amano et al. |
| 5,343,665 A | 9/1994 | Palmersten |
| 5,347,632 A | 9/1994 | Filepp et al. |
| 5,351,075 A | 9/1994 | Herz et al. |
| 5,353,121 A | 10/1994 | Young et al. |
| 5,381,523 A | 1/1995 | Hayashi |
| 5,382,779 A | 1/1995 | Gupta |
| 5,410,344 A | 4/1995 | Graves et al. |
| 5,459,826 A | 10/1995 | Archibald |
| 5,483,278 A | 1/1996 | Strubbe et al. |
| 5,534,911 A | 7/1996 | Levitan |
| 5,535,320 A | 7/1996 | Gay et al. |
| 5,541,638 A | 7/1996 | Story |
| 5,541,738 A | 7/1996 | Mankovitz |
| 5,541,991 A | 7/1996 | Benson et al. |
| 5,546,193 A | 8/1996 | Hailey et al. |
| 5,548,708 A | 8/1996 | Sakashita et al. |
| 5,555,496 A | 9/1996 | Tackbary et al. |
| 5,559,549 A | 9/1996 | Hendricks et al. |
| 5,585,866 A | 12/1996 | Miller et al. |
| 5,596,373 A | 1/1997 | White et al. |
| 5,600,364 A | 2/1997 | Hendricks et al. |
| 5,608,534 A | 3/1997 | Park et al. |
| 5,635,989 A | 6/1997 | Rothmuller |
| 5,647,181 A | 7/1997 | Hunts |
| 5,649,186 A | 7/1997 | Ferguson |
| 5,649,216 A | 7/1997 | Sieber |
| 5,657,414 A | 8/1997 | Lett et al. |
| 5,680,619 A | 10/1997 | Gudmundson et al. |
| 5,684,525 A | 11/1997 | Klosterman |
| 5,740,425 A | 4/1998 | Povilus |
| 5,748,257 A | 5/1998 | Kawabata et al. |
| 5,748,484 A | 5/1998 | Cannon et al. |
| 5,749,083 A | 5/1998 | Koda et al. |
| 5,761,372 A | 6/1998 | Yoshinobu et al. |
| 5,801,747 A | 9/1998 | Bedard |
| 5,822,014 A | 10/1998 | Steyer et al. |
| 5,822,123 A | 10/1998 | Davis et al. |
| 5,844,620 A | 12/1998 | Coleman et al. |
| 5,860,073 A | 1/1999 | Ferrel et al. |
| 5,861,906 A | 1/1999 | Dunn et al. |
| 5,870,718 A | 2/1999 | Spector |
| 5,873,073 A | 2/1999 | Bresnan et al. |
| 5,890,175 A | 3/1999 | Wong et al. |
| 5,907,704 A | 5/1999 | Gudmundson et al. |
| 5,926,230 A | 7/1999 | Niijima et al. |
| 5,926,825 A | 7/1999 | Shirakawa |
| 5,930,810 A | 7/1999 | Farros et al. |
| 5,933,811 A | 8/1999 | Angles et al. |
| 5,948,061 A | 9/1999 | Merriman et al. |
| 5,956,736 A | 9/1999 | Hanson et al. |
| 5,963,968 A | 10/1999 | Warmus et al. |
| 5,973,683 A | 10/1999 | Cragun et al. |
| 5,974,396 A | 10/1999 | Anderson et al. |
| 5,983,227 A | 11/1999 | Nazem et al. |
| 5,983,243 A | 11/1999 | Heiney et al. |
| 5,986,670 A | 11/1999 | Dries et al. |
| 5,987,454 A | 11/1999 | Hobbs |
| 5,999,912 A | 12/1999 | Wodarz et al. |
| 6,003,041 A | 12/1999 | Wugofski |
| 6,005,560 A | 12/1999 | Gill et al. |
| 6,005,597 A | 12/1999 | Barrett et al. |
| 6,009,410 A | 12/1999 | LeMole et al. |
| 6,026,417 A | 2/2000 | Ross et al. |
| 6,034,678 A | 3/2000 | Hoarty et al. |
| 6,035,584 A | 3/2000 | Barreto |
| 6,052,514 A | 4/2000 | Gill et al. |
| 6,064,967 A | 5/2000 | Speicher |
| 6,072,983 A | 6/2000 | Klosterman |
| 6,081,262 A | 6/2000 | Gill et al. |
| 6,085,485 A | 6/2000 | Murdock |
| 6,088,722 A | 7/2000 | Herz et al. |
| 6,094,186 A | 7/2000 | Kuroda et al. |
| 6,097,878 A | 8/2000 | Saib |
| 6,108,673 A | 8/2000 | Brandt et al. |
| 6,118,449 A | 9/2000 | Rosen et al. |
| 6,118,925 A | 9/2000 | Murata et al. |
| 6,119,101 A | 9/2000 | Peckover |
| 6,144,944 A | 11/2000 | Kurtzman, II et al. |
| 6,157,411 A | 12/2000 | Williams et al. |
| 6,167,382 A | 12/2000 | Sparks et al. |
| 6,182,050 B1 | 1/2001 | Ballard |
| 6,192,382 B1 | 2/2001 | Lafer et al. |
| 6,205,582 B1 | 3/2001 | Hoarty |
| 6,216,112 B1 | 4/2001 | Fuller et al. |
| 6,230,143 B1 | 5/2001 | Simons et al. |
| 6,243,375 B1 | 6/2001 | Speicher |
| 6,247,047 B1 | 6/2001 | Wolff |

(56) References Cited

U.S. PATENT DOCUMENTS

| | | |
|---|---|---|
| 6,253,238 B1 | 6/2001 | Lauder et al. |
| 6,271,860 B1 | 8/2001 | Gross |
| 6,286,005 B1 | 9/2001 | Cannon |
| 6,311,211 B1 | 10/2001 | Shaw et al. |
| 6,312,336 B1 | 11/2001 | Handelman et al. |
| 6,313,822 B1 | 11/2001 | McKay et al. |
| 6,317,883 B2 | 11/2001 | Marics |
| 6,334,109 B1 | 12/2001 | Kanevsky et al. |
| 6,342,924 B1 | 1/2002 | Ikeda et al. |
| 6,356,903 B1 | 3/2002 | Baxter et al. |
| 6,385,592 B1 | 5/2002 | Angles et al. |
| 6,400,406 B1 | 6/2002 | Kim |
| 6,401,075 B1 | 6/2002 | Mason et al. |
| 6,405,371 B1 | 6/2002 | Oosterhout et al. |
| 6,407,779 B1 * | 6/2002 | Herz ............ 348/734 |
| 6,415,316 B1 | 7/2002 | Van Der Meer |
| 6,425,128 B1 | 7/2002 | Krapf et al. |
| 6,438,752 B1 | 8/2002 | McClard |
| 6,446,045 B1 | 9/2002 | Stone et al. |
| 6,449,657 B2 | 9/2002 | Stanbach, Jr. et al. |
| 6,462,754 B1 | 10/2002 | Chakraborty et al. |
| 6,463,585 B1 | 10/2002 | Hendricks et al. |
| 6,473,794 B1 | 10/2002 | Guheen et al. |
| 6,477,705 B1 | 11/2002 | Yuen et al. |
| 6,484,148 B1 | 11/2002 | Boyd |
| 6,484,149 B1 | 11/2002 | Jammes et al. |
| 6,493,688 B1 | 12/2002 | Das et al. |
| 6,496,857 B1 | 12/2002 | Dustin et al. |
| 6,513,035 B1 | 1/2003 | Tanaka et al. |
| 6,519,571 B1 | 2/2003 | Guheen et al. |
| 6,526,577 B1 | 2/2003 | Knudson et al. |
| 6,538,701 B1 | 3/2003 | Yuen |
| 6,553,178 B2 | 4/2003 | Abecassis |
| 6,567,854 B1 | 5/2003 | Olshansky et al. |
| 6,571,053 B1 | 5/2003 | Yasuzato |
| 6,587,835 B1 | 7/2003 | Treyz et al. |
| 6,589,292 B1 | 7/2003 | Langford-Wilson |
| 6,601,107 B1 | 7/2003 | Seibert |
| 6,604,328 B1 | 8/2003 | Paddock |
| 6,611,348 B1 | 8/2003 | Chase et al. |
| 6,611,349 B1 | 8/2003 | Vogt et al. |
| 6,611,958 B1 | 8/2003 | Shintani et al. |
| 6,618,504 B1 | 9/2003 | Yoshino |
| 6,628,314 B1 | 9/2003 | Hoyle |
| 6,637,029 B1 | 10/2003 | Maissel et al. |
| 6,684,369 B1 | 1/2004 | Bernardo et al. |
| 6,691,093 B2 | 2/2004 | Shell |
| 6,701,060 B2 | 3/2004 | Yuen et al. |
| 6,704,931 B1 | 3/2004 | Schaffer et al. |
| 6,718,551 B1 | 4/2004 | Swix et al. |
| 6,728,966 B1 | 4/2004 | Arsenault et al. |
| 6,738,978 B1 | 5/2004 | Hendricks et al. |
| 6,748,397 B2 | 6/2004 | Choi |
| 6,763,334 B1 | 7/2004 | Matsumoto et al. |
| 6,795,972 B2 | 9/2004 | Rovira |
| 6,799,327 B1 | 9/2004 | Reynolds et al. |
| 6,801,917 B2 | 10/2004 | Gutta et al. |
| 6,810,526 B1 | 10/2004 | Menard et al. |
| 6,813,776 B2 | 11/2004 | Chernock et al. |
| 6,829,587 B2 | 12/2004 | Stone et al. |
| 6,829,780 B2 | 12/2004 | Kraft et al. |
| 6,847,969 B1 | 1/2005 | Mathai et al. |
| 6,851,090 B1 | 2/2005 | Gutta et al. |
| 6,889,385 B1 | 5/2005 | Rakib et al. |
| 6,918,132 B2 | 7/2005 | Gargi |
| 6,922,844 B1 | 7/2005 | Arsenault et al. |
| 6,954,728 B1 | 10/2005 | Kusumoto et al. |
| 6,958,759 B2 | 10/2005 | Safadi et al. |
| 6,973,665 B2 | 12/2005 | Dudkiewicz et al. |
| 6,983,478 B1 | 1/2006 | Grauch et al. |
| 7,010,497 B1 | 3/2006 | Nyhan et al. |
| 7,020,652 B2 | 3/2006 | Matz et al. |
| 7,051,352 B1 | 5/2006 | Schaffer |
| 7,055,165 B2 | 5/2006 | Connelly |
| 7,069,228 B1 | 6/2006 | Rose et al. |
| 7,109,985 B2 | 9/2006 | Spencer et al. |
| 7,120,591 B1 | 10/2006 | Solomon et al. |
| 7,131,134 B2 | 10/2006 | Trovato et al. |
| 7,143,066 B2 | 11/2006 | Shear et al. |
| 7,143,160 B2 | 11/2006 | Tamaki |
| 7,146,626 B1 | 12/2006 | Arsenault et al. |
| 7,152,237 B2 | 12/2006 | Flickinger et al. |
| 7,159,175 B2 | 1/2007 | Ishii et al. |
| 7,165,041 B1 | 1/2007 | Guheen et al. |
| 7,171,677 B1 | 1/2007 | Ochiai |
| 7,174,512 B2 | 2/2007 | Martin et al. |
| 7,181,445 B2 | 2/2007 | Bebo et al. |
| 7,188,355 B1 | 3/2007 | Prokopenko et al. |
| 7,188,356 B1 | 3/2007 | Miura et al. |
| 7,200,853 B2 | 4/2007 | Kawai |
| 7,204,025 B2 | 4/2007 | Ziegs et al. |
| 7,213,027 B1 | 5/2007 | Kominek et al. |
| 7,231,607 B2 | 6/2007 | Neely |
| 7,239,779 B2 | 7/2007 | Little |
| 7,240,025 B2 | 7/2007 | Stone et al. |
| 7,249,059 B2 | 7/2007 | Dean et al. |
| 7,254,829 B1 | 8/2007 | Brown et al. |
| 7,263,270 B1 | 8/2007 | Lapstun et al. |
| 7,263,709 B1 | 8/2007 | Krapf |
| 7,266,733 B2 | 9/2007 | Bazinet et al. |
| 7,284,064 B1 | 10/2007 | Connelly |
| 7,292,723 B2 | 11/2007 | Tedesco et al. |
| 7,304,685 B2 | 12/2007 | Park et al. |
| 7,312,772 B2 | 12/2007 | Kim |
| 7,315,983 B2 | 1/2008 | Evans et al. |
| 7,319,976 B1 | 1/2008 | Peckover |
| 7,340,457 B1 | 3/2008 | Killian et al. |
| 7,343,157 B1 | 3/2008 | Mitchell |
| 7,343,354 B2 | 3/2008 | Hennessey |
| 7,376,333 B2 | 5/2008 | Chung et al. |
| 7,398,541 B2 | 7/2008 | Bennington et al. |
| 7,421,467 B2 | 9/2008 | Kaneko et al. |
| 7,421,724 B2 | 9/2008 | Klosterman et al. |
| 7,428,555 B2 | 9/2008 | Yan |
| 7,434,160 B2 | 10/2008 | Peiro et al. |
| 7,440,674 B2 | 10/2008 | Plotnick et al. |
| 7,441,260 B1 | 10/2008 | Kurapati |
| 7,444,658 B1 | 10/2008 | Matz et al. |
| 7,464,344 B1 | 12/2008 | Carmichael et al. |
| 7,469,943 B2 | 12/2008 | Hiramoto |
| 7,480,701 B2 | 1/2009 | Smith et al. |
| 7,487,529 B1 | 2/2009 | Orlick |
| 7,493,641 B2 | 2/2009 | Klosterman et al. |
| 7,496,943 B1 | 2/2009 | Goldberg et al. |
| 7,499,628 B2 | 3/2009 | Yuen et al. |
| 7,500,202 B2 | 3/2009 | Gerba et al. |
| 7,503,058 B2 | 3/2009 | Van Horck |
| 7,508,942 B2 | 3/2009 | Candelore |
| 7,509,580 B2 | 3/2009 | Sezan et al. |
| 7,533,034 B2 | 5/2009 | Laurin et al. |
| 7,542,657 B2 | 6/2009 | Yuen et al. |
| 7,552,458 B1 | 6/2009 | Finseth et al. |
| 7,564,369 B1 | 7/2009 | Adams et al. |
| 7,631,329 B1 | 12/2009 | Yamada |
| 7,644,425 B2 | 1/2010 | Parker et al. |
| 7,653,603 B1 | 1/2010 | Holtkamp, Jr. et al. |
| 7,668,950 B2 | 2/2010 | Horowitz et al. |
| 7,685,019 B2 | 3/2010 | Collins |
| 7,698,719 B2 | 4/2010 | Evans et al. |
| 7,752,073 B2 | 7/2010 | Barry et al. |
| 7,757,252 B1 | 7/2010 | Agasse |
| 7,774,341 B2 | 8/2010 | Aravamudan et al. |
| 7,797,168 B2 | 9/2010 | Kusumoto et al. |
| 7,814,421 B2 | 10/2010 | Reynolds et al. |
| 7,827,062 B2 | 11/2010 | Merriman et al. |
| 7,840,437 B2 | 11/2010 | Lewis |
| 7,844,985 B2 | 11/2010 | Hendricks et al. |
| 7,853,969 B2 | 12/2010 | Smith et al. |
| 7,873,972 B2 | 1/2011 | Zaslavsky et al. |
| 7,890,490 B1 | 2/2011 | Bovenschulte et al. |
| 7,904,814 B2 | 3/2011 | Errico et al. |
| 7,904,922 B1 | 3/2011 | Haberman et al. |
| 7,930,207 B2 | 4/2011 | Merriman et al. |
| 7,937,725 B1 | 5/2011 | Schaffer et al. |

(56) References Cited

U.S. PATENT DOCUMENTS

| | | |
|---|---|---|
| 7,970,648 B2 | 6/2011 | Gailey et al. |
| 7,992,068 B2 | 8/2011 | Chen et al. |
| 7,996,864 B2 | 8/2011 | Yuen et al. |
| 8,001,487 B2 | 8/2011 | Koppert |
| 8,032,414 B2 | 10/2011 | Payne et al. |
| 8,032,835 B1 | 10/2011 | Clevenger et al. |
| 8,032,853 B2 | 10/2011 | Awashima |
| 8,056,099 B2 | 11/2011 | Shanks et al. |
| 8,091,031 B2 | 1/2012 | Evans |
| 2001/0034654 A1 | 10/2001 | Vigil et al. |
| 2002/0010926 A1 | 1/2002 | Lee |
| 2002/0036654 A1 | 3/2002 | Evans et al. |
| 2002/0042921 A1 | 4/2002 | Ellis |
| 2002/0049975 A1* | 4/2002 | Thomas .............. G06Q 50/34 725/60 |
| 2002/0059094 A1 | 5/2002 | Hosea et al. |
| 2002/0059621 A1 | 5/2002 | Thomas et al. |
| 2002/0067376 A1 | 6/2002 | Martin et al. |
| 2002/0069218 A1 | 6/2002 | Sull et al. |
| 2002/0087986 A1 | 7/2002 | Markel |
| 2002/0175953 A1 | 11/2002 | Lin |
| 2002/0178446 A1 | 11/2002 | Sie et al. |
| 2002/0194591 A1* | 12/2002 | Gargi ............................ 725/32 |
| 2003/0051238 A1 | 3/2003 | Barone |
| 2003/0084441 A1 | 5/2003 | Hunt |
| 2003/0084446 A1 | 5/2003 | Thurston et al. |
| 2003/0084449 A1 | 5/2003 | Chane et al. |
| 2003/0097657 A1 | 5/2003 | Zhou et al. |
| 2003/0103088 A1 | 6/2003 | Dresti et al. |
| 2003/0115597 A1 | 6/2003 | Yassin et al. |
| 2003/0131355 A1 | 7/2003 | Berenson et al. |
| 2003/0135464 A1 | 7/2003 | Mourad et al. |
| 2003/0145323 A1 | 7/2003 | Hendricks et al. |
| 2003/0171991 A1 | 9/2003 | Robbins |
| 2003/0204846 A1 | 10/2003 | Breen et al. |
| 2003/0204854 A1 | 10/2003 | Blackketter et al. |
| 2004/0010720 A1* | 1/2004 | Singh et al. .................. 713/201 |
| 2004/0039648 A1 | 2/2004 | Candelore et al. |
| 2004/0070593 A1 | 4/2004 | Neely et al. |
| 2004/0078809 A1 | 4/2004 | Drazin |
| 2004/0184548 A1 | 9/2004 | Kerbiriou et al. |
| 2004/0194128 A1 | 9/2004 | McIntyre et al. |
| 2004/0210933 A1* | 10/2004 | Dresti ..................... G08C 17/00 725/40 |
| 2004/0255336 A1 | 12/2004 | Logan et al. |
| 2004/0261112 A1 | 12/2004 | Hicks, III et al. |
| 2004/0268393 A1 | 12/2004 | Hunleth et al. |
| 2004/0268413 A1 | 12/2004 | Reid et al. |
| 2005/0010531 A1 | 1/2005 | Kushalnagar et al. |
| 2005/0012761 A1 | 1/2005 | Shiomi et al. |
| 2005/0017949 A1* | 1/2005 | Dunn ..................... G08C 17/02 345/158 |
| 2005/0018079 A1 | 1/2005 | Van Der Vleuten |
| 2005/0063677 A1 | 3/2005 | Kosako et al. |
| 2005/0155067 A1 | 7/2005 | McKenna |
| 2005/0160461 A1 | 7/2005 | Baumgartner et al. |
| 2005/0160468 A1* | 7/2005 | Rodriguez et al. .......... 725/109 |
| 2005/0172314 A1 | 8/2005 | Krakora et al. |
| 2005/0203943 A1 | 9/2005 | Su et al. |
| 2005/0262535 A1* | 11/2005 | Uchida ................ H04N 5/4403 725/80 |
| 2006/0015911 A1 | 1/2006 | Dean |
| 2006/0039481 A1 | 2/2006 | Shen et al. |
| 2006/0059277 A1 | 3/2006 | Zito et al. |
| 2006/0085828 A1 | 4/2006 | Dureau et al. |
| 2006/0101338 A1* | 5/2006 | Kates ................ H04N 5/4403 715/716 |
| 2006/0125962 A1 | 6/2006 | Shelton et al. |
| 2006/0218583 A1 | 9/2006 | Vanparijs et al. |
| 2006/0230417 A1 | 10/2006 | Van Horck |
| 2006/0282852 A1 | 12/2006 | Purpura et al. |
| 2007/0011702 A1 | 1/2007 | Vaysman et al. |
| 2007/0016925 A1 | 1/2007 | Vaysman et al. |
| 2007/0044127 A1 | 2/2007 | Vaysman et al. |
| 2007/0070218 A1 | 3/2007 | Meijer et al. |
| 2007/0113257 A1 | 5/2007 | Takemoto |
| 2007/0144090 A1 | 6/2007 | Nguyen |
| 2007/0157248 A1 | 7/2007 | Ellis |
| 2007/0174286 A1 | 7/2007 | Seitz et al. |
| 2007/0204302 A1 | 8/2007 | Calzone |
| 2007/0214470 A1 | 9/2007 | Glasgow et al. |
| 2007/0214478 A1 | 9/2007 | Feldstein et al. |
| 2007/0234388 A1 | 10/2007 | King |
| 2008/0002580 A1 | 1/2008 | Kawada et al. |
| 2008/0059312 A1 | 3/2008 | Gern et al. |
| 2008/0092182 A1 | 4/2008 | Conant |
| 2008/0154803 A1 | 6/2008 | Stein et al. |
| 2008/0183577 A1 | 7/2008 | Evans |
| 2008/0196071 A1 | 8/2008 | Manthoulis |
| 2008/0275786 A1 | 11/2008 | Gluck |
| 2008/0282290 A1 | 11/2008 | Malik et al. |
| 2009/0055268 A1 | 2/2009 | Knoller et al. |
| 2009/0158337 A1 | 6/2009 | Stiers et al. |
| 2009/0259957 A1 | 10/2009 | Slocum et al. |
| 2009/0287610 A1 | 11/2009 | Bradshaw et al. |
| 2010/0017820 A1 | 1/2010 | Thevathasan et al. |
| 2010/0153983 A1 | 6/2010 | Philmon et al. |
| 2010/0205562 A1 | 8/2010 | de Heer |
| 2010/0324997 A1 | 12/2010 | Evans |
| 2011/0110515 A1 | 5/2011 | Tidwell et al. |
| 2011/0125586 A1 | 5/2011 | Evans |
| 2011/0138327 A1 | 6/2011 | Scott et al. |
| 2011/0202960 A1 | 8/2011 | Vaysman et al. |
| 2011/0209173 A1 | 8/2011 | Vaysman et al. |
| 2011/0209179 A1 | 8/2011 | Vaysman et al. |
| 2011/0225591 A1 | 9/2011 | Wada et al. |
| 2011/0225612 A1 | 9/2011 | Vaysman et al. |
| 2011/0265120 A1 | 10/2011 | Vaysman et al. |
| 2011/0296467 A1 | 12/2011 | Vaysman et al. |
| 2011/0307925 A1 | 12/2011 | Vaysman et al. |
| 2011/0314501 A1 | 12/2011 | Vaysman et al. |
| 2012/0011544 A1 | 1/2012 | Vaysman et al. |
| 2012/0072952 A1 | 3/2012 | Vaysman et al. |
| 2012/0254910 A1 | 10/2012 | Donoghue et al. |
| 2012/0266189 A1 | 10/2012 | Zaslavsky |
| 2012/0297409 A1 | 11/2012 | Zaslavsky |
| 2012/0304209 A1 | 11/2012 | Zaslavsky |
| 2012/0304210 A1 | 11/2012 | Zaslavsky |
| 2012/0307152 A1 | 12/2012 | Zaslavsky |
| 2012/0311629 A1 | 12/2012 | Zaslavsky |

FOREIGN PATENT DOCUMENTS

| | | | |
|---|---|---|---|
| EP | 1280343 | 1/2003 | |
| EP | 1423794 | 6/2004 | |
| EP | 0965192 | 2/2007 | |
| FR | 2836321 | 8/2003 | |
| GB | 2375674 | 11/2002 | |
| JP | WO 2004006563 A1 * | 1/2004 | ............ H04N 5/4403 |
| WO | WO9808176 | 2/1998 | |
| WO | WO9917258 | 4/1999 | |
| WO | WO0237840 | 5/2002 | |
| WO | WO0245304 | 6/2002 | |
| WO | WO02102079 | 12/2002 | |
| WO | WO03054678 | 7/2003 | |
| WO | WO05107245 | 11/2005 | |
| WO | WO06018825 | 2/2006 | |
| WO | WO2006055243 | 5/2006 | |

OTHER PUBLICATIONS

PCT Patentability Report for PCT/US2006/003420, dated Apr. 3, 2008.
PCT Search Report for PCT/US2006/003420, dated Apr. 3, 2008.
PCT Search Report for PCT/US2012/39683, dated Aug. 10, 2012.
PCT Search Report for PCT/US2012/38328, dated Aug. 9, 2012.
PCT Search Report for PCT/US2012/39280, dated Aug. 13, 2012.
PCT Patentability Report for PCT/US12/40683, dated Aug. 9, 2012.
PCT Patentability Report for PCT/US12/41154, dated Aug. 14, 2013.
PCT Search and Patentability Report for PCT/US2012/032323, dated Jun. 19, 2012.

(56) References Cited

OTHER PUBLICATIONS

PCT Search and Patentability Report for PCT/US2014/057375, dated Dec. 24, 2014.
EP Search Report for PCT/US2012040683, dated Aug. 27, 2014.
PCT Search Report for PCT/US2013/053894, dated Feb. 10, 2015.
"Introducing Interactive Video Mosaic" Aptiv Digital Product Sheet, 2005. (Previously considered by U.S. Examiner in U.S. Appl. No. 11/505,063 on Dec. 15, 2009.

* cited by examiner

Content Category

| Video for program assigned to mosaic element 1 | Video for program assigned to mosaic element 2 | Video for program assigned to mosaic element 3 | Video for program assigned to mosaic element 4 |
|---|---|---|---|
| Mosaic Element 1 | Mosaic Element 2 | Mosaic Element 3 | Mosaic Element 4 |
| Video for program assigned to mosaic element 5 | Video for program assigned to mosaic element 6 | Video for program assigned to mosaic element 7 | Video for program assigned to mosaic element 8 |
| Mosaic Element 5 | Mosaic Element 6 | Mosaic Element 7 | Mosaic Element 8 |
| Video for program assigned to mosaic element 9 | Video for program assigned to mosaic element 10 | Video for program assigned to mosaic element 11 | Video for program assigned to mosaic element 12 |
| Mosaic Element 9 | Mosaic Element 10 | Mosaic Element 11 | Mosaic Element N |

Creeping Line: text is synched with audio track (like a closed captioned /subtitles) OR instant program info (Current /Next show)

| Language Option 1 | Language Option 2 |

FIG. 2

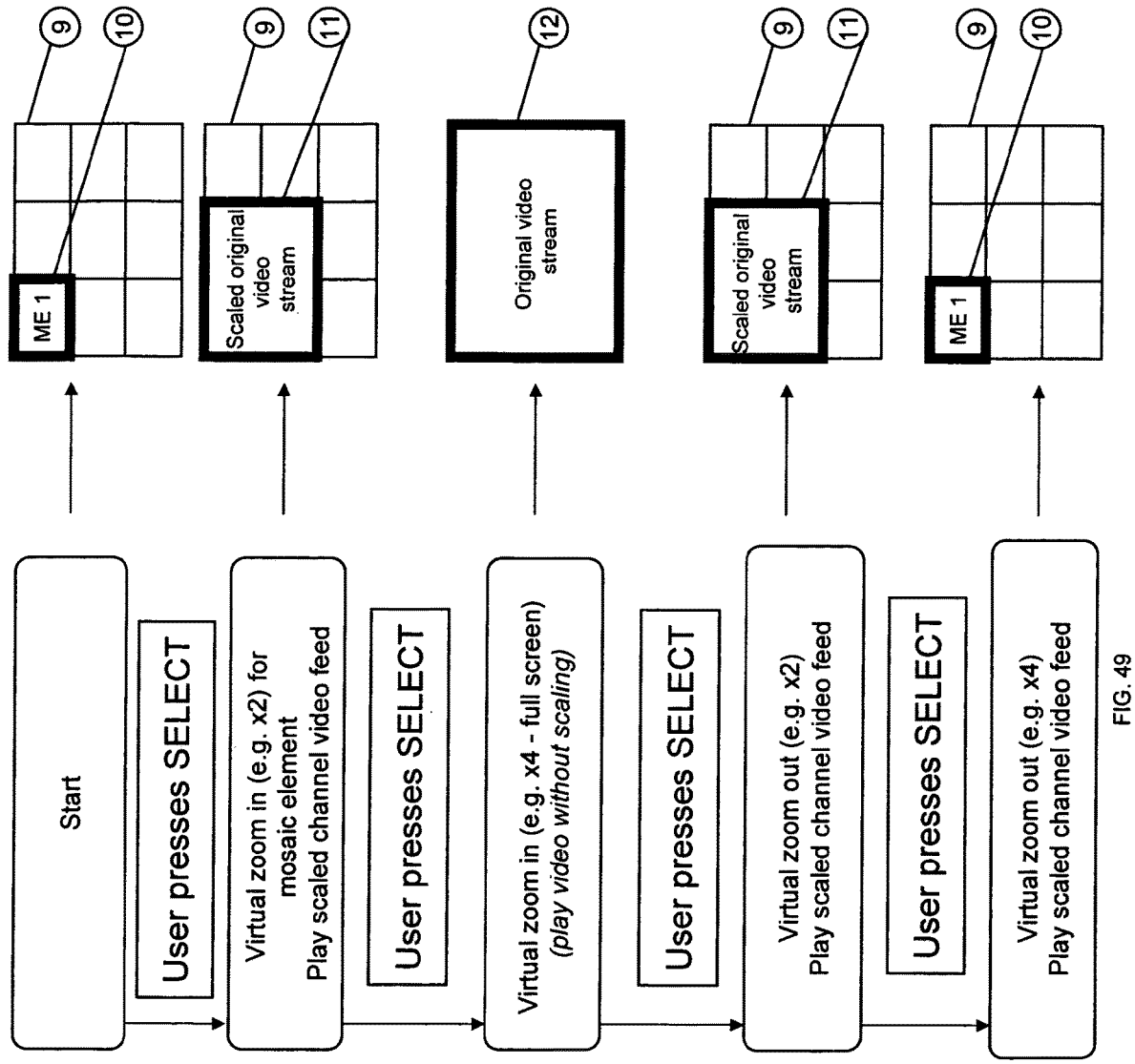
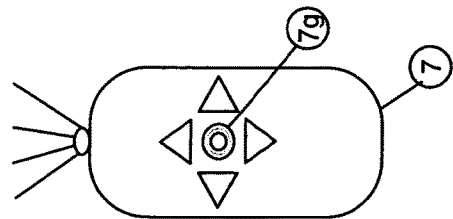
FIG. 49

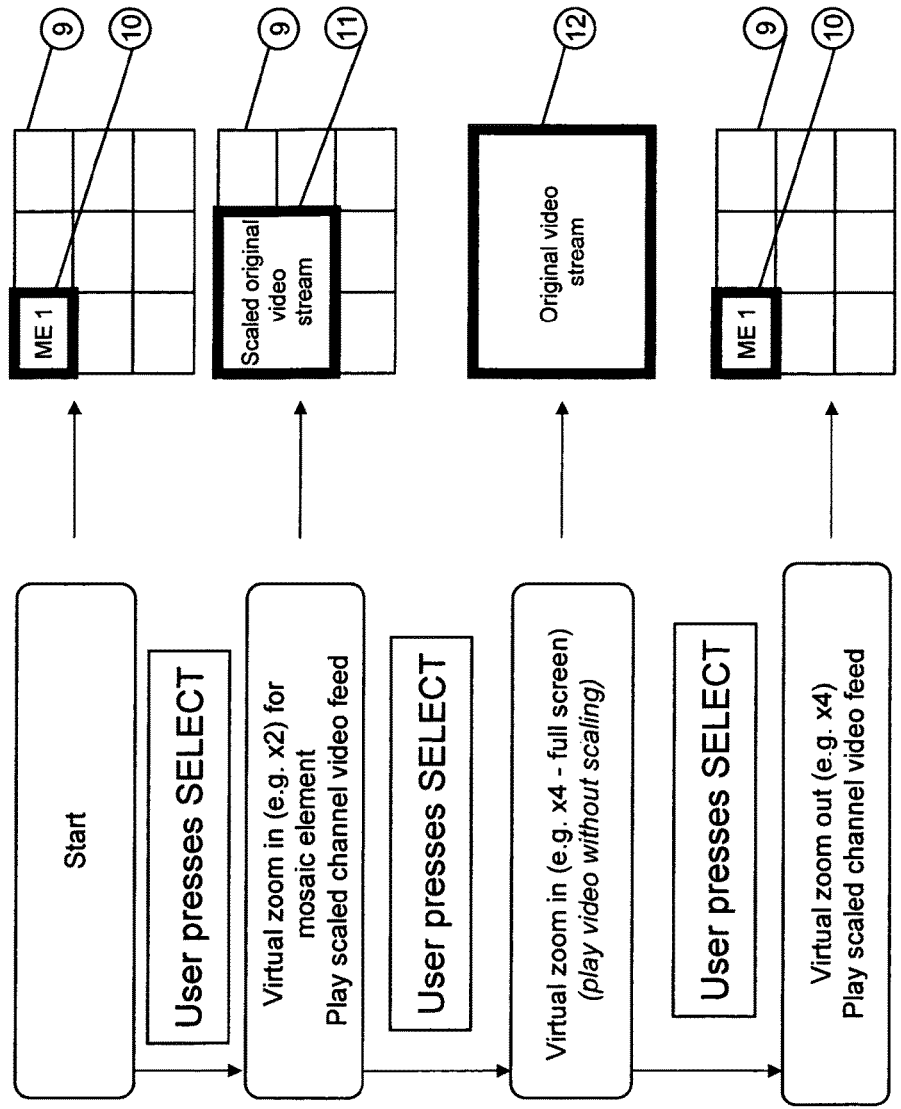
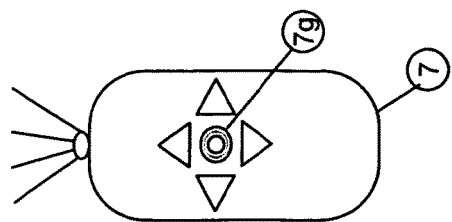
FIG. 50

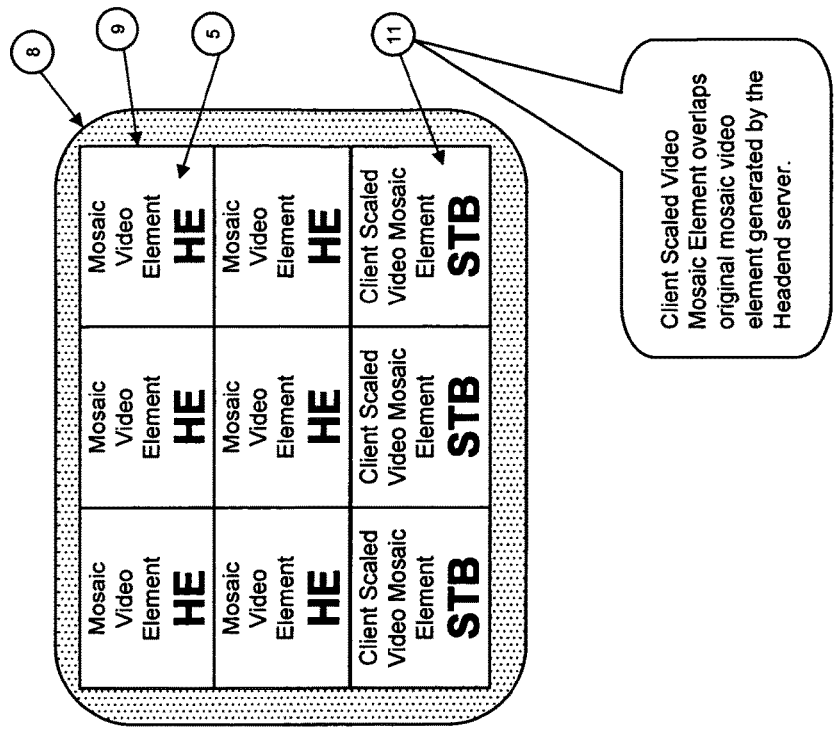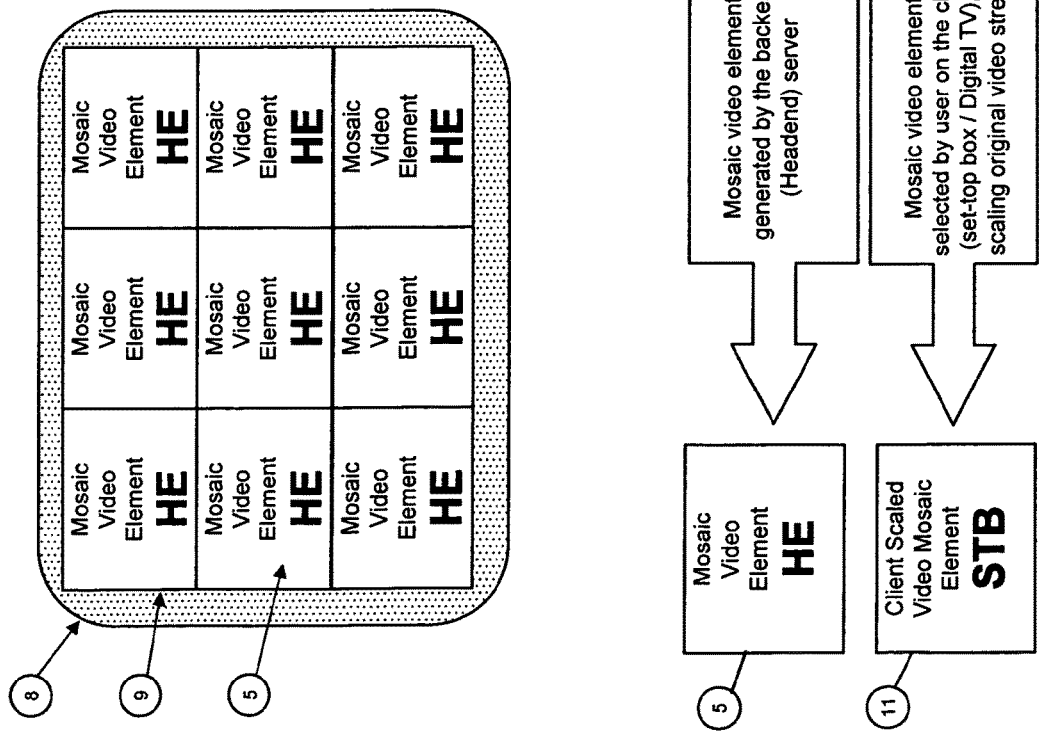
FIG. 51

| # | DMXEPG | Mosaic Element | Original Video Stream | Display, Monitor, TV |
|---|---|---|---|---|
| 1 | 4x3 | 4x3 | 4x3 | 4x3 |
| 2 | 4x3 | 4x3 | 4x3 | 16x9 |
| 3 | 4x3 | 4x3 | 4x3 | MxN |
| 4 | 4x3 | 4x3 | 16x9 | 4x3 |
| 5 | 4x3 | 4x3 | 16x9 | 16x9 |
| 6 | 4x3 | 4x3 | 16x9 | MxN |
| 7 | 4x3 | 4x3 | MxN | 4x3 |
| 8 | 4x3 | 4x3 | MxN | 16x9 |
| 9 | 4x3 | 4x3 | MxN | MxN |
| 10 | 4x3 | 16x9 | 4x3 | 4x3 |
| 11 | 4x3 | 16x9 | 4x3 | 16x9 |
| 12 | 4x3 | 16x9 | 4x3 | MxN |
| 13 | 4x3 | 16x9 | 16x9 | 4x3 |
| 14 | 4x3 | 16x9 | 16x9 | 16x9 |
| 15 | 4x3 | 16x9 | 16x9 | MxN |
| 16 | 4x3 | 16x9 | MxN | 4x3 |
| 17 | 4x3 | 16x9 | MxN | 16x9 |
| 18 | 4x3 | 16x9 | MxN | MxN |
| 19 | 4x3 | MxN | 4x3 | 4x3 |
| 20 | 4x3 | MxN | 4x3 | 16x9 |
| 21 | 4x3 | MxN | 4x3 | MxN |
| 22 | 4x3 | MxN | 16x9 | 4x3 |
| 23 | 4x3 | MxN | 16x9 | 16x9 |
| 24 | 4x3 | MxN | 16x9 | MxN |
| 25 | 4x3 | MxN | MxN | 4x3 |
| 26 | 4x3 | MxN | MxN | 16x9 |
| 27 | 4x3 | MxN | MxN | MxN |

Table 1. DMXEPG with aspect ratio 4x3

FIG. 56

| # | DMXEPG | Mosaic Element | Original Video Stream | Display, Monitor, TV |
|---|---|---|---|---|
| 1 | 16x9 | 4x3 | 4x3 | 4x3 |
| 2 | 16x9 | 4x3 | 4x3 | 16x9 |
| 3 | 16x9 | 4x3 | 4x3 | MxN |
| 4 | 16x9 | 4x3 | 16x9 | 4x3 |
| 5 | 16x9 | 4x3 | 16x9 | 16x9 |
| 6 | 16x9 | 4x3 | 16x9 | MxN |
| 7 | 16x9 | 4x3 | MxN | 4x3 |
| 8 | 16x9 | 4x3 | MxN | 16x9 |
| 9 | 16x9 | 4x3 | MxN | MxN |
| 10 | 16x9 | 16x9 | 4x3 | 4x3 |
| 11 | 16x9 | 16x9 | 4x3 | 16x9 |
| 12 | 16x9 | 16x9 | 4x3 | MxN |
| 13 | 16x9 | 16x9 | 16x9 | 4x3 |
| 14 | 16x9 | 16x9 | 16x9 | 16x9 |
| 15 | 16x9 | 16x9 | 16x9 | MxN |
| 16 | 16x9 | 16x9 | MxN | 4x3 |
| 17 | 16x9 | 16x9 | MxN | 16x9 |
| 18 | 16x9 | 16x9 | MxN | MxN |
| 19 | 16x9 | MxN | 4x3 | 4x3 |
| 20 | 16x9 | MxN | 4x3 | 16x9 |
| 21 | 16x9 | MxN | 4x3 | MxN |
| 22 | 16x9 | MxN | 16x9 | 4x3 |
| 23 | 16x9 | MxN | 16x9 | 16x9 |
| 24 | 16x9 | MxN | 16x9 | MxN |
| 25 | 16x9 | MxN | MxN | 4x3 |
| 26 | 16x9 | MxN | MxN | 16x9 |
| 27 | 16x9 | MxN | MxN | MxN |

Table 2. DMXEPG with aspect ratio 16x9

FIG. 57

| # | DMXEPG | Mosaic Element | Original Video Stream | Display, Monitor, TV |
|---|--------|----------------|----------------------|----------------------|
| 1 | MxN | 4x3 | 4x3 | 4x3 |
| 2 | MxN | 4x3 | 4x3 | 16x9 |
| 3 | MxN | 4x3 | 4x3 | MxN |
| 4 | MxN | 4x3 | 16x9 | 4x3 |
| 5 | MxN | 4x3 | 16x9 | 16x9 |
| 6 | MxN | 4x3 | 16x9 | MxN |
| 7 | MxN | 4x3 | MxN | 4x3 |
| 8 | MxN | 4x3 | MxN | 16x9 |
| 9 | MxN | 4x3 | MxN | MxN |
| 10 | MxN | 16x9 | 4x3 | 4x3 |
| 11 | MxN | 16x9 | 4x3 | 16x9 |
| 12 | MxN | 16x9 | 4x3 | MxN |
| 13 | MxN | 16x9 | 16x9 | 4x3 |
| 14 | MxN | 16x9 | 16x9 | 16x9 |
| 15 | MxN | 16x9 | 16x9 | MxN |
| 16 | MxN | 16x9 | MxN | 4x3 |
| 17 | MxN | 16x9 | MxN | 16x9 |
| 18 | MxN | 16x9 | MxN | MxN |
| 19 | MxN | MxN | 4x3 | 4x3 |
| 20 | MxN | MxN | 4x3 | 16x9 |
| 21 | MxN | MxN | 4x3 | MxN |
| 22 | MxN | MxN | 16x9 | 4x3 |
| 23 | MxN | MxN | 16x9 | 16x9 |
| 24 | MxN | MxN | 16x9 | MxN |
| 25 | MxN | MxN | MxN | 4x3 |
| 26 | MxN | MxN | MxN | 16x9 |
| 27 | MxN | MxN | MxN | MxN |

Table 3. DMXEPG with aspect ratio MxN

FIG. 58

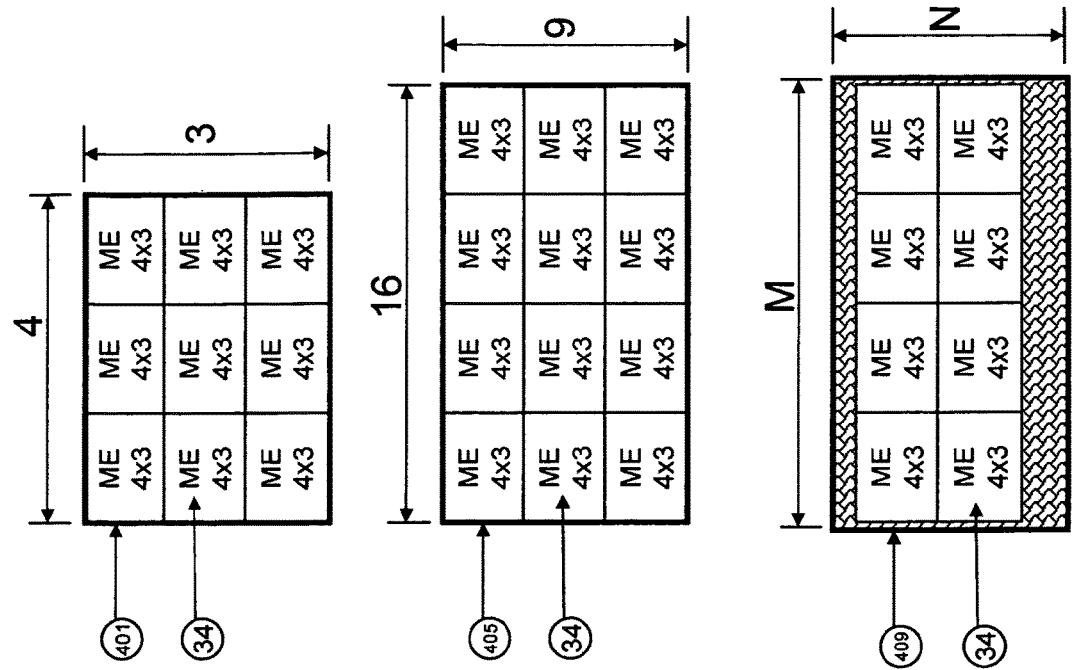
FIG. 60
| # | DMXEPG | Mosaic Elements |
|---|---|---|
| 401 | 4x3 | 4x3 |
| 402 | 4x3 | 16x9 |
| 403 | 4x3 | MxN |
| 404 | 4x3 | Mix: 4x3 + 16x9 + MxN |
| 405 | 16x9 | 4x3 |
| 406 | 16x9 | 16x9 |
| 407 | 16x9 | MxN |
| 408 | 16x9 | Mix: 4x3 + 16x9 + MxN |
| 409 | MxN | 4x3 |
| 410 | MxN | 16x9 |
| 411 | MxN | MxN |
| 412 | MxN | Mix: 4x3 + 16x9 + MxN |
Table 4. DMXEPG types
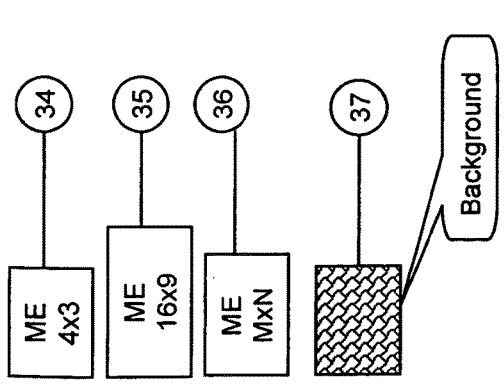

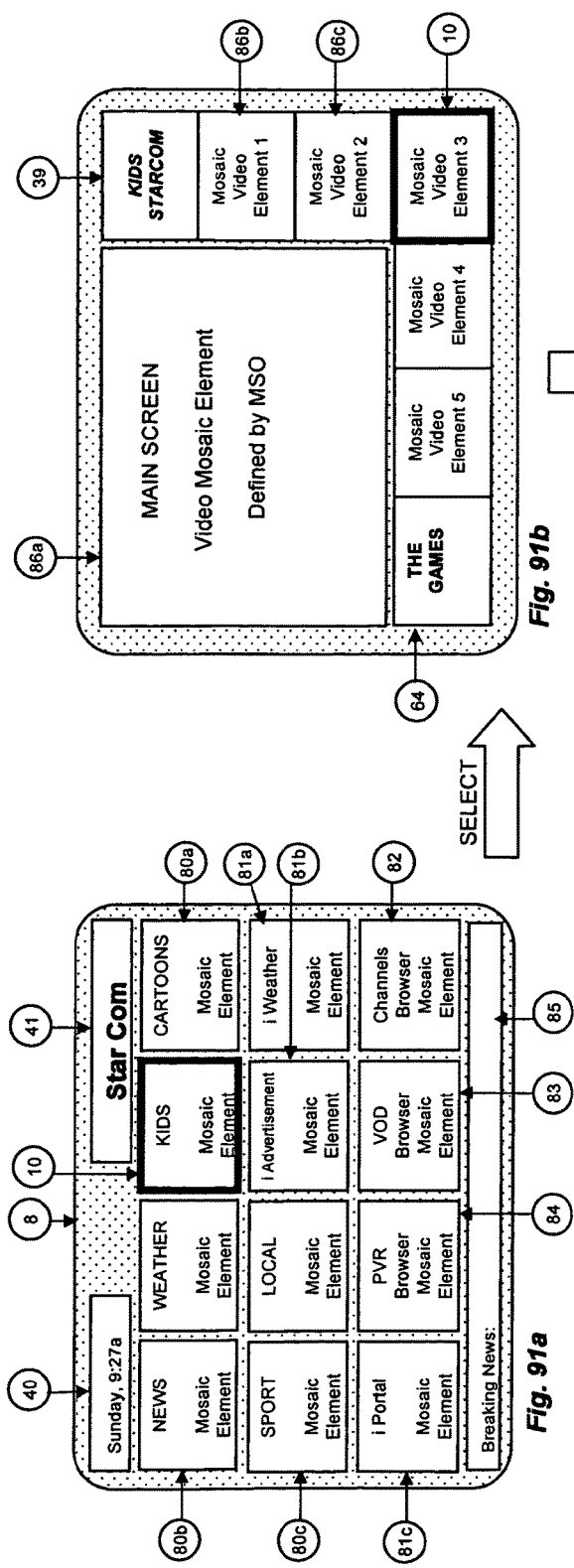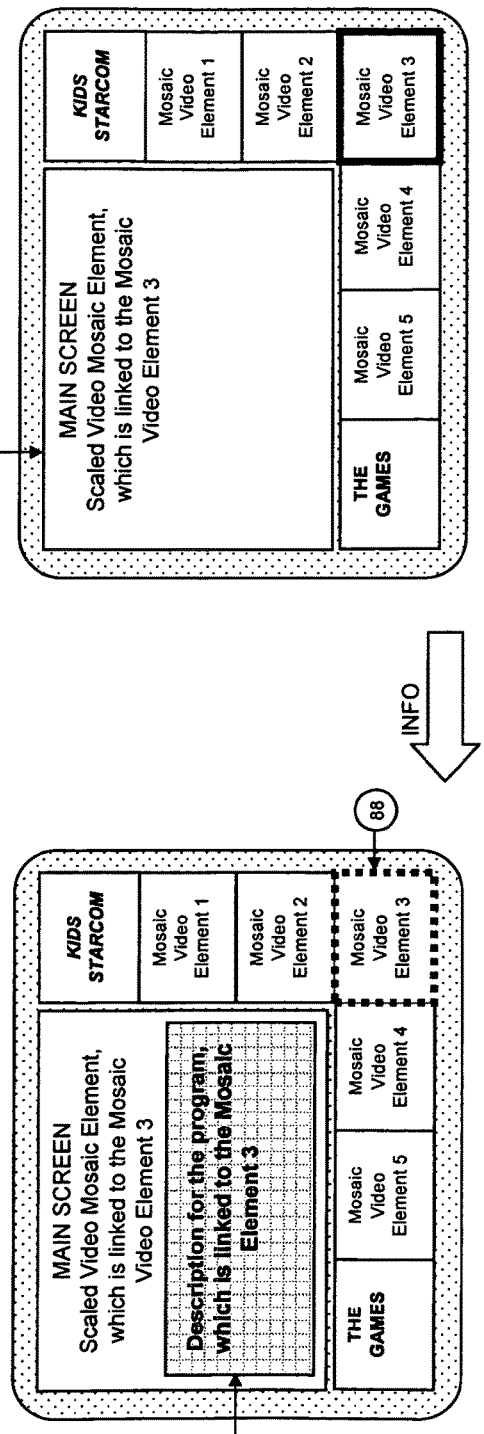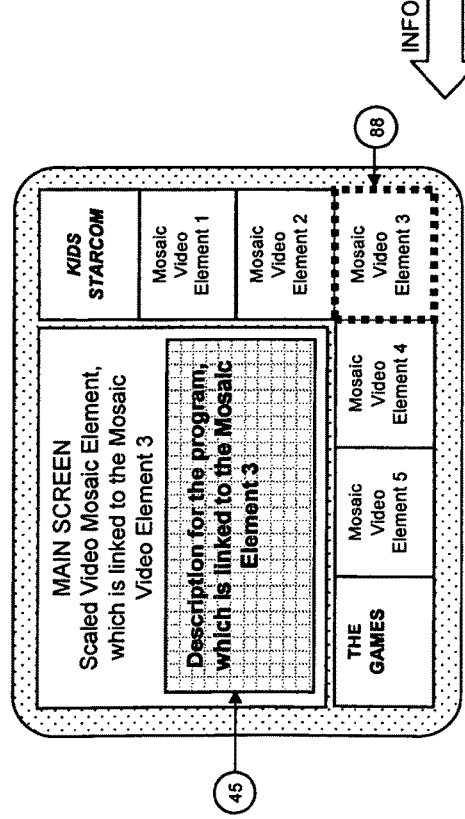

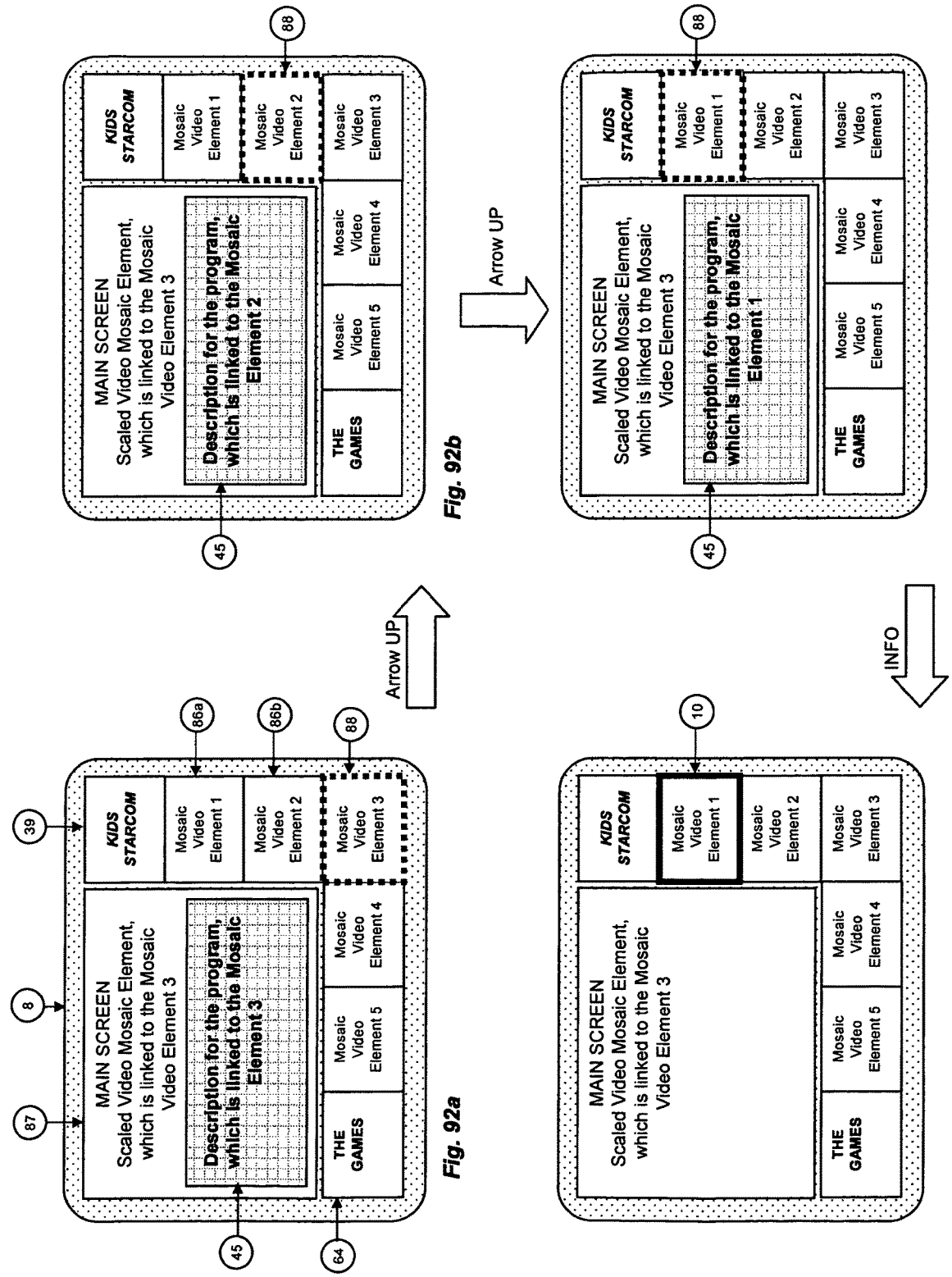

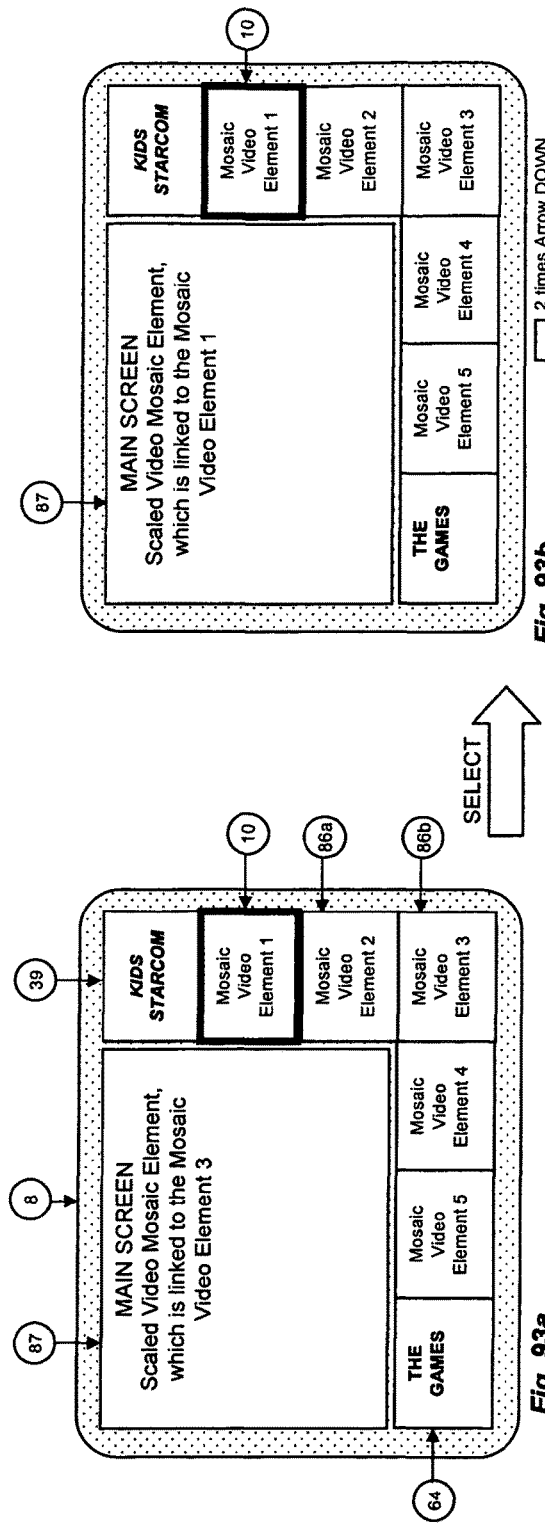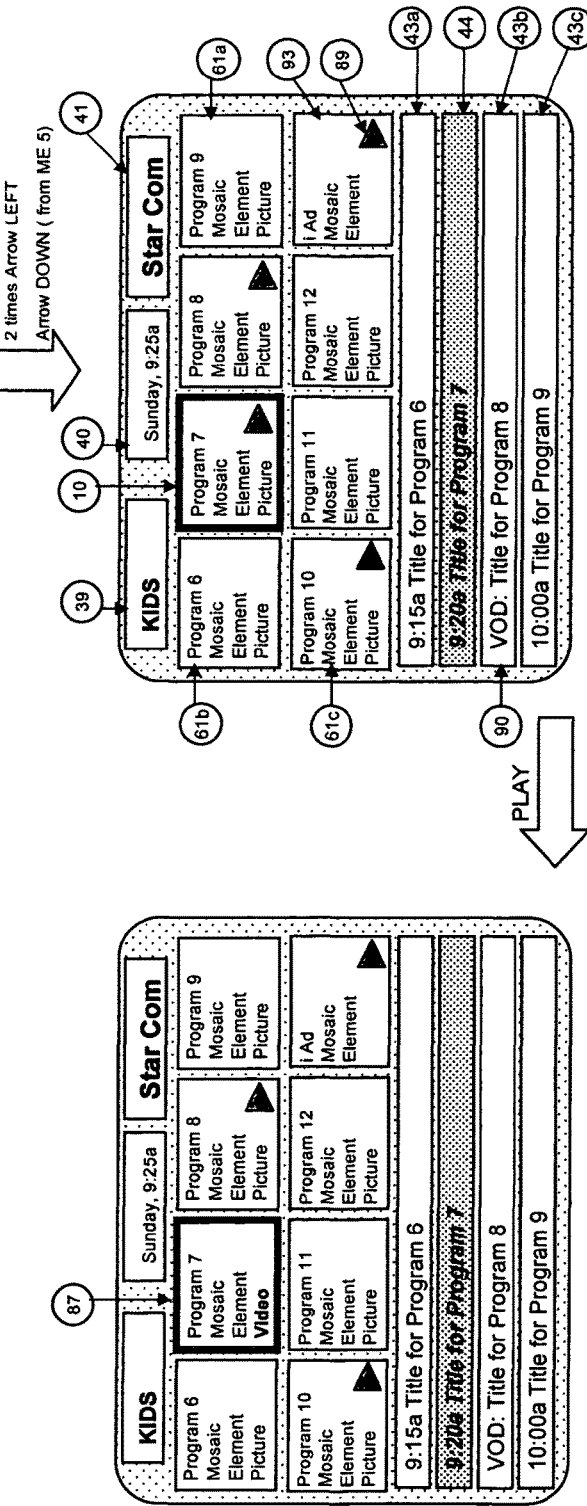
Fig. 93a  Fig. 93b  Fig. 93c  Fig. 93d

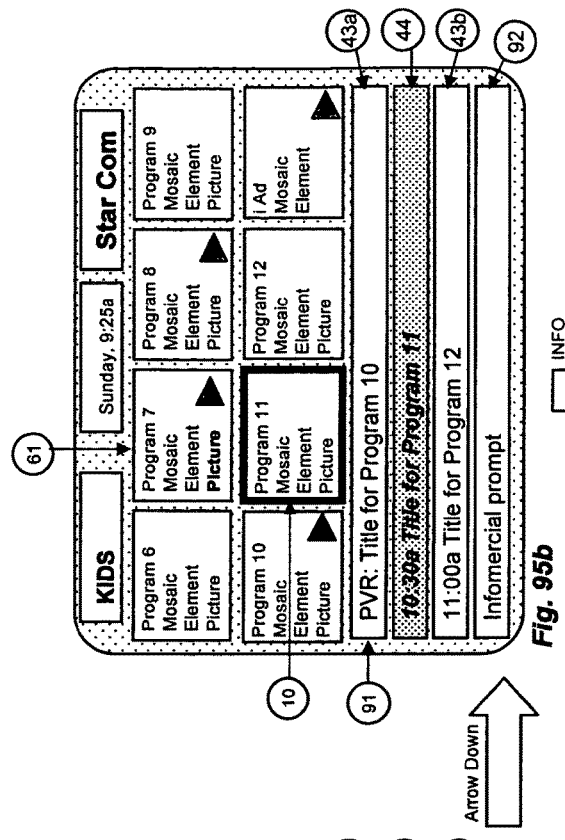
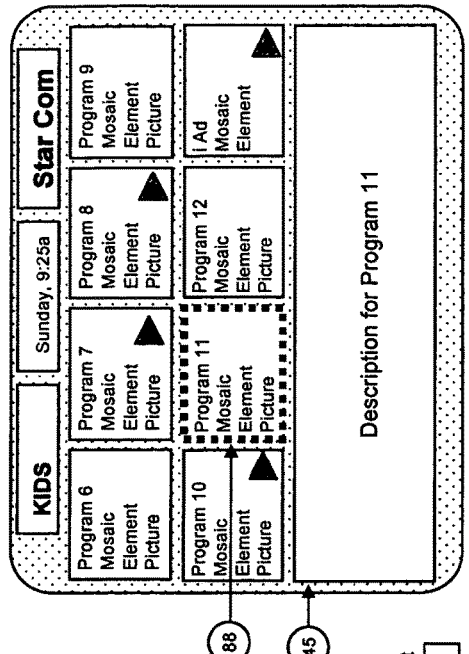
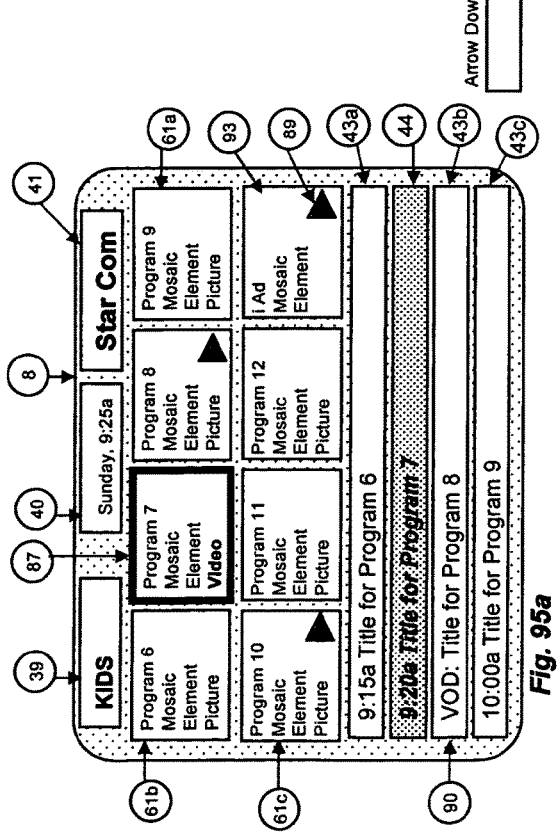
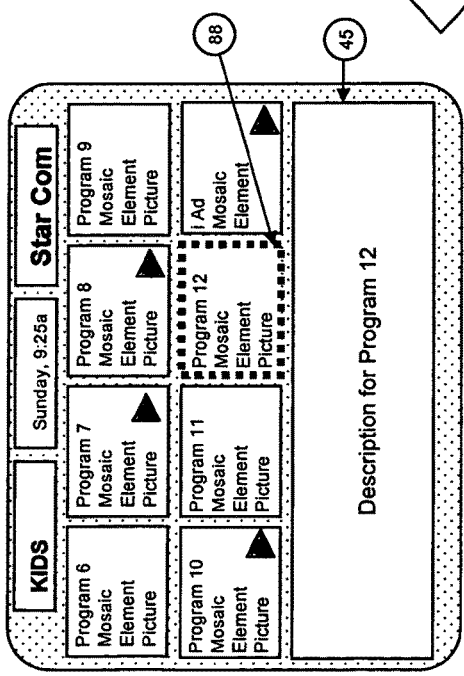

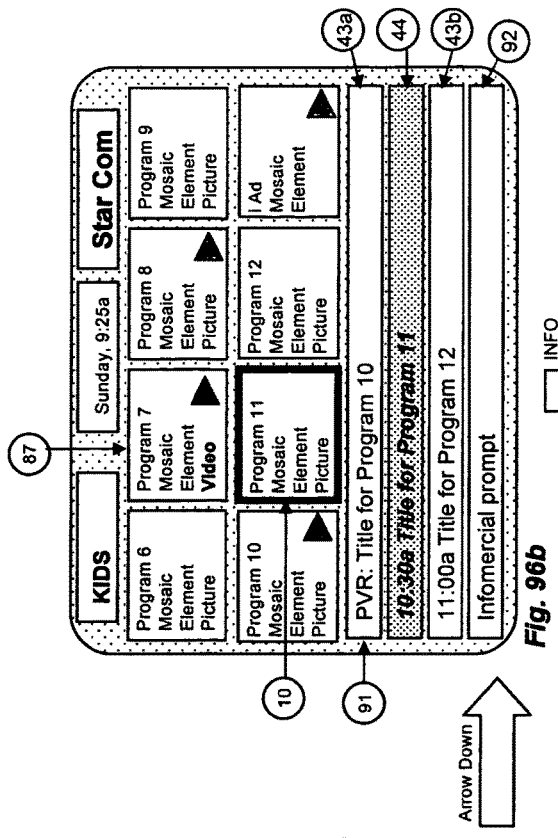
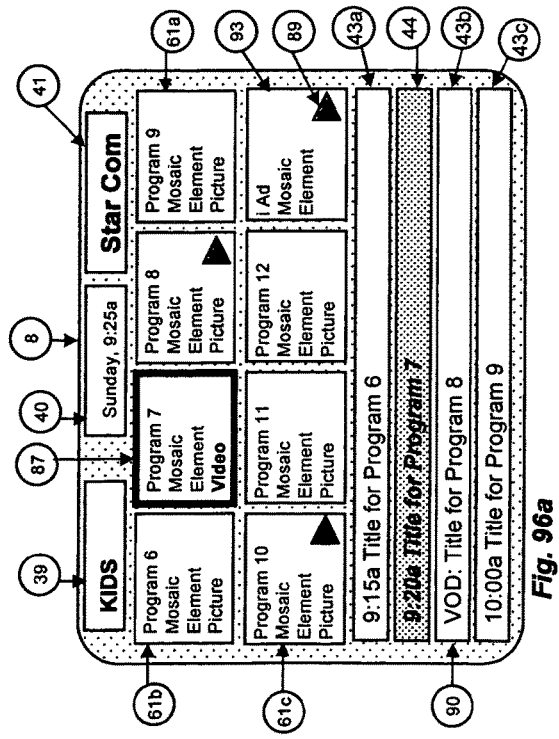
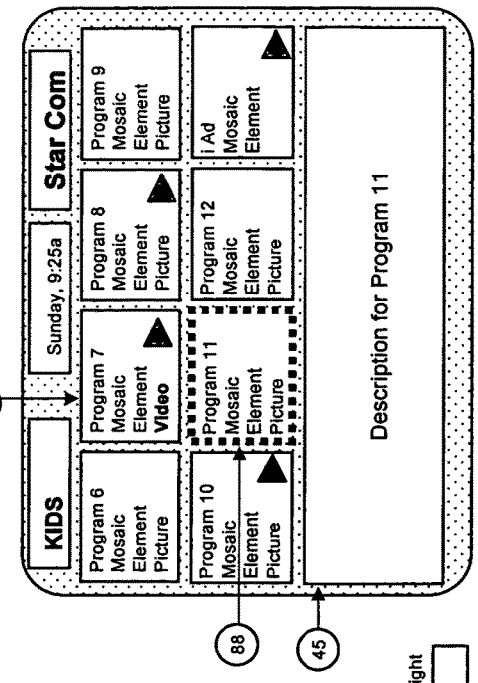
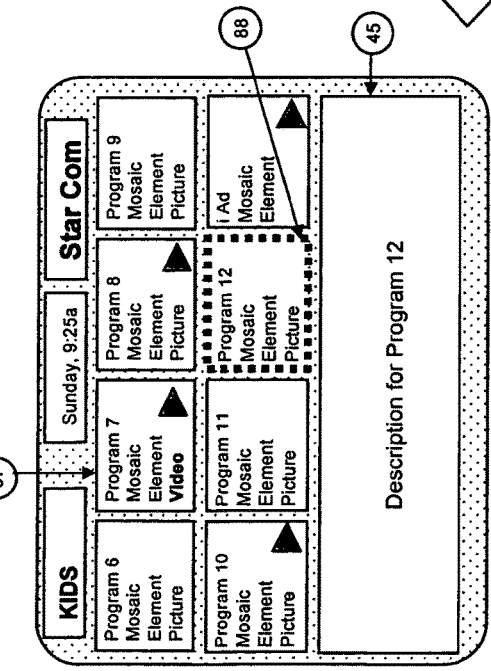

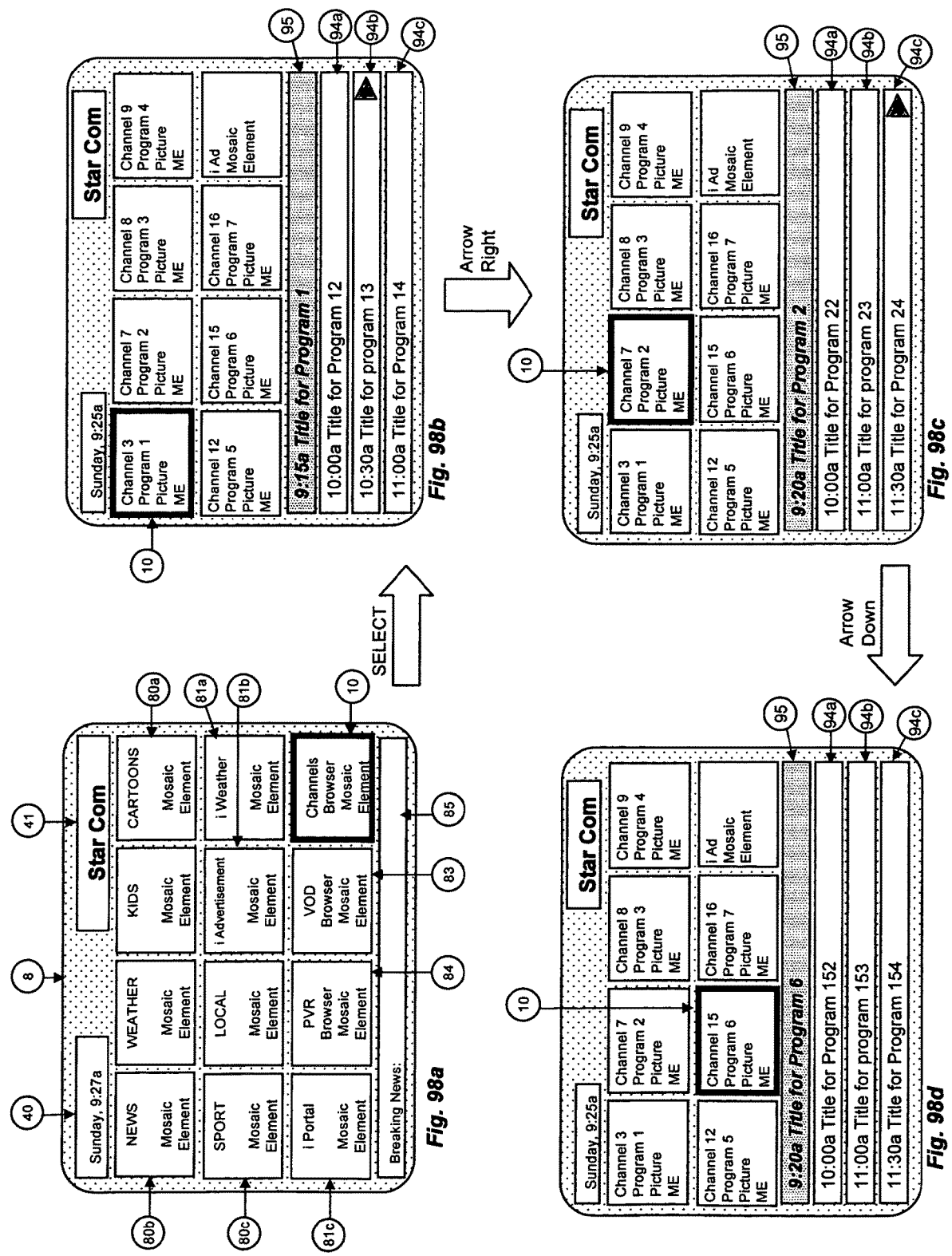

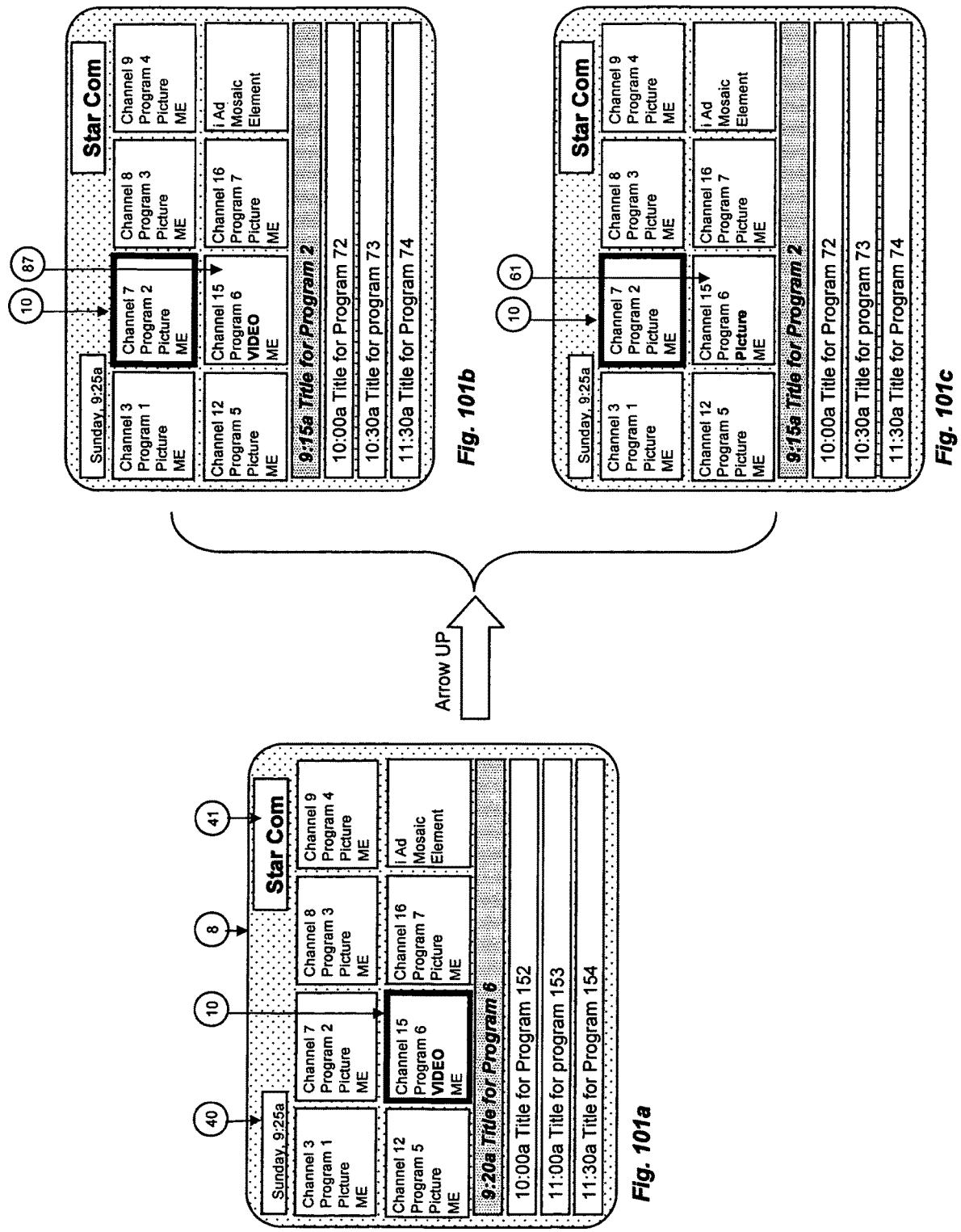

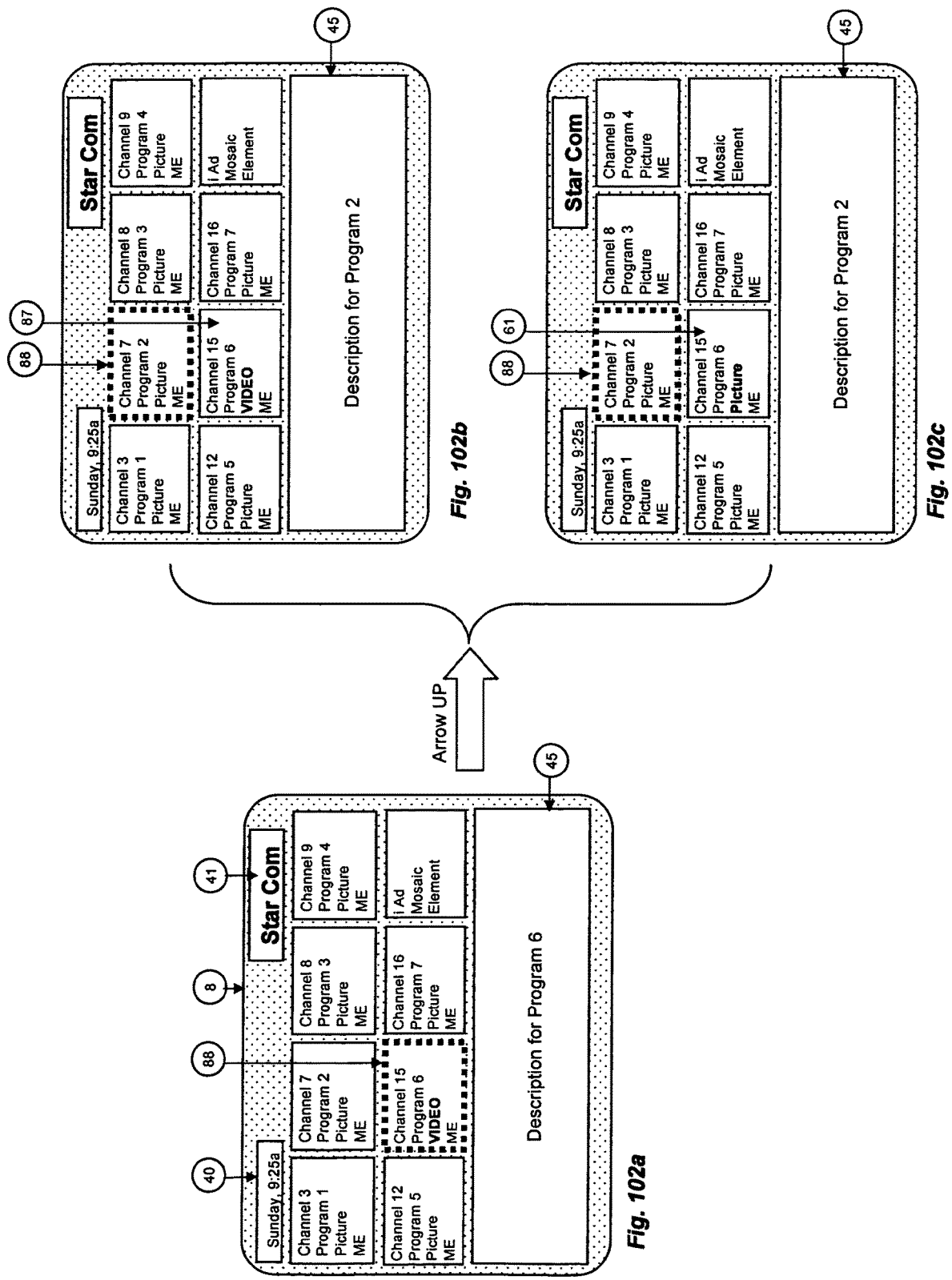

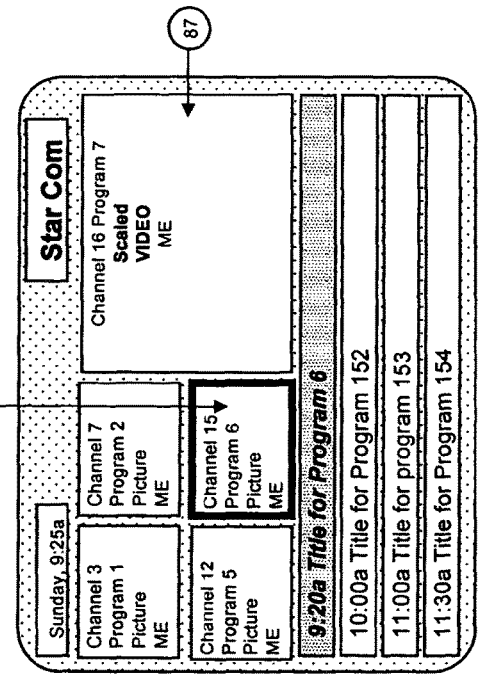
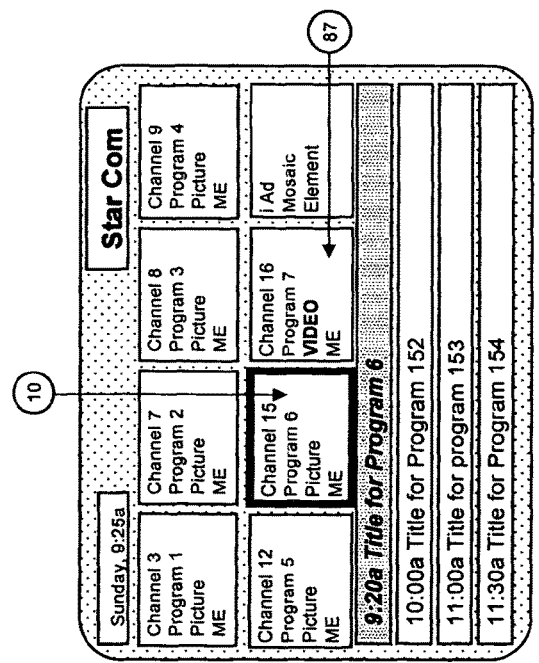
*Fig. 109b*  *Fig. 109c*
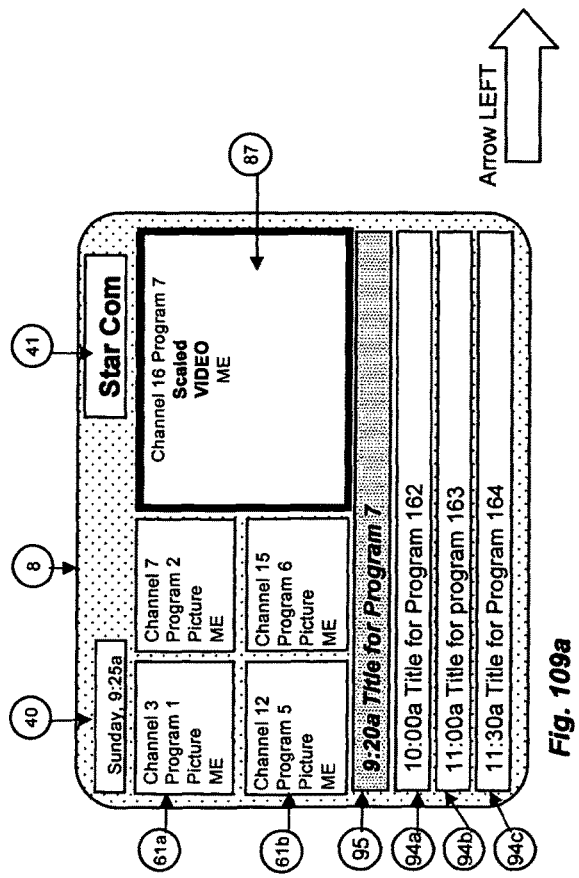
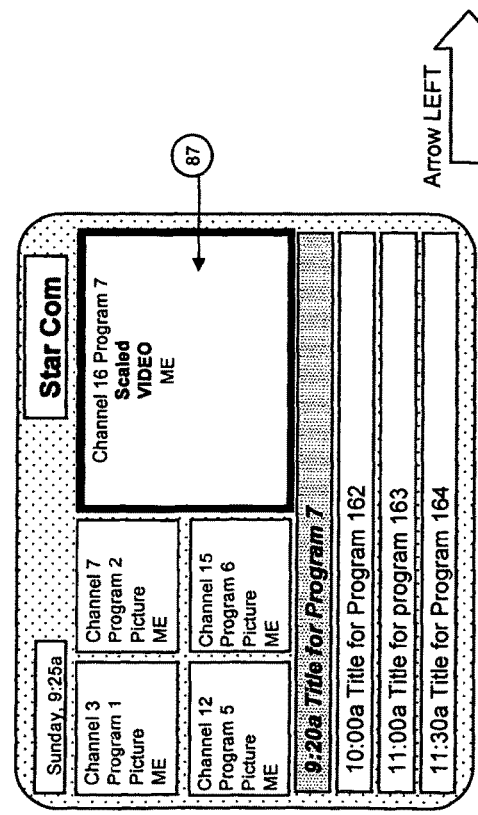
*Fig. 109a*  *Fig. 109d*

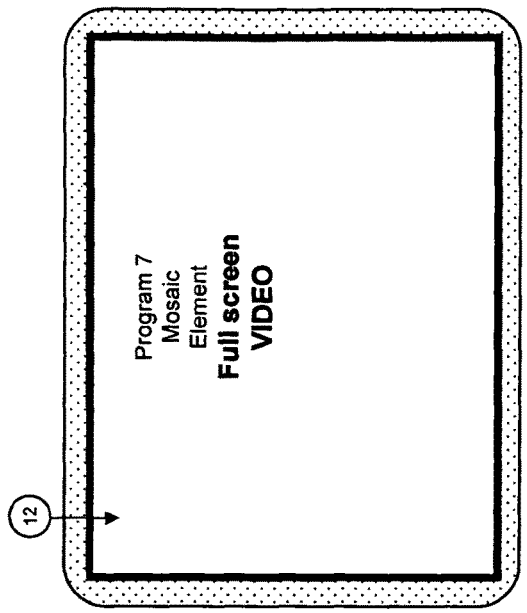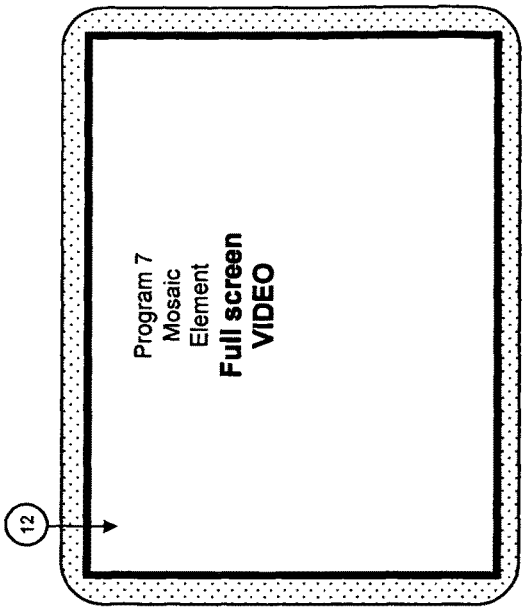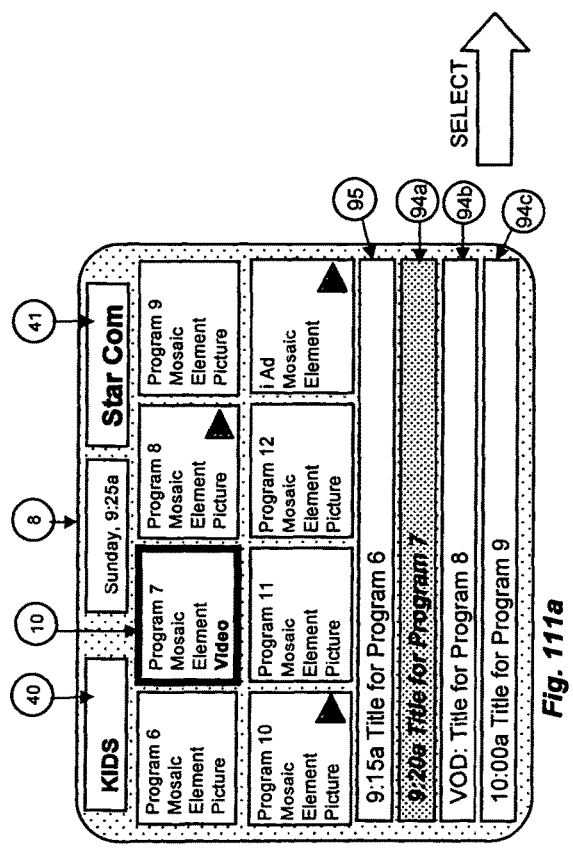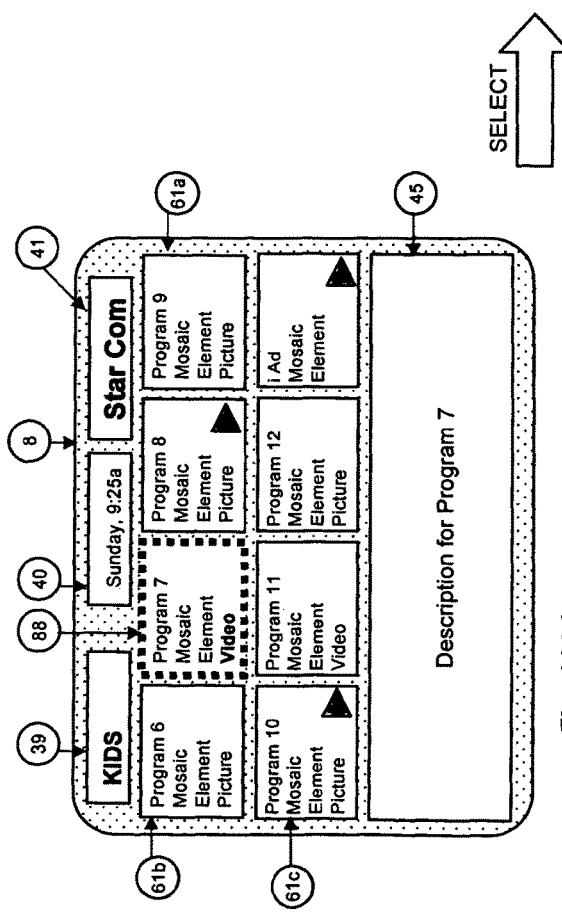

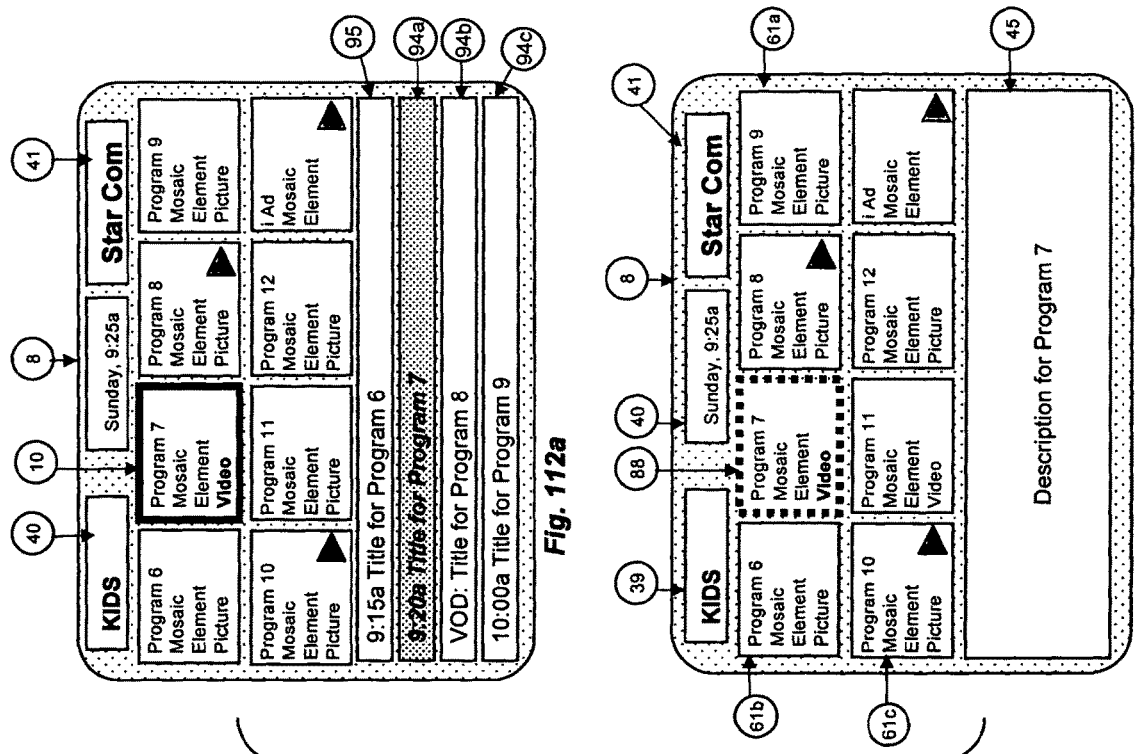
*Fig. 112a*  *Fig. 112d*
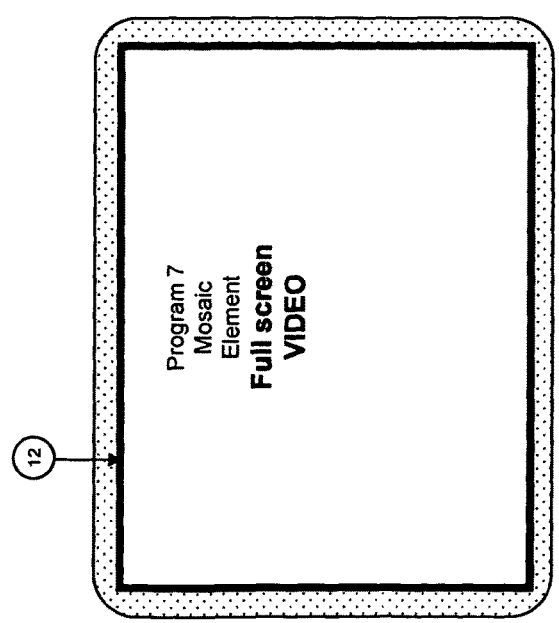
*Fig. 112a*

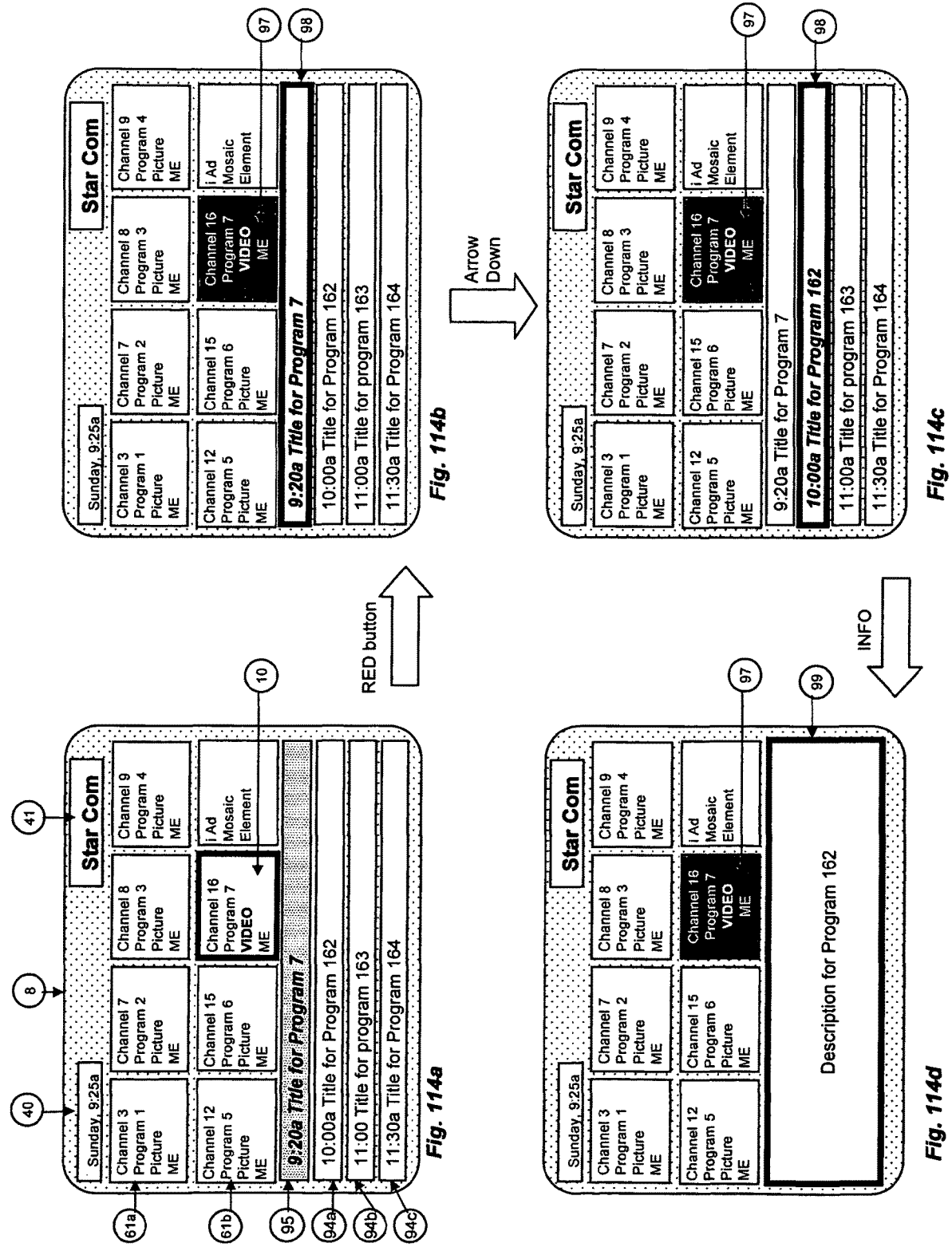

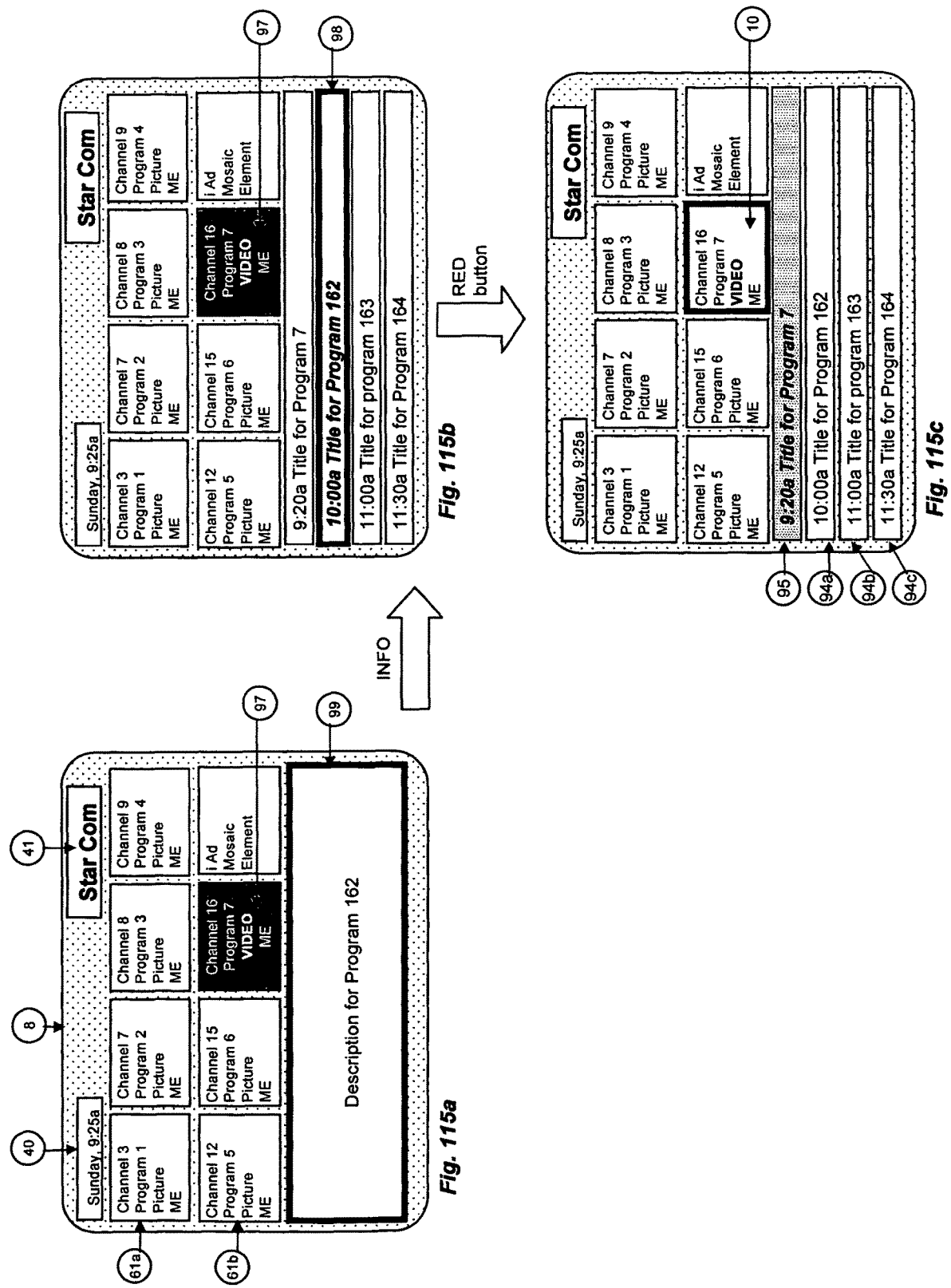

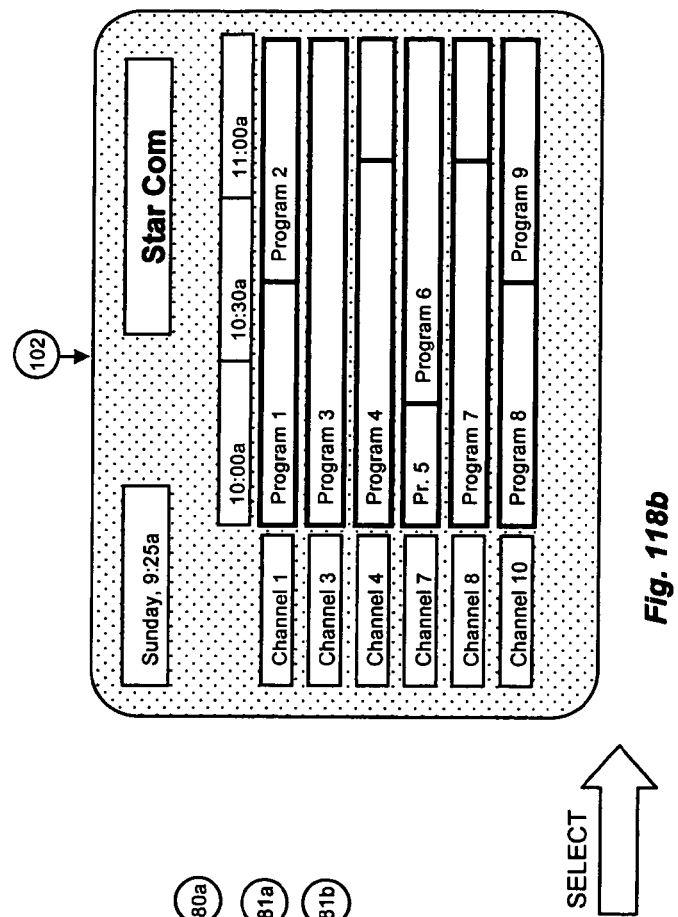
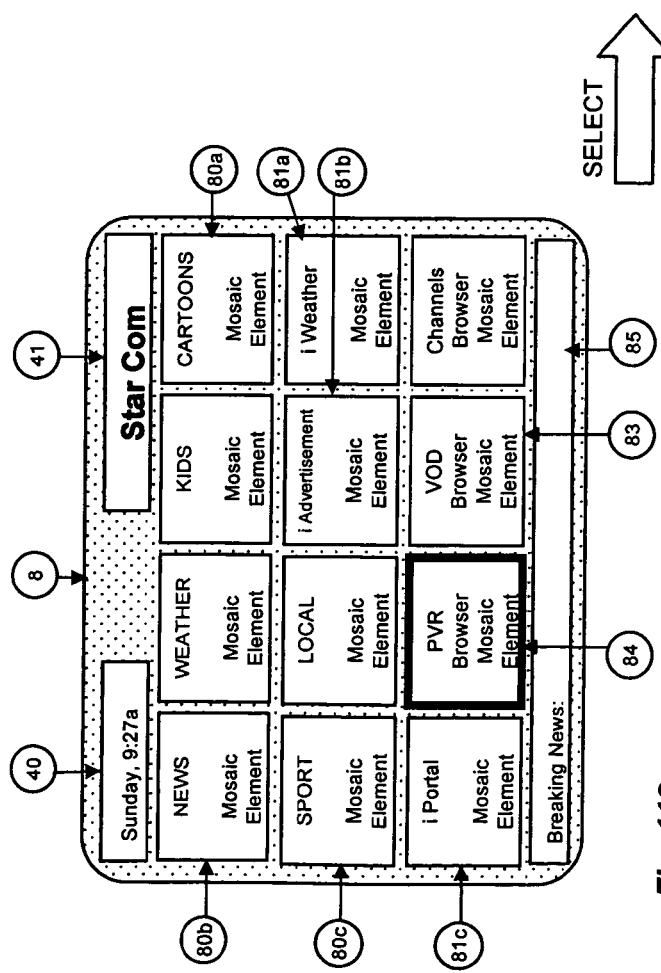
*Fig. 118b*
*Fig. 118a*

METHOD AND APPARATUS FOR GENERATING MULTIPLE DYNAMIC USER-INTERACTIVE DISPLAYS

CROSS-REFERENCES TO RELATED APPLICATIONS

This application claims the benefit of U.S. Provisional Application No. 60/647,287, filed Jan. 27, 2005 and U.S. Provisional Application No. 60/678,773, filed May 9, 2005, both of which are included by reference in their entirety for all purposes.

BACKGROUND OF THE INVENTION

Television service providers including cable, satellite, terrestrial, video over Internet, IPTV, and others can deliver a large number of channels to subscribers. To choose and select desired program among hundreds of available channels, subscribers can browse channels one by one or use grid or mosaic based Electronic Programming Guides (EPG) by which they might search for possible choices, with the effect to that those subscribers are able to select one or more choices for presentation. However, while they achieve the general goal of allowing users to search and select, known systems are subject to several draw-backs.

Browsing a large number of channels in a search of a desired show is time consuming and inefficient. For example, to preview currently broadcasted shows subscriber can surf 300 channels one by one while spending 10 seconds on each, requires over 50 minutes, which is, in many cases, longer than subscriber choose to watch television program, or the duration of desired program itself. Grid based EPG, although listing titles of programs for several channels at once, including the option of selecting favorite channels and expediting program selection process, displays on average 2 shows per grid's channel line, for the total of 600 shows subscriber has to view to select desired show. Moreover, grid based EPG does not allow users to observe the actual video content of several channels at once, thus forcing subscribers to decide on channel and program selection merely from its textual description, and not its actual content. Although some EPGs allow subscribers to preview in PIP a program selected from the grid, still users can not simultaneously observe content of more than one program. Grid based EPGs that allow subscribers to search programs by title or content category, displayed search results still in a textual representation of a matched program; at the same time not including in the search programs available over VOD, local or network PVR, or program available thru other service provider or source.

Existing mosaic based EPG (MEPG), used by CANAL+ in France for example, is also limiting since it creates pages made of mosaic element each of which is assigned for an extended period of time to a specific channel. CANAL+ offers 3 screens each with 20 elements for the total of 60 channels. However, for such static MEPG, 300 channels may be presented on 15 separate screens forcing a subscriber whishing to find all "News" programs to preview video content of 300 channels by surfing 15 separate screens each with 20 elements. When a subscriber whishes to compare content of two or more channels not present on the same screen, he or she has to toggle between two or more EPG screens, rendering such system as cumbersome, inconvenient, and difficult to use. Such static MEPG systems do not allow subscribers to customize EPG screens to simultaneously display video content of their favorite channels on the same screen. Also, existing MEPG systems, when attempting to group channels by category (e.g. movies, news, cartoons) fail because the same channel broadcasts shows that can belong to different content categories at different times of the day: "Cartoons" in the morning, "Soap Operas" in the afternoon, "News" in the evening, and "Movies" at night. As the result, with the existing MEPG system, when the channels are grouped by category and displayed on the same screen, subscriber that tunes to "cartoons" mosaic EPG page, expecting to see cartoons, actually sees programs that belong to other content categories.

In U.S. Patent Application No. 20040070593, discloses a mosaic-like UI that can be dynamically rearranged in response, in part, to user selection and static metadata about the video titles stored in the library. However, this solution does not work for the television broadcasting environment where each channel's metadata is not static, but dynamic, since it is being contentiously updated and changed. The '593 application does not take into account business needs of service provider which might want to auction off locations of some or all of the mosaic elements on some or all MEPG screens to broadcasters or other third parties. The '593 application does not allow subscribers to simultaneously view video feed from one of any broadcasting channels on one part of the screen while simultaneously accessing MEPG in the remaining portion of the same screen.

In addition to the difficulties of selecting among a large number of currently broadcasting programs, as described above, subscribers also have many challenges selecting upcoming shows using existing EPGs. Again, to find a show that matches their criteria, subscribers have to review set of hundreds of shows that immediately following currently broadcasting programs plus review another set of hundreds of shows that follow after. This task becomes very arduous because by default programs in the existing grid and mosaic based EPGs are organized by channel and time, but not by program category.

So, to choose desired program subscribers have to review many hundreds of entries most of which do not belong to desired program category. The problem of program selection will be exacerbated in the future when even more channels and programs become accessible to subscribers thanks to proliferation of client PVR, VOD over cable, VOD over Internet, network PVR, and other program delivery methods and service. Not only subscribers would have to review hundreds of available programs many of which are irrelevant to the search since they belong to other program categories, subscribers have to juggle among several EPGs each of which is representing its own service. For example, digital cable service and VOD over cable are represented by their own EPGs, TiVO or ReplayTV PVR services are represented by their own EPGs, and VOD over Internet, like Akimbo, is also represented by its own EPG. With more and more content delivery options, subscribers are forced to spend greater amount of time searching and selecting desired content distributed among various systems represented by own EPGs.

What's more, existing EPG services use textural representation of programs and services, like interactive TV. However, it's been shown that people gravitate towards search of video information not by its textual representation but by its visual representation. The best example of this are display cases of a video store, like Blockbuster. There, latest movie releases are arranged in such a manner as to allow customers to view and select desire program by viewing front covers of the DVD cases. Most DVDs, on their front covers, show a visual representation of the video content that allows them to quickly and easily infer its genre, participating actors, and thus make a selection. Unfortunately, existing EPG services have not been designed to display program's visual representation and allow subscribers to choose desired program by it. Instead, subscribers have to choose desired program by its textual representation.

To simplify content selection process, subscribers ought to have a Content Portal that can allow them to choose desired program based on its visual representation and can consolidate access to programs available over multiple services, including those based on a locally or remotely stored content, and services based on programs broadcasted over various available media. Thus, Content Portal ought to allow subscribers to access currently broadcasted programs, soon to be broadcasted programs, locally stored and remotely stored programs by their visual representation. While consolidating access and selection of programs available over multiple networks, Content Portal should also preserve access to advanced value added services like interactive television and on demand advertisement.

In addition to EPGs, subscribers can choose desired program using other program sources including printed TV guides, and TV guides offered over the Internet. There, subscribers have to deal with the same problems of choosing desired content based on its textual representation, but not on its visual representation.

Similarly to the digital TV service providers, providers of digital and satellite radio services like XM and Cirrus have not incorporated visual representation of broadcasted or soon to be broadcasted content, although amount of available content over hundreds of available channels is large. Similarly to the digital TV service, subscribers to the digital radio service have to choose desired program based on its textual representation. With hundreds of simultaneously available programs, this task becomes as challenging as selecting video content from digital TV service providers.

BRIEF SUMMARY OF THE INVENTION

The invention provides a method and system capable of solving many problems of content preview and selection for visual or audio content offered over digital TV or digital radio networks, and generally a user interface (UI) for accessing content. One aspect of the invention is a method of creating and presenting a Dynamic Mosaic Extended Electronic Programming Guide (DMXEPG) using video, audio, special applications, and service dynamic metadata. The system enables television or digital radio service subscribers to select and display of various programs including video, interactive TV applications, or any combination of audio or visual components grouped and presented in accordance with the dynamic program/show metadata, business rules and objectives of service providers, broadcasters, and/or personal subscriber choices. Another aspect of the invention is to print programming guides or guides in electronic form using the same solution of utilizing dynamic metadata to group, consolidate, and display program information with the purpose of allowing subscribers to view and select desired program using program's visual representation.

In accordance with an aspect of the present invention, the system can merge channel programs/shows metadata for multiple services offered by one or more than one service provider using a unique channel identifier, e.g., a service source ID either for digital TV or radio services. Such merger is performed on the backend and merged metadata is displayed on a client device or in a printed program information guide. This invention differs from the mechanism described in U.S. Pat. No. 6,072,983, which describes merging channel metadata on the client side.

In accordance with an aspect of the present invention, an application can be provided on devices with more than one tuner that can simultaneously display video and applications graphics of that application on more than one display.

In accordance with an aspect of the present invention, applications can be provided on devices with more than one tuner that can simultaneously display a program chosen by the subscriber on one portion of the screen, while displaying DMXEPG or its components on the rest of the screen.

In accordance with an aspect of the present invention, metadata from different value-added services can be integrated into a matrix element (ME) of the DMXEPG and displayed to subscribers for currently broadcasted or soon to be broadcasted programs.

In accordance with an aspect of the present invention, integrated metadata can be recorded for later playback.

Further aspects of the present invention include:
(a) it can dynamically assign channels to Mosaic Element (ME) using: continuously updated metadata (programming schedule) about television (broadcasted) channel (EPG programming/listings), criteria received from one or more sources. For example a subscriber, service provider, or third party. Example of third party can be broadcaster, content critic, and the like.
(b) it can dynamically assign iTV applications, Interactive advertisement, VOD program links to Mosaic Element (ME) using criteria received from one or more sources. For example a subscriber, service provider, or third party. Example of third party can be broadcaster, content critic, and the like.
(c) it allows to support DMXEPG where subscribers can simultaneously observe any pre-selected channel chosen by them or video content from other sources, like DVD players or programs offered by another digital TV service provider, on one portion of the screen while observing other ME with or without program related textual information on the rest of the screen
(d) it allows service providers to collect payments from broadcasters, content owners, or third parties for assigning without service subscriber input their programs to pre-selected ME and DMXEPG screens
(e) it allows service providers to collect payments from advertisers for assigning, without service subscriber input, logos, videos, or other visual or audio materials to ME or DMXEPG screens
(f) it allows service providers to create more than one variant of DMXEPG pages, and without subscriber input associate the specific DMXEPG variant to subsets of subscribers. These subscriber subsets can be defined by one or more criteria. For example, subscriber demographic data, capabilities of subscriber device, or capabilities of service provider head-end equipment, etc.
(g) it simplifies for subscribers channel, program, and iTV application selection, usage of interactive TV applications and DMXEPG by using available buttons on the remote control in conjunction with the optional rotating element integrated into the remote control
(h) it allows subscribers to customize DMXEPG page which can be set to display in some or all MEs either channels, programs or interactive applications chosen by the subscriber
(i) it allows subscribers to choose currently broadcasted or upcoming show which are organized according to their type, business rules or service provider, or client equipment capabilities (j) it allows subscribers to choose desired program among currently broadcasted or soon to be broadcasted audio or video programs based on their visual representation
(k) it allows subscribers using services of multiple digital TV or digital radio service providers, to choose desired program from a single programming guide and also use the same programming guide to choose desired program stored either locally or remotely
(l) it allows subscribers using programming guide to access value added services, like VOD, which are integrated into related ME of DMXEPG. For example, ME displaying currently broadcasting or soon to be broadcasted show can have embedded sign indicating to subscribers availability of previously broadcasted episodes of the same show over VOD service
(m) it allows to created application on devices with more than one tuner that can simultaneously display video and applications graphics of that application on more than one display, for example allowing subscribers to view and navigate DMXEPG on one display, which can be a touch screen display, and view selected show on another display
(n) it allows subscribers with devices with multiple tuners to simultaneously view DMXEPG on one portion of the screen while viewing desired program delivered from local or remote source on the other portion of the screen.
(o) it allows subscribers to record desired program along with metadata of related services like TV commerce, interactive advertisement, VOD, interactive TV applications, and others
(p) it allows to virtually increase size of displayed video in the ME to improve content recognition by the subscriber by zooming in and truncating source video
(q) it allows subscribers to search channels by channel name
(r) it allows subscribers to create one or more customized DMXEPG channel line up by reassigning channel numbers to numbers selected by the subscriber. For example, subscriber can group desired channels by assigning numbers to the channels that would allow channels to be located closely to each other during channel surfing. This system can be implemented by processing original channel line up on the client side or on the headend side
(s) it allows to create content representation system using ME which is a visual and or audio representation, in addition to the textual description, of accessible content (information) or representation of content category and type.
(t) it allows subscriber to browse, view, and select desired program from all subscriber accessible content information using DMXEPG which comprises ME
(u) it allows to pre-search and display to subscribers related information including showing times, channel number, or location (VOD, PVR) of past or upcoming episodes of the show in the selected ME. For example, subscriber reviewing a show in specific ME, can ascertain show times of upcoming or past episodes as well as VOD ordering or PVR start play options
(v) it allows to indicate to subscribers availability of video trailer or show video preview or related value added service stored on PVR, network PVR, or VOD server on ME representing currently broadcasted or soon to be broadcasted shows
(w) it allows subscribers to enable content filtering service managed by service provider or third party in addition to or instead of TV Parental Guidance (TVPG) or Motion Picture (MPAA) ratings. For example, based on user preference, DMXEPG service (back-end service suite, client software, or their combination) can deny access to one or more channel, program, or portion of a program in accordance with the criteria managed by either service provider and/or third party.

BRIEF DESCRIPTION OF THE DRAWINGS

Various aspects of the present invention are described in the following detailed discussion of an illustrative embodiment of the invention. The embodiment is explained in the figures listed below and in the following detailed discussion.

FIG. 2 is one of the layouts for the second or other levels of DMXEPG which, according to the invention, is dynamically generated by the DMXEPG service, assigning to the MEs the programs that match program content, business, and subscriber preference rules.

FIG. 49 is a general flow chart showing an alternative process for zooming in and zooming out of an in-focus ME.

FIG. 50 shows changing the location of an expanded ME on the screen.

FIG. 51 shows that DMEPX can comprise MEs generated at the headend or on the subscriber (client) side.

FIG. 56-58 show a table that explains how to scale and display video when aspect ratio of DMXEPG, or ME, or original video stream, or display are different.

FIGS. 60-63 show options of assembling DMXEPG when DMXEPG and ME aspect ratios are or are not the same

FIG. 91a shows example of UI and navigation of a DMXEPG portal.

FIGS. 91b, 91c, 91d show DMXEPG UI navigation within specific content category.

FIGS. 92a, 92b, 92c, 92d show DMXEPG UI navigation and program information following changes in focus of MEs.

FIG. 93 shows UI and navigation of DMXEPG of future (not yet broadcast) programs.

FIGS. 95, 96 shows UI and navigation of DMXEPG in program information display mode when some ME display trailers one ME is in focus and optionally continue to play trailers when focus moves to another ME.

FIGS. 98-109 show UI and navigation of DMXEPG in channel browsing mode.

FIGS. 110-112 show zoom in and zoom out of ME in DMXEPG in show browsing mode.

FIGS. 113-117 show UI and navigation of DMXEPG in channel browsing mode.

FIG. 118 shows DMXEPG ability to enter PVR content browsing mode.

DETAILED DESCRIPTION OF THE INVENTION

Following is a lexicography of terminology used in this specification:

"Select" button—STB remote control button shown on some remote controls as "Select", or "OK", or "Enter", or under other equivalent name DMXEPG—Dynamic Mosaic Extended Electronic Programming Guide Focus—highlighted or otherwise emphasized screen element iTV—interactive television. Any content that involves subscriber input and provides response to that input ME—Mosaic Element MEC—Mosaic Element Component pressing a button—the specification discloses a conventional button-based remote control device. However, any suitable control device is contemplated, and it need not necessarily contain buttons which are pressed. It is understood that all references herein to pressing a button refers to activating an action, whether by actual button press or some other action; e.g., a voice command.

Program—any show or event transmitted over a channel

Service Provider—entity that offers video services over cable, satellite, terrestrial digital, video over interne, IPTV, fiber, or other types of infrastructure.

STB—set top box. When applicable, STB may be used as a substitute for the terms Subscriber Device or Client Device. The STB is a device which allows service subscriber to receive and decode digital stream.

VOD—video-on-demand. Service that allows a subscriber to start chosen video program stored by the service provider. Term VOD is also used to substitute term COD (content-on-demand). COD may or may not include video in addition to a combination of audio, interactive, graphical, or any other type of transmittable content.

MTVSS—Matrix TV Server Suite

Tuner—system module that allows to filter desired program stream. For example, program stream can be transmitted over RF network; it can also be transmitted over digital packet delivery network, like Internet.

Figure 1:
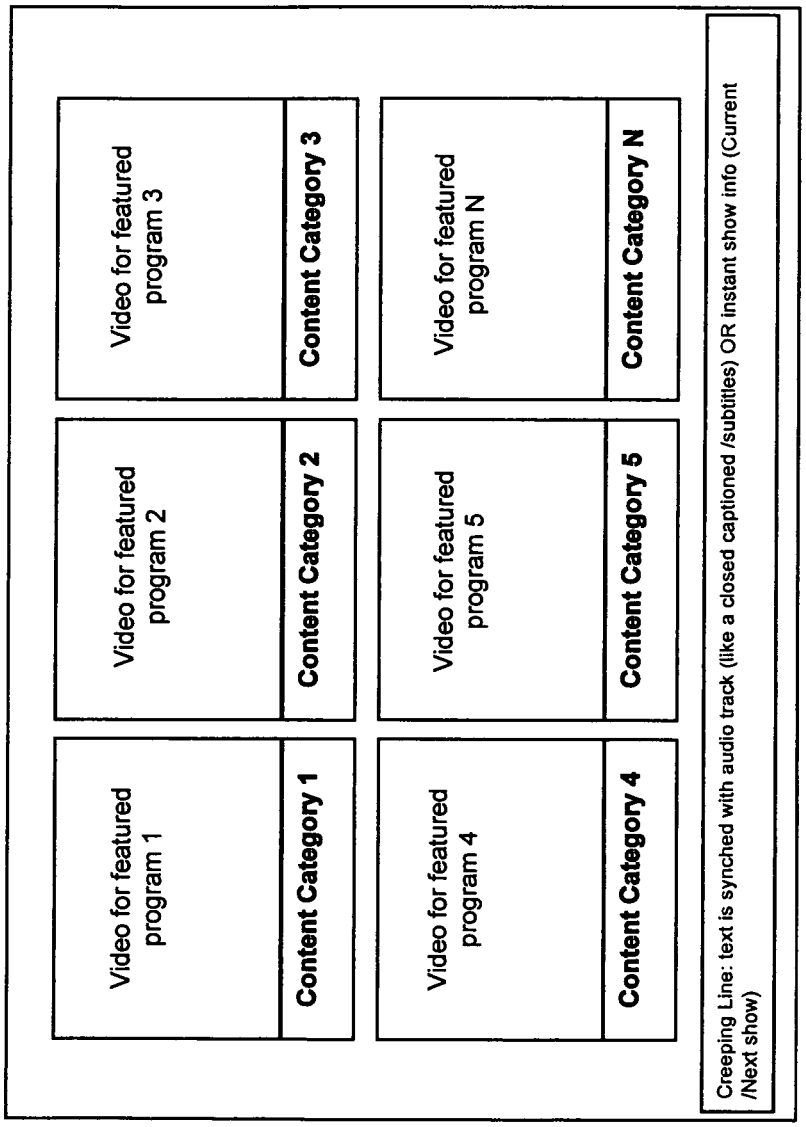
FIG. 1 is the screen for the first level of multi-dimensional DMXEPG which, according to the invention, dynamically generated by assigning to ME programs that match program content, business, and subscriber preference rules.
Figure 127:
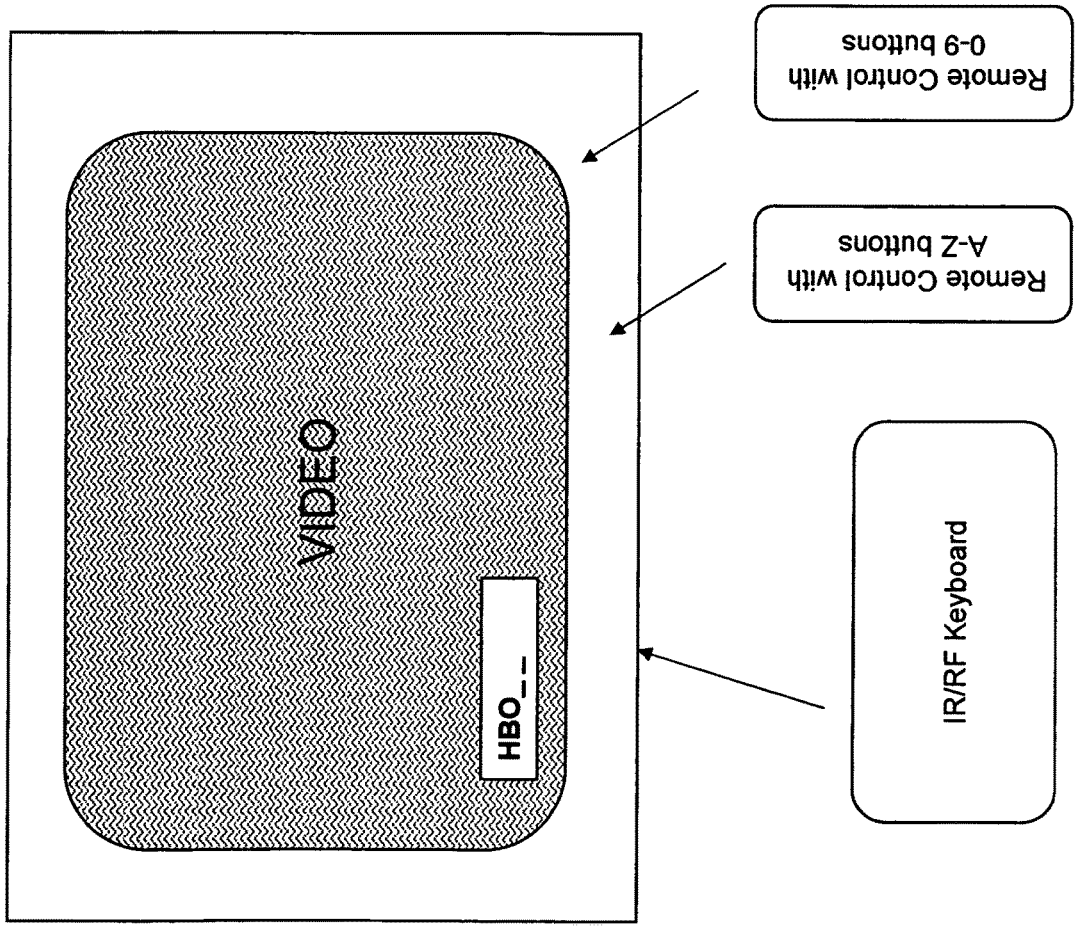
FIG. 127 shows how subscriber can tune to the desired channel using channel name (for example CNN, HBO, etc) or its mnemonic representation using telephone keypad—letter association.

Following is a list of the reference numerals used in FIGS. 1-127 of the specification:

| Number | Description |
|---|---|
| 1 | Full screen video |
| 2 | Clipped video source |
| 3 | Video processor |
| 4 | Mosaic element processed for insertion into DMXEPG |
| 5 | Mosaic element inside DMXEPG |
| 6 | Headend generated DMXEPG video stream |
| 7 | Remote control |
| 7a | Arrow Up button |
| 7b | Arrow Down button |
| 7c | Arrow Left button |
| 7d | Arrow Right button |
| 7e | Zoom in button |
| 7f | Zoom out button |
| 7g | Select button |
| 7h | Info button |
| 8 | Display device |
| 9 | DMXEPG application screen (video and graphics) displayed on client device |
| 10 | Generic Mosaic Element (Video, Picture, Application, etc. see FIG. 5) that is "in focus" |
| 11 | Video feed scaled by the client device |
| 12 | Full screen video on a client device |
| 13 | Digital TV headend |
| 14 | Client video source (DVD, VCR, Camcorder, etc.) |
| 15 | Video input in the client device |
| 16 | DVR or PVR video decoder |
| 17 | Digital video decoder |
| 18 | Video tuner (digital/analog) |
| 19 | RF Splitter |
| 20 | RF Switch |
| 21 | Microprocessor |
| 22 | Mosaic Application Memory |
| 23 | RF input |
| 24 | Video Processor (Scalier) |
| 25 | Video Processor Combiner |
| 26 | Client device (e.g., STB/Media center, Digital television system module, video processing card in a PC, any portable wireless device such as a PDA or a cell phone, and so on) |
| 27 | Graphic component of the DMXEPG application |
| 28 | Interactive Application Canvas (Partial Screen) |
| 29 | DMXEPG Screen Title |
| 30 | Interactive Application Canvas (Full Screen) |
| 31 | Original DMXEPG video feed with aspect ratio 4 × 3 |
| 32 | Original DMXEPG video feed with aspect ratio 16 × 9 |
| 33 | Original DMXEPG video feed with aspect ratio M × N |
| 34 | ME with aspect ratio 4 × 3 |
| 35 | ME with aspect ratio 16 × 9 |
| 36 | ME with aspect ratio M × N |
| 37 | Background |
| 38 | DMXEPG video stream on display |
| 39 | Screen Title (also referred to as Screen name) |
| 40 | Current Time |
| 41 | Screen branding area |
| 42 | ME with the "IDLE focus" |
| 43 | The Show/program title bar |
| 44 | The Show/program title bar which is belongs to the focused mosaic element |
| 45 | Show/program description |
| 46 | The sign to show ability to scroll description information |
| 47 | Screen title |
| 48-50 | (unused) |
| 51 | MEC HE |
| 52 | MEC STB |
| 53 | MEC video loop |
| 531 | MEC audio loop |
| 54 | MEC Image |
| 55 | MEC Application |
| 56 | MEC link to the Application |
| 57 | MEC link to the video program chosen by a subscriber |
| 58-59 | (unused) |
| 60 | ME video (HE or STB) |
| 61 | ME picture |
| 62 | ME Application |
| 63 | ME Game (may include any combination of 51, 52, 53, |

| Number | Description |
|---|---|
| | 531, 54, 55, or 56) |
| 64 | ME Entry to the Games or Game Categories list |
| 65 | The Game title bar |
| 66 | The game title bar belongs to the focused Game Mosaic Element |
| 67 | ME Game in PAUSE state |
| 68 | ME Game Category (may include any combination of 51, 52, 53, 531, 54, 55, or 56) |
| 69 | The Game Category screen title, which includes name of the game category and branding area. |
| 70 | ME Program/show/event (may include any combination of 51, 52, 53, 531, 54, 55, or 56) |
| 71-79 | (unused) |
| 80 | ME - entry to the Program Browser Mosaic for specific category (may include combination of 51, 52, 53, 531, 54) |
| 81 | ME Link to the application |
| 82 | ME link to the channel browser |
| 83 | ME link to the VOD programs browser |
| 84 | ME link to the PVR recorder program browser or to the Programs Grid |
| 85 | Creping line |
| 86 | ME: headend generated video |
| 87 | ME: STB generated scaled video |
| 88 | Generic Mosaic Element in the focus in the DESCRIPTION (info) MODE |
| 89 | Sign "PLAY", which is indicates that user may play scaled/full screen video for this mosaic element (video loop is stored on STB HD or on the VOD server) |
| 90 | Non-broadcast program video-on-demand (VOD) |
| 91 | Non-broadcast program. Program is recorded by PVR. This program belongs to the selected program category (KIDS) |
| 92 | Infomercial title |
| 93 | ME: Infomercial |
| 94 | The Title of the program, which is belongs to the selected channel |
| 95 | The Title of the currently broadcasted program, which is belongs to the selected channel |
| 96 | Infomercial description |
| 97 | ME, which is in LOST focus, focus on the listings line |
| 98 | The title of the program in the focus |
| 99 | Program description ME with the focus on it |
| 100 | The Title of the program for specific channel |
| 101 | The Title of the program for the focused ME |
| 102 | Programs Grid |
| 103 | ME, which is an entry to the specific VOD category |
| 104 | Sign on the program title bar, which indicates that this program or similar programs are available on VOD system |
| 105 | EPG National Meta Data Server |
| 106 | EPG Local Meta Data Server |
| 107 | Local VOD Assets server |
| 108 | EPG data encapsulator |

Following is a list of the reference numerals used in FIGS. 128-152 of the specification:

| Number | Description |
|---|---|
| 1 | Display device |
| 2 | The screen of the display device |
| 3 | Generic input for video and/or data<br>Composite Audio/Video Input<br>DVI 1.0 Digital HDTV input with HDCP Copy Protection<br>IEEE 1394 Digital Input with 5C copy protection<br>USB input<br>WIRELESS connection |
| 4 | Generic output for video and/or data:<br>Composite Audio/Video output<br>DVI 1.0 Digital HDTV output with HDCP Copy Protection<br>IEEE 1394 Digital output with 5C copy protection<br>USB output<br>WIRELESS connection |
| 5 | a client device (e.g., STB/Media center, Digital television system module, video processing card in a PC, any portable wireless device such as a PDA or a cell phone, and so on) |
| 6 | Video/Data connection for the wired implementation or video/data flow for wireless connection |
| 7 | Remote control receiver device |
| 8 | Remote Control device |
| 9 | Interactive Application Canvas (Partial Screen) |
| 10 | Generic Mosaic Element in focus |
| 11 | Generic Mosaic Element |
| 12 | Full Screen Video |
| 13 | Program Title bar in focus |
| 14 | Program Title bar |
| 15 | Program Description |
| 16 | Channel Name and channel number indicator |
| 17 | The current time indicator |
| 18 | Button Display1 on the remote control |
| 19 | Button Display2 on the remote control |
| 20 | Interactive Application |
| 21 | The instance on DMXEPG application. |
| 22 | The HScreen instance |
| 23 | The HScreenDevice objects, instances of HGraphicsDevice class |
| 24 | The HScreenDevice objects, instances of HGraphicsDevice class |
| 25 | The HScreenDevice object, instance of HBackgroundDevice class |
| 26 | The screen area of the touch screen display device |
| 27 | The SCROLL button2 |
| 28 | RF input/connection to the STB/Digital TV/Media center |
| 29 | Screen Title |
| 30 | Touch screen video device |
| 31 | CLEAR button |
| 32 | MOVE/REMOVE button |
| 33 | Arrow UP button (PAGE) |
| 34 | HOME button |
| 35 | Arrow DOWN (PAGE) button |
| 36 | INFO button |
| 37 | MUTE button |
| 38 | Microprocessor |
| 39 | Application memory |
| 40 | Tuner |
| 41 | Combiner of the Video Processor |
| 42 | RF Splitter |
| 43 | Tuner |
| 44 | Video decoder |
| 45 | Video Processor - video scale |
| 46 | DVR's Hard Drive |
| 47 | Cable, Satellite, IPTV, Terrestrial, or other digital TV Headend |
| 48 | Generic video processor |
| 49 | Touch screen display |
| 50 | Touch screen user input analyzer device |
| 51 | Graphics Processor |

Aspects of a user interface in accordance with the present invention are explained in detail in the illustrative embodiment of the present invention disclosed below relating to electronic program guides for accessing broadcast content. It will be appreciated by one of ordinary skill that any type of content can be accessed using a user interface that incorporates the various elements disclosed hereinbelow.

FIG. 1 is a DMXEPG main page (an EPG screen) which, in accordance with the invention, displays multi-dimensional UI with dynamically assigned programs, iTV applications, video loops, icons, sound, pictures or any other content components to each ME taking into consideration service provider infrastructure and subscriber STB capabilities, business rules of service provider; business rules of a broadcaster; customer profile: geographic location, time of the day in the location, past personal preferences; channel metadata, program properties, and other program or subscriber relevant data. Subscriber can observer multiple video streams displayed on the screen and navigate the screen by changing the focus from any one displayed object to another displayed object. For the subscriber, a change in focus is indicated by visual or audio elements; for example, a beeping noise can be emitted, and visual cues such as blinking or highlighted outlines can be presented. Once in focus, ME enables audio for the corresponding program and gives the ability to the subscriber to trigger predefined response once the subscriber presses "Enter" on the remote control or STB.

Returning to FIG. 1, the DMXEPG main page can accommodate various numbers and sizes of displayed MEs. Program types that are assigned to the MEs can be added, removed, or relocated. The number of programs assigned to one ME and their rotation schedule. Changes to the DMXEPG main page can be triggered by time of the day, day of the week, week of the month, etc., special events, or other program or business criteria.

FIG. 1 shows the MEs as rectangle-shaped elements. However, it is possible to use other shapes for the MEs; e.g., circular MEs, elliptical, other polygonal shapes, combinations of various shaped MEs, and so on. However, for the specification, rectangle-shaped MEs will be discussed.

FIG. 2 is DMXEPG second or lower level screen which, in accordance with the invention, comprises dynamically assigned MEs. This means that each ME is assigned to a program that matches predefined content category while taking into consideration criteria such as program properties, business rules of the service provider, business rules of a broadcaster, customer profile, and preferences. Similarly to DMXEPG main screen, a subscriber can navigate the page, change focus from any to any screen elements and by pressing "Enter" on the remote control or STB, thus triggering predefined response. Such response includes display of a lower level DMXEPG screen; launch of iTV application; tuning to a channel; switch of audio channel; display of the text synchronized with audio track (closed captioned or subtitles); information for the current or the next program, or other predefined action.

Figure 3:
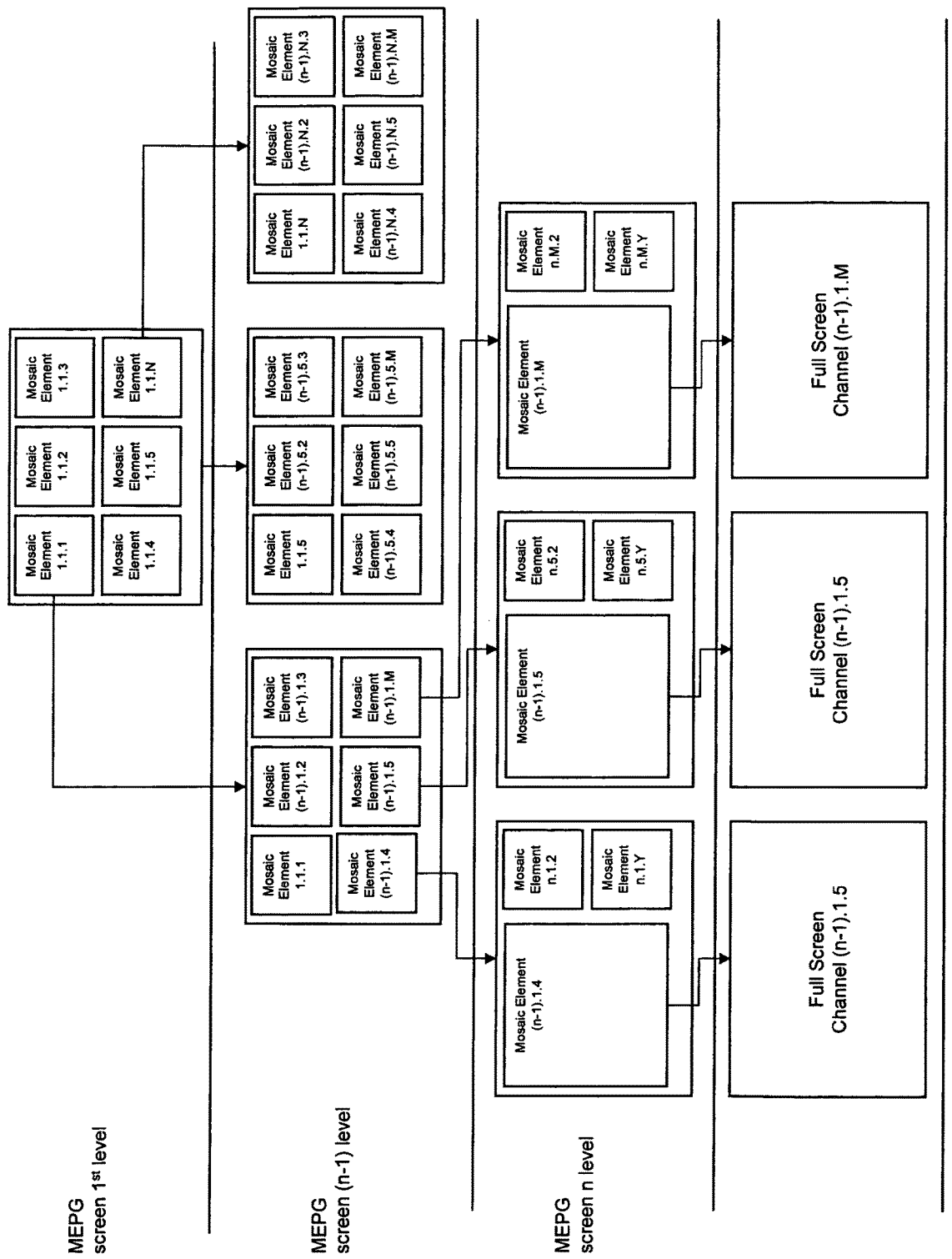
FIG. 3 is the multi-level DMXEPG for the systems with a multi-tuner set-top box (STB) or VOD system.

FIG. 3 is multi-dimensional DMXEPG which, in accordance with the invention, enables a subscriber to view and select ongoing programs which are grouped, among other criteria, by content category, thus simplifying and expediting a task of identifying, viewing, comparing, and selecting one of desired programs. The system is capable of dynamically generating necessary number of DMXEPG levels to expose to subscribers some or all programs in a content category and satisfy business and technical objectives of broadcaster and service provider.

Figure 4:
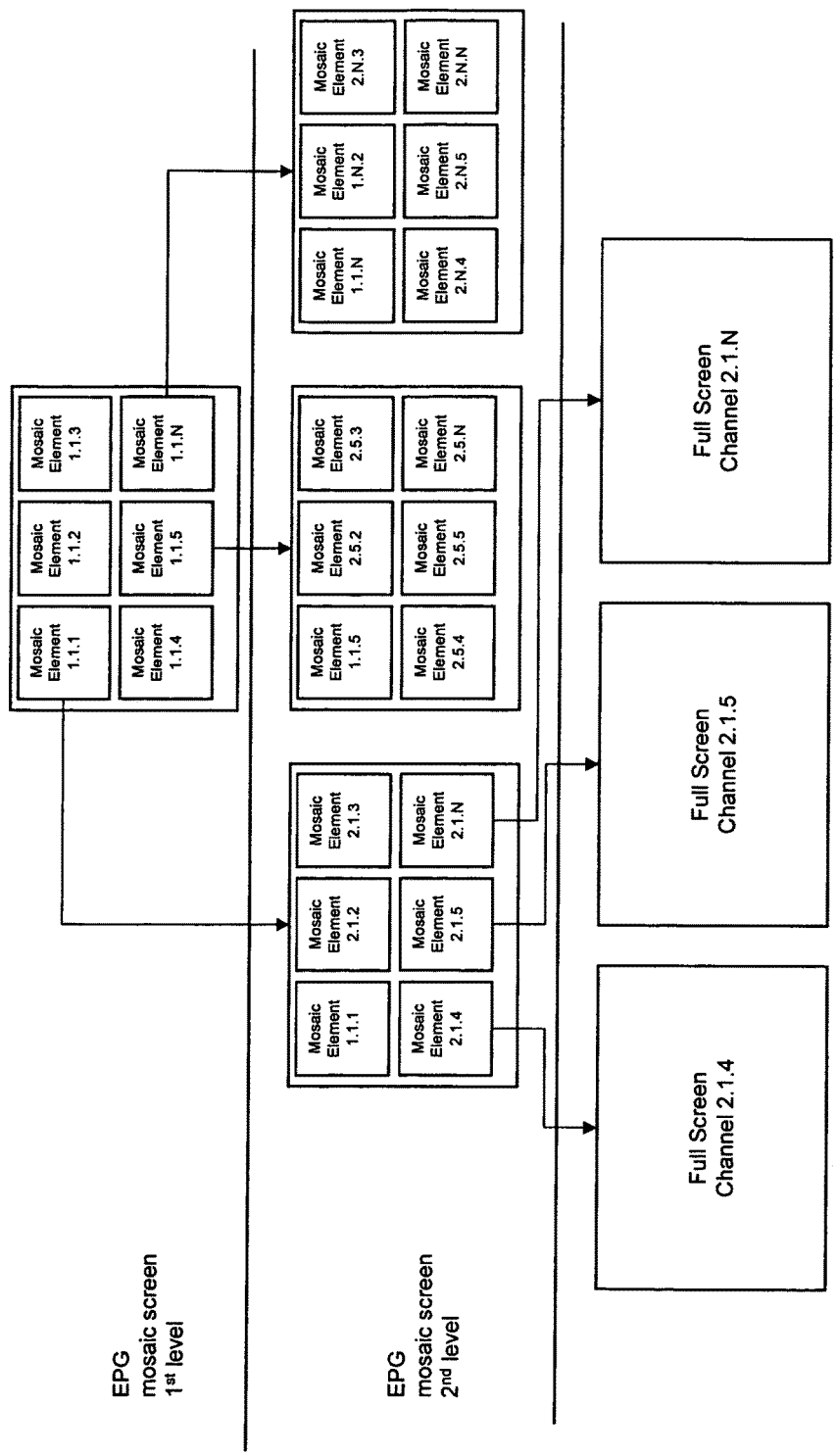
FIG. 4 is an example of tri-level DMXEPG access path to the channel.

FIG. 4 is DMXEPG arranged in two levels. DMXEPG screen of the first level displays content categories and matched video feeds. Subscribers by moving focus on the screen switch corresponding audio and by pressing "Enter" view larger number of video feeds that match content category in the DMXEPG second level screen. There, by pressing "Enter" on focused ME subscribers may leave DMXEPG and trigger STB to tune to a channel which is carrying currently displayed program.

Figure 5:
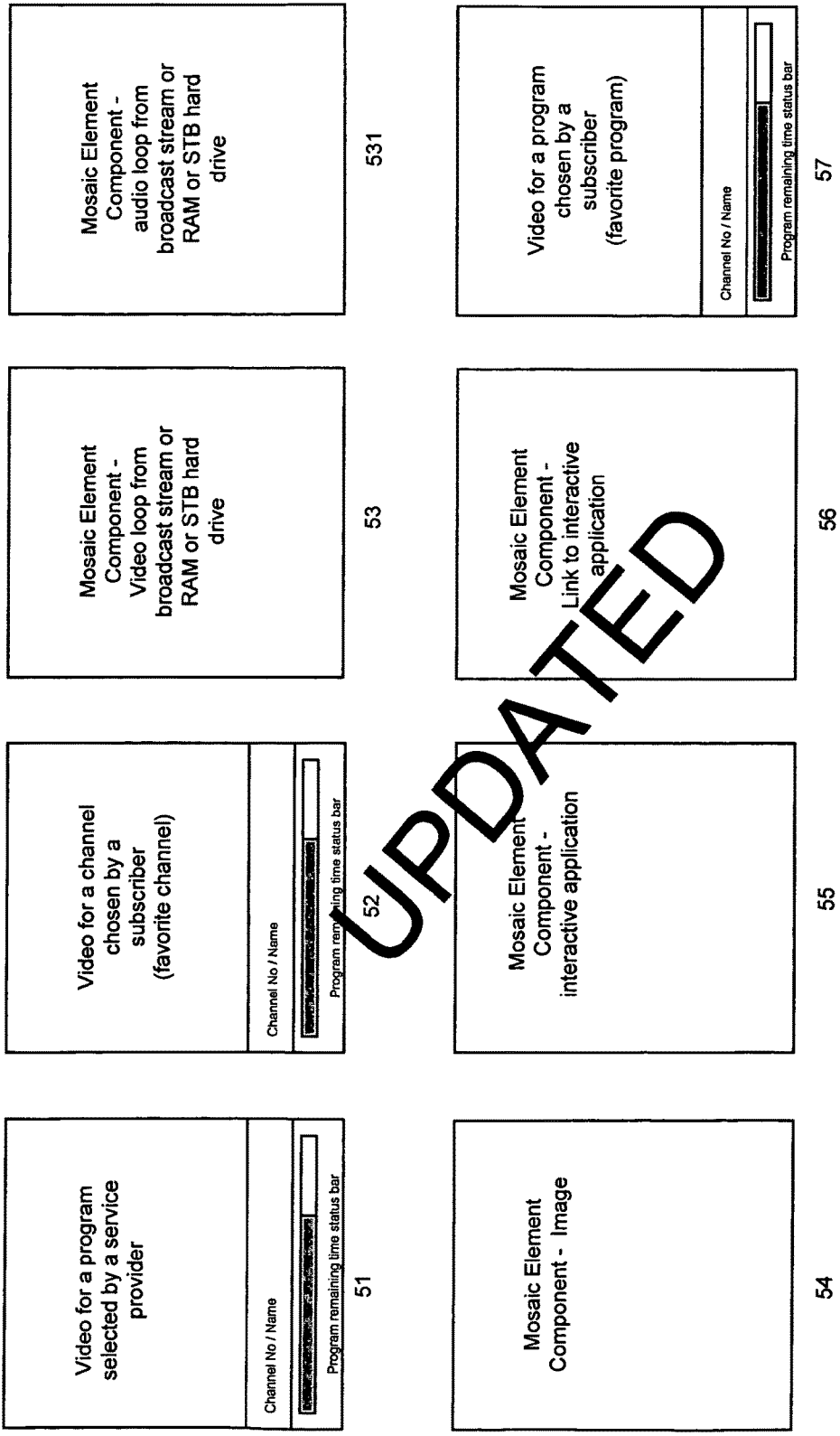
FIG. 5 is an anatomy of the ME components used in DMXEPG.

FIG. 5 shows the composition of an ME. Each ME can include any number of the following components (each component being referred to as "media content", or simply "content"): video program selected by the service provider; video channel chosen by a subscriber; video program chosen by a subscriber; video loop from broadcast stream, RAM, or hard drive; image; service provider or subscriber chosen iTV application as well as a link to iTV application. When applicable, an ME can include: channel number, program name, program status bar which displays program remaining time. When permitted by STB or service provider infrastructure (for example dual tuner STB or VOD system) subscriber can select channel assigned to the ME.

Figure 6:
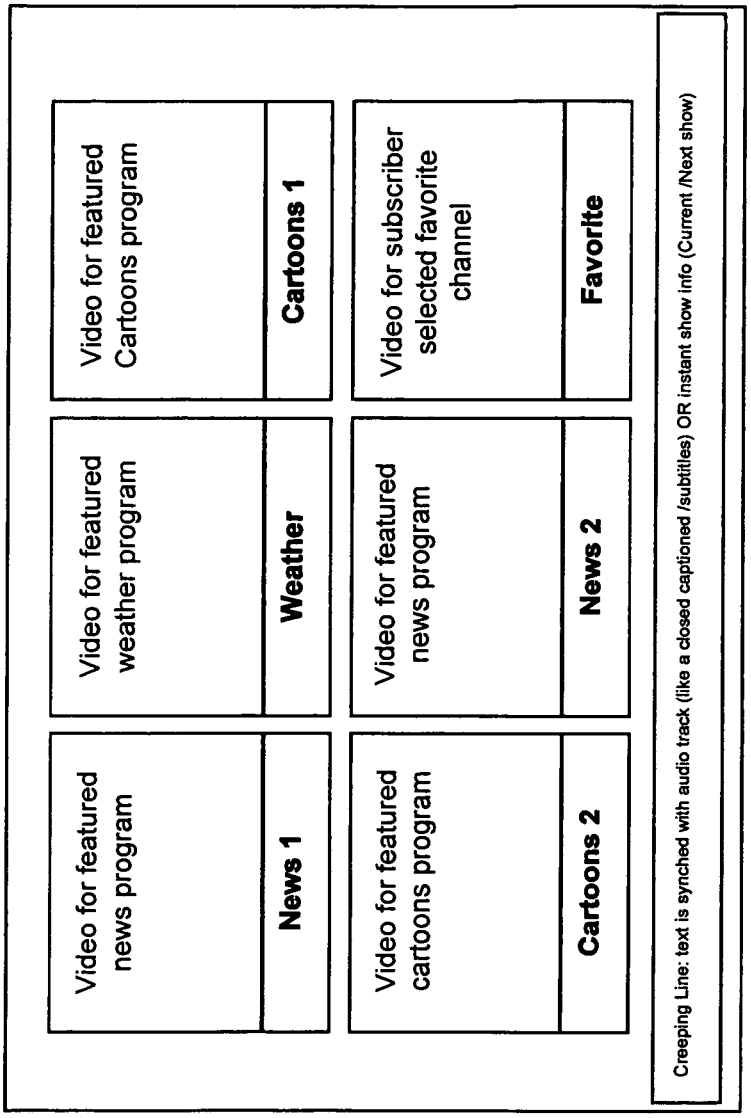
FIG. 6 is an example of a DMXEPG page dynamically created in the morning hours.
Figure 7:
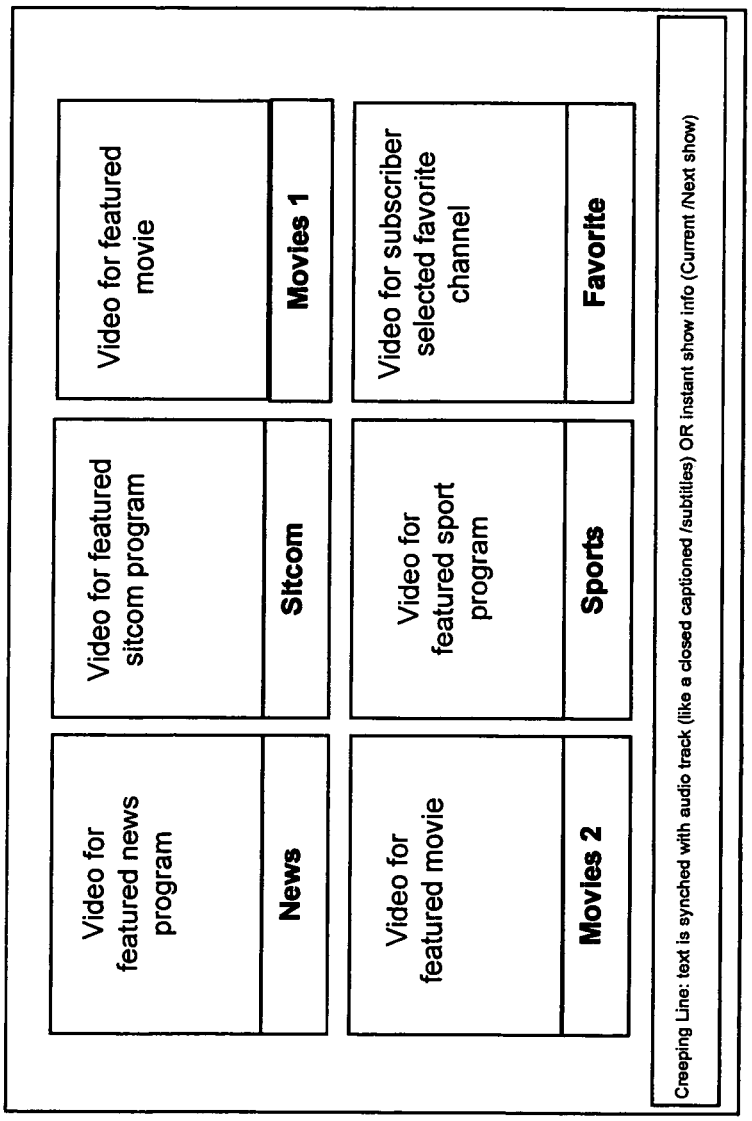
FIG. 7 is an example of a DMXEPG page dynamically created in the evening hours.

FIG. 6 shows a DMXEPG that was generated in the morning hours. The figure shows that the DMXEPG matches most common subscriber program preferences or service provider or broadcaster business objectives. On the other hand, FIG. 7 shows a DMXEPG generated in the evening hours which matches most common subscriber program preferences or service provider or broadcaster business objectives. As can be seen between FIGS. 6 and 7, the same level DMXEPG screen has different program composition in the morning and evening hours.

Figure 8:
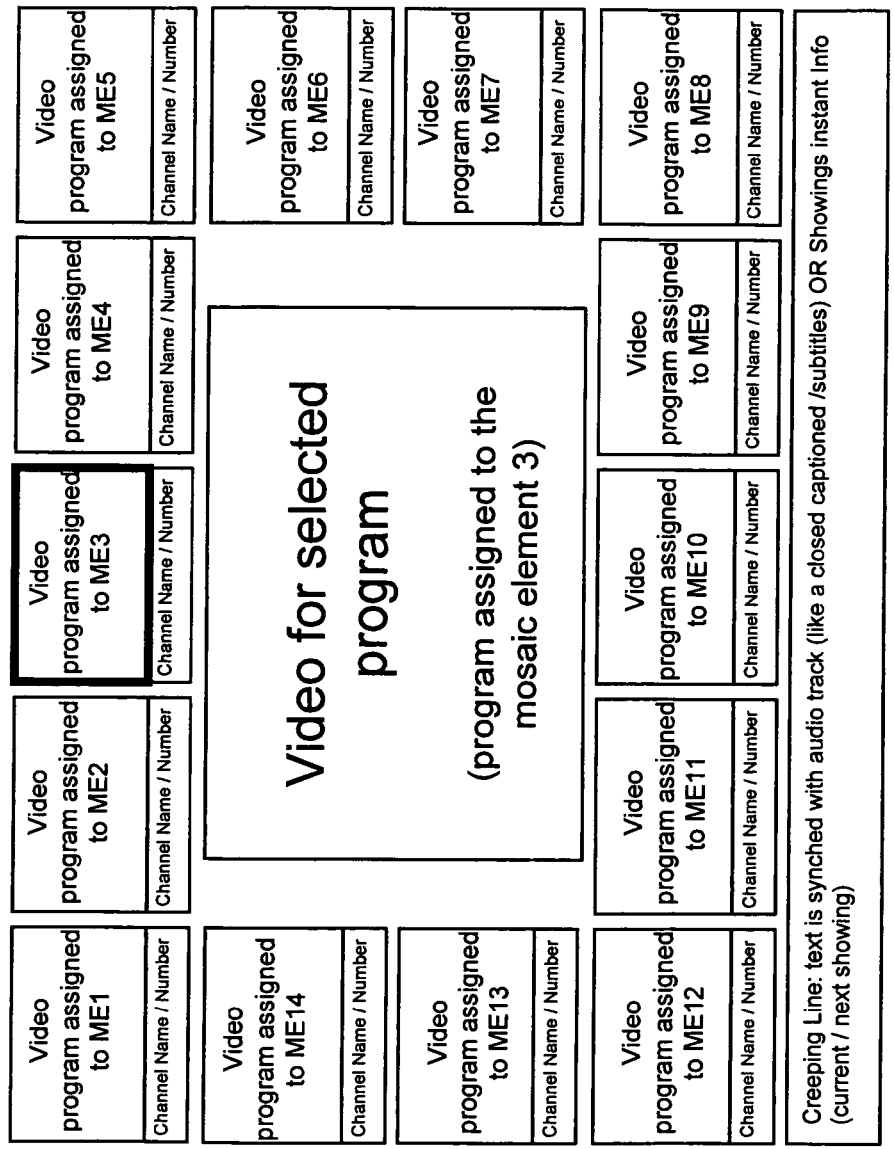
FIG. 8 is an example of a DMXEPG page generated by an STB with two or more tuners.

FIG. 8 shows a DMXEPG screen configured with peripheral MEs of different sizes. A subscriber moves the focus to a desired peripheral ME, presses "Select" or its equivalent button on the remote control or STB and a larger ME in the center of the display switches its video program and its audio to the program that matches the in-focus ME. This capability is possible on STBs with two or more tuners or on an infrastructure that supports a VOD system.

Figure 9:
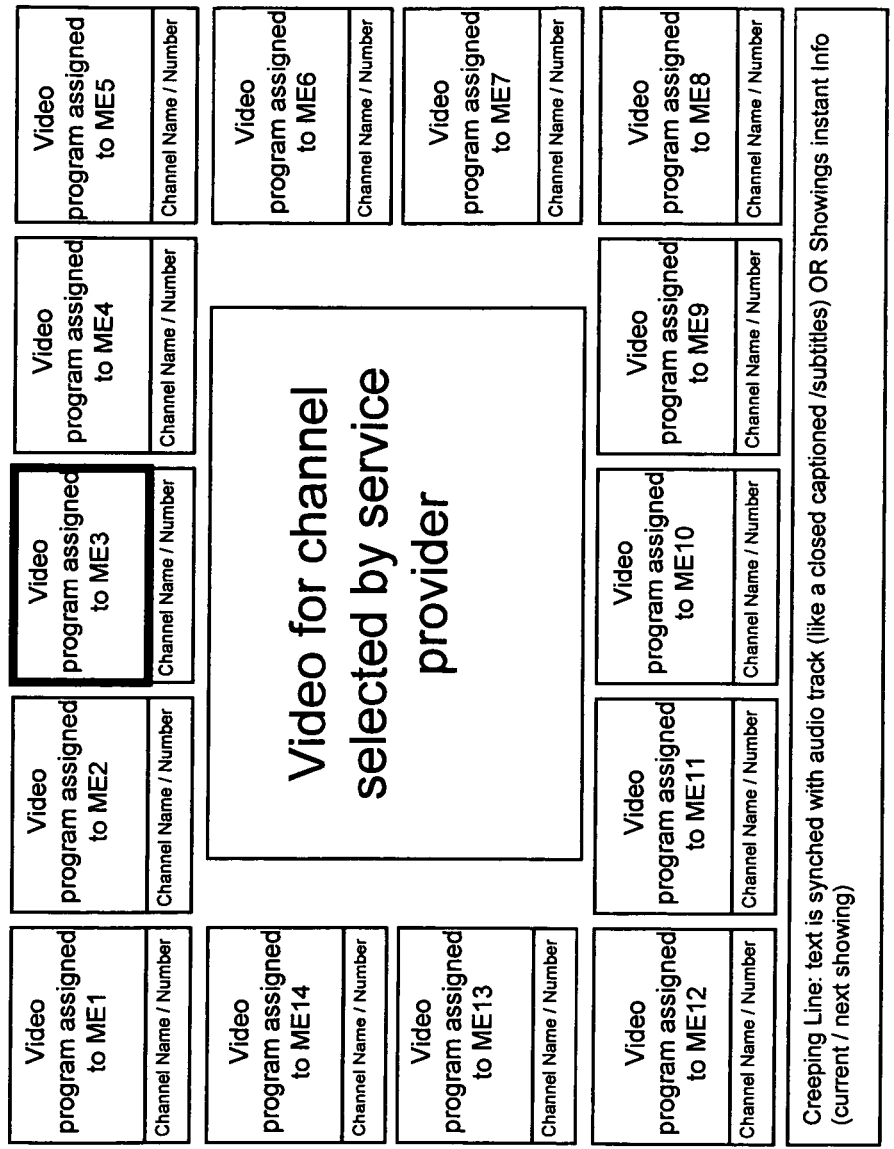
FIG. 9 is an example of a DMXEPG page generated by the service provider.

FIG. 9 is a DMXEPG screen similar to the screen in FIG. 8, but for a configuration where the STB has only one tuner and where there is no VOD system. In this configuration, the service provider assigns a program to the center ME. When the focus is changed from one peripheral ME to another, only the audio can be switched. The "Select" button allows subscriber to switch to the next DMXEPG level or to tune to desired program.

Figure 10:
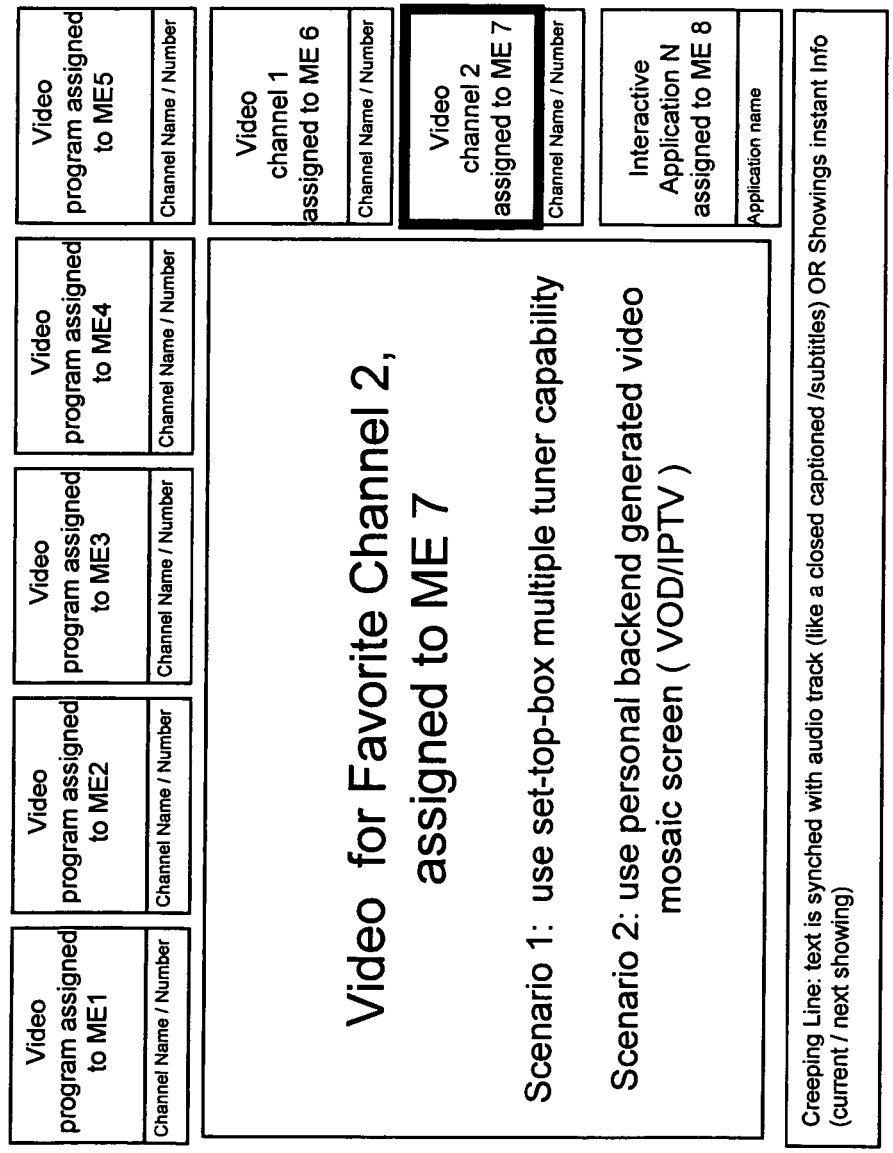
FIG. 10 is an example of a DMXEPG page with video channel(s) assigned to ME(s) by the subscriber and facilitated by multi-tuner STB or VOD system.

FIG. 10 is a DMXEPG screen comprising some MEs which display programs assigned by the service provider and other MEs which display channels or iTV applications selected by the subscriber. This functionality can be provided by an STB with multiple tuners or by a VOD system.

Figure 11:
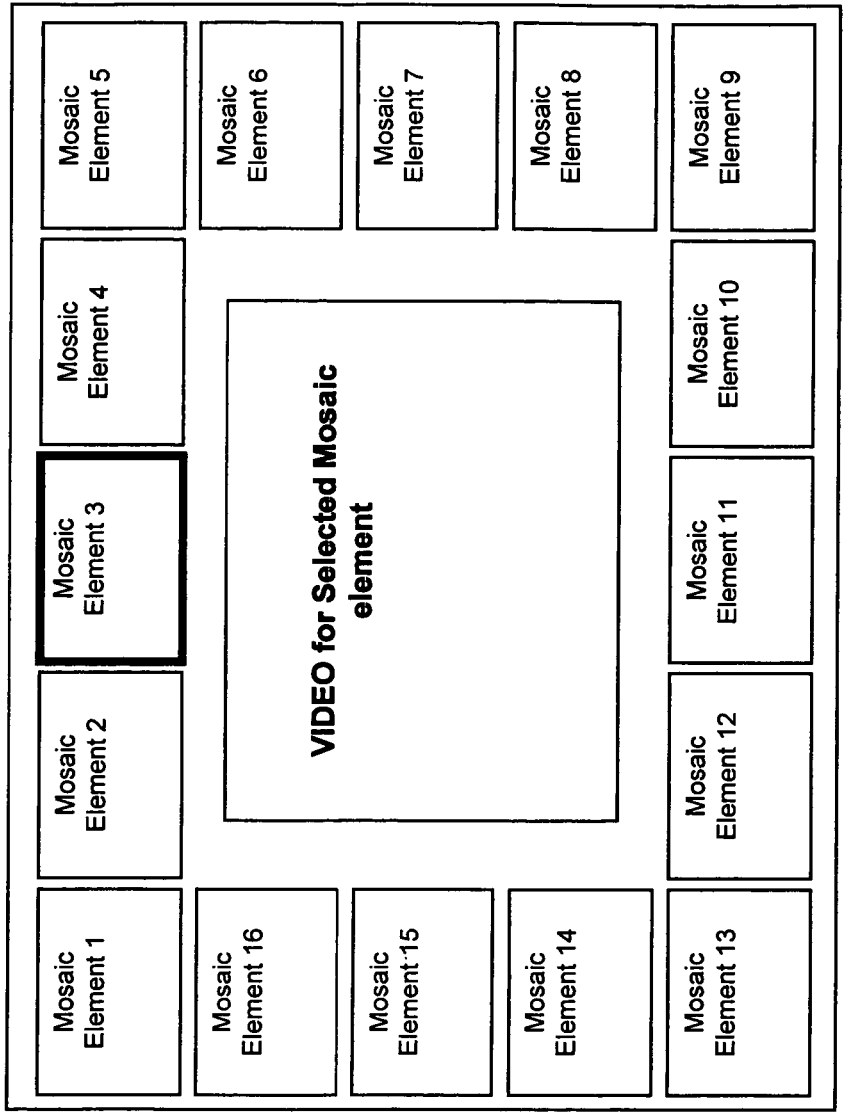
FIG. 11 is a DMXEPG page generated when 16 or more programs for selected content category are available at a given time and where the subscriber has the ability to display video that is selected from an ME within another ME.

FIG. 11 is a DMXEPG screen which is generated with 16 peripheral MEs. The number of displayed MEs and their location was generated by the system which takes into account number of available programs that match selected content category, iTV applications and favorite channels selected by subscriber, TV screen size and resolution.

Figure 12:
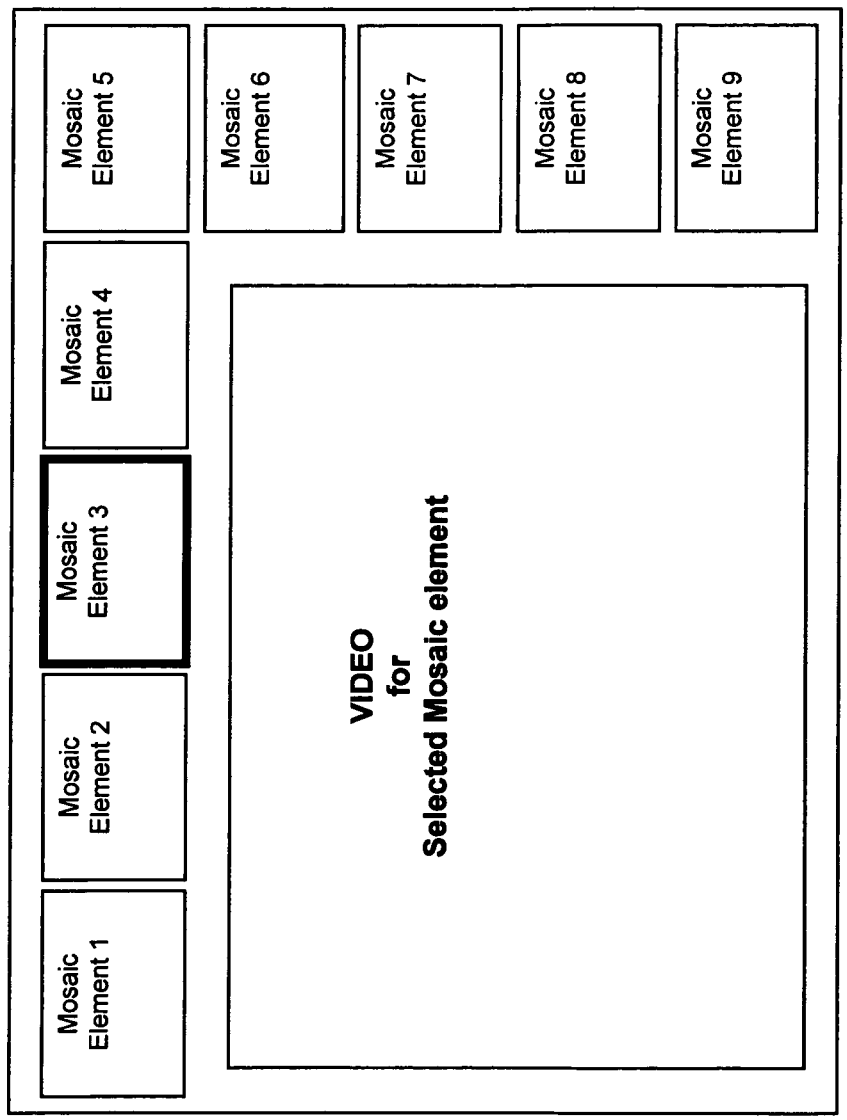
FIG. 12 is a DMXEPG page generated when 9 programs for selected content category are available at a given time.

FIG. 12 is a DMXEPG screen which is generated with 9 peripheral MEs. The number of displayed MEs and their location was generated by the system which takes into account number of available programs that match selected content category, iTV applications and favorite channels selected by subscriber, TV screen size and resolution.

Figure 13:
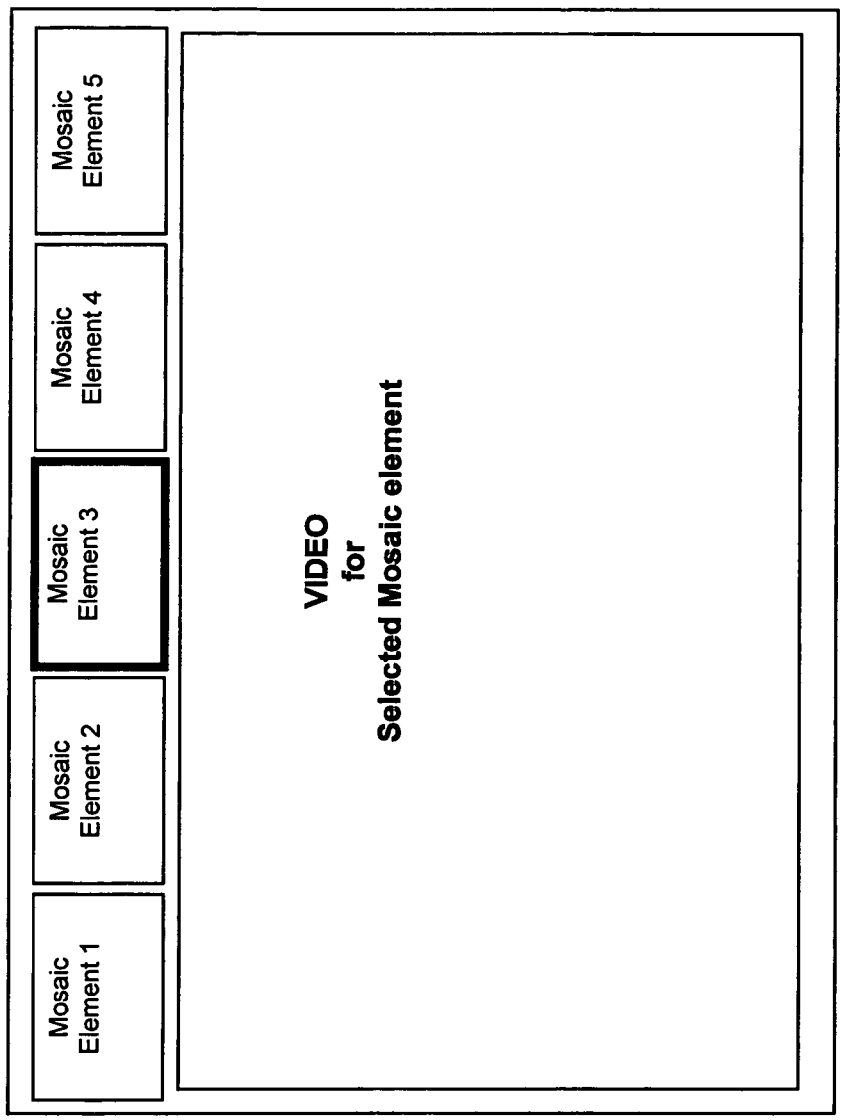
FIG. 13 is a DMXEPG page generated when 5 programs for selected content category are available at a given time.

FIG. 13 is a DMXEPG screen which is generated with 5 peripheral MEs. The number of displayed MEs and their location was generated by the system which takes into account number of available programs that match selected content category, iTV applications and favorite channels selected by subscriber, TV screen size and resolution.

Figure 14:
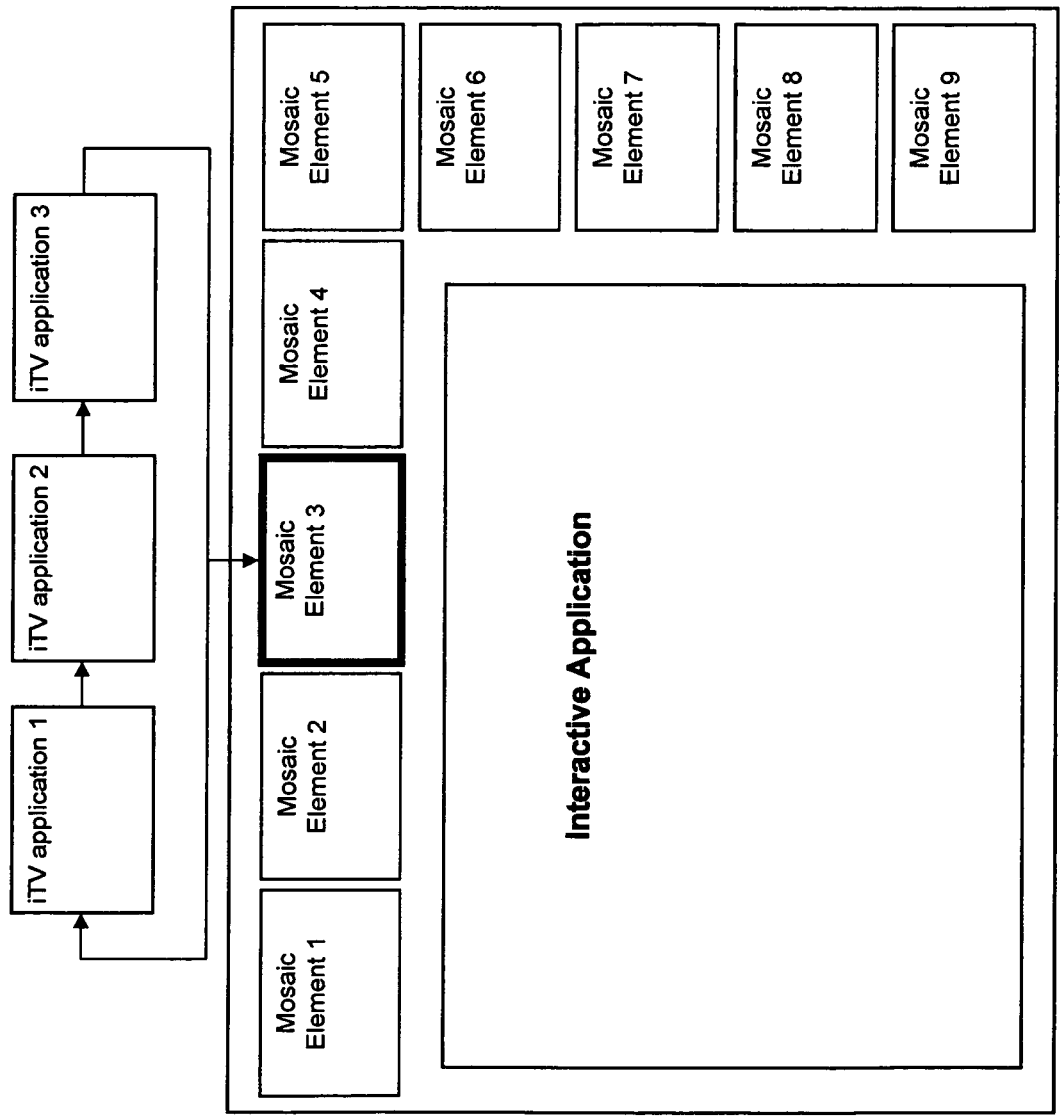
FIG. 14 is an example of a DMXEPG page simultaneously displaying an interactive application on one or more MEs while displaying assigned video programs on another ME, where each ME can have more than one iTV application assigned to it.

FIG. 14 is a DMXEPG screen with some MEs having association to more than one iTV application. Pointer to iTV applications can be assigned by the service provider and by subscriber. Multiple iTV applications assigned to an ME are displayed one at a time and can rotate at preset or default time interval. Subscriber can link any accessible iTV application to desired ME.

Figure 15:
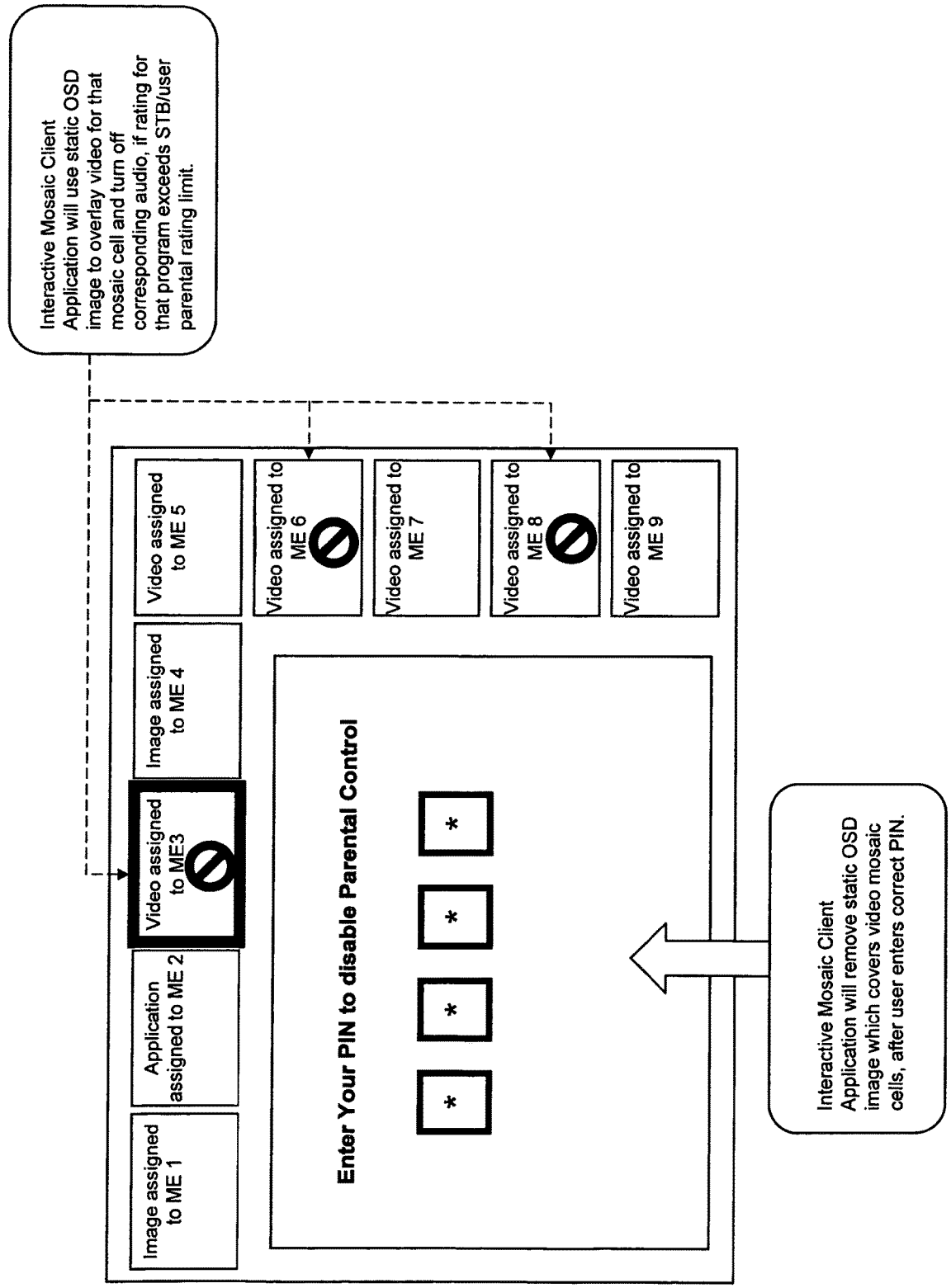
FIG. 15 is a DMXEPG page generated when customer does not have rights to access programs with parental rating exceeding maximum allowed limit.

FIG. 15 is a DMXEPG screen showing the case when some MEs are set to display programs that match screen content criteria but fail subscriber parental rating limit. In such a case, subscriber has an option to enter PIN code to let a DMXEPG client application remove overlay and display programs that fail parental rating limit. If subscriber does not enter correct PIN code, programs that exceed parental rating limit will continue to be blocked. MEs with blocked programs can be overlaid with static on-screen display (OSD) image. The DMXEPG client application allows the user to navigate the DMXEPG hierarchy (e.g., as shown in FIG. 3) on the client device.

Figure 16:
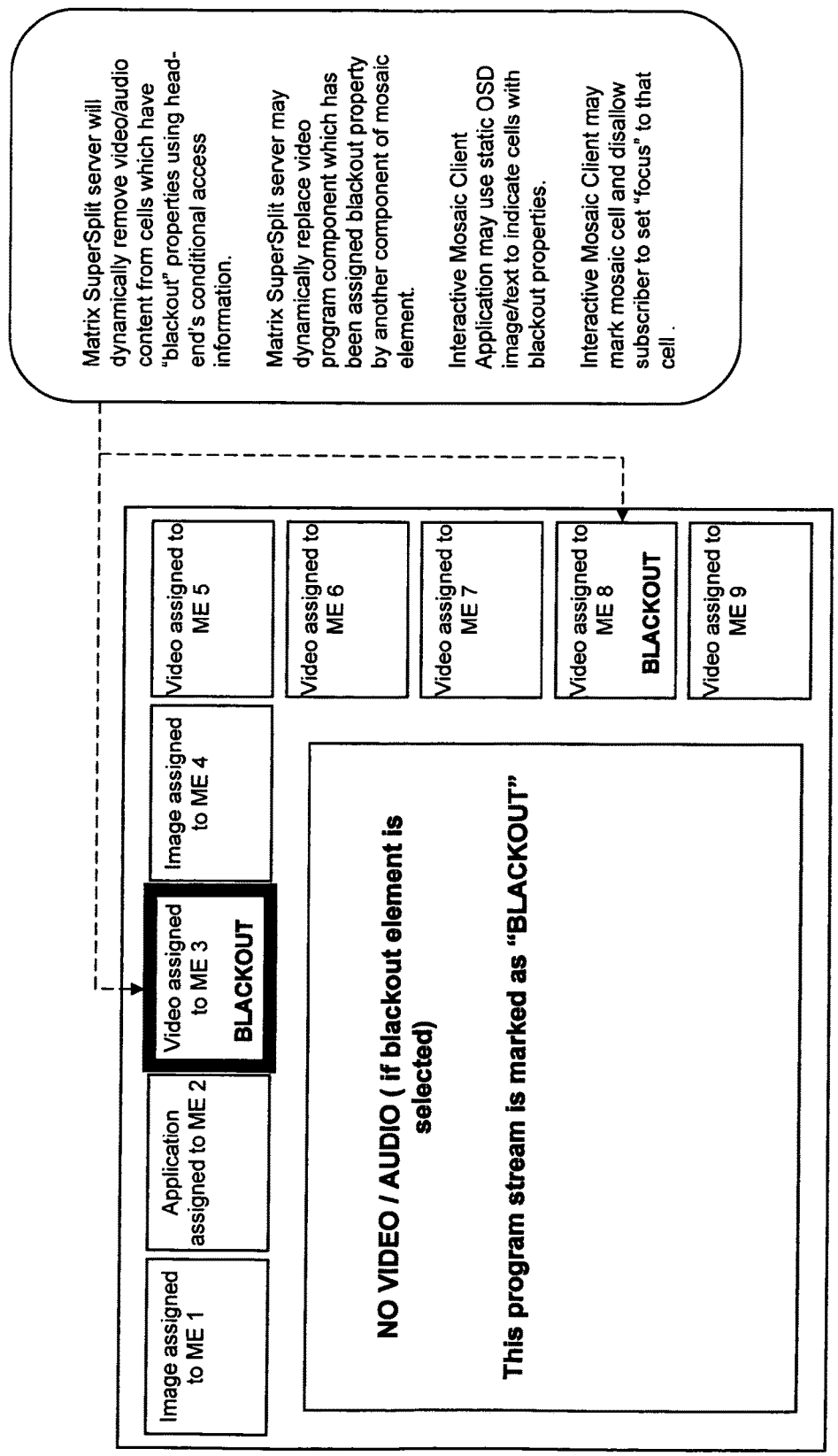
FIG. 16 is a DMXEPG page generated when the customer does not have rights to access channels assigned to one or more ME.

FIG. 16 is a DMXEPG screen showing the case when video or audio content that is removed from some MEs; for example as a result of "blackout" properties using head end's conditional access information (sports events can be blacked out). The Matrix SuperSplit server discussed below can dynamically replace a program marked as "blackout" by another program. Alternatively, Interactive Mosaic Client Application may use static OSD image or text to indicate cells with blackout properties or mark ME and disallow subscriber to set focus to that cell.

Figure 17:
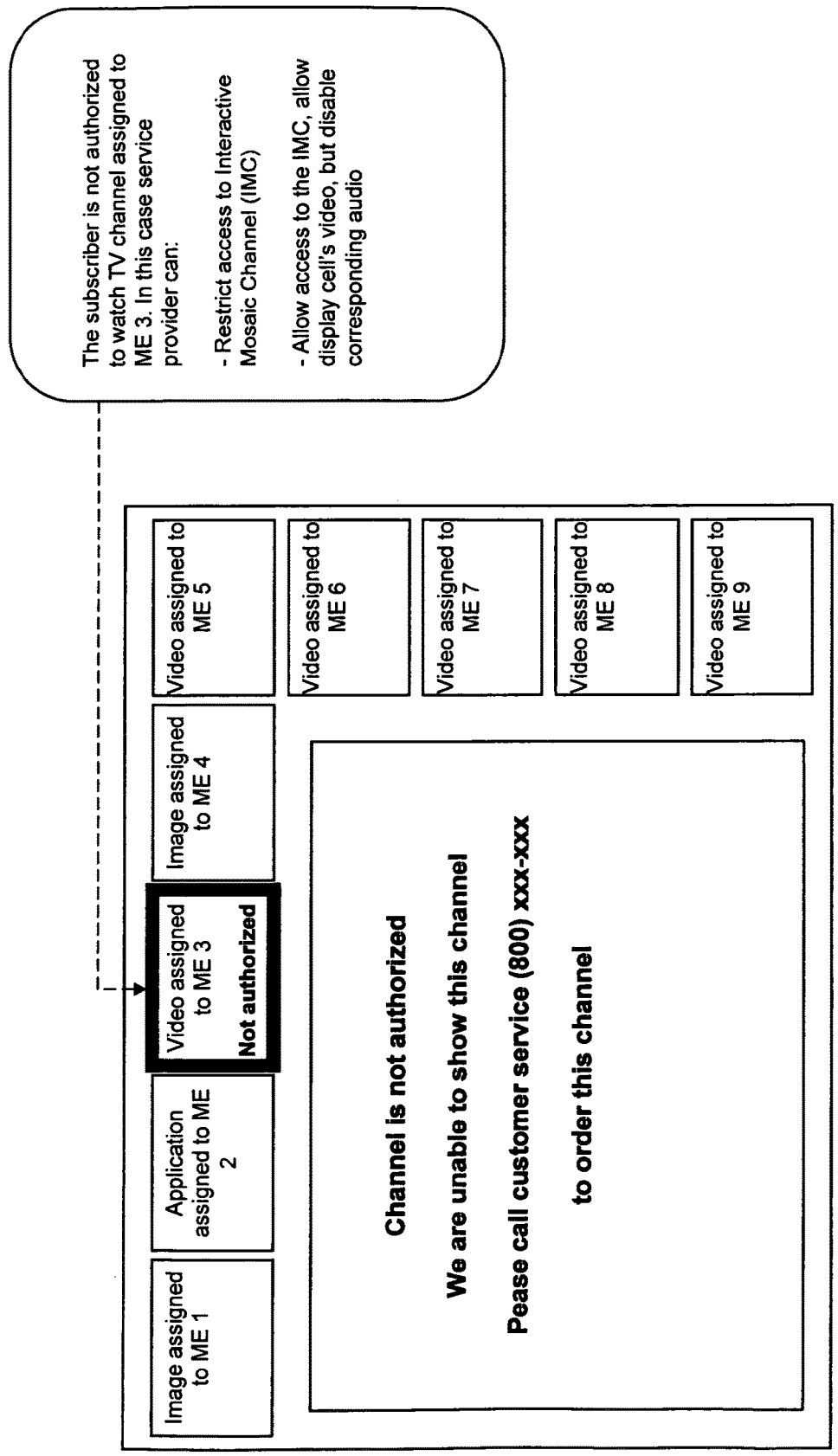
FIG. 17 is a DMXEPG generated by the service provider with one or more MEs displaying a channel for which subscriber is not authorized.

FIG. 17 is a DMXEPG screen showing the case when video or audio content is removed by the DMXEPG client application from the MEs because subscriber has not been authorized to access that channel. Service provider can choose to disallow subscriber to set "focus" to the ME for the duration of program on non-authorized channel, or corresponding audio.

Figure 18:
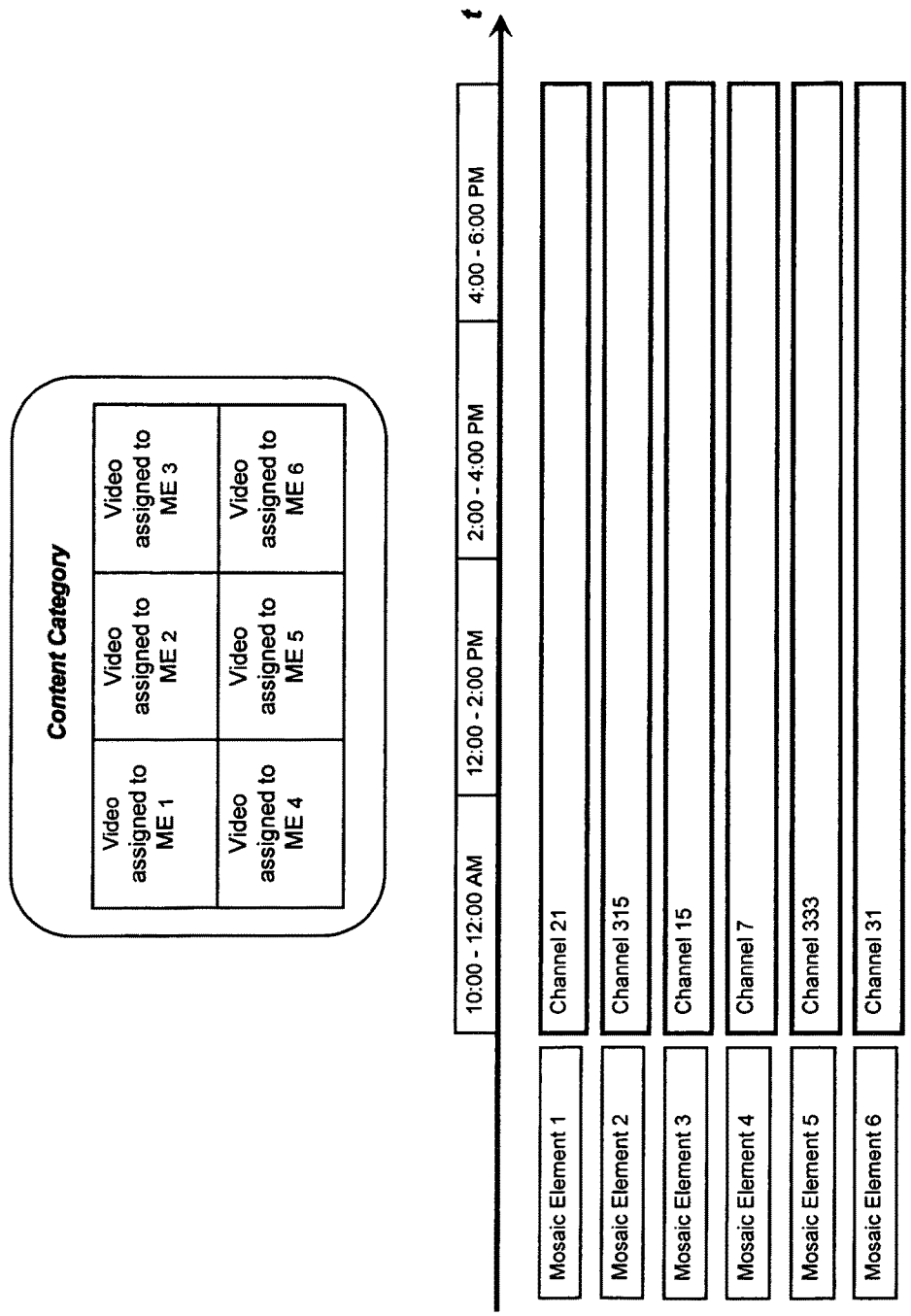
FIG. 18 is an assignment schedule for existing static DMXEPG.

FIG. 18 is a conventional DMXEPG with channels statically assigned to its MEs. The channels assigned to the DMXEPG are shown below, illustrated in a conventional programming guide format. Each ME represents a channel and not a program. ME association to the channel does not change for the extended period of time. Each DMXEPG screen displays semi-permanent group of channels.

Figure 19:
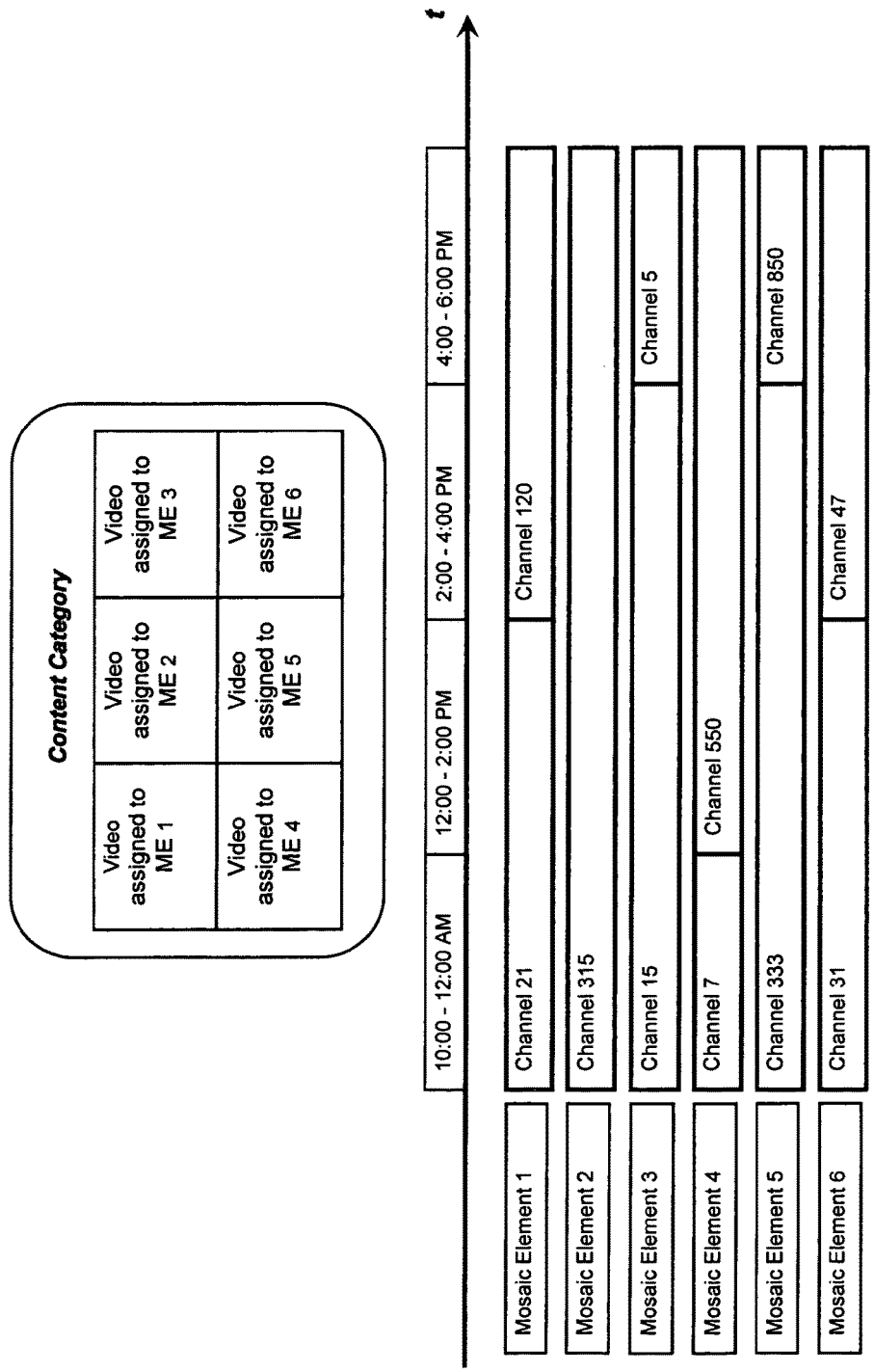
FIG. 19 is an assignment schedule for DMXEPG that dynamically assigns channels to MEs.

FIG. 19 is an example of a schedule for a DMXEPG screen composition according to an aspect of the present invention with its MEs being assigned and reassigned to different channels to match service provider or broadcaster business rules. For explanatory purposes, the schedule of channels that are assigned to this DMXEPG screen are illustrated below the DMXEPG screen in conventional programming guide format.

Figure 20:
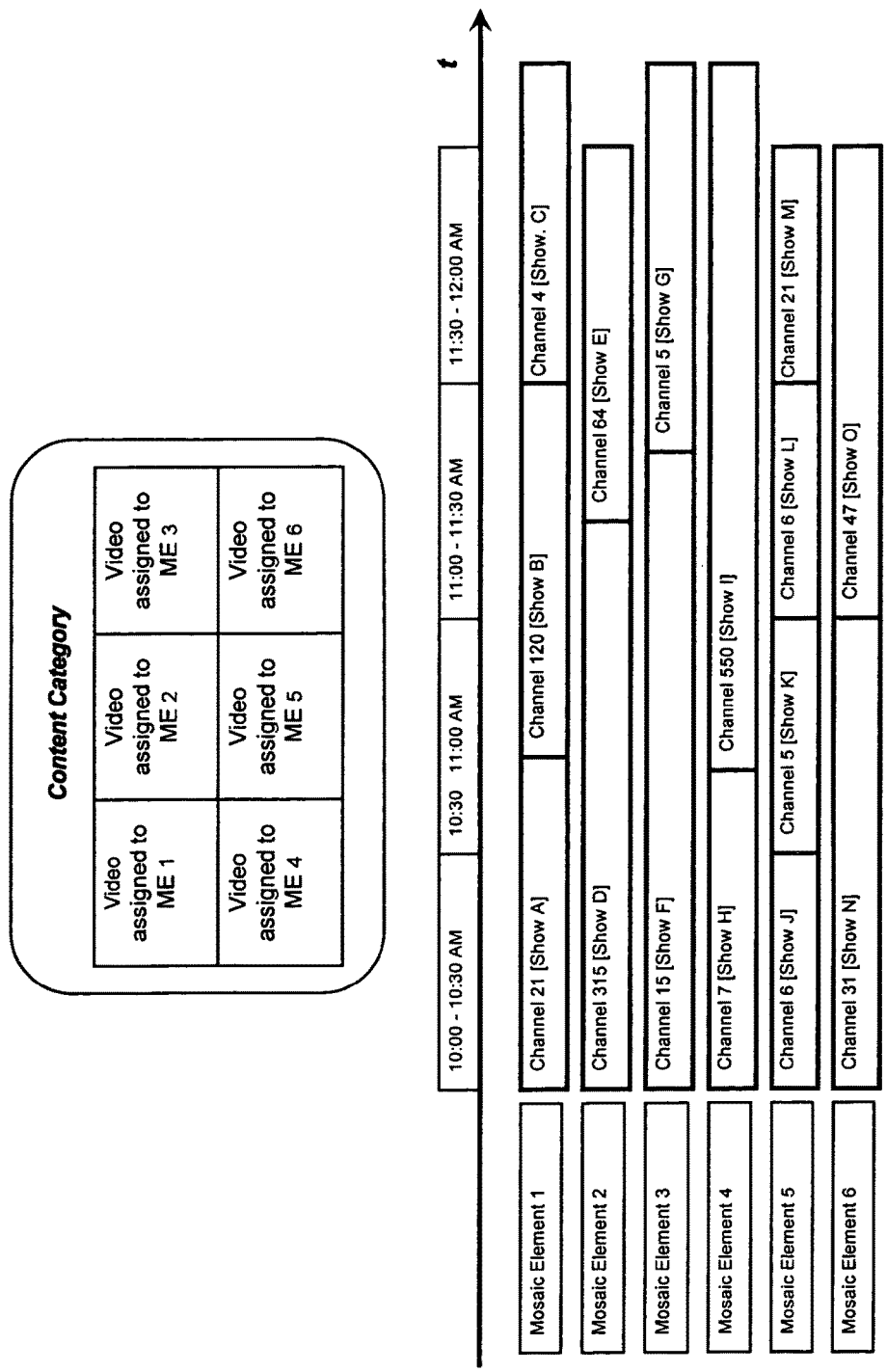
FIG. 20 is an assignment schedule for DMXEPG that dynamically assigns programs from different channels to MEs.

FIG. 20 is an example of schedule for DMXEPG screen composition according to an aspect of the present invention with its MEs being assigned and reassigned to different channels with programs that match pre-defined content category for that ME. For explanatory purposes, the schedule of channels that are assigned to this DMXEPG screen are illustrated below the DMXEPG screen in conventional programming guide format.

Figure 21:
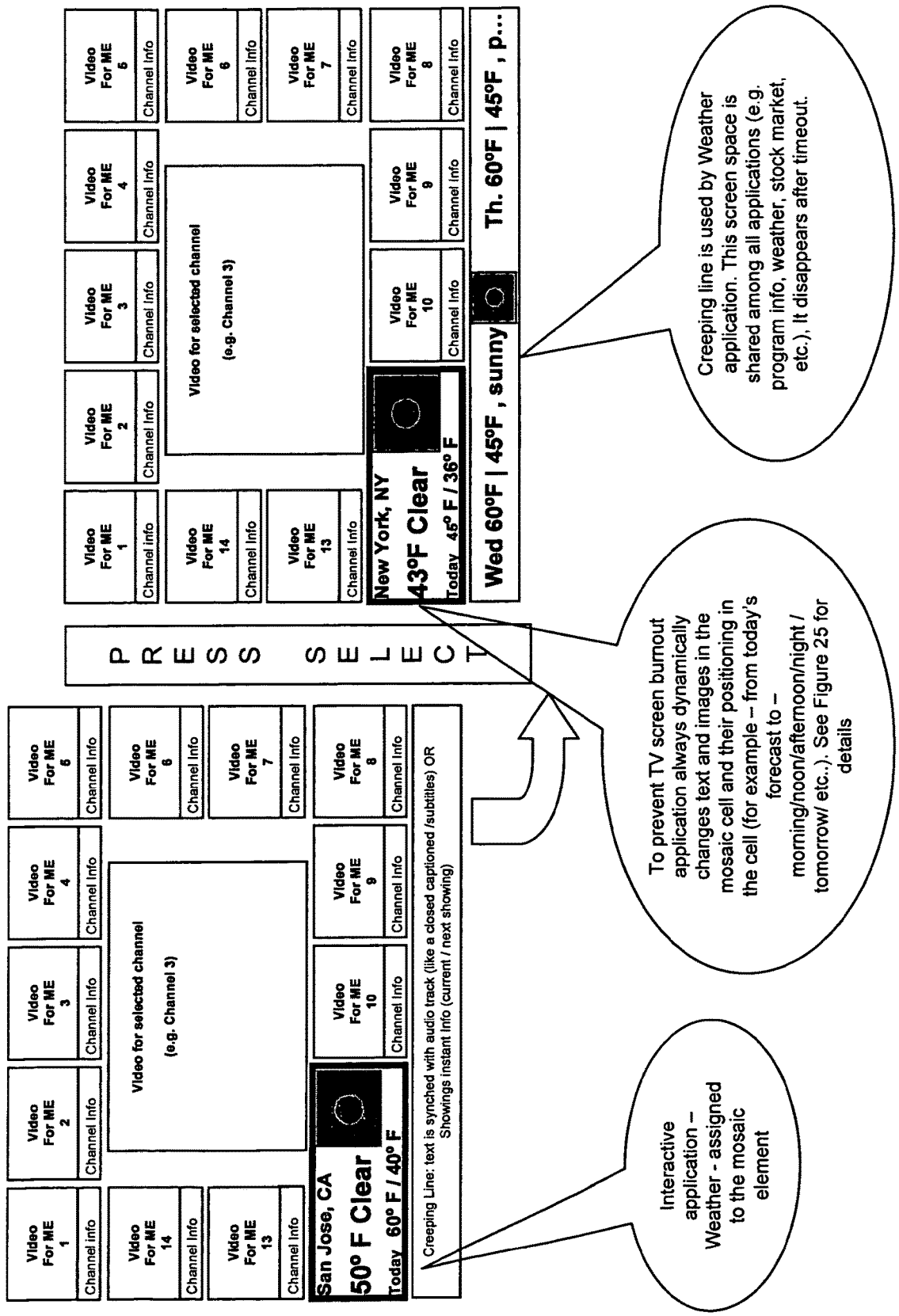
FIG. 21 is a DMXEPG page with rotating interactive content assigned to ME.

FIG. 21 is an example of a DMXEPG that incorporates an iTV application in one ME. To prevent screen's burnout, iTV data is rotated, and it positioning is continuously changed. If a subscriber selects an ME to which an iTV application is assigned, additional information related to that iTV application can appear on a creeping line. Also, to prevent screen burnout information in the creeping line is rotated among application or disappears after timeout.

Figure 22:
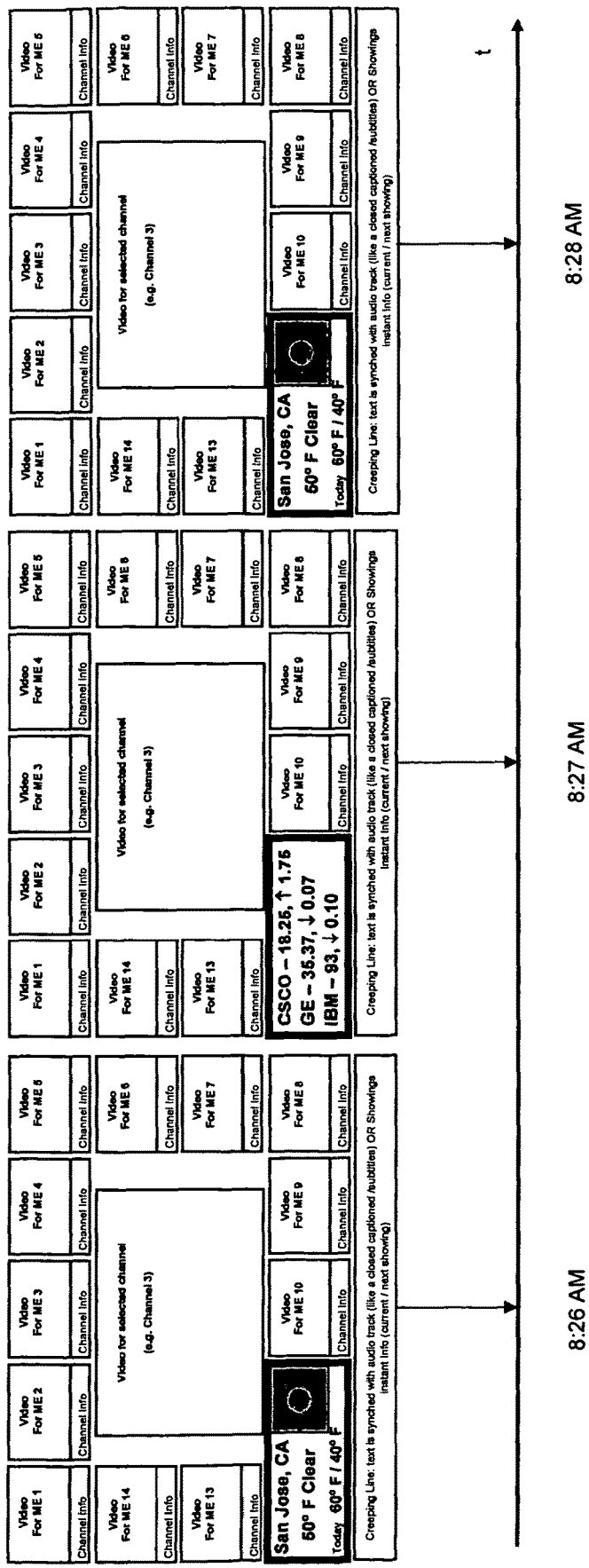
FIG. 22 is a DMXEPG page with rotating interactive applications assigned to ME.

FIG. 22 is a DMXEPG page with one of its ME allocated to a group of iTV applications. iTV applications share an ME's space and rotate, appearing one at a time for pre-set time interval.

Figure 23:
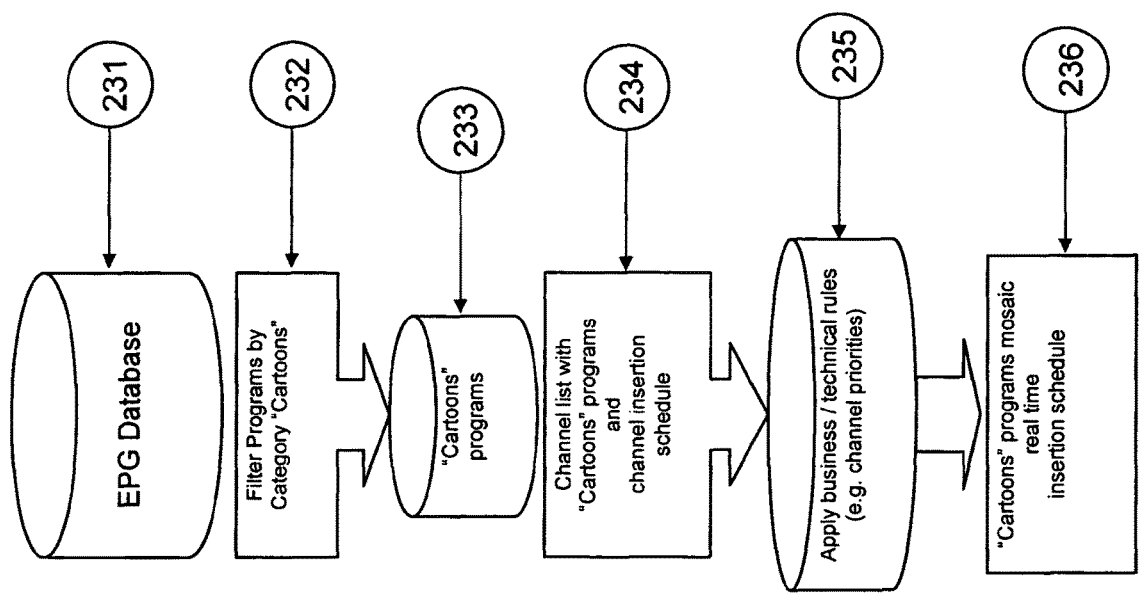
FIG. 23 is head-end data flow through the Matrix TV Server Suite (MTVSS).

FIG. 23 is a head-end data flow through MTVSS. MTVSS gets raw EPG data from an EPG listings data provider (e.g. Tribune Media Services, TV Guide, or TV-Anytime). Available data delivery mechanisms include downloading from an FTP site, a Virtual Private Network, or a Data Broadcast Carousel. MTVSS imports raw EPG data into the MTVSS database. In most cases, EPG listings data provider supplies accurate data, which includes local programming, for 14 days.

MTVSS filters all programs by program category, subcategory, and genre. The figure depicts filtering by program subcategory "CARTOONS". As a result of this data processing, system creates record set of all programs during the next 14 days across multiple channels (uniquely identified by source_id) and multiple head-ends (cable, satellite, or other) with the subcategory "CARTOONS".

MTVSS will process data set made during step 233 and generate Interactive Mosaic channel insertion schedule for all channels that includes "CARTOONS" programs across multiple head-ends. MTVSS will generate schedule for short period (e.g. 1 day), because EPG schedule might dynamically change even inside 14 days windows.

On the local head-end MTVSS will apply (step 235) the local channel lineup, local business rules (e.g. channel priorities, non-video interactive mosaic element components), local conditional access rules (e.g. program rating, blackout), "last-minute" listings update data.

After step 235, MTVSS will generate real-time insertion schedule 236 for CARTOON programs which are broadcasted on this local head-end.

Figure 24:
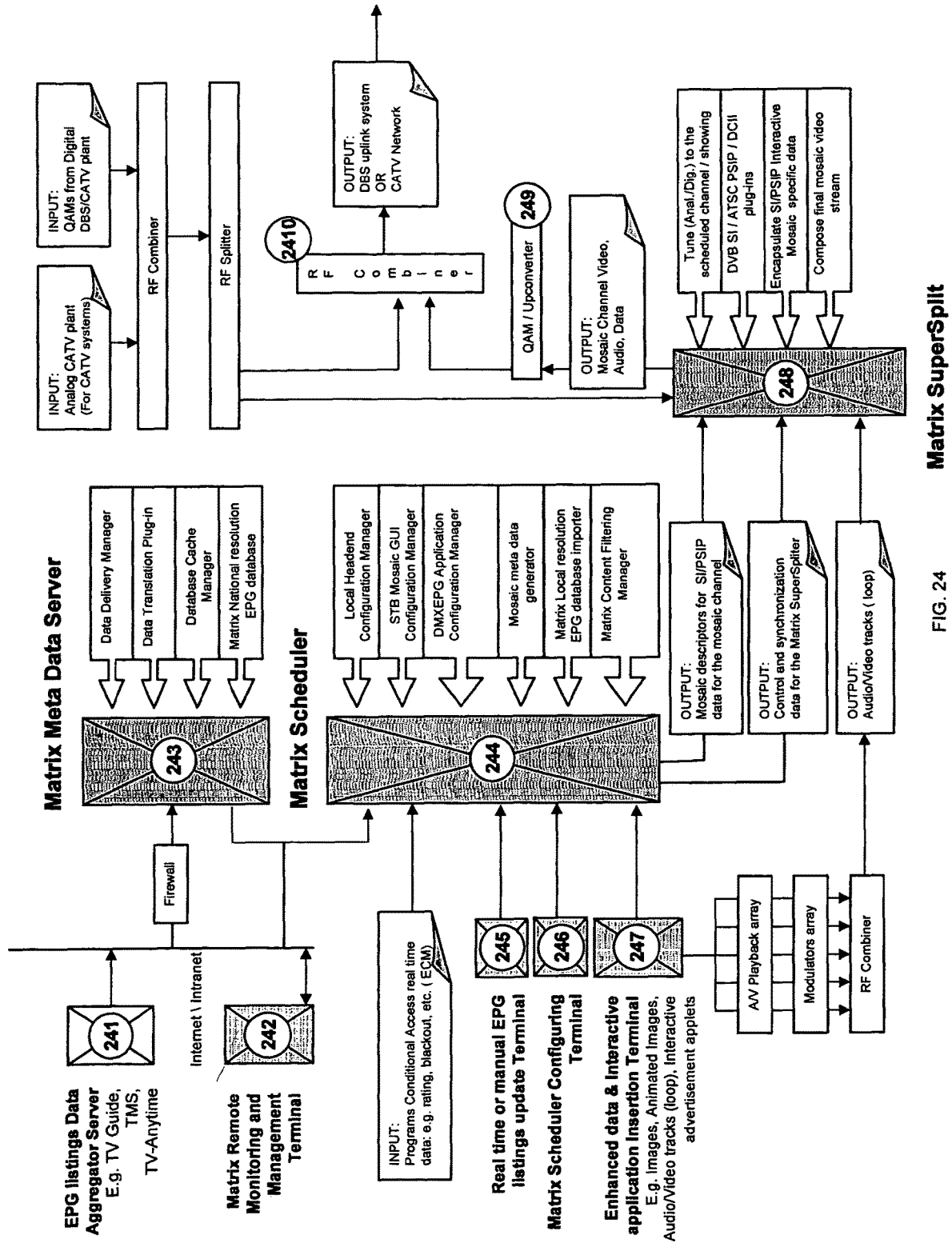
FIG. 24 shows logical components of the MTVSS

FIG. 24 shows logical components of the MTVSS. EPG listings data aggregator server 241 provides data to the Matrix Meta Data Server (MMDS). Daily, EPG data server refreshes data set and provides listings data for the next 14 days. The daily data set is the most accurate for the next day. There are two ways to retrieve the data: data "push" and data "pull". For example Tribune Media Services (TMS) provides the "pull" method using their secure FTP site. To get data from TMS, MMDS uses a secure ftp connection to retrieve EPG listings data.

Matrix Remote Monitoring Terminal (MRMT) 242 is a web based interface that allows a system operator to access MTVSS. Once authenticated, the system operator accesses tasks and processes enabled by his security level. The system operator can perform a number of functions including: retrieval of Matrix Meta Data Server status, retrieval of Matrix Scheduler status, retrieval of Matrix SuperSplit status, and retrieval of logs, traces, and statistics for all MTVSS components. Matrix remote management portion of MRMT is a web based interface that allows the system operator to access MTVSS. Depending on granted permissions, the system operator can manage specific tasks and processes. The system operator can perform the following functions: start and stop any process on any MTVSS component, update configuration parameters for any MTVSS component.

Matrix Meta Data Server 243 comprises four components: Data Delivery Manager, Data Translation Manager, Data Cache Manager, and Matrix National resolution EPG database.

Data Delivery Manager (DDM) is designed to retrieve EPG data from data aggregator server and store data in the local database. Data Delivery Manager can be customized with configuration file which includes data delivery schedule and secure connection login parameters (e.g. secure ftp connection). DDM can deliver data from multiple data sources (e.g. Tribune Media Services, TV Guide, TV-Anytime).

Data Translation Manager (DTM) translates and converts original EPG data using Data Translation Plug-ins (DTP). DTM may support multiple DTPs for different EPG data providers (e.g. one for TMS, one for TV Guide, etc.).

Data Cache Manager provides database interface for all MMDS tasks.

Matrix National resolution EPG database stores original EPG data (retrieved from EPG aggregation server) and data translated to the Matrix Meta Data database. This database stores the channel lineup for all service providers in a region.

Matrix Scheduler (MS) 244 receives and retrieves the following data:

Matrix Local resolution EPG database data (for specific head-end, or set of head-ends) from Matrix Meta Data Server.

Additional conditional access data (e.g. program rating, program blackout, etc.) from local digital access controller (e.g. DAC 6000—Motorola head-end, DNCS—Scientific Atlanta head-end, DCAS server).

"Last minute" program update data from EPG listings update terminal 245

Enhanced data and Interactive Application insertion Terminal (EIAT) 247. EIAT provides data for all mosaic element components except "video program selected by service provider" e.g.:

Images
Video loops
Audio loops
Interactive applications
Still images
Texts
Interactive advertisement
Content Filtering Criteria received from either service provider or third party.

Matrix scheduler comprises five major components: Local Headend Configuration Manager, STB Mosaic GUI Configuration Manager, DMXEPG Application Configuration Manager, Mosaic Meta Data generator, and Matrix Local resolution EPG database importer. Local Headend Configuration Manager is designed to apply local technical (e.g. channel lineup, MPEG2/DCII SI/PSIP tables configuration) and business rules (e.g. channel assignment priority) to the final program mosaic video stream and mosaic meta data. SIB Mosaic GUI Configuration Manager allows a service provider to configure the graphical user interface and provides navigation for the DMXEPG Client application.

Mosaic meta data generator builds Interactive Mosaic descriptor, Interactive Mosaic Master Table, control and scheduling data for the Matrix SuperSplit, and additional mosaic meta data discussed in more detail below. Matrix Local resolution EPG database importer stores EPG listings data in the local database.

Real time or manual EPG listings update terminal 245 is a web based interface that allows system operator to update EPG listings data on local and national head-end before broadcasting.

Matrix Scheduler Configuration terminal 246 is a web based interface that allows system operator to configure program mosaic video stream, DMXEPG Client Application, insert local technical information, insert local business rules, and assign mosaic element components (FIG. 5) to the different mosaic elements.

Figure 25:
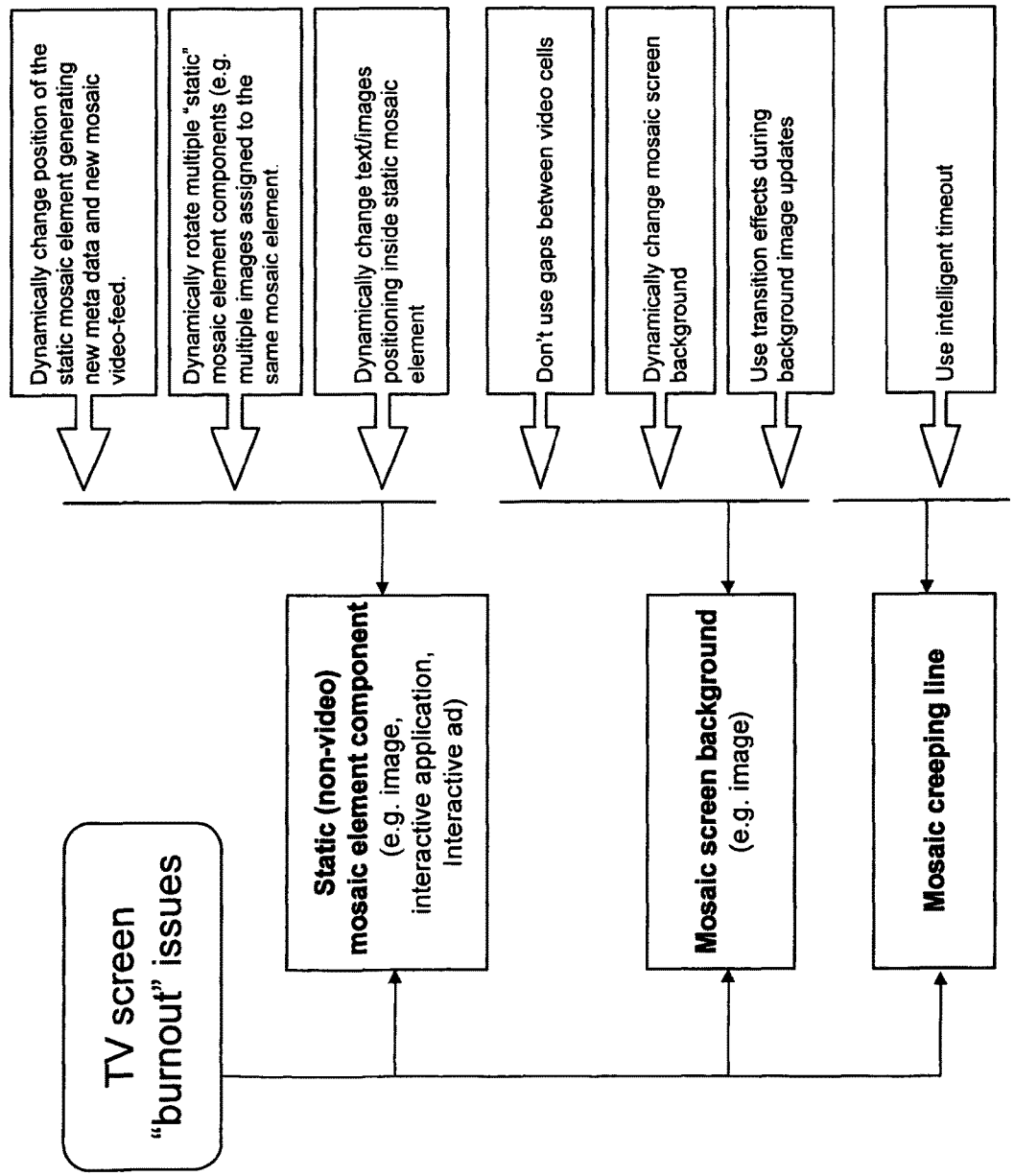
FIG. 25 is an algorithm for avoiding TV screen burnout.
Figure 26:
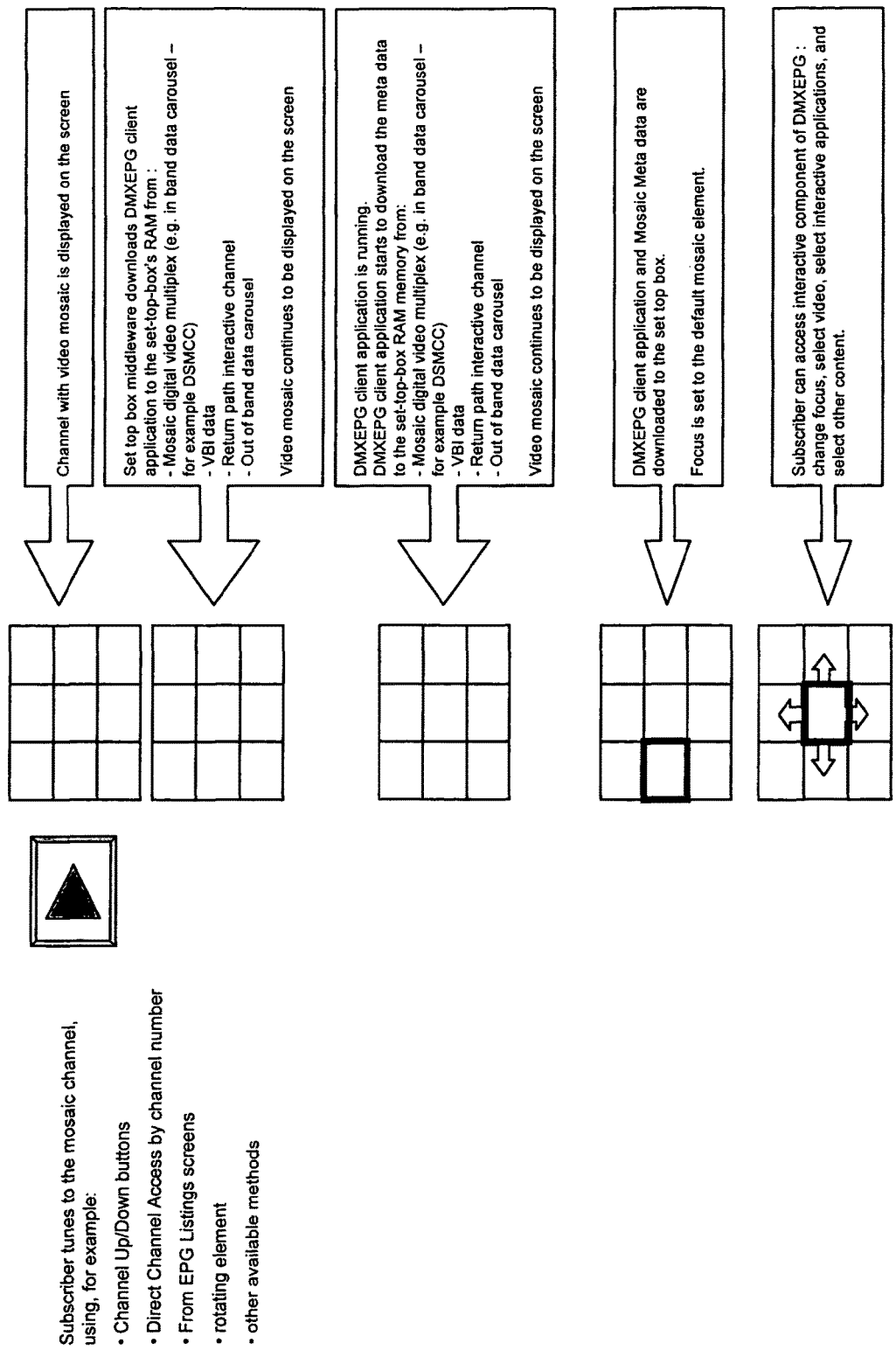
FIG. 26 shows ways to activate the DMXEPG Client application.
Figure 27:
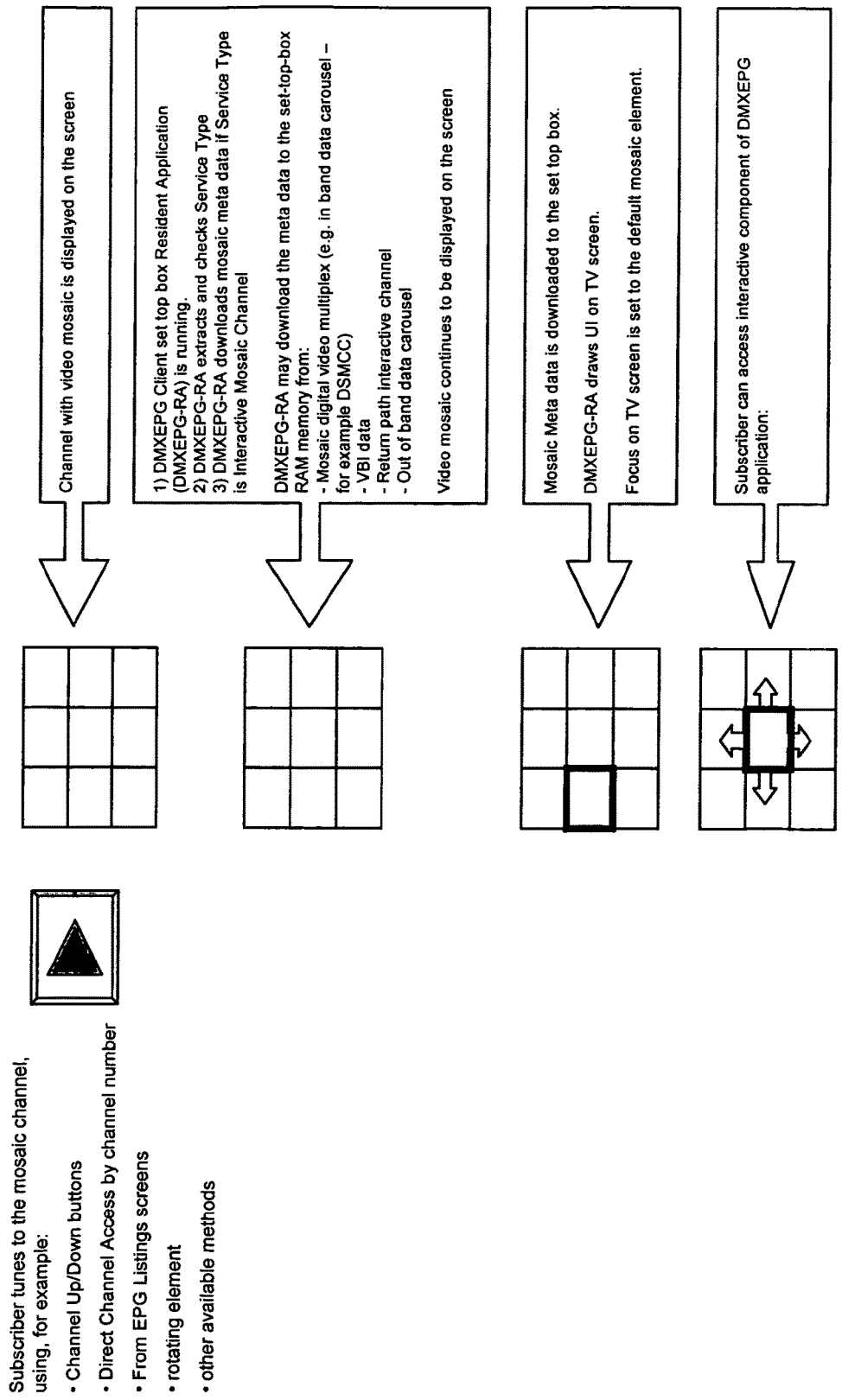
FIG. 27 shows ways to activate the DMXEPG Client resident application.

Enhanced data and Interactive application Insertion terminal 247 is a web based interface that allows system operator to insert/assign mosaic element components (FIG. 5) to the Interactive mosaic. Matrix SuperSplit (MSS) 248 is a real time digital video processor which can:

Tune to the scheduled channel and program using Matrix Scheduler control information
Compose mosaic video stream
Compose mosaic audio stream
Encapsulate Interactive Mosaic private data
Encapsulate modified Service Information tables The MSS receives:
private interactive mosaic tables descriptors, mosaic element components scheduling data (for example, which broadcasted video program should be inserted in the final mosaic video stream) from Matrix Scheduler
additional mosaic element components content (e.g., video/audio loops) from Enhanced data and Interactive application Insertion terminal 247
video feed which includes all channels sent by service provider The MSS composes the final mosaic digital stream which comprises:
Mosaic video stream
Multiple audio streams, if applicable
DMXEPG Client Application, if applicable
Modified Service Information Data (E.g. PMT, SDT, CVT), if applicable
Private Interactive Mosaic tables and descriptors
QAM/upconverter 249 (or its IPTV equivalent) modulates Matrix SuperSplit output
RF combiner 2410 (or its IPTV equivalent) combines original video feed with the Interactive Mosaic Virtual channel FIG. 25 is an algorithm to minimize or eliminate TV screen "burnout" caused by an interactive mosaic which may comprise a number of static graphics elements like "non-video" mosaic element components, mosaic screen background, and mosaic screen creeping line. To prevent TV screen "burnout", system uses any combination of following rules and actions:

For "non-video" mosaic components (e.g. image, text, application):
  Dynamically change position of the mosaic element with the "non-video" mosaic component. In this case we have to regenerate mosaic video feed by MSS 248 and interactive mosaic private tables/descriptors by MS 244.
  Dynamically rotate multiple "non-video" mosaic components, using transition effects (e.g. rotate weather application and market stock application)
  Dynamically change text/images positioning inside static mosaic element For Mosaic screen background:
  Try do not use gaps between video cells
  Dynamically change mosaic screen background
  Use transition effects during background image update
Use intelligent timeout for mosaic creeping line FIG. 26 and FIG. 27 show ways to activate the DMXEPG Client application (DMXEPG-C). The DMXEPG-C can be downloaded to the STB RAM memory via any available transport mechanisms:
In band data carousel (e.g. DSMCC)
In band private tables or message (MPEG2—private section, DCII—text message)
VBI data
Return path interactive channel
Out of band data carousel
Out of band private messaging DMXEPG-C also can be stored in the available medium such as flash memory, hard drive, or another STB's persistent storage as STB's resident application. There are two scenarios to activate DMXEPG-C, depending on its location. FIG. 26 shows activation process when DMXEPG-C is downloaded to the box after subscriber tunes to the mosaic channel. FIG. 27 shows activation process when DMXEPG-C is stored in the STB persistence storage.

Figure 28:
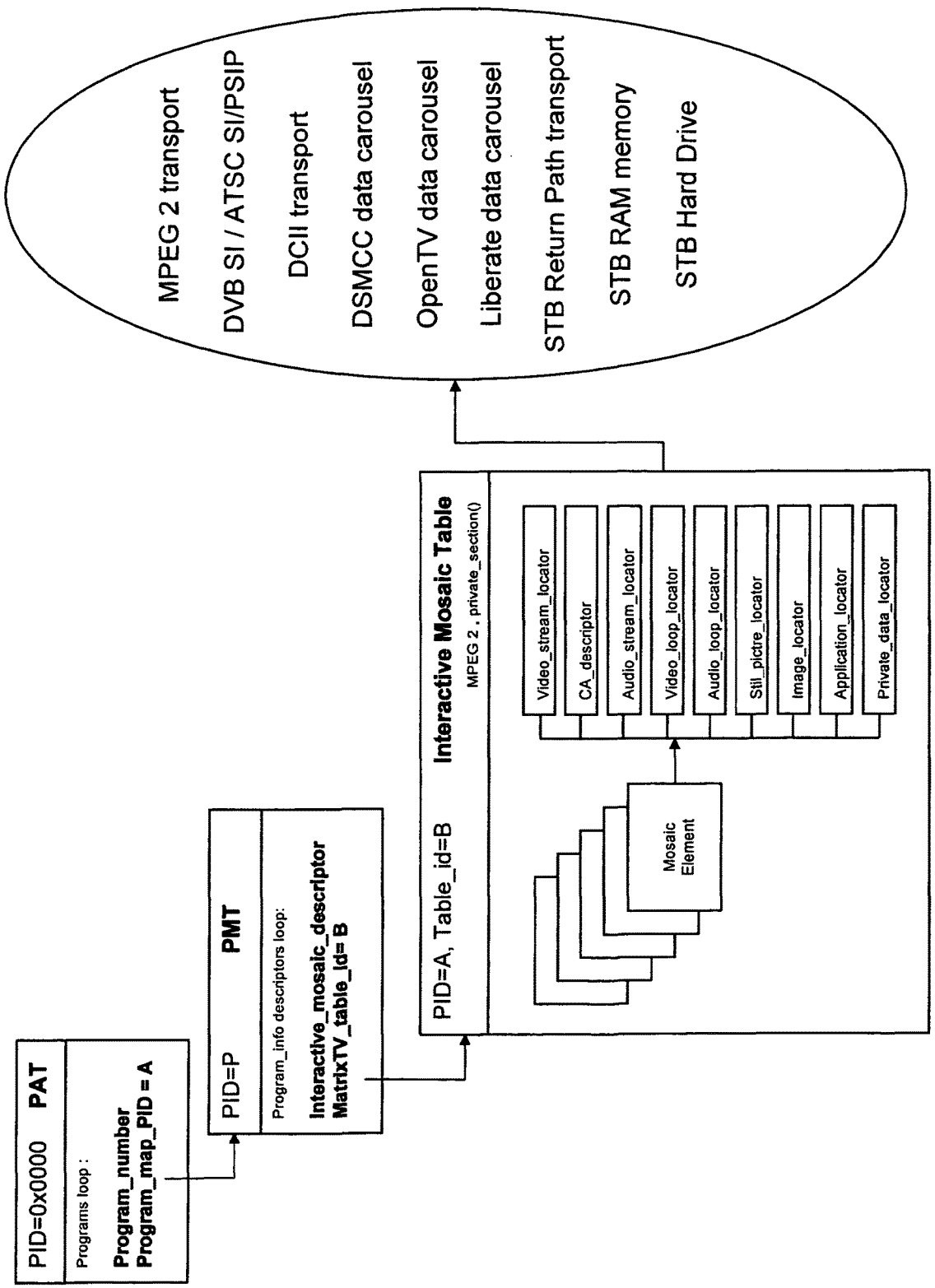
FIG. 28 shows relations between standard MPEG2 transport tables and additional private Interactive Mosaic Tables/descriptors.

FIG. 28 shows relation between standard MPEG2 transport tables and additional private Interactive Mosaic Tables and descriptors. Following is a discussion of the descriptors and tables showing an example of the syntax for Interactive Mosaic Descriptor and Interactive Mosaic Master Table.

Interactive Mosaic Private Tables and Descriptor (MPEG 2 Private Section)

The interactive mosaic descriptor can be located in the following MPEG 2/ATSC SI/PSIP/DVB SI tables:

ATSC PSIP:
- Virtual Channel Table (VCT)
  - Satellite_virtual_channel ( )—descriptors loop
  - SMATV_virtual_channel ( )—descriptors loop
  - Broadcast_virtual_channel ( )—descriptors loop
  - Virtual_channel ( )—descriptor loop DVB SI:
- Service Description Table (SDT)—descriptors loop MPEG 2
- Program Map Table (PMT)
  - TS_program_map_section ( )—program_info descriptor loop A digital program which carries interactive mosaic can include the interactive mosaic descriptor inside its Program Map section in the program information descriptors loop.

TABLE 1

Syntax of private Interactive Mosaic Descriptor

| Syntax | Bits | Bytes | Mnemonic |
|---|---|---|---|
| Interactive_mosaic_descriptor( ){ | | | |
|     Descriptor_tag | 8 | 1 | uimsbf |
|     Descriptor_length | 8 | 1 | uimsbf |
|     For (j=0; j<N_table_ids; j++){ | | | |
|         MatrixTV_table_id | 8 | 1 | uimsbf |
|     } | | | |
| } | | | |

TABLE 2

MatrixTV_table_id values

| MatrixTV_table_id | Matrix TV data stream |
|---|---|
| 0xD0 | Interactive Mosaic Master Table |
| 0xD1 | Interactive Mosaic Resources Table |
| 0xD2 | Interactive Mosaic Applications Table |
| 0xD3 | Reserved |
| 0xD4 | Reserved |

TABLE 3

Syntax of Interactive Mosaic Master Table (IMMT)

| Syntax | Bits | Bytes | Mnemonic |
|---|---|---|---|
| Interactive_mosaic_master_table( ){ | | | |
|   Table_id (see table 1) | 8 | 1 | Uimsbf |
|   Section_syntax_indicator | 1 | | bslbf |
|   Reserved_future_use | 1 | | Bslbf |
|   Reserved | 2 | | Bslbf |
|   Section_length | 12 | 2 | Uimsbf |
|   Table_id_extension | 16 | 2 | Uimsbf |
|   Reserved | 2 | | Bslbf |
|   Version_number | 5 | | Uimsbf |
|   Current_next_indicator | 1 | 2 | Bslbf |
|   Section_number | 8 | 1 | Uimsbf |
|   Last_section_number | 8 | 1 | Uimsbf |
|   Interactive_mosaic_entry_level | 1 | | Bslbf |
|   Reserved | 7 | 2 | |
|   For(i=0;i<N;i++){ | | | |
|     mosaic_element_id | 8 | 1 | Uimsbf |
|     mosaic_element_type | 4 | | Uimsbf |
|     Mosaic_cell_record_length | 12 | 2 | Uimsbf |
|     On_left_key_press_mosaic_element_id | 8 | 1 | Uimsbf |
|     On_right_key_press_mosaic_element_id | 8 | 1 | Uimsbf |
|     On_up_key_press_mosaic_element_id | 8 | 1 | Uimsbf |
|     On_down_key_press_mosaic_element_id | 8 | 1 | Uimsbf |
|     Horizontal_offset | 14 | | Uimsbf |
|     Horizontal_size | 14 | | Uimsbf |
|     Vertical_offset | 14 | | Uimsbf |
|     Vertical_size | 14 | 7 | Uimsbf |
|     Mosaic_element_components_count | 8 | 1 | Uimsbf |
|     For(j=0;j<mosaic_component_components_count;j++){ | | | |
|       If( mosaic_component_components_count > 1){ | | | |
|         Repeat_flag | 1 | | Bslbf |
|         If(repeat_flag==0){ | | | |
|           Start_time | 32 | 4 | Uimsbf |
|         } | | | |
|         Duration_in_seconds | 15 | 2 | Uimsbf |
|       } | | | |
|       mosaic_element_component_descriptor( ) | * | | ((*)) |
|     } | | | |
|   } | | | |
| } | | | |

TABLE 4

Syntax of mosaic element component descriptor

| Syntax | Bits | Bytes | Mnemonic |
|---|---|---|---|
| mosaic_element_component_descriptor( ){ | | | |
|     Descriptor_tag | 8 | 1 | Uimsbf |
|     If(descriptor_tag == 0x01){ | | | |
|         Video_steam_locator( ) | * | | |
|         CA_descriptor( ) | * | | |
|     } | | | |
|     If(descriptor_tag == 0x02){ | | | |
|         Audio_stream_locator( ) | * | | |
|         CA_descriptor( ) | * | | |
|     } | | | |
|     If(descriptor_tag == 0x03){ | | | |
|         Video_loop_locator( ) | * | | |
|         CA_descriptor( ) | * | | |
|     } | | | |
|     If(descriptor_tag == 0x04){ | | | |
|         Audio_loop_locator( ) | * | | |
|         CA_descriptor( ) | * | | |
|     } | | | |
|     If(descriptor_tag == 0x05){ | | | |
|         Still_picture_locator( ) | * | | |
|     } | | | |
|     If(descriptor_tag == 0x06){ | | | |
|         Image_locator( ) | * | | |
|     } | | | |
|     If(descriptor_tag == 0x07){ | | | |
|         Application_locator( ) | * | | |
|     } | | | |
|     If(descriptor_tag == 0x08){ | | | |
|         Private_data_locator( ) | * | | |
|     } | | | |
| } | | | |

The resource locators' descriptors and Interactive Mosaic Resources Table and Interactive Mosaic Application Table are protocol/transport depended (may be one for DVB SI, one for ATSC PSIP, one for OCAP, one for DSMCC).

Figure 29:
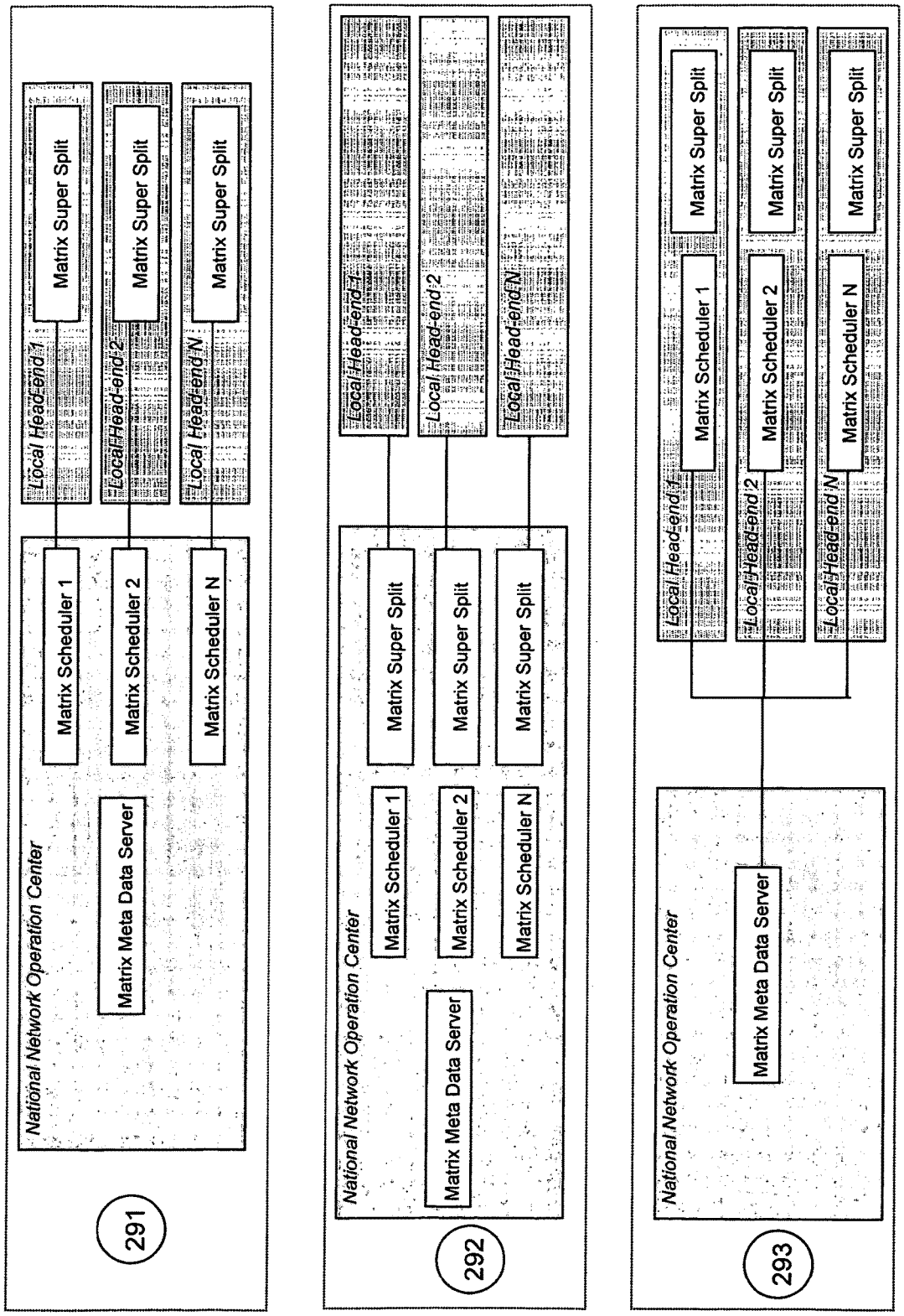
FIG. 29 shows local and national MTVSS configurations.

FIG. 29 shows local and national MTVSS configurations. MTVSS have three configuration options: National-1 (MTVSS-N1), National-2 (MTVSS-N2), and Local (MTVSS-L).

a) MTVSS-N1 291 generates local real-time program insertion schedule in the national network operation centre (NNOC) and delivers the data to the local Matrix SuperSplit server(s), which generates DMXEPG screens.

b) MTVSS-N1 292: local video stream generates by the Matrix SuperSplit server(s) located in NNOC. This option has better scalability because it does not require any changes on a local head-end where DMXEPG screens are delivers over existing digital TV infrastructure.

c) MTVSS-L 293 generates local real-time program insertion schedule using local Matrix Scheduler Server(s) and delivers the data to the local Matrix SuperSplit server(s), which generates DMXEPG screens.

Figure 29A:
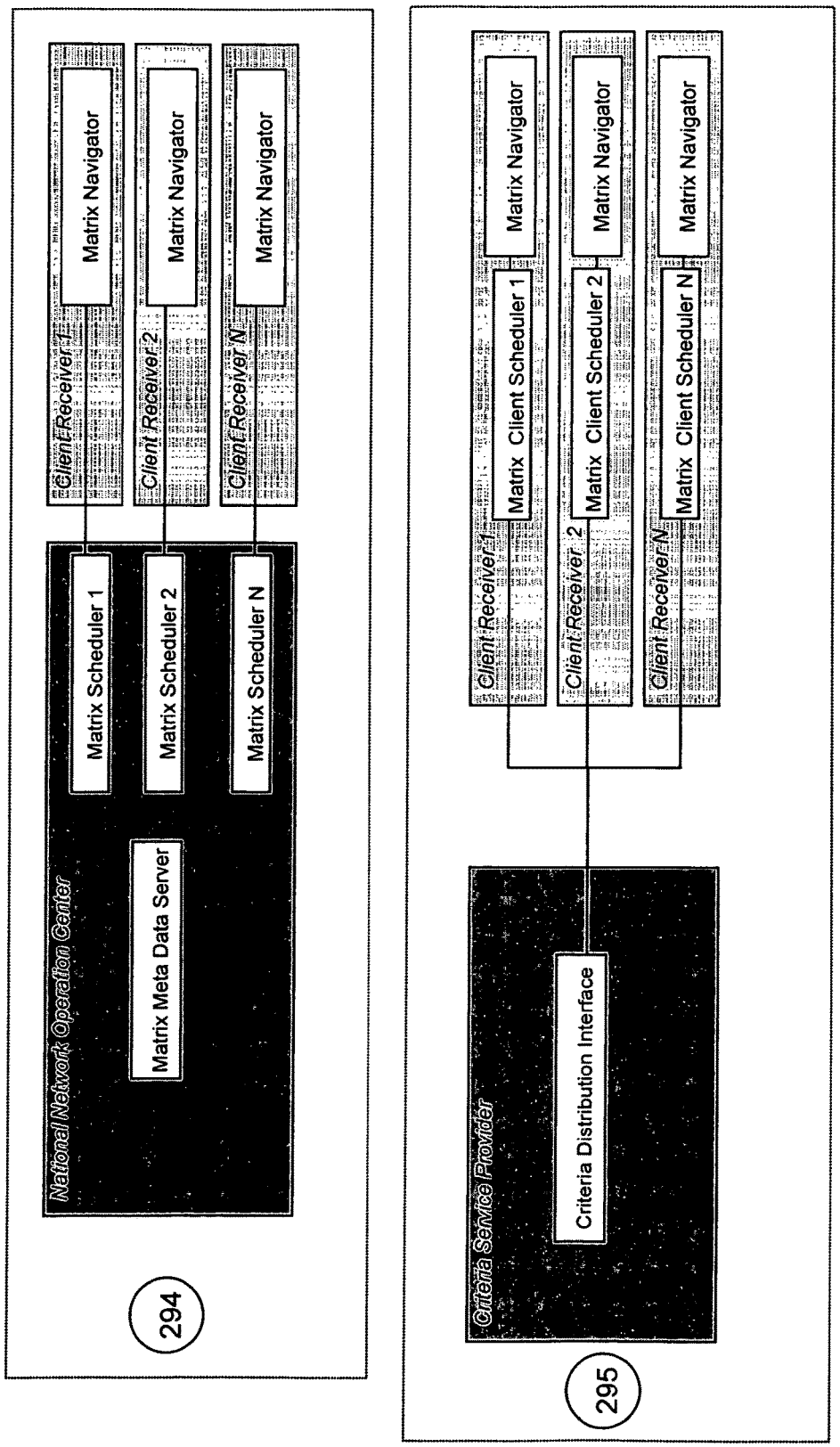
FIG. 29a shows MTVSS configurations for DMXEPG screen generation on client device.

FIG. 29a shows MTVSS configurations for DMXEPG screen implementation on client device. MTVSS implementation in 294 comprises a Matrix Scheduler as part of service provider backend. That configuration allows service provider to control ME mosaic element presentation criteria.

The MTVSS implementation in 295 consists of Matrix Scheduler as part of subscriber device. That configuration allows subscriber or third party to control ME mosaic element presentation criteria. The criteria service provider can be any third party that provides mosaic element presentation criteria that is used by the Matrix Scheduler. The criteria service provider can be the manufacturer of the client subscriber device. The criteria service provider can be the subscriber. In the general case, the mosaic element presentation criteria may comprise criteria from any combination of third party providers, the manufacturer, and/or the subscriber.

Mosaic element presentation criteria can be delivered using any suitable delivery medium including an Internet connection, a dial-up service, over the airwaves, satellite link, cable link, and so on. The subscriber can be provided with criteria on a CD that can be installed in the subscriber device.

Figure 30:
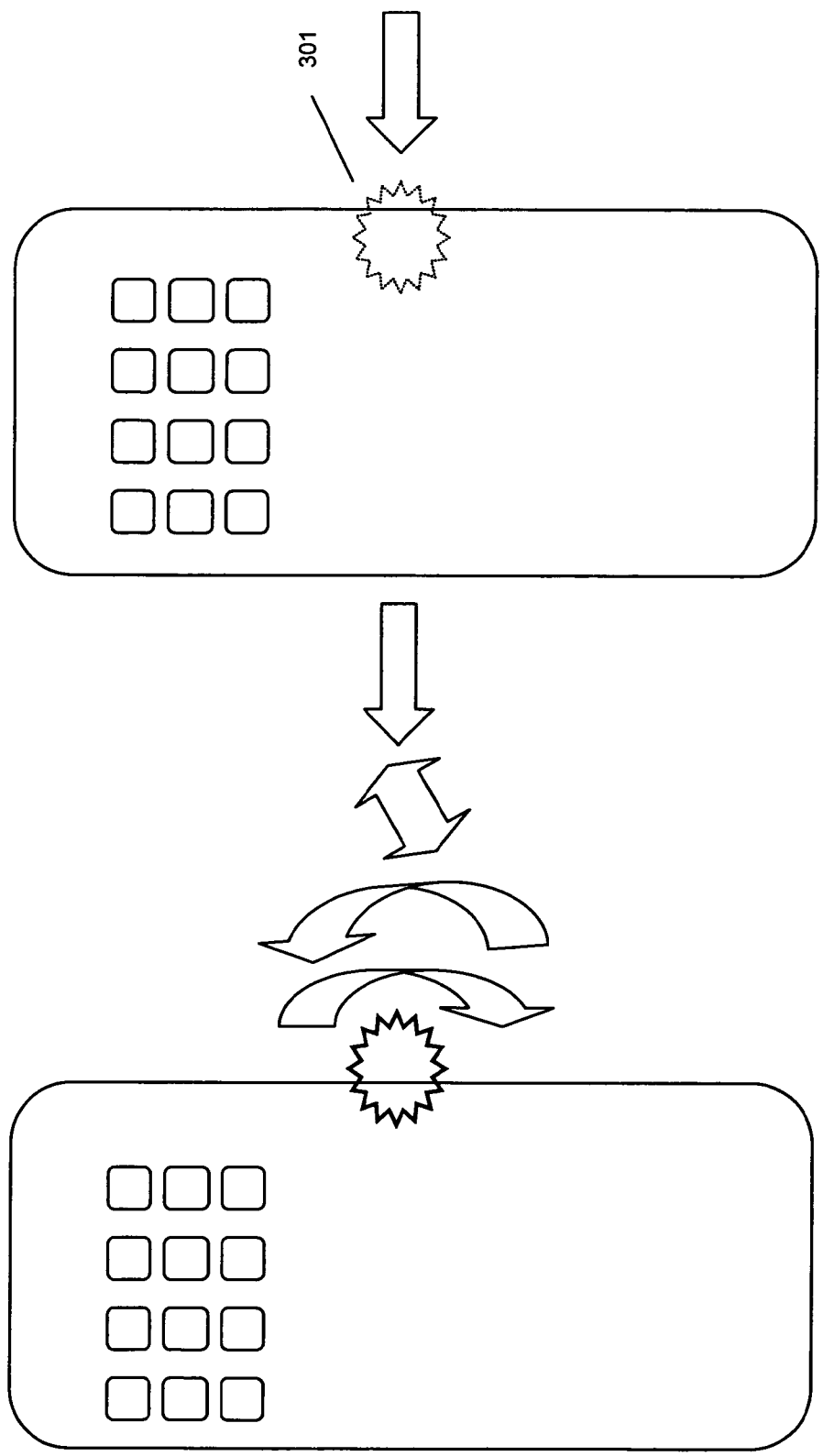
FIG. 30 is a remote control which, in accordance with the invention, incorporates a rotating element used by subscribers to navigate DMXEPG or iTV applications.

FIG. 30 shows remote control which, in accordance with the invention, incorporates rotating element which can be used by subscriber to simplify navigation of DMXEPG or any iTV application. Subscriber can manipulate the rotating element by rotating it up or down, as well as pushing it toward or away from himself, or depressing it into the remote control, or finally releasing it after it has been depressed into the remote control. STB maps movements of the rotating element with the DMXEPG or iTV application functions.

Figure 31:
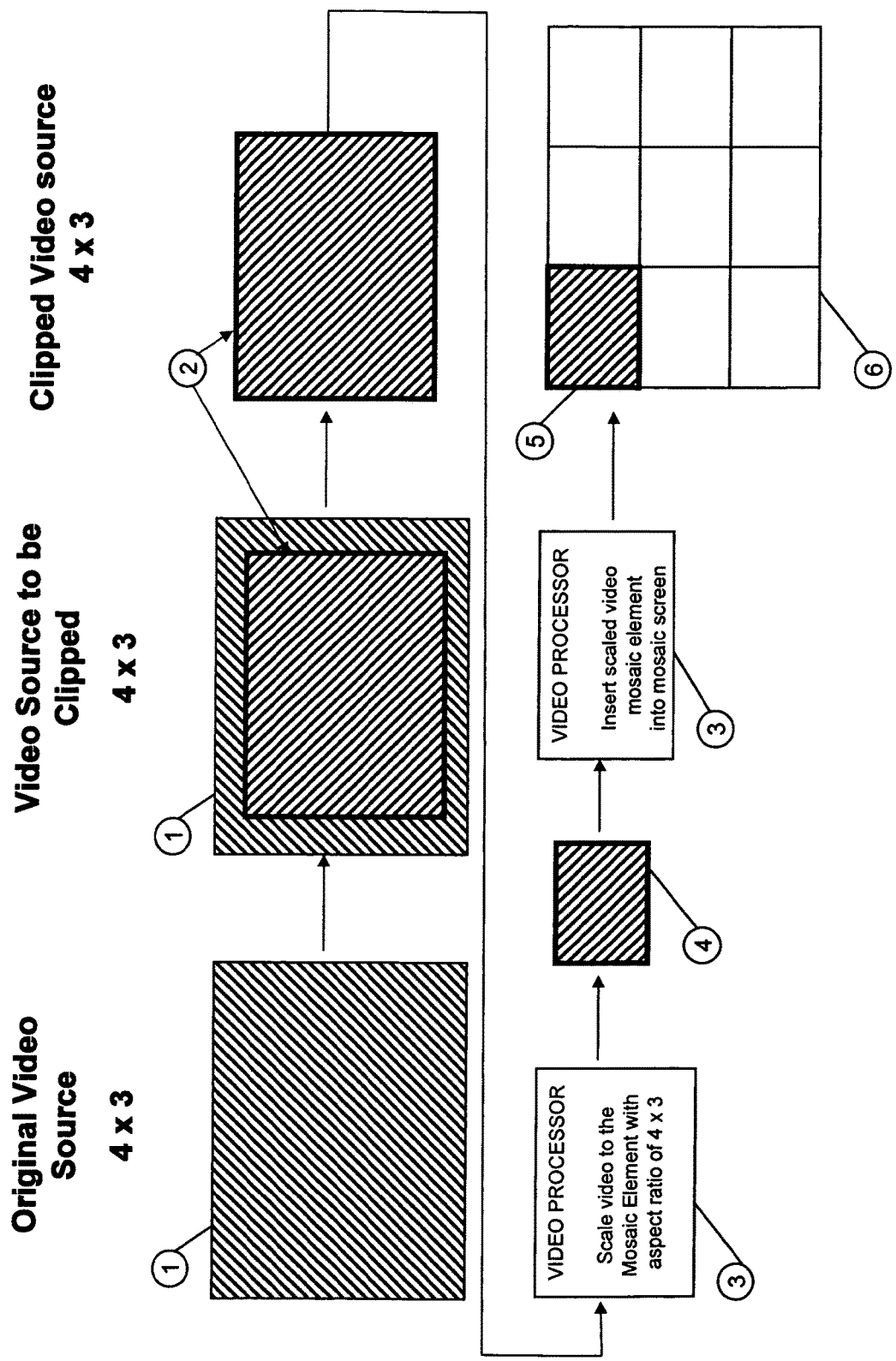
FIGS. 31-36 illustrate how to "virtually" increase size of the video or visual program in the ME for various aspect ratios.

FIG. 31 shows how to "virtually" increase the size of the video or visual program displayed in an ME since the ME size can be too small to show the entire video in a discernable manner. To solve the problem, the video or visual program can be virtually expanded by clipping less critical area around the center of the video and stretching the remaining video to fill in a ME. The figure shows clipping to extract a central portion of the video. The user can clip other regions of the video to extract portions of the video other than the central portion.

Numerous combinations of aspect ratios of video sources and aspect ratios of the display area are possible. Typical combinations include:
a 16×9 video source converted to a 4×3 ME
a 4×3 video source converted to a 16×9 ME
a 16×9 or a 4×3 video source converted to an ME of non standard aspect ratio To virtually increase the size of the video, it is necessary to clip a percentage of the original video feed (which is usually lost because of TV overscan) and scale it to the size and aspect ratio of the target ME. As shown in FIG. 31, the video is clipped to produce a clipped video source. The clipped video source is then expanded (scaled up, sized up, etc.) and incorporated into the target ME. The figure shows the original video has a 4×3 aspect ratio and the target ME has a 4×3 aspect ratio. The clipped video source therefore has a 4×3 video source.

Figure 32:
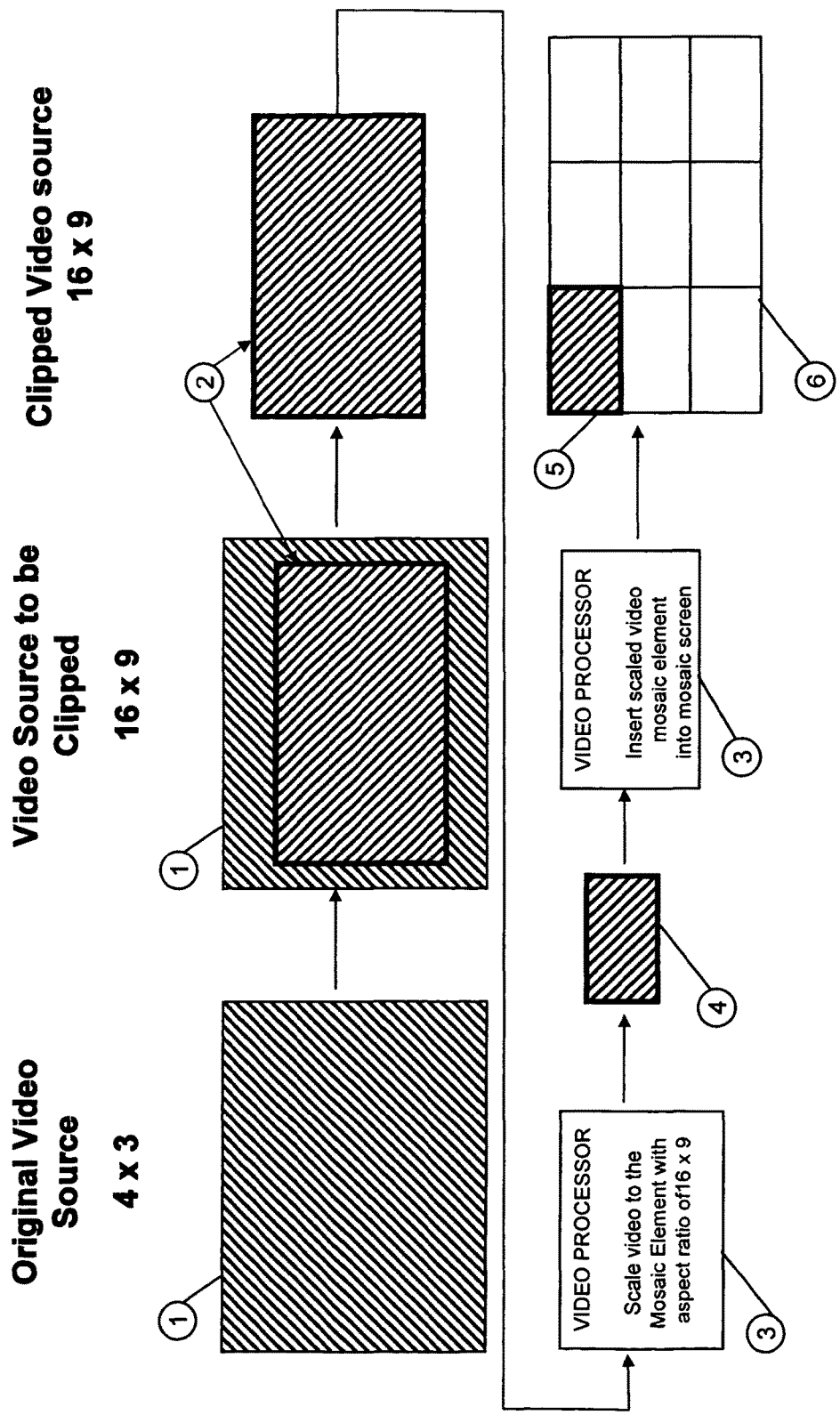

FIG. 32 shows clipping for an original video source having a 4×3 aspect ratio that is targeted for an ME that has a 16×9 aspect ratio. The clipping is performed with a rectangle having an aspect ratio of 16×9 s the video can be scaled up to fit the target ME without distorting the original video.

Figure 33:
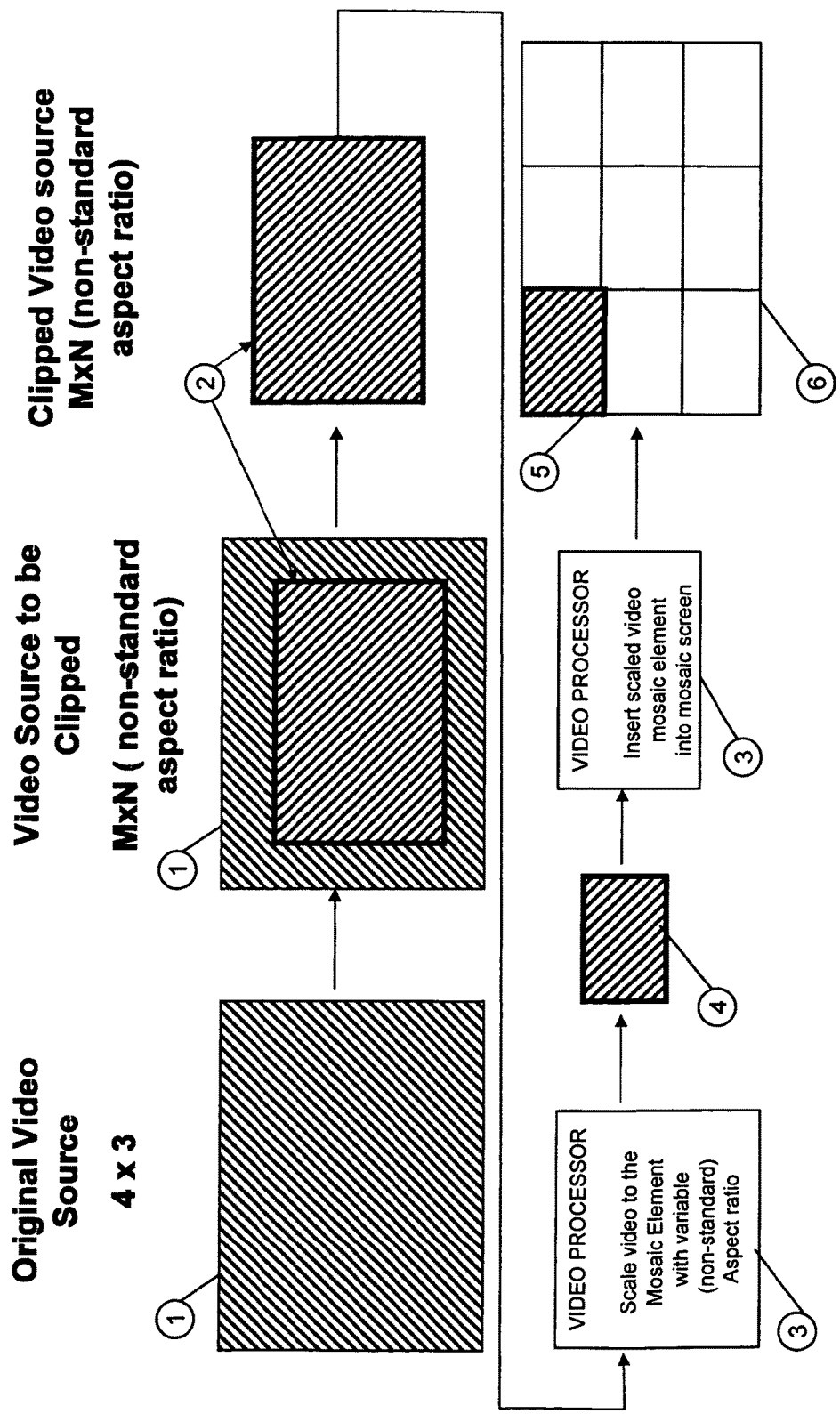
Figure 34:
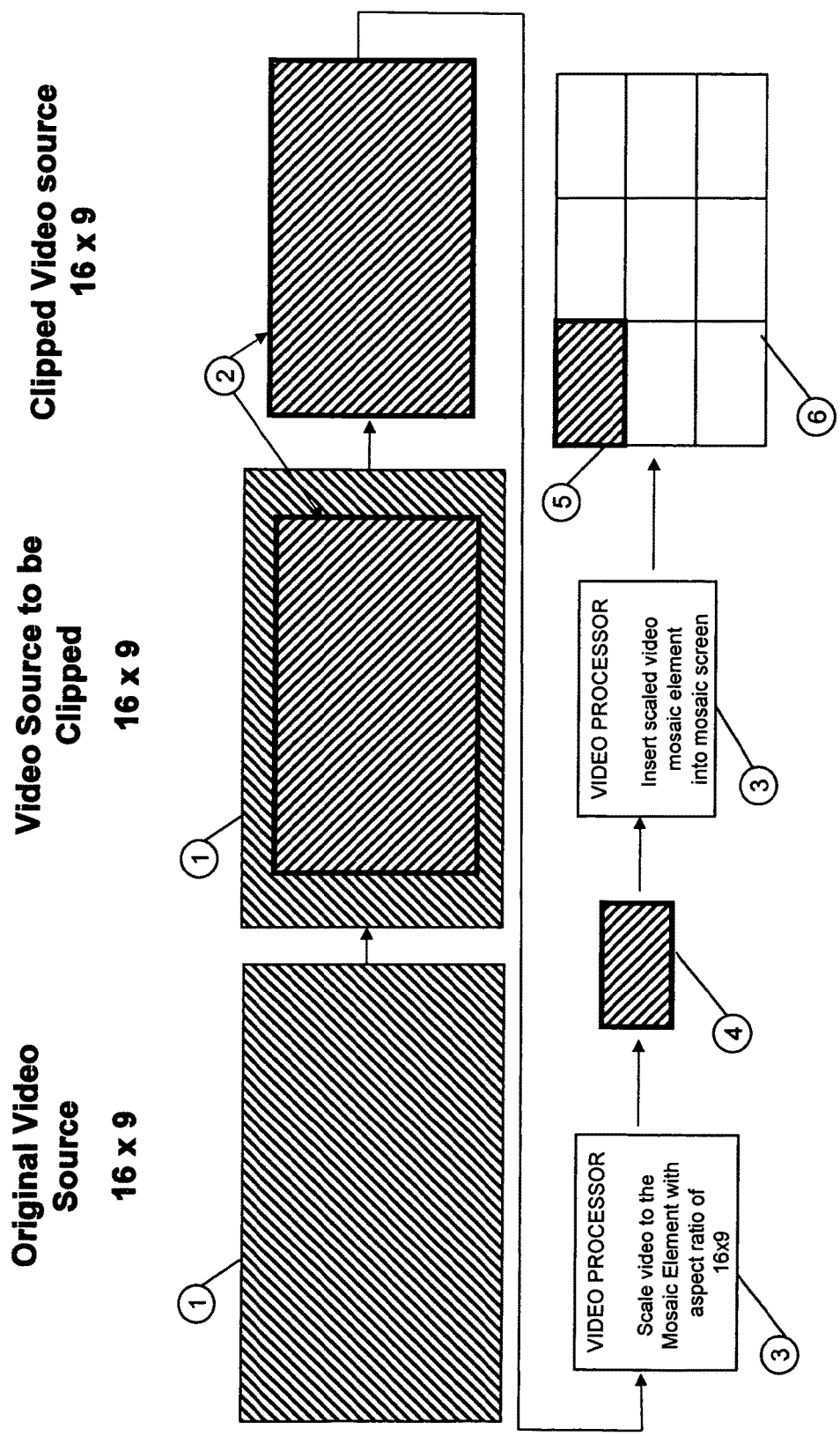
Figure 35:
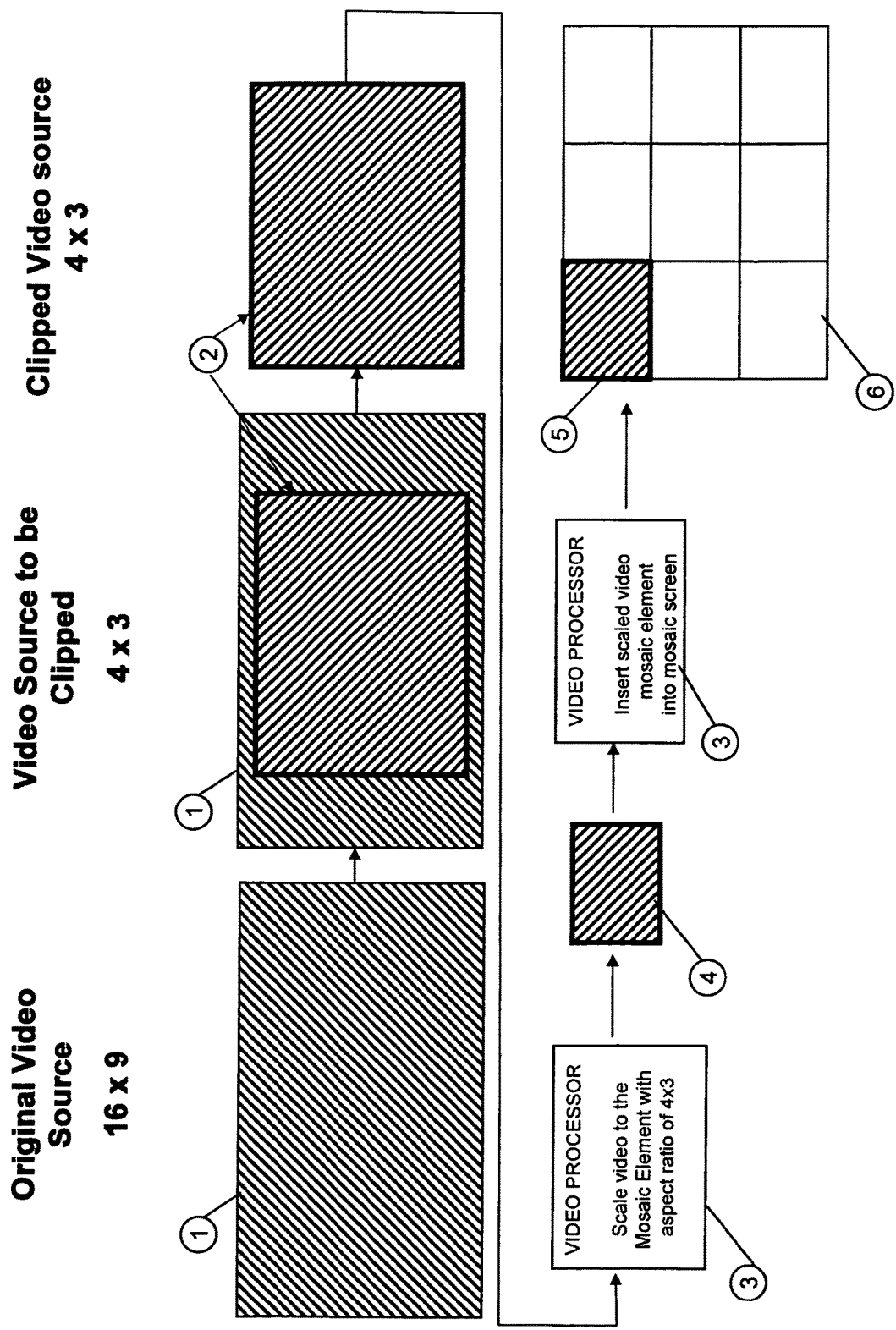
Figure 36:
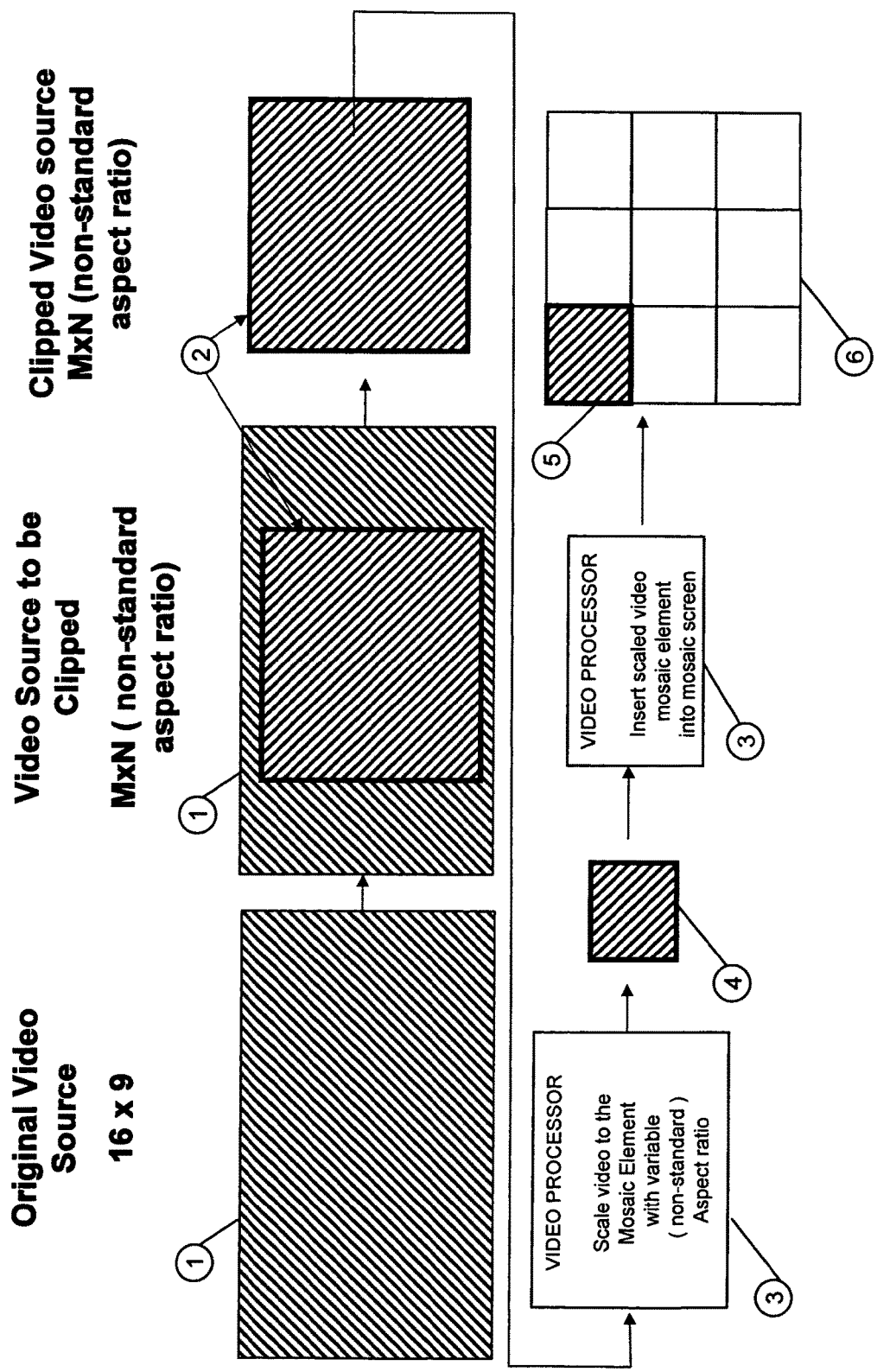

To further illustrate this clipping aspect of the present invention, FIG. 33 shows clipping for a 4×3 original video source (i.e., its aspect ratio is 4×3) to fit into a target ME having a non-standard aspect ratio. FIG. 34 clipping for a 16×9 original video source to fit a 16×9 ME (i.e., its aspect ratio is 16×9). FIG. 35 clipping for a 16×9 original video source to fit a 4×3 ME. FIG. 36 shows clipping for a 16×9 to fit a non-standard ME.

Figure 37:
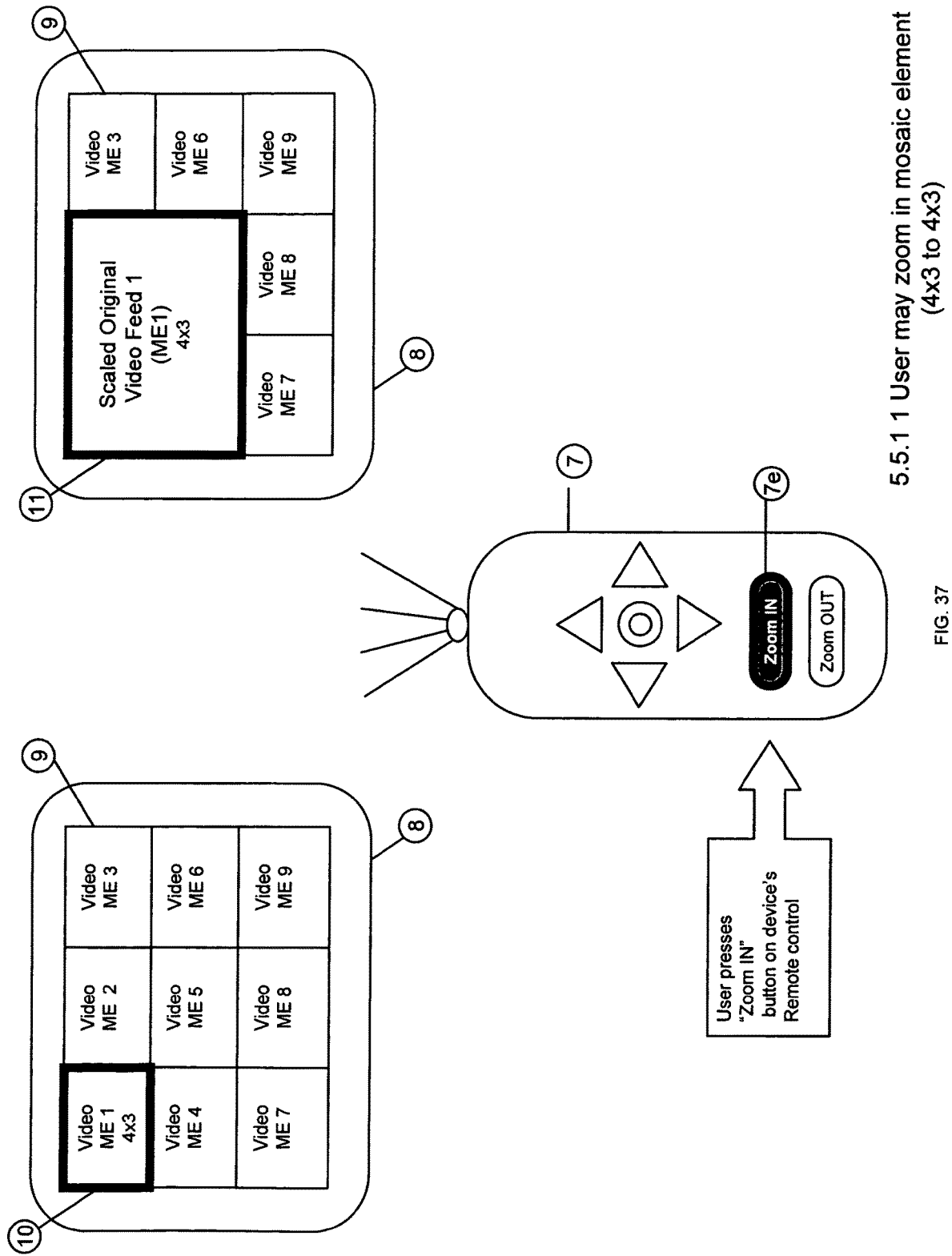
FIGS. 37-45 illustrate "zooming" in on an ME that is in focus.

FIGS. 37-44 show that a subscriber can zoom in on an ME that is in focus. FIG. 37 shows how a subscriber can expand the size of a 4×3 ME (i.e., its aspect ratio is 4×3) that is in focus including the video displayed in it to a larger (zoomed in) 4×3 ME. This operation is done by a second tuner connected directly or indirectly to the display, and is performed when the user activates a control to perform zooming. For example, the figures shows "zoom in" button on a remote control that can be used to activate zooming in. The original aspect ratio of ME may or may not be preserved in the expanded ME. For example, FIG. 37 illustrates an example where the aspect ratio is preserved when zooming is performed on the ME in focus.

Figure 38:
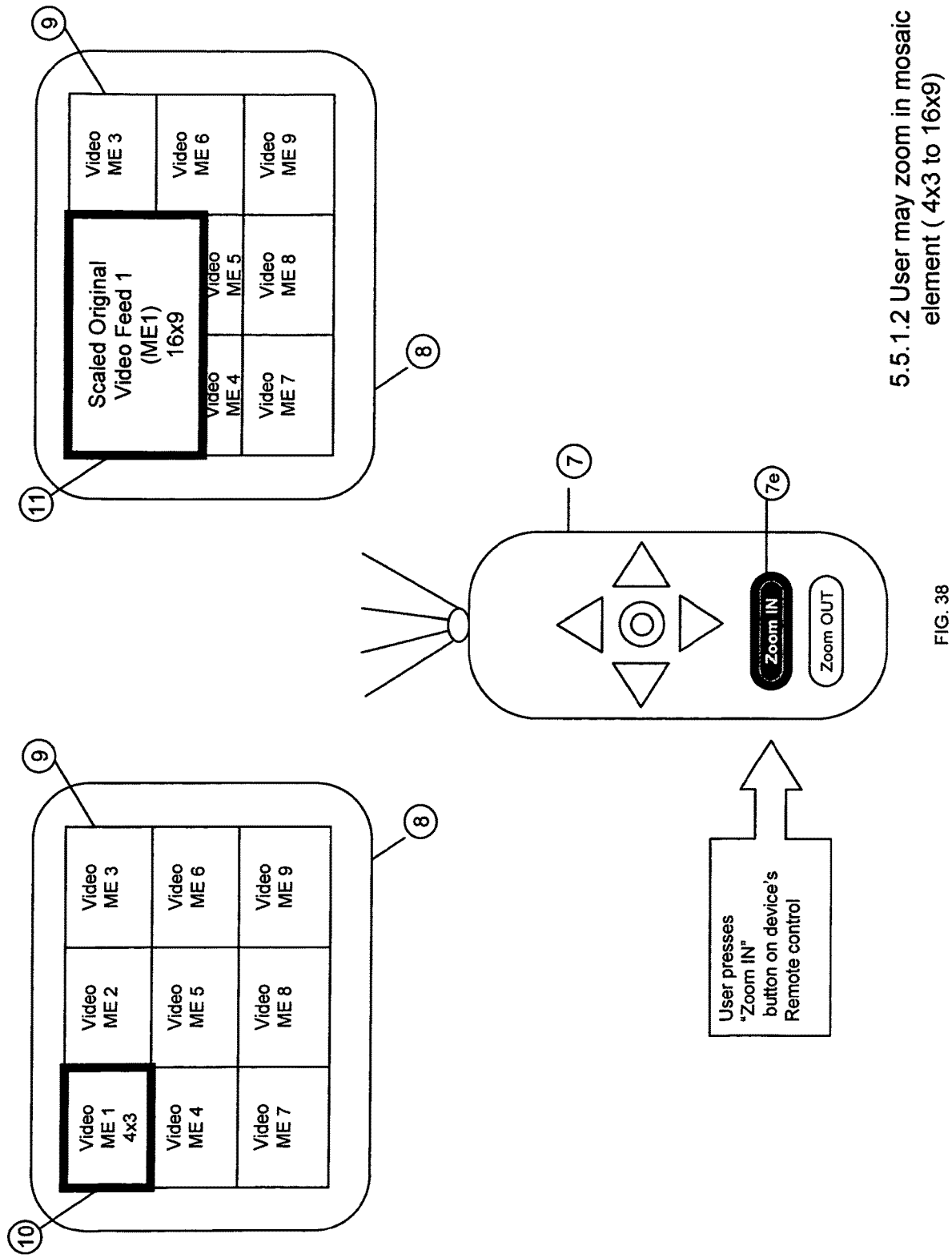
Figure 39:
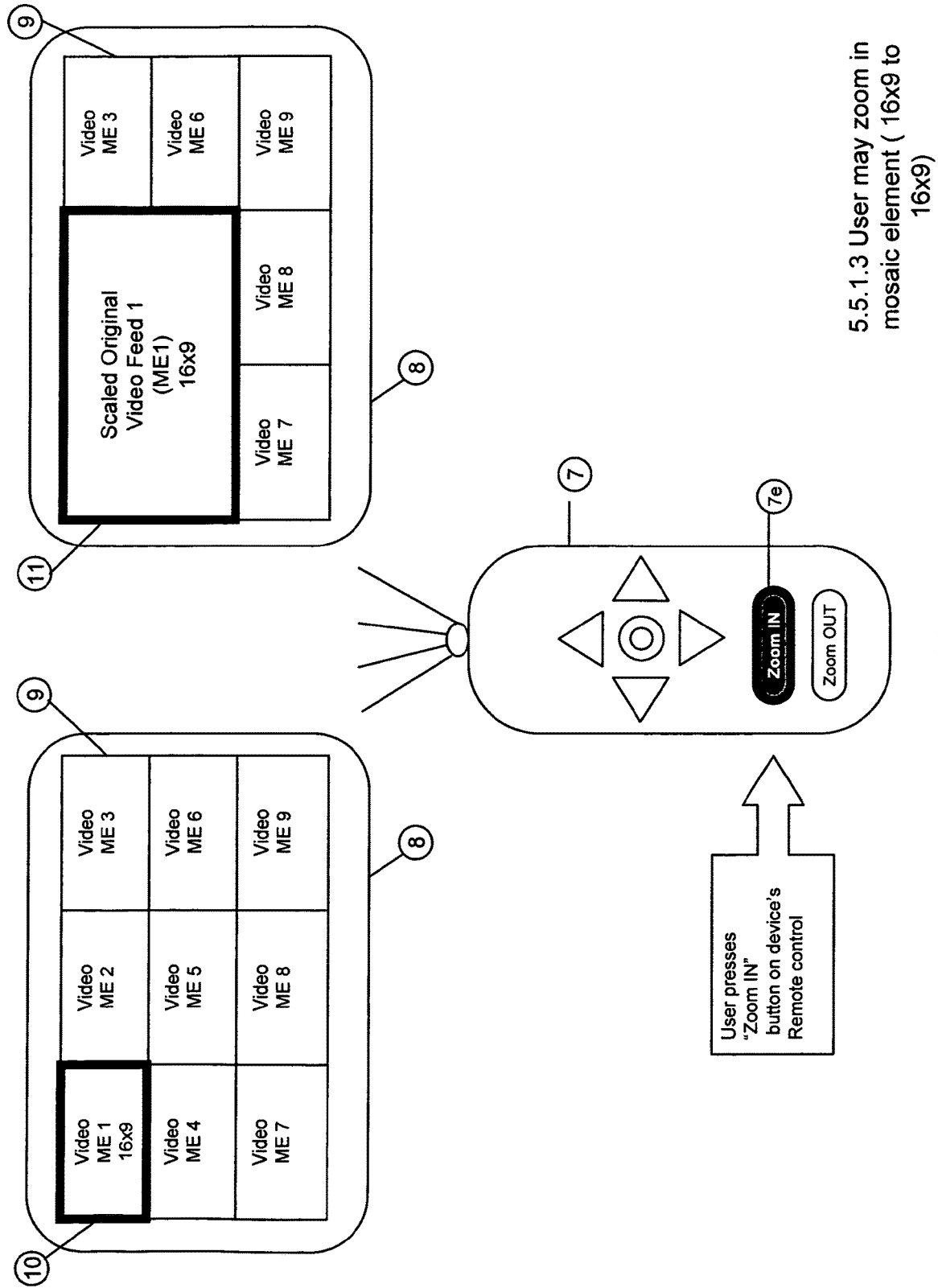
Figure 40:
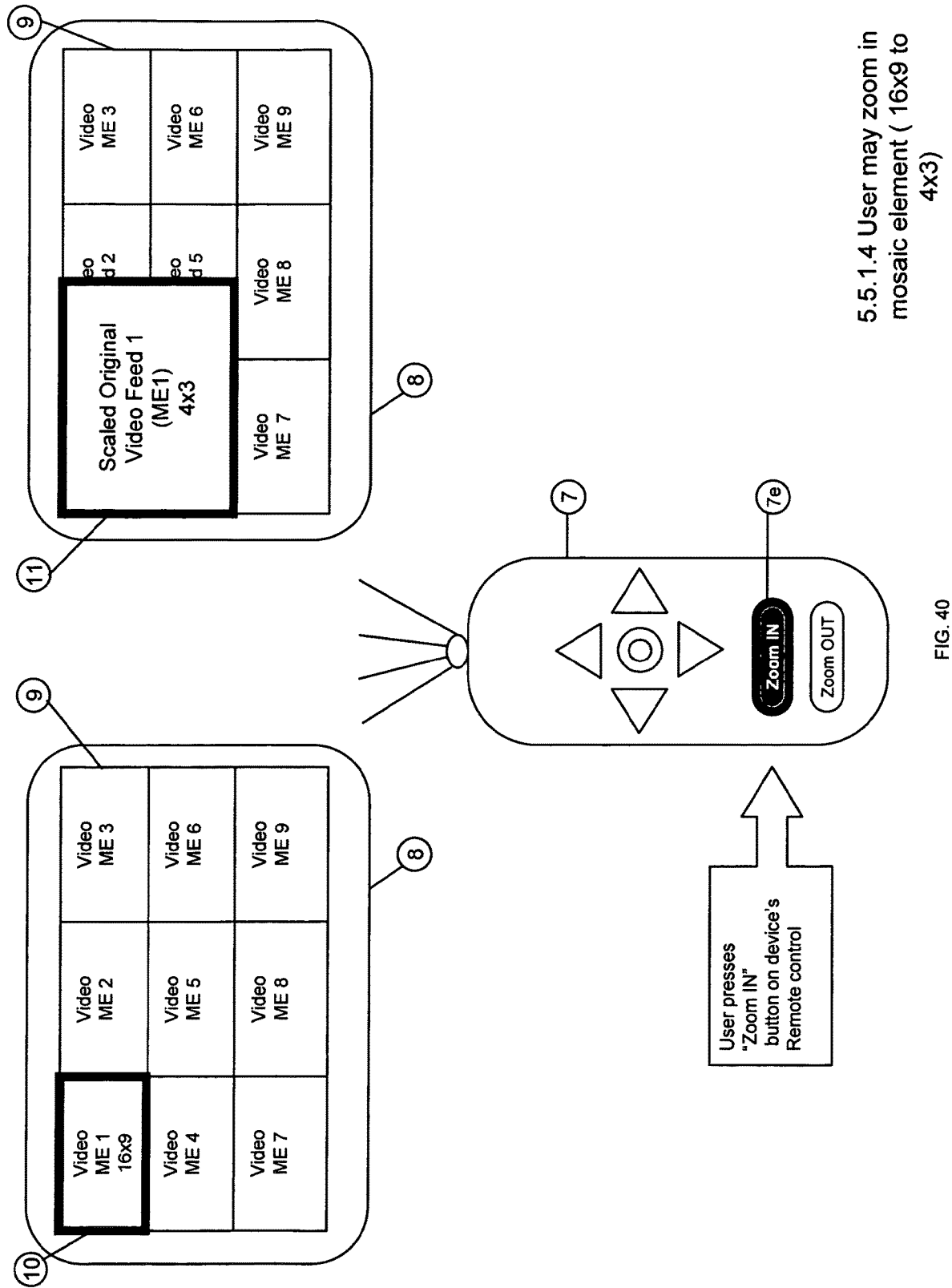
Figure 41:
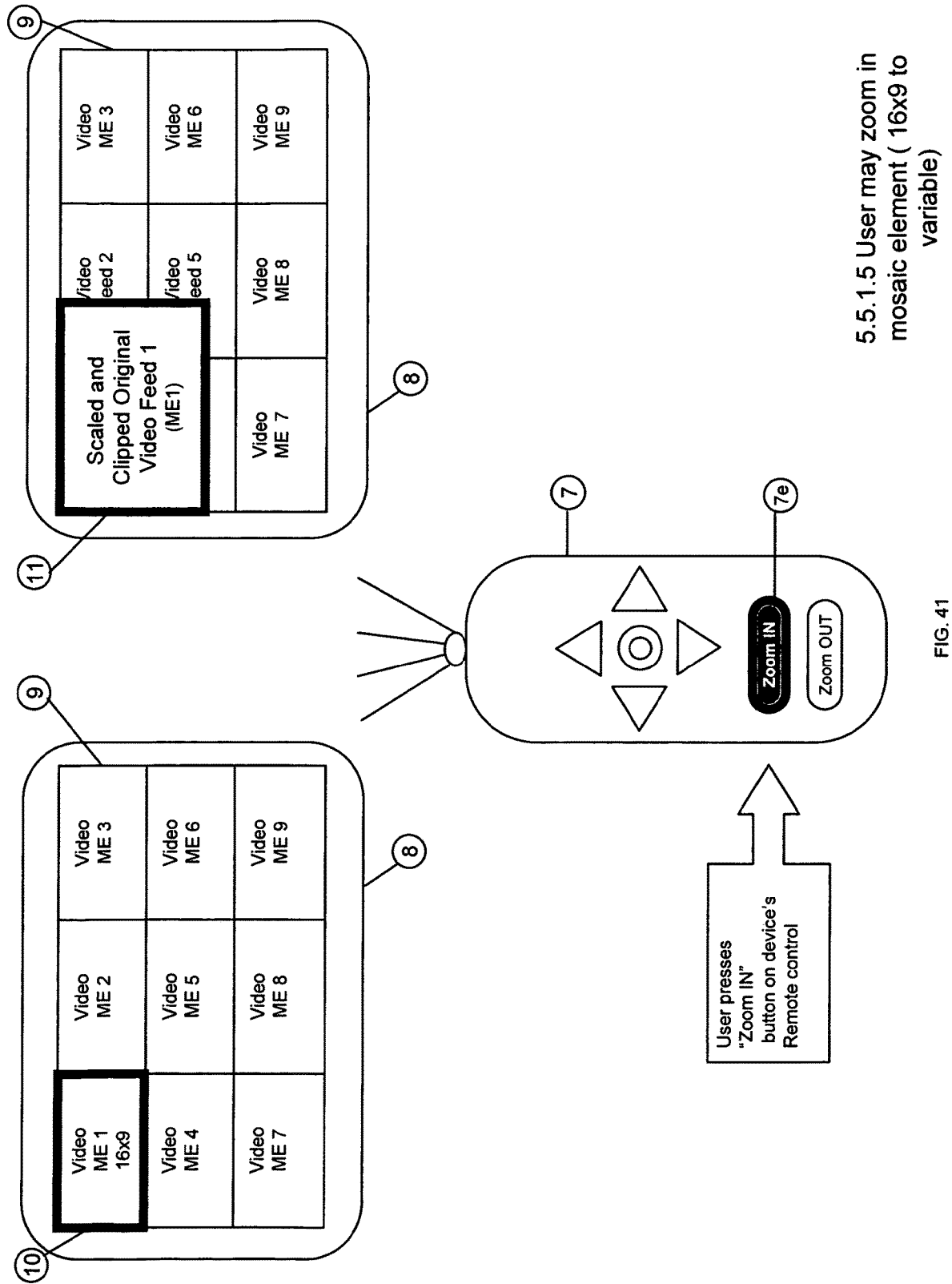
Figure 42:
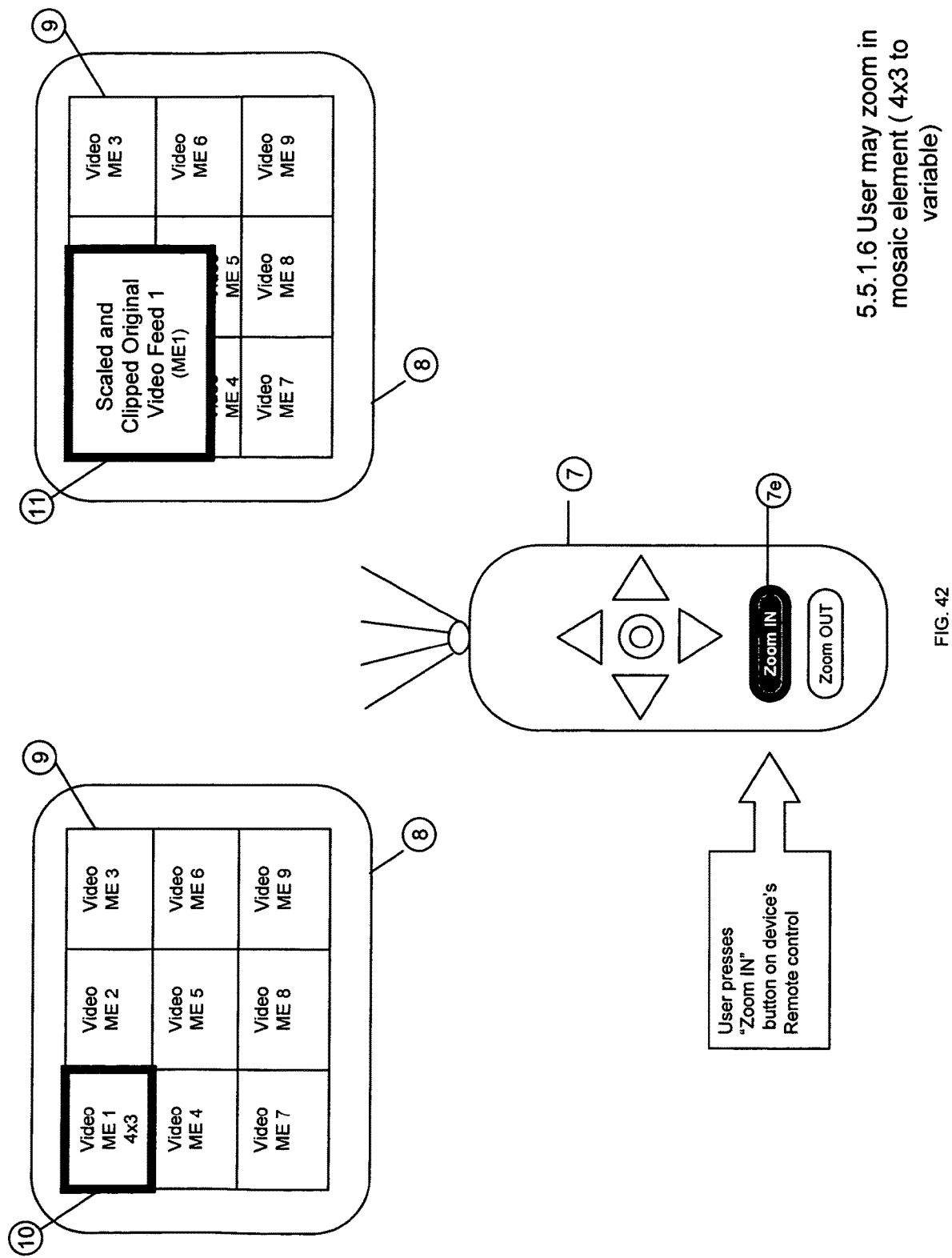
Figure 43:
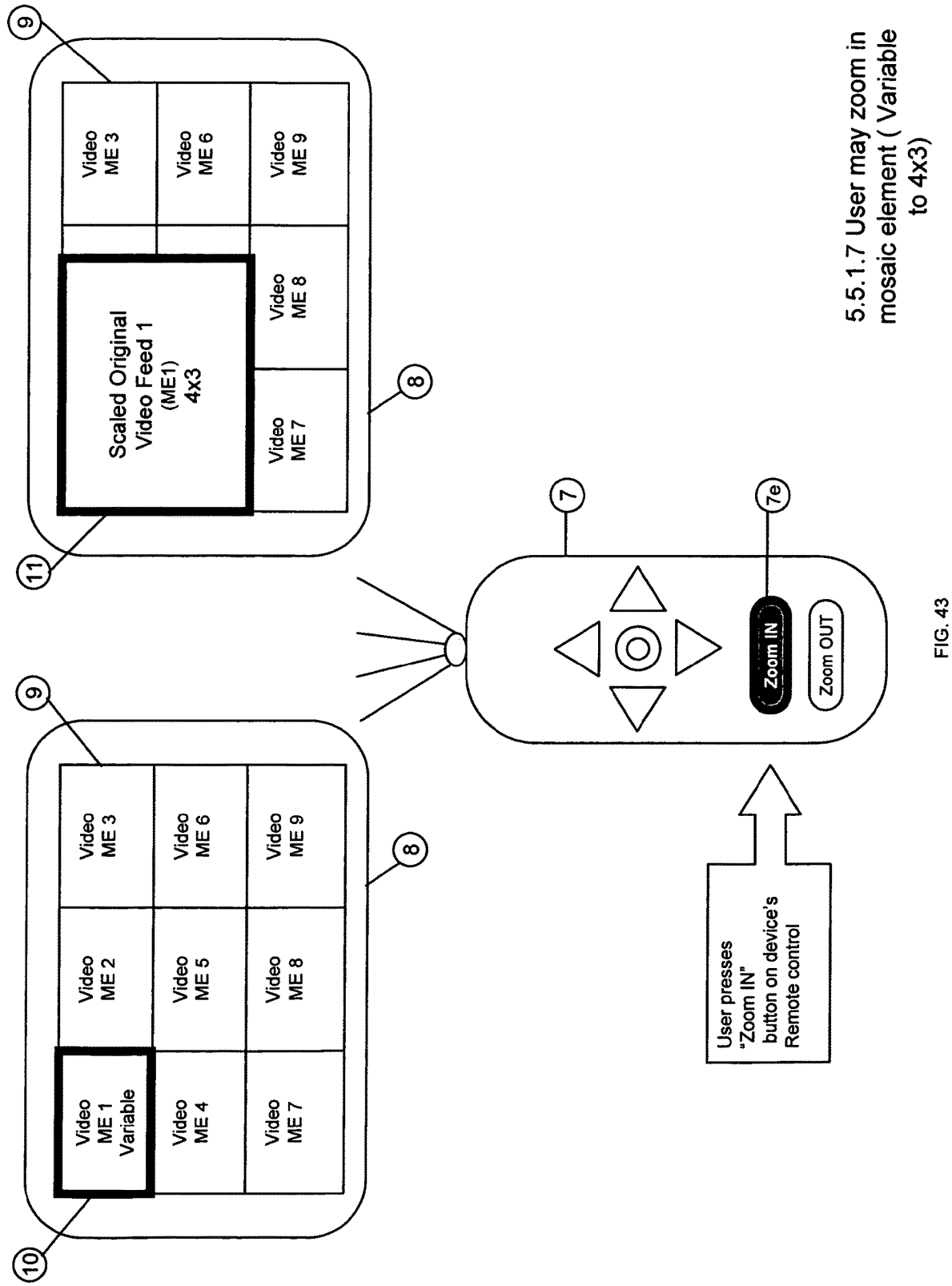
Figure 44:
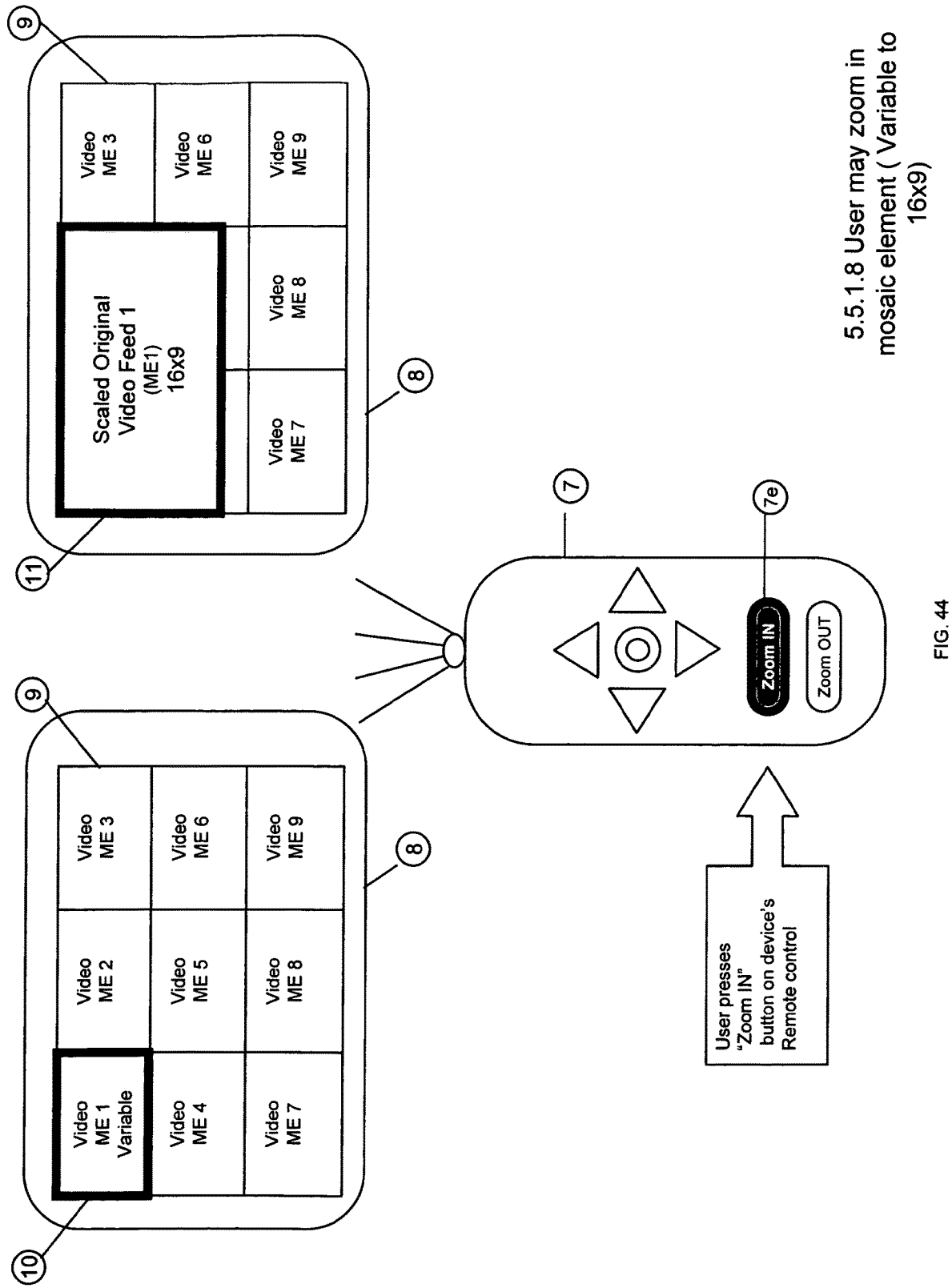

Other aspect ratios can be accommodated. FIG. 38 shows zooming in of a 4×3 original ME to an expanded ME having a 16×9 aspect ratio. FIG. 39 shows zooming in of a 16×9 original ME to a 16×9 enlarged ME. FIG. 40 shows zooming in of a 16×9 original ME to a 4×3 enlarged ME. FIG. 41 shows zooming in of a 16×9 original ME to a non-standard zoomed-in ME (i.e., the ME has a non-standard aspect ratio). FIG. 42 shows zooming in of a 4×3 original ME to a non-standard zoomed-in ME (i.e., the ME has a non-standard aspect ratio). FIG. 43 illustrates a configuration where the in-focus ME has a non-standard aspect ratio where zooming results in a 4×3 expanded ME, while FIG. 44 shows an 16×9 expanded ME.

Figure 45:
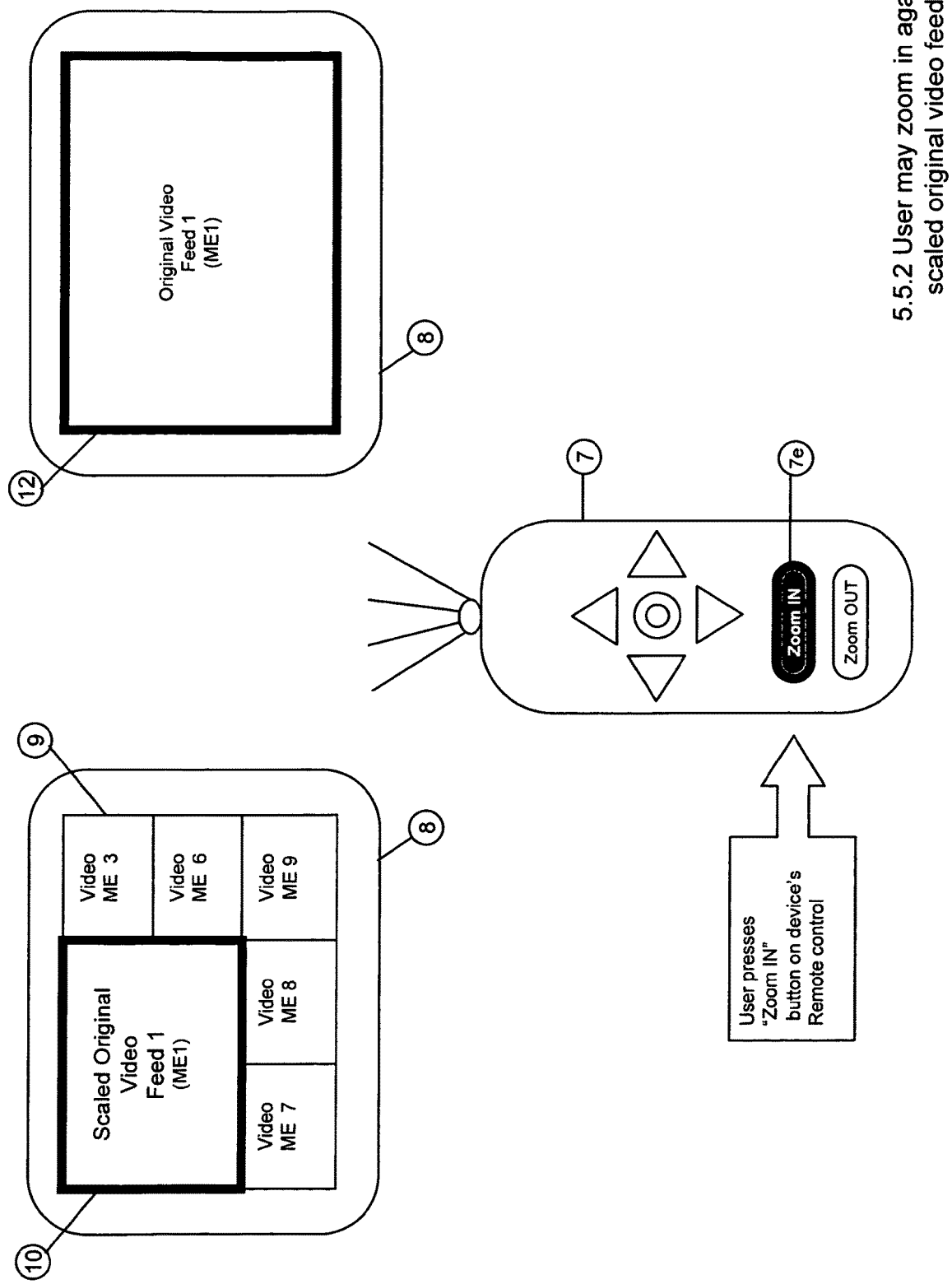

FIG. 45 illustrates that the subscriber can further expand the size of the zoomed-in ME to a full-screen video. This action can be activated by an additional press of the zoom-in button on the remote control. The full-screen video may take on the aspect ratio of the display, or take on its original aspect ratio as broadcast.

Figure 46:
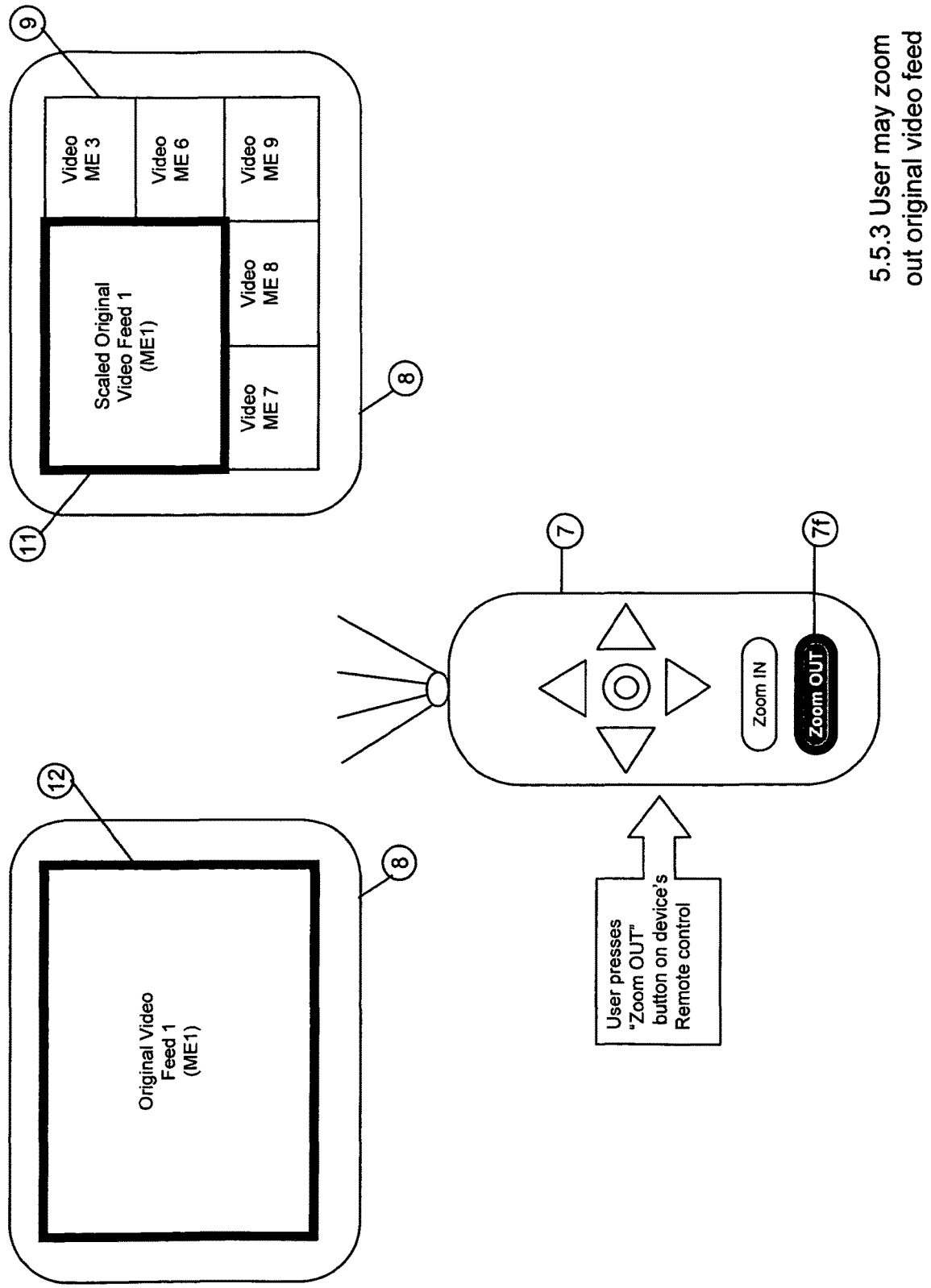
FIGS. 46 and 47 show "zooming" out of an ME.
Figure 47:
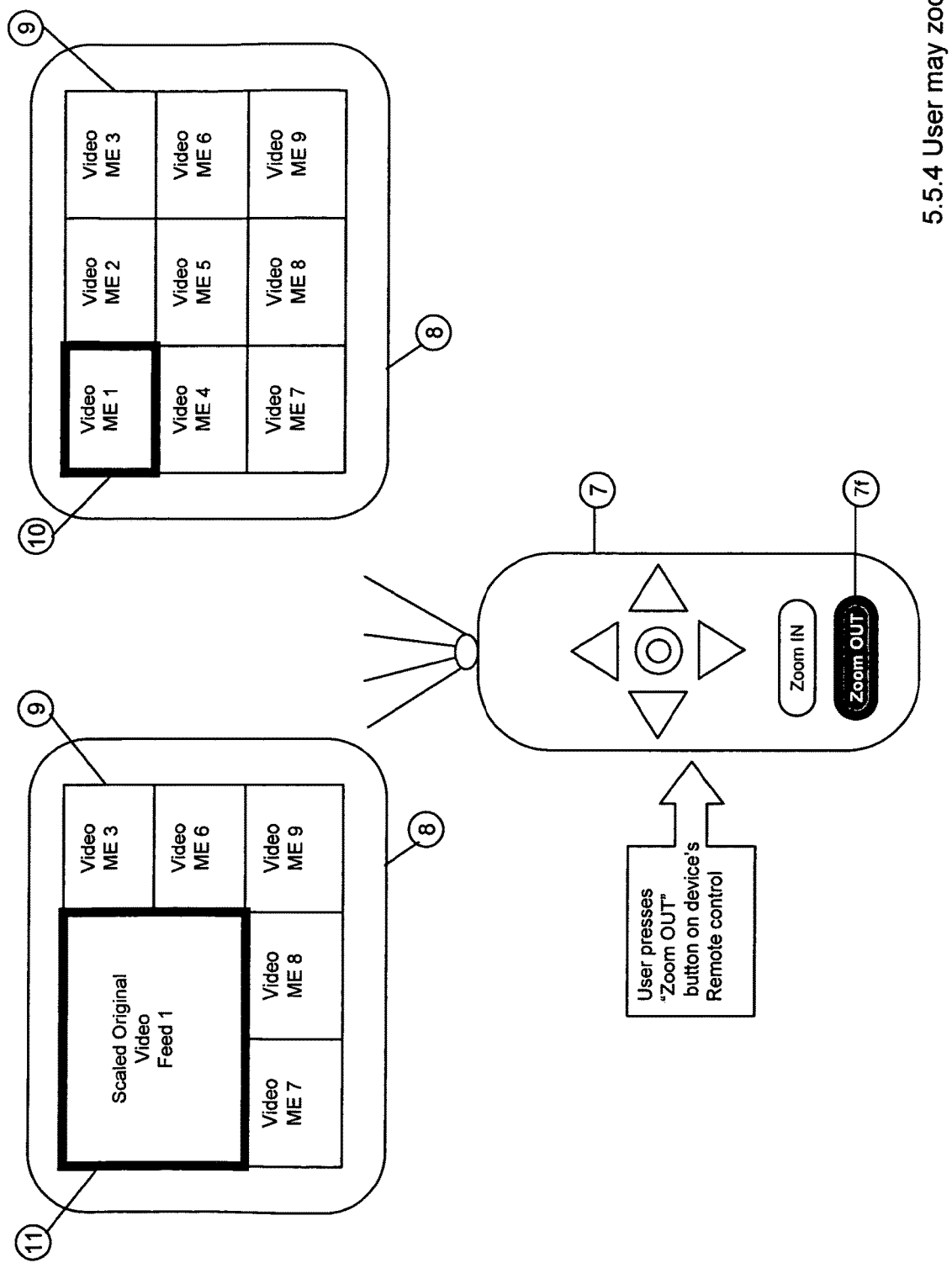

FIGS. 46 and 47 show that the subscriber can reverse the series of zoom-in's by zooming out. This action is activated by pressing the zoom-out button on the remote control. FIG. 46 shows that a full-screen display can be reduces to its previous state (size) which is the expanded ME. A further activation of the zoom-out button will cause the expanded ME to return to its original size, as illustrated in FIG. 47.

Figure 48:
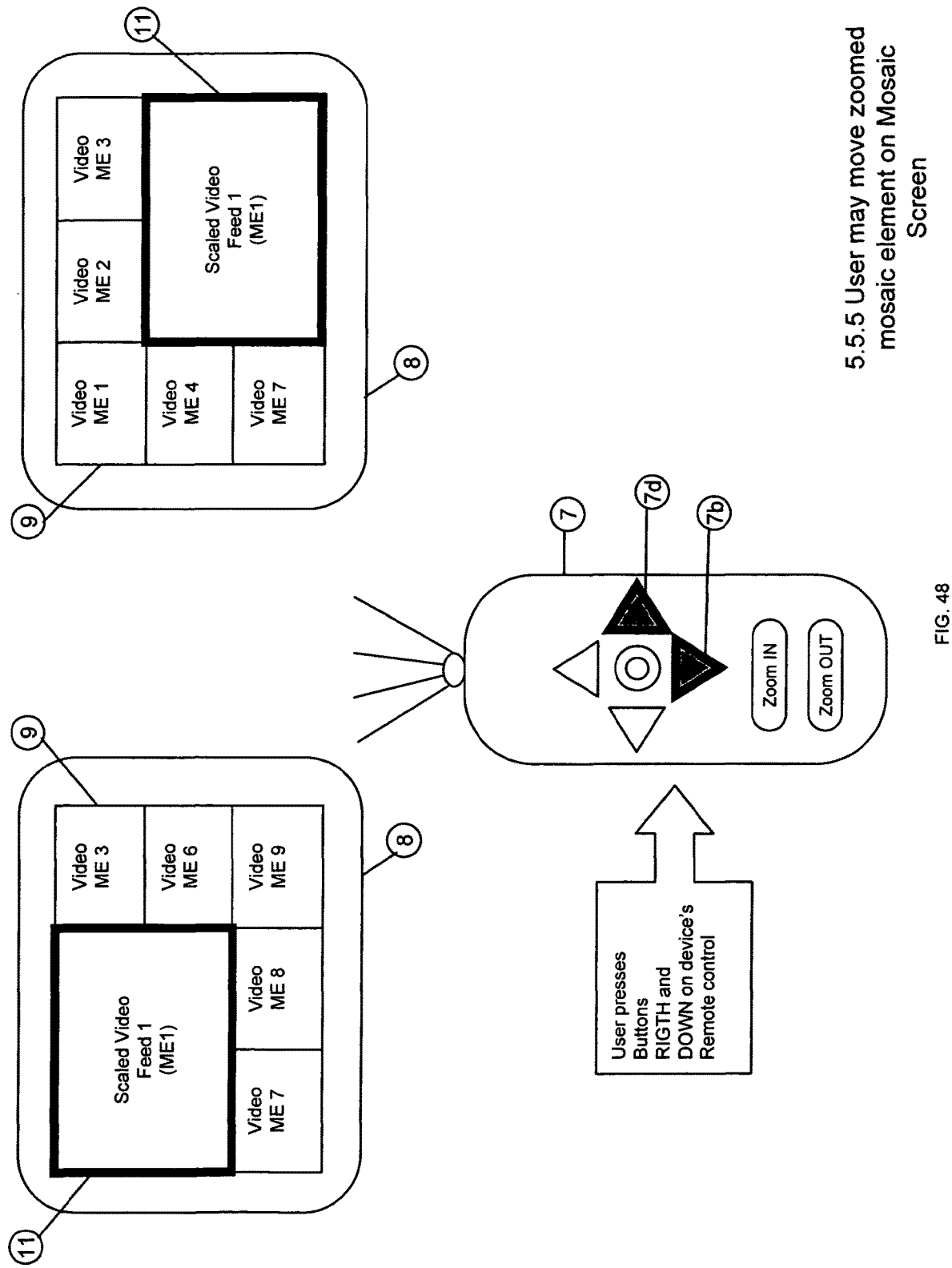
FIG. 48 is a general flow chart showing the subscriber steps zooming in and zooming out of an in-focus ME.

FIG. 48 shows the use of the SELECT button to expand the size of ME and bring it back to it original state. By repeated activation of the SELECT button, the in-focus ME can cycle from original size, then to expanded size, then to full-screen size as shown in the figure. Further activation of the SELECT button may restore the video in reverse order. Thus, the full-screen size is reduced to the expanded ME, then to the original-sized ME with another press of the SELECT button.

FIG. 49 shows an alternative embodiment of FIG. 48. When the video is displayed in full-screen mode, the press of the SELECT button returns the video to the original-sized ME. This may be preferable over the sequence shown in FIG. 48 in that the user who is viewing the full-screen video may simply want to return to the display of MEs without having to traverse through the intermediate step of the expanded ME.

FIG. 50 shows that the subscriber can change location of an expanded ME on the screen by using the arrow keys on the remote control (or by a voice command in the case of a voice-based control device). The expanded ME can move about the screen in pixel-sized increments, or on other increments of distance. Keeping an arrow key depressed can cause the expanded ME to accelerate from a small increments in movement to larger increments in movement. These and other motion dynamics can be provided.

FIG. 51 shows that DMXEPG can comprise MEs which are generated on the headend MEs which are generated on the subscriber (client) side. The notation "HE" refers to those MEs that were generated at the headend, while the notation STB indicates MEs generated on the subscriber side; e.g., by the subscriber's STB.

Figure 52:
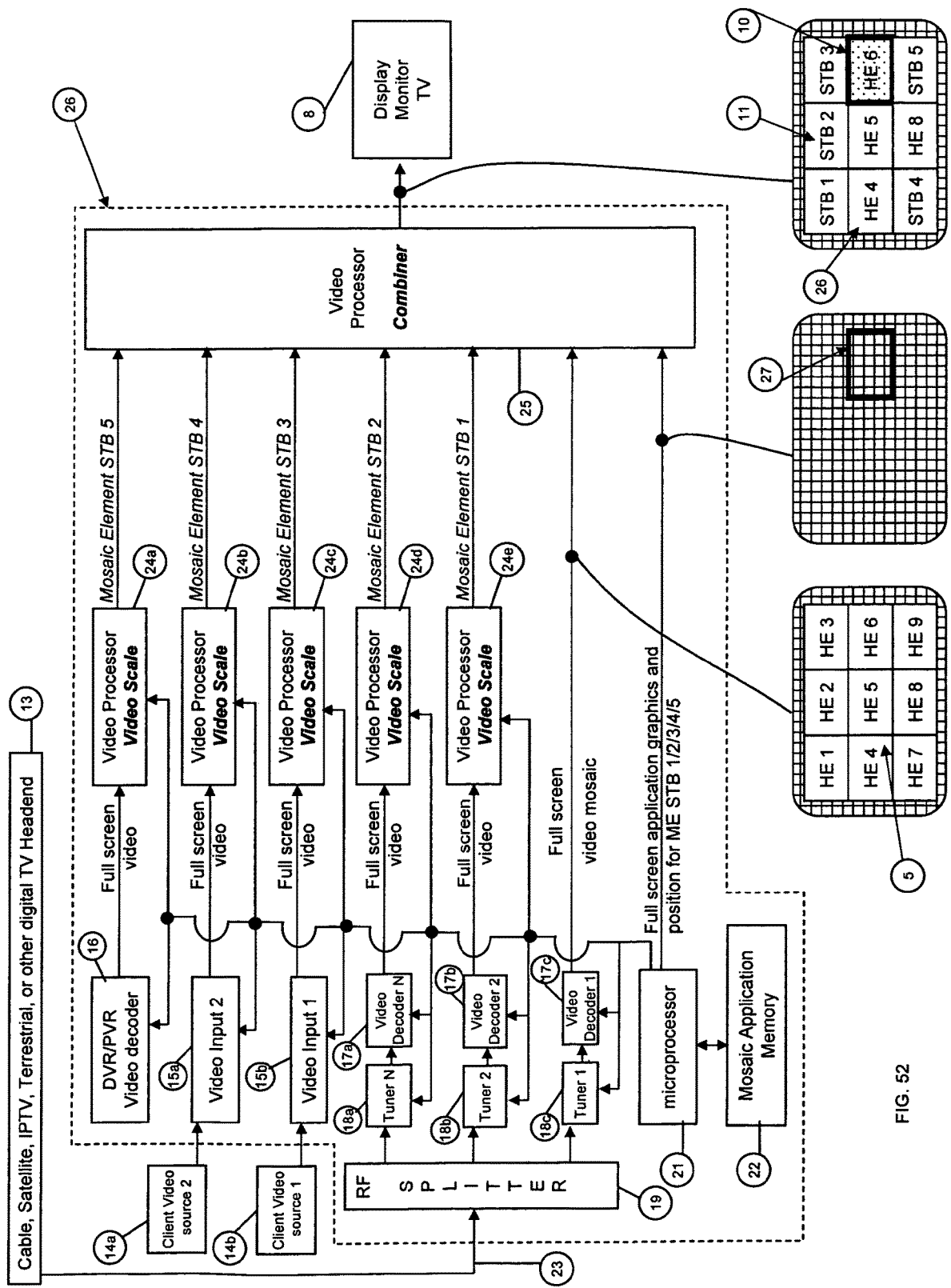
FIG. 52 shows major system elements which allow connection of additional content from any source that is available to subscriber.

FIG. 52 shows major system elements and their connections to enable subscribers to display DMXEPG with some of the MEs selected by subscriber from an additional content any source available to subscriber. The components of the client device according to the present invention are enclosed by the phantom lines. The figure shows that the subscriber subscribes on one content provider; e.g., a cable company, a satellite dish, and so on. Additional content sources, identified in the figure as client video sources 1 and 2, can be connected to the client device.

Figure 52A:
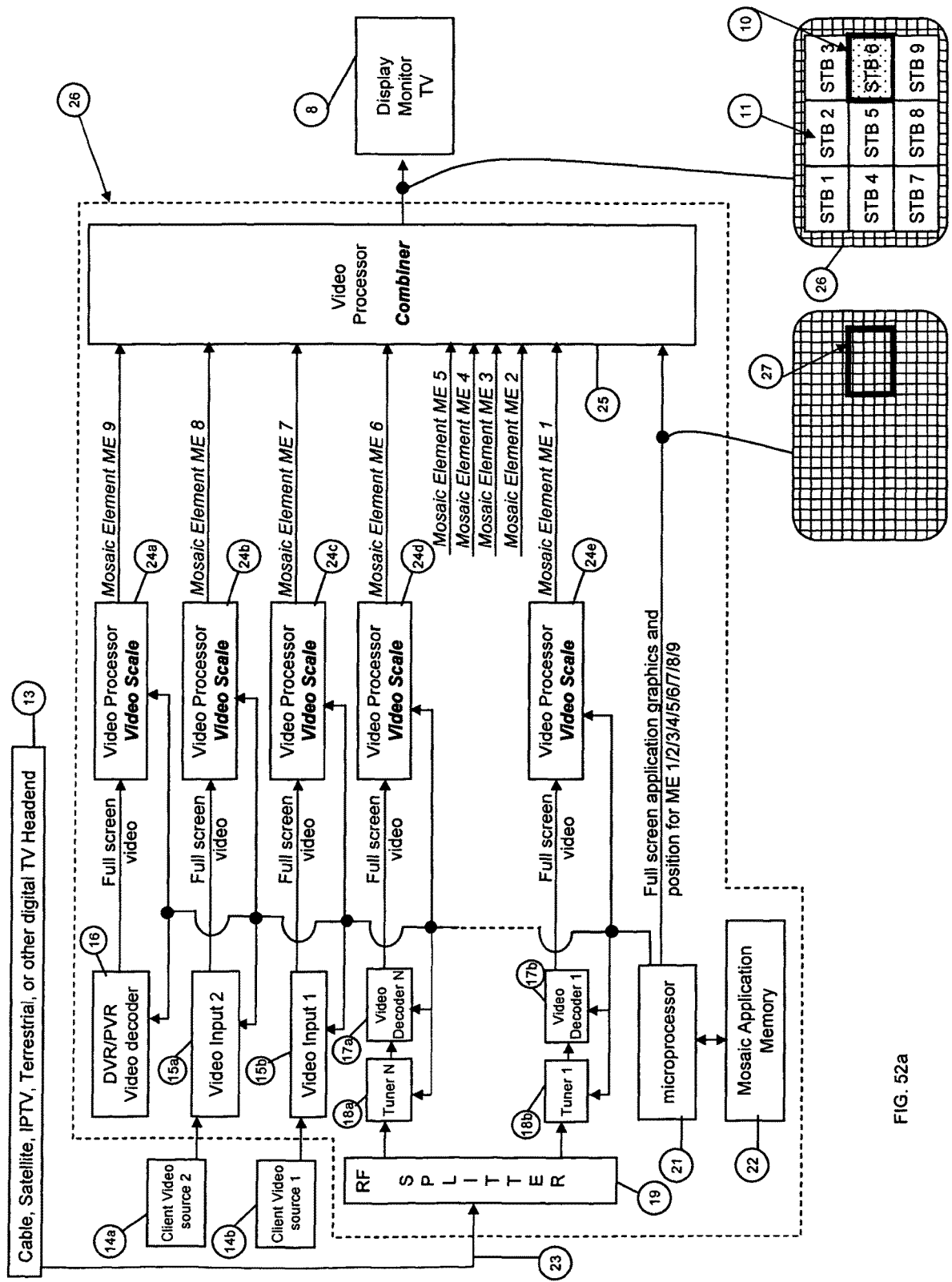
FIG. 52a shows major system elements which allow DMXEPG screen to be created by subscriber device

FIG. 52a shows major system elements which allow entire DMXEPG screen to be created by subscriber device with multi-tuner capability. As an example, when input signal is transmitted over RF, subscriber device can include input module that splits incoming signal to feed subscriber device tuners.

Figure 53:
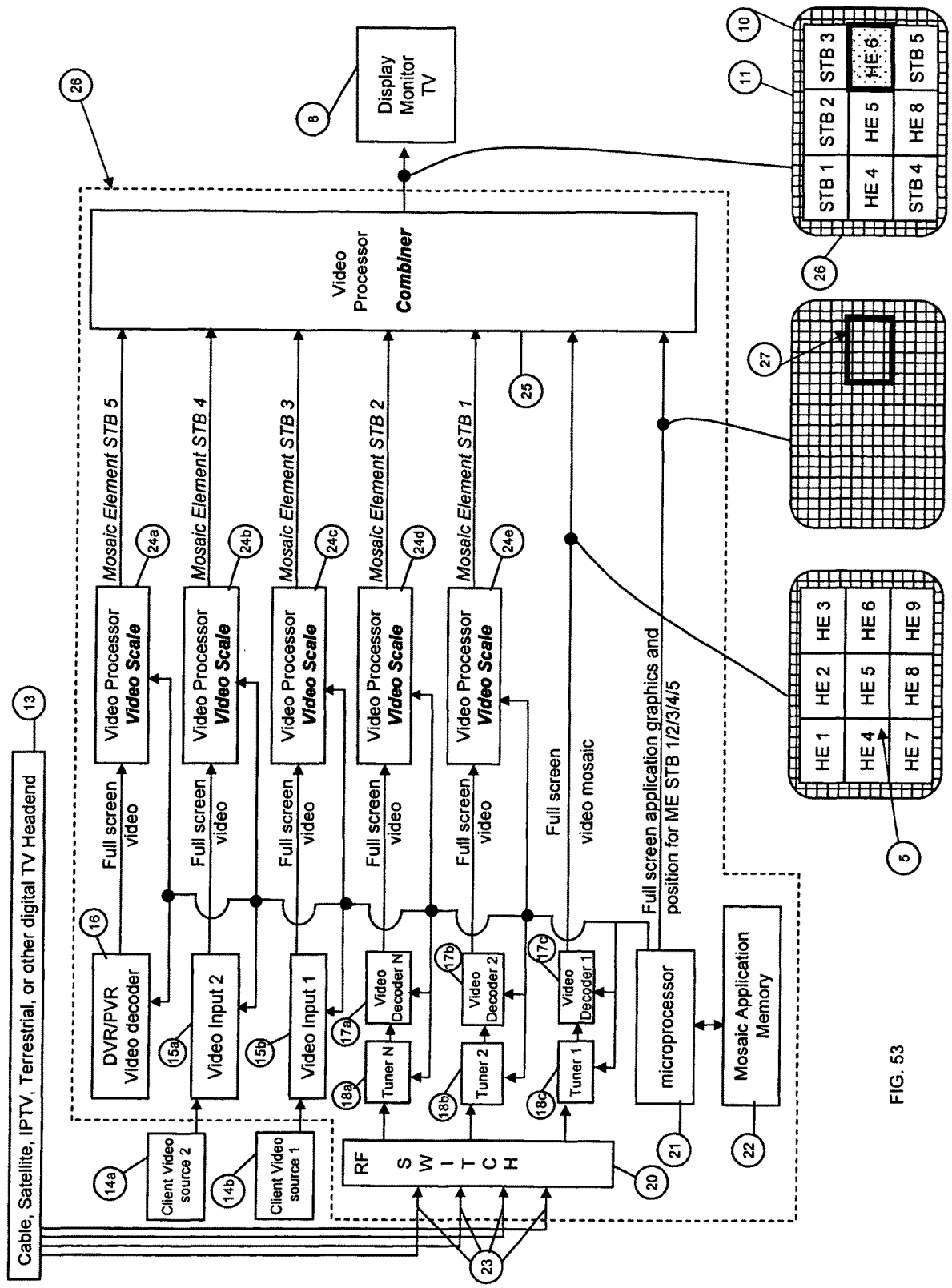
FIG. 53 shows major system elements which allow connection of additional content from more than one additional content source that is available to subscriber.

FIG. 53 is similar to FIG. 52, but for a configuration where the subscriber has access to more than one content provider. The configuration of FIG. 53 shows a switch for switching among the multiple content providers.

Figure 54:
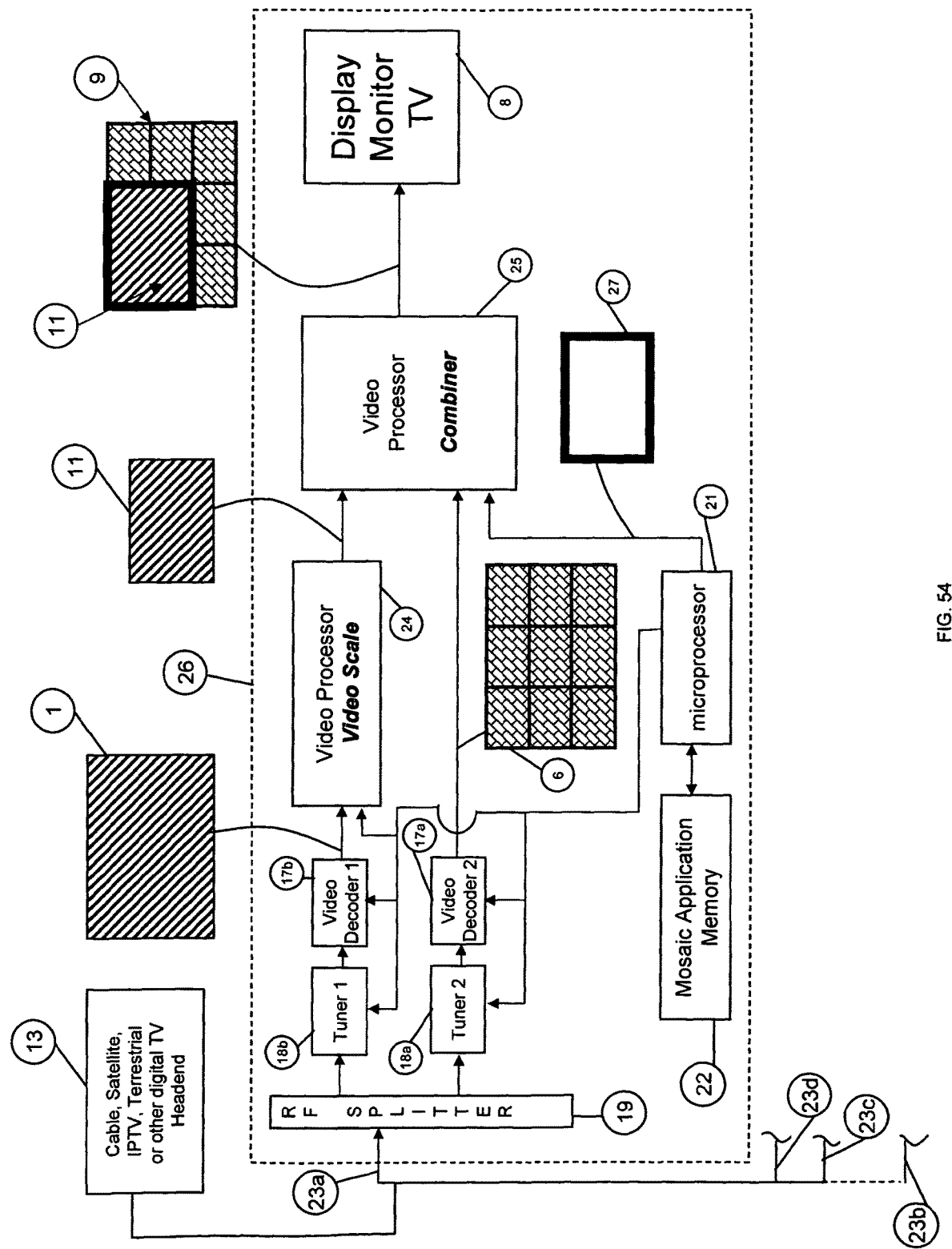
FIG. 54 shows major system elements and their connections to enable subscribers to display expanded ME in the DMXEPG using the same content source

FIG. 54 shows major system elements and their connections to enable subscribers to display expanded ME in the DMXEPG using the same content source.

Figure 55:
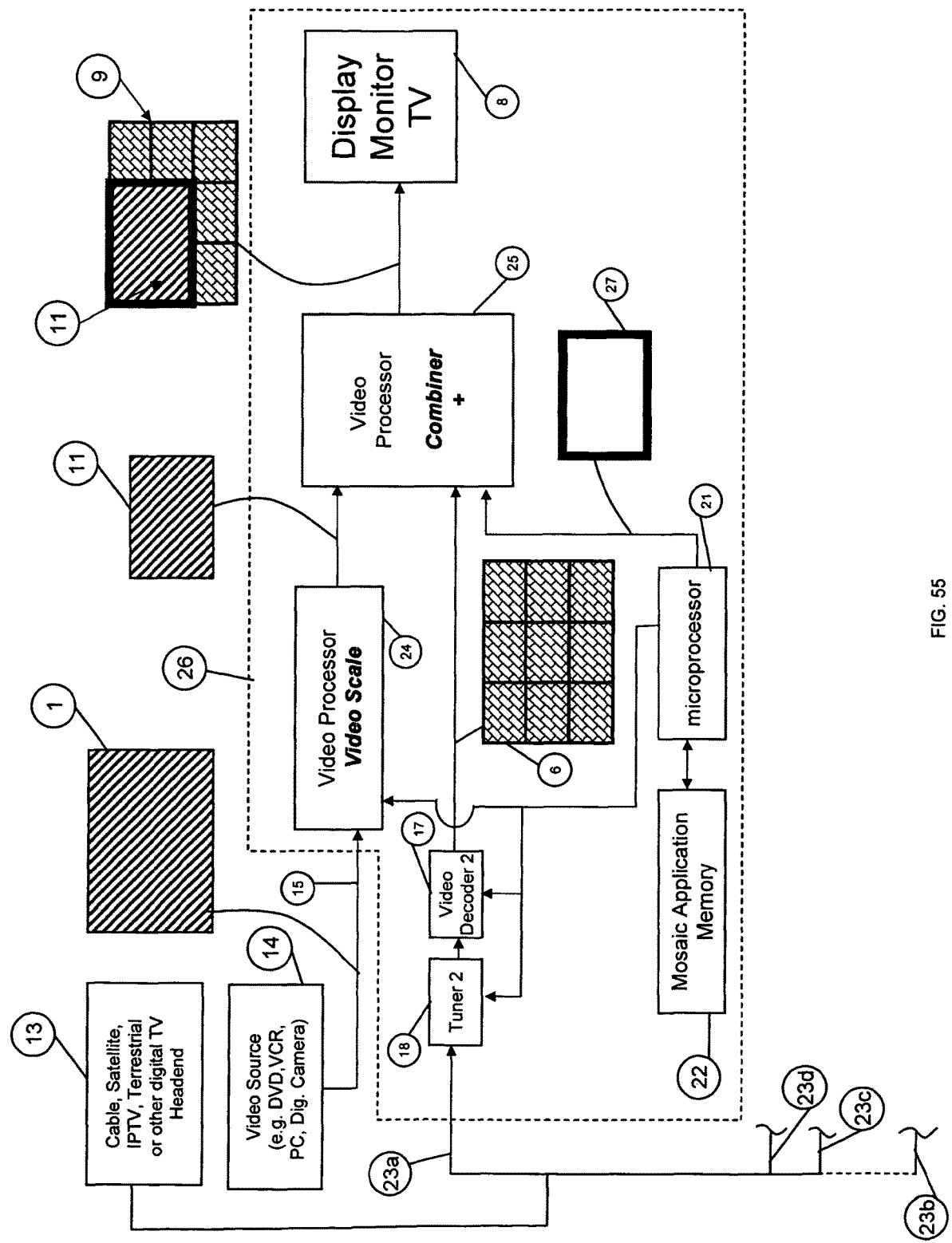
FIG. 55 shows major system elements and their connections to enable subscribers to display expanded ME in the DMXEPG using more than one content source

FIG. 55 shows major system elements and their connections to enable subscribers to display expanded ME in the DMXEPG using more than one content source.

FIGS. 56-58 are tables that illustrate combinations of scaling and displaying video for different combinations of aspect ratios among the DMXEPG application screen 9 (FIG. 37, for example), an in-focus ME, the original video stream, and the display. The DMXEPG application screen contains an array of MEs.

Figure 59:
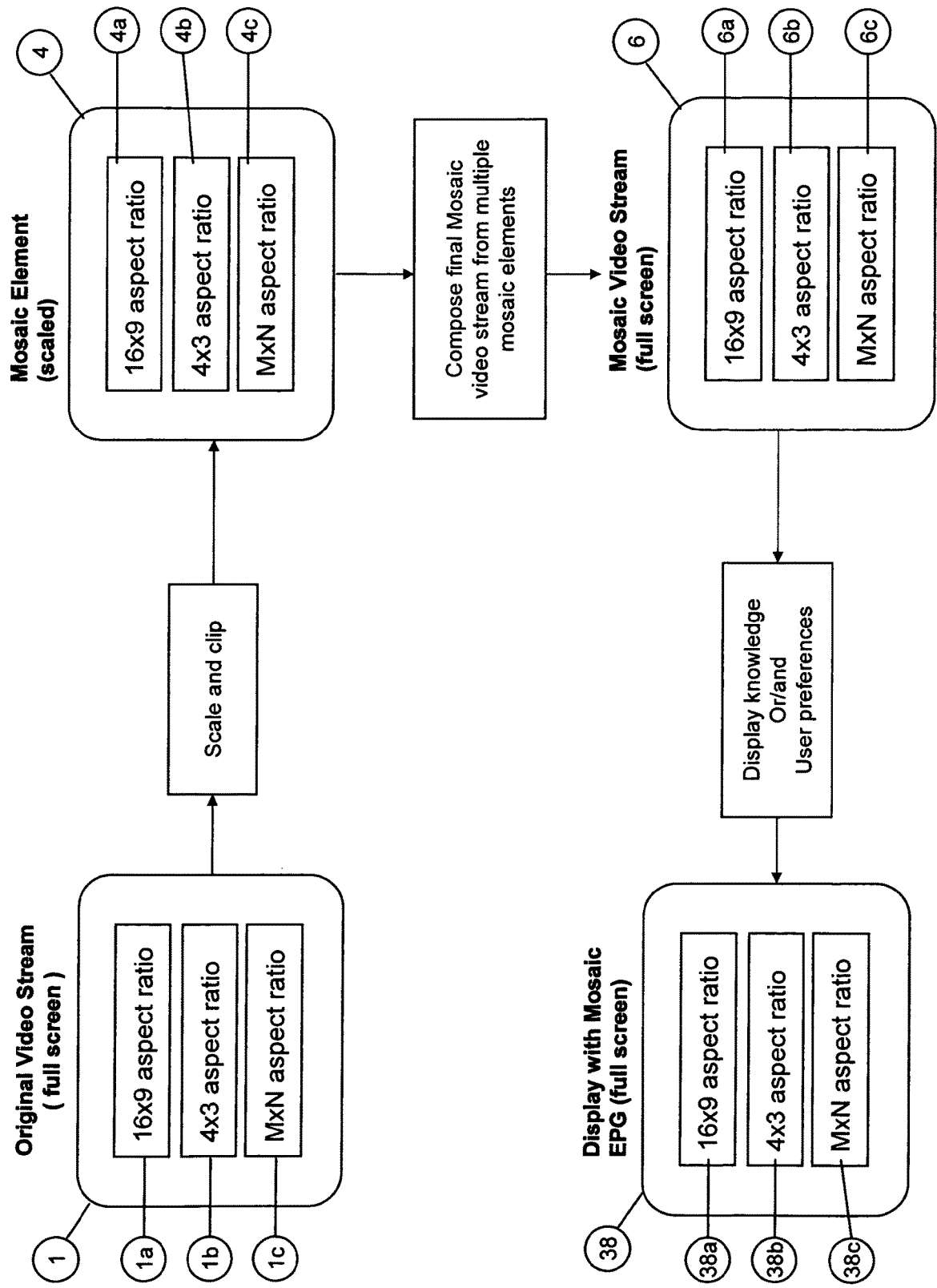
FIG. 59 shows process of scaling source video to ME when source and destination aspect ratios are or are not the same

FIG. 59 shows process of scaling source video to ME when source and destination aspect ratios are or are not the same.

Figure 61:
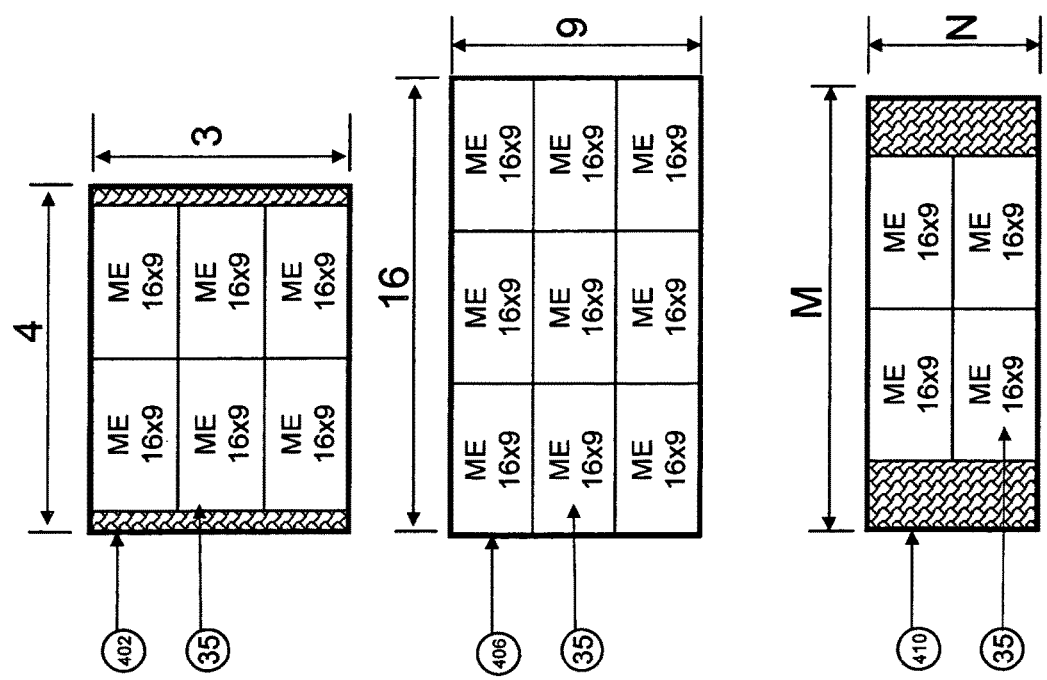
Figure 62:
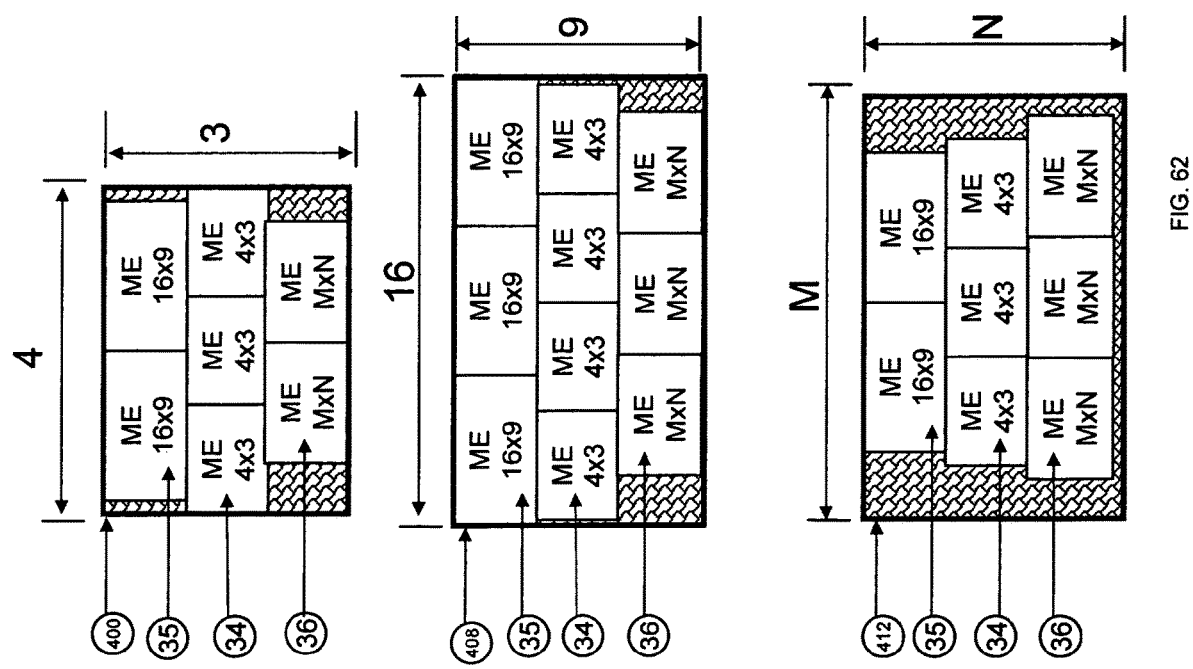
Figure 63:
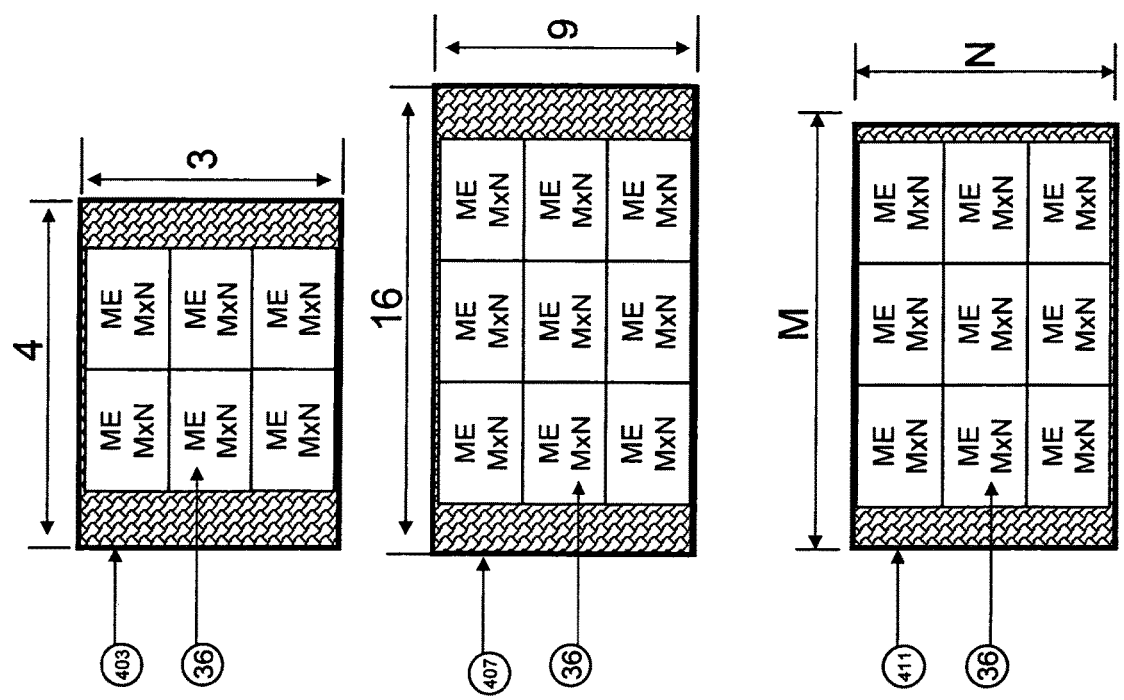

FIG. 60 shows examples of different arrangements of MEs in a DMXEPG application screen (e.g., element 9 in FIG. 37), for different combinations of aspect ratios of the DMXEPG application screen and the MEs. Thus, for example, a 4×3 DMXEPG application screen (i.e., having an aspect ratio of 4×3) can accommodate a 3×3 array of MEs having an aspect ratio of 4×3. A 16×9 DMXEPG application screen can fit a 4×3 array of MEs having an aspect ratio of 4×3. More generally, an M×N DMXEPG application screen can fit an array of 4×3 MEs leaving some unused space which can be filled with a suitable background pattern. Table 4 in FIG. 60 lists examples of various combinations of DMXEPG application screen and ME arrangement. FIGS. 61-63 illustrate examples where MEs of different aspect ratios can be used to populate a DMXEPG application screen.

Figure 64:
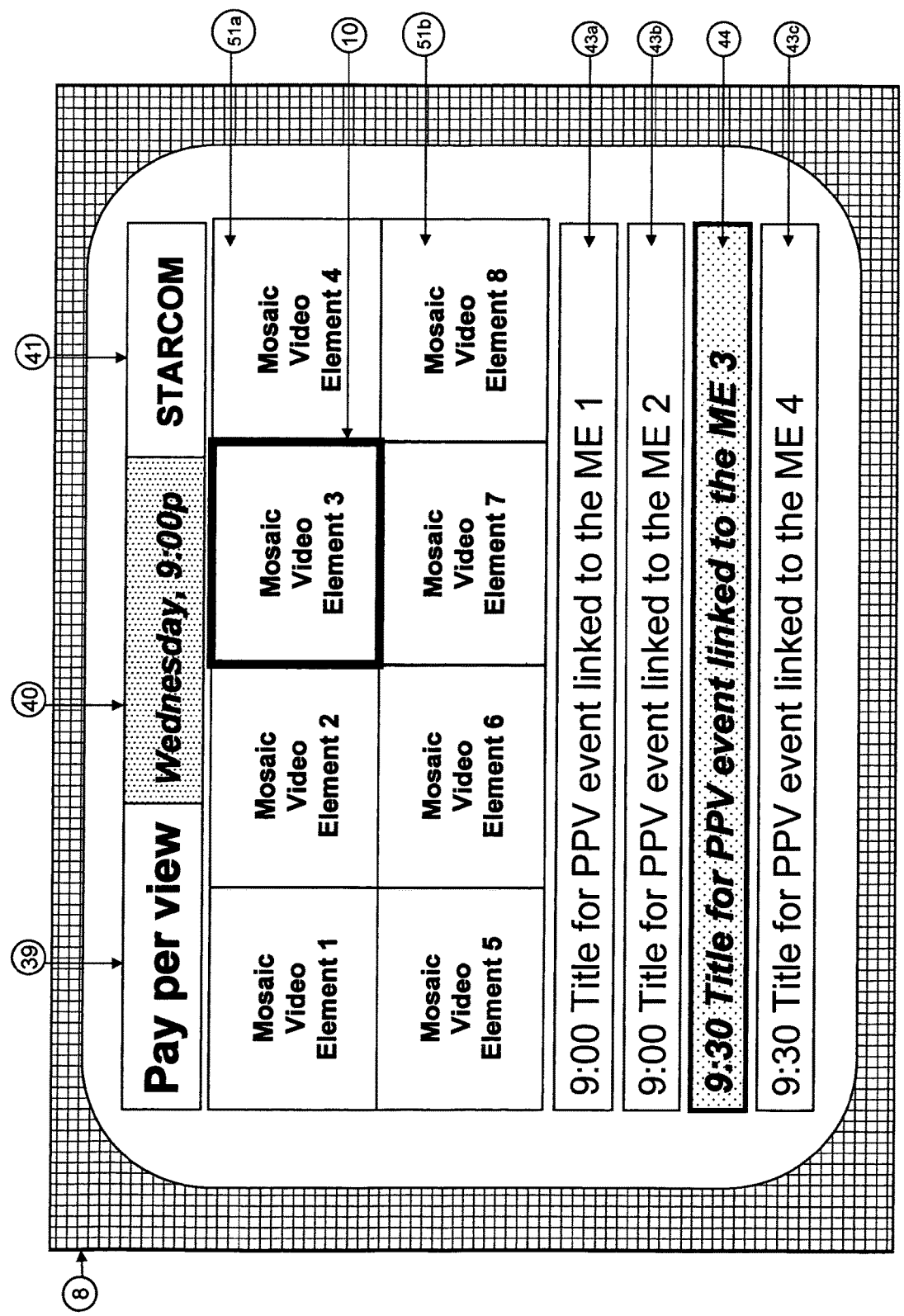
FIGS. 64-69 show various aspects of a Pay Per View portal created with MEs.

FIG. 64 illustrates an example of a Pay Per View portal created with MEs. A screen name area identifies that this screen is a "pay per view" portal. A screen branding area allows for a sponsor's logo; e.g., STARCOM.

Figure 65:
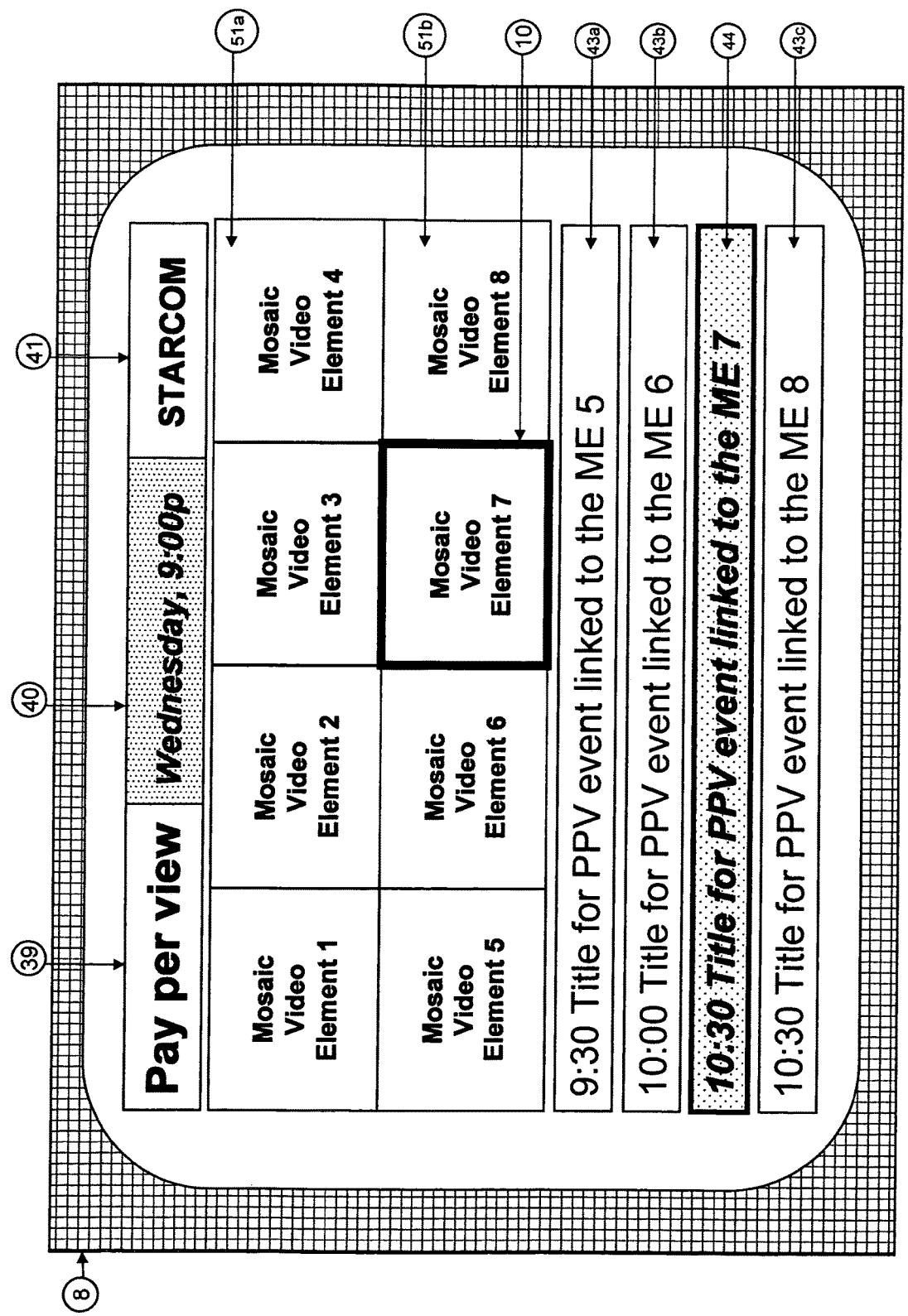
Figure 66:
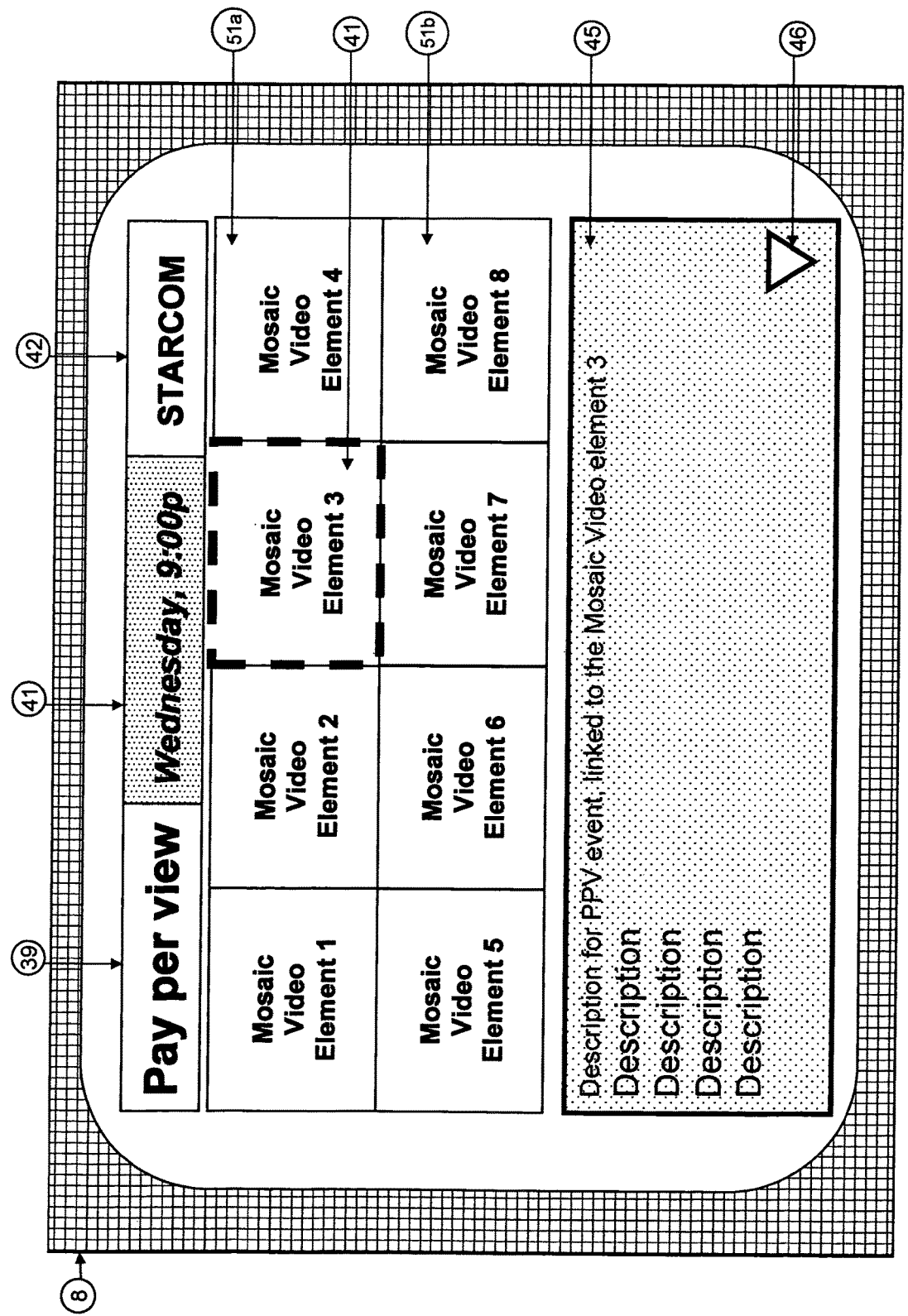
Figure 67:
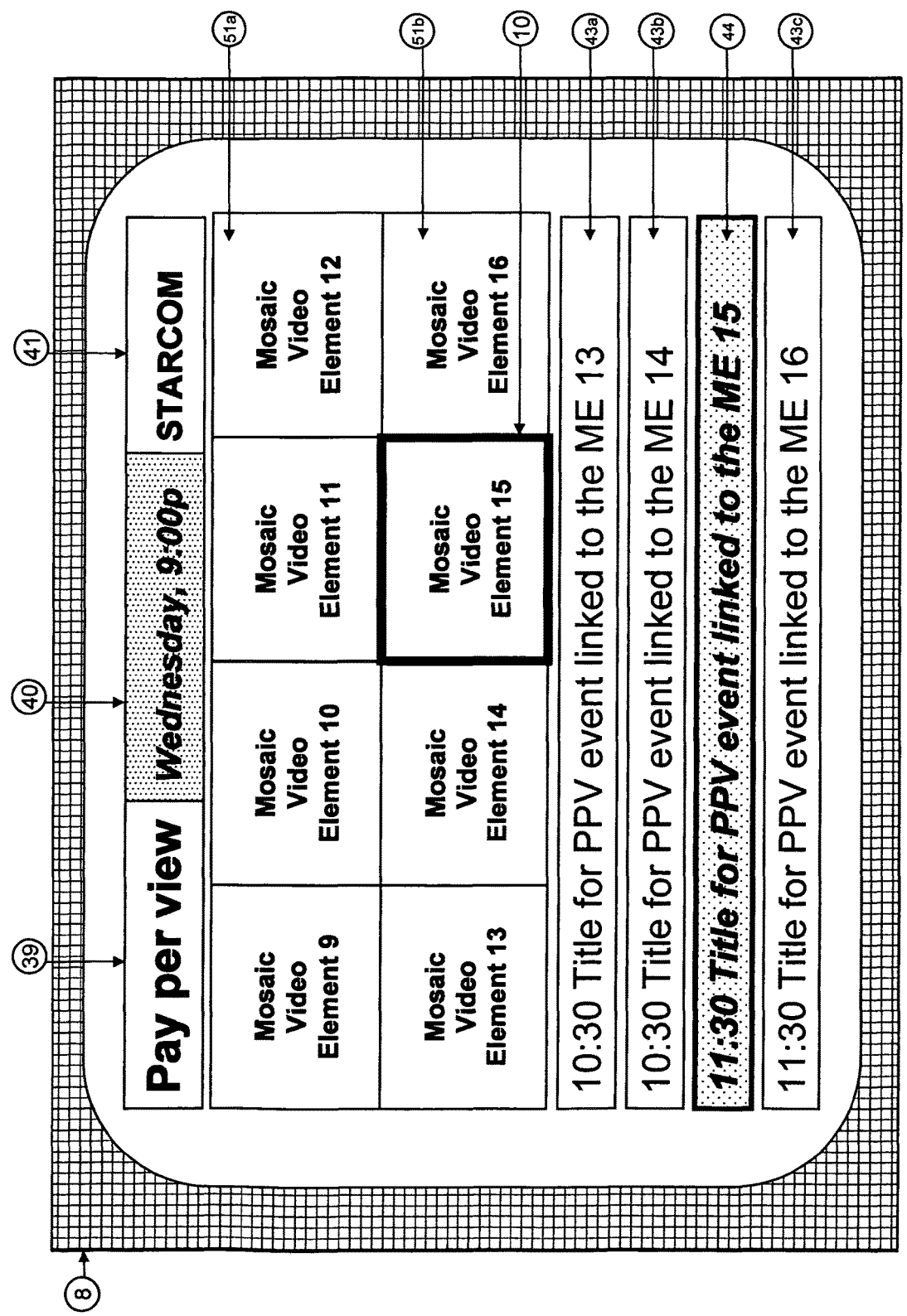
Figure 68:
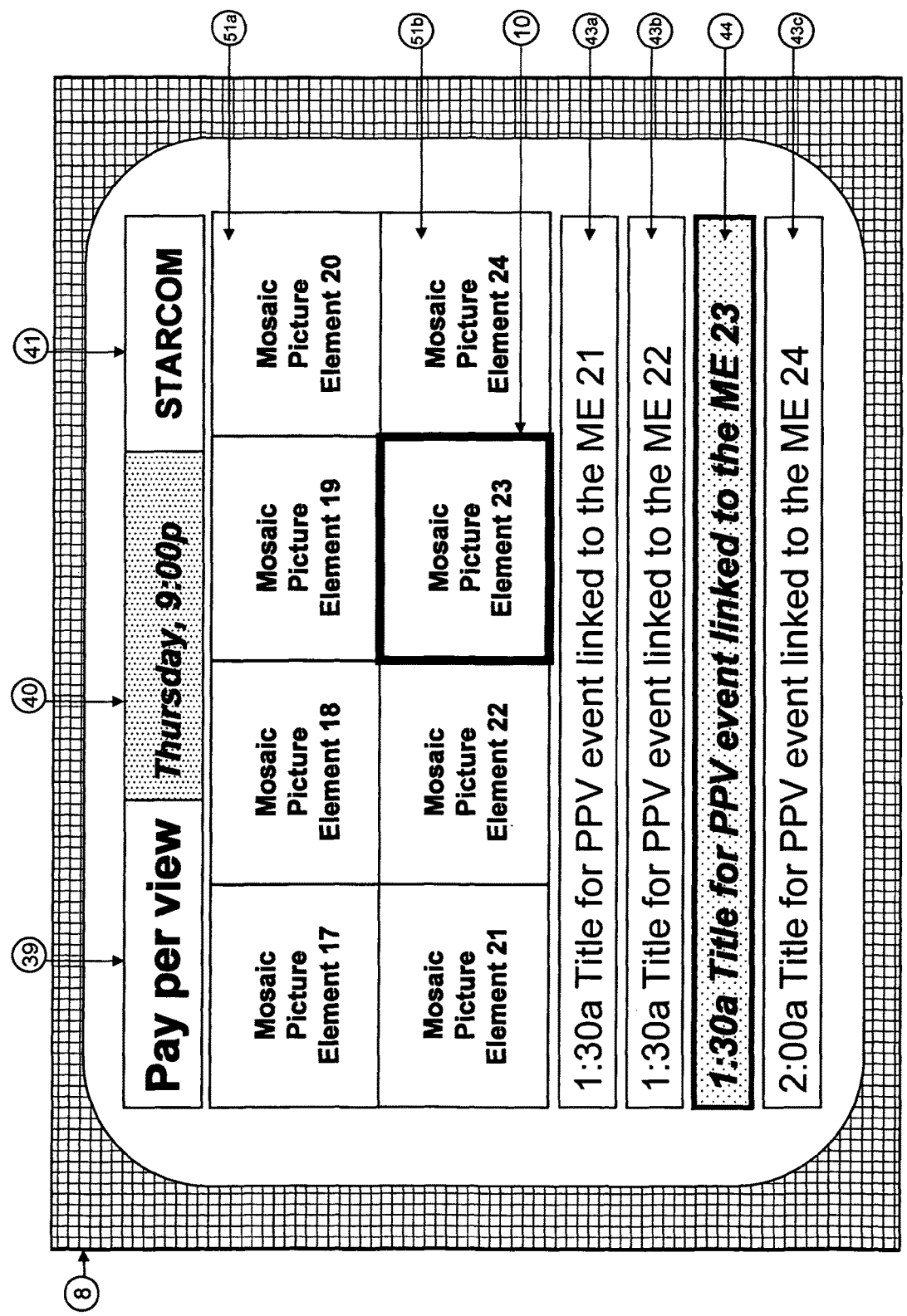
Figure 69:
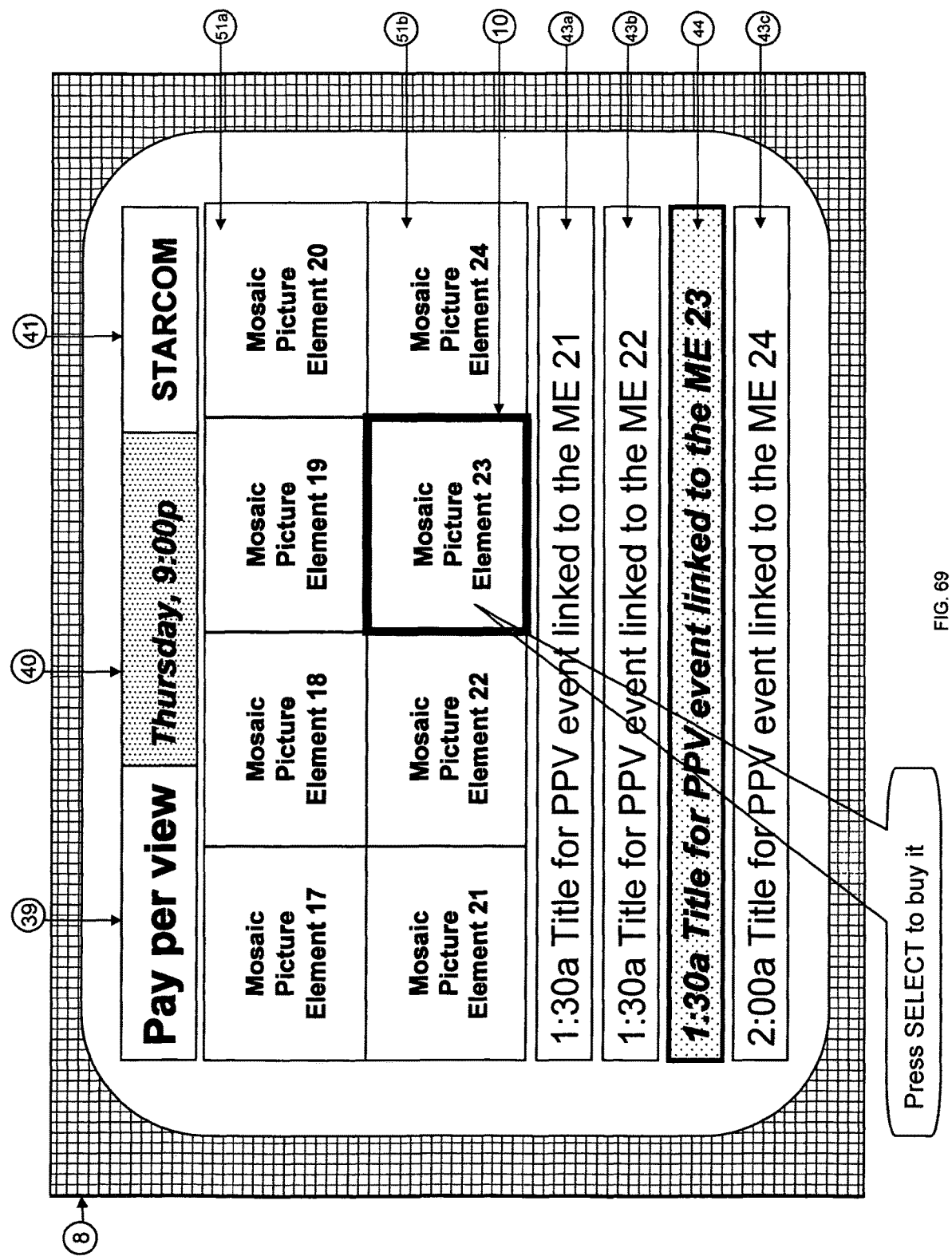

FIGS. 64 and 65 illustrate that the title bar corresponding to the in-focus ME is highlighted in addition to the in-focus ME. In addition, the titles for the row of MEs that includes the in-focus ME are displayed in an area below the array of MEs. Thus, in FIG. 65, ME3 is in focus and the titles for ME1 to ME4 are shown. In FIG. 66, the in-focus ME is ME7, and so the titles for ME5 to ME8 are shown. Further examples are shown in FIGS. 67-69. FIG. 69 shows that an in-focus ME can be purchased for viewing by pressing the SELECT button on the remote control.

FIG. 66 shows Pay Per View portal created with MEs.
FIG. 67 shows Pay Per View portal created with MEs.
FIG. 68 shows Pay Per View portal created with MEs.
FIG. 69 shows Pay Per View portal created with MEs.

Figure 70:
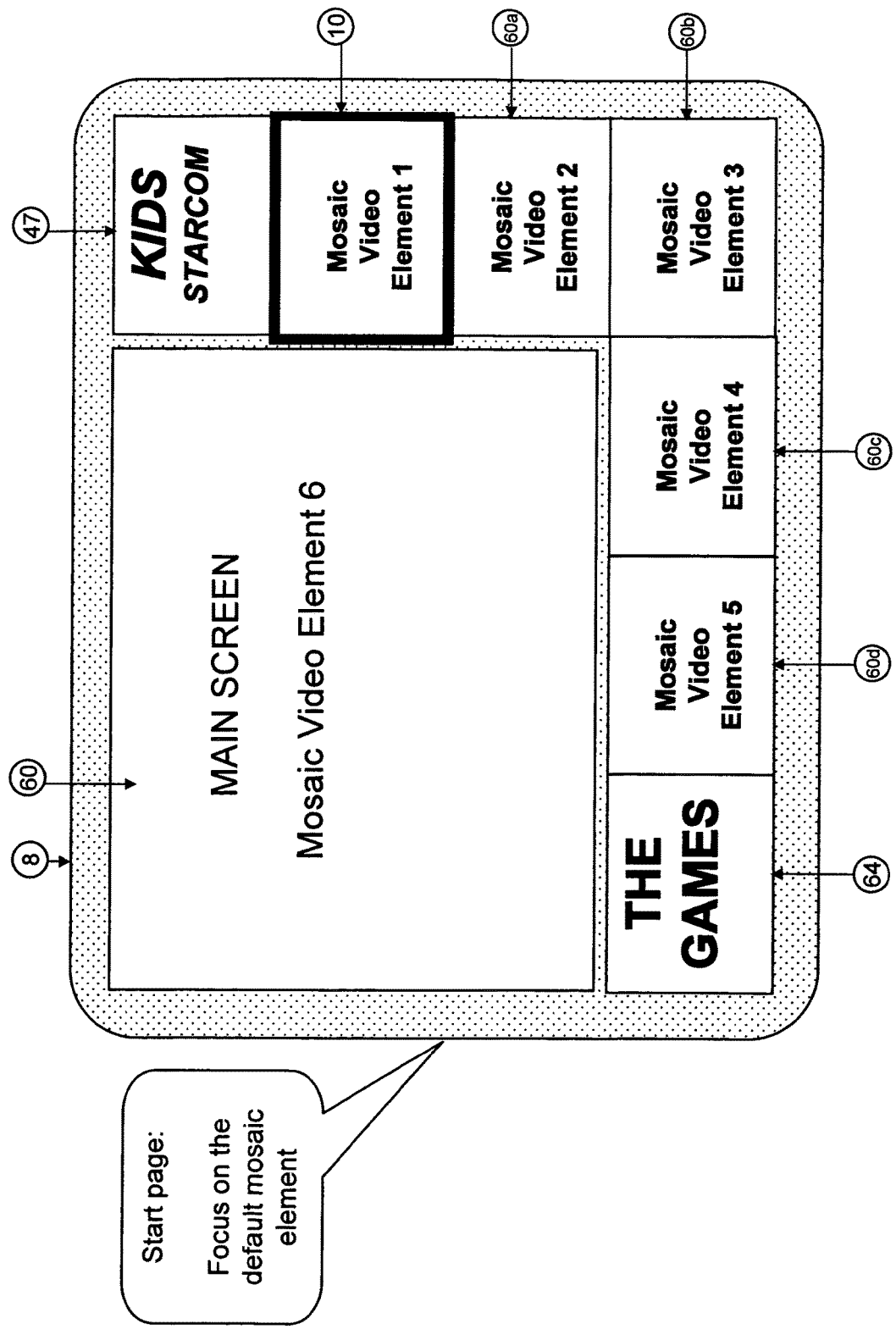
FIGS. 70-90 show various aspects of a UI and navigation with the UI according to the present invention.

FIG. 70 shows example of UI and navigation in the DMXEPG in accordance with the present invention. The example is a DMXEPG for the specific content category of GAMES for content category of KIDS. The main screen defaults to an ME that is selected to be the default ME. In this case the default ME is ME6.

Figure 71:
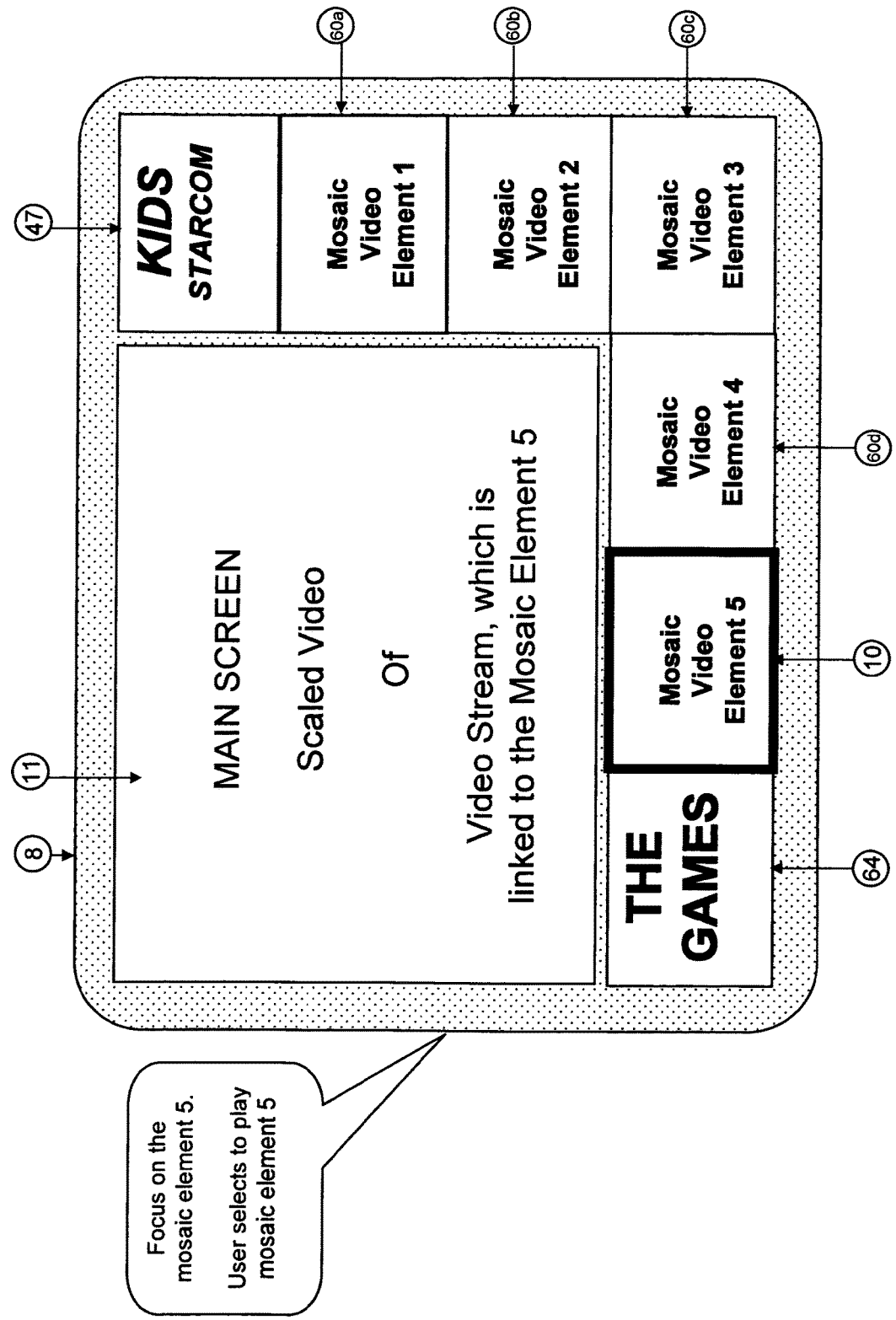

FIG. 71 shows that the ME5 is in focus. The main screen is updated with the video currently associated with ME5 when the user presses the SELECT button on the remote control.

Figure 72:
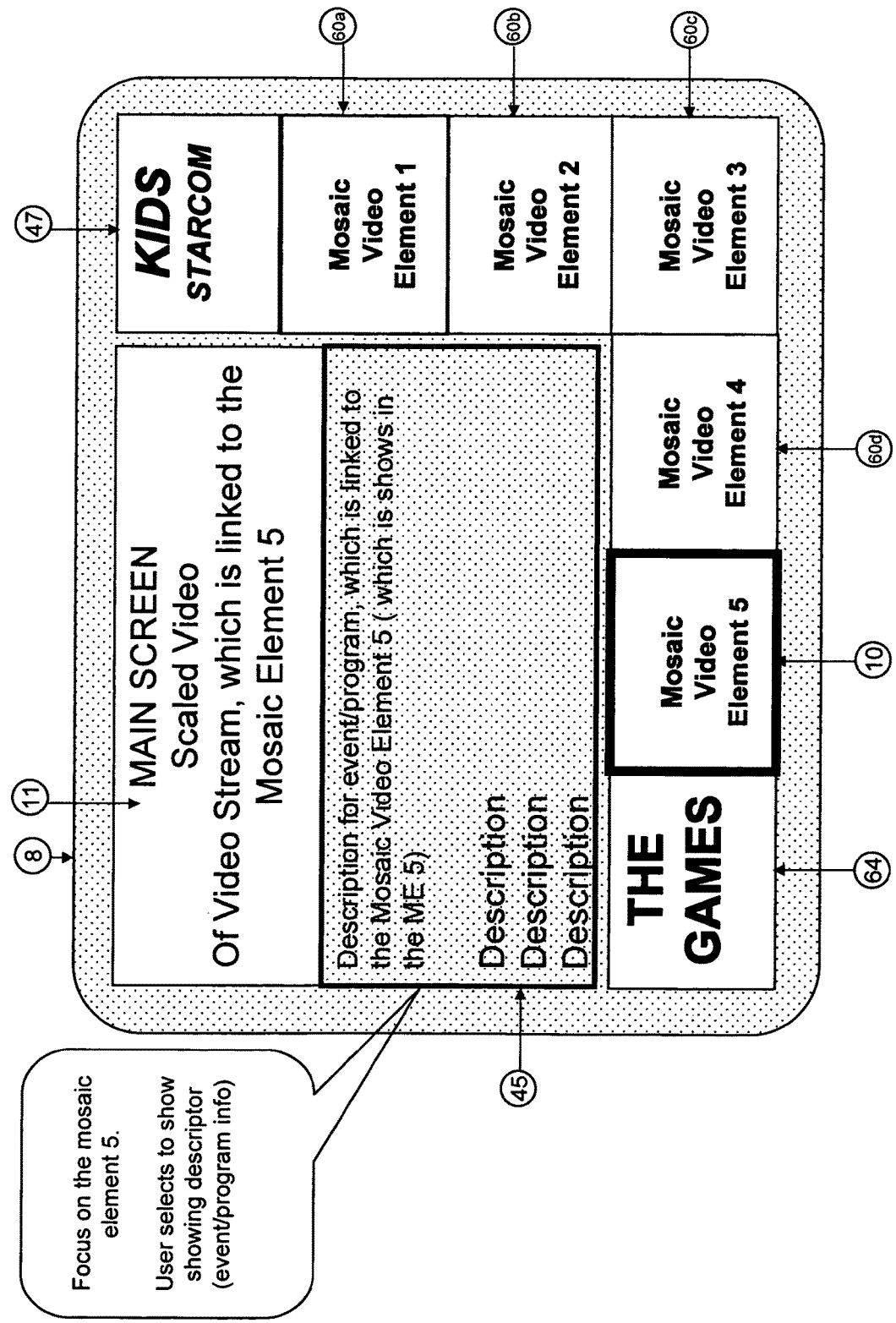

FIG. 72 shows the display of additional information for the in-focus ME when the user requests additional information. The video is scaled to allow for room to display the additional information.

Figure 73:
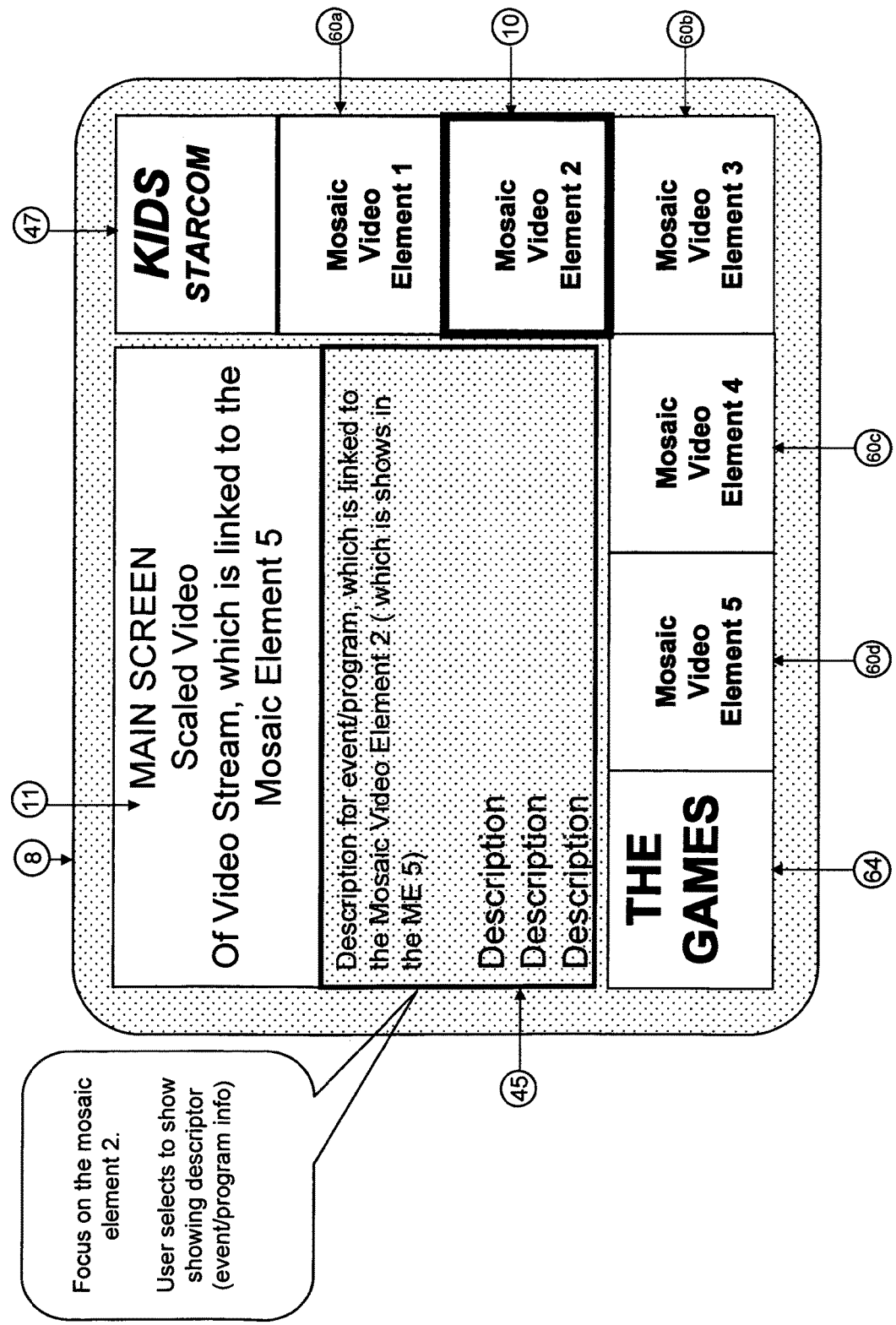

FIG. 73 shows that the display including scaled video and additional information will change when the user changes the focus from one ME to another ME. Here, ME5 was in focus as shown in FIG. 72, and in FIG. 73 ME2 becomes focused.

Figure 74:
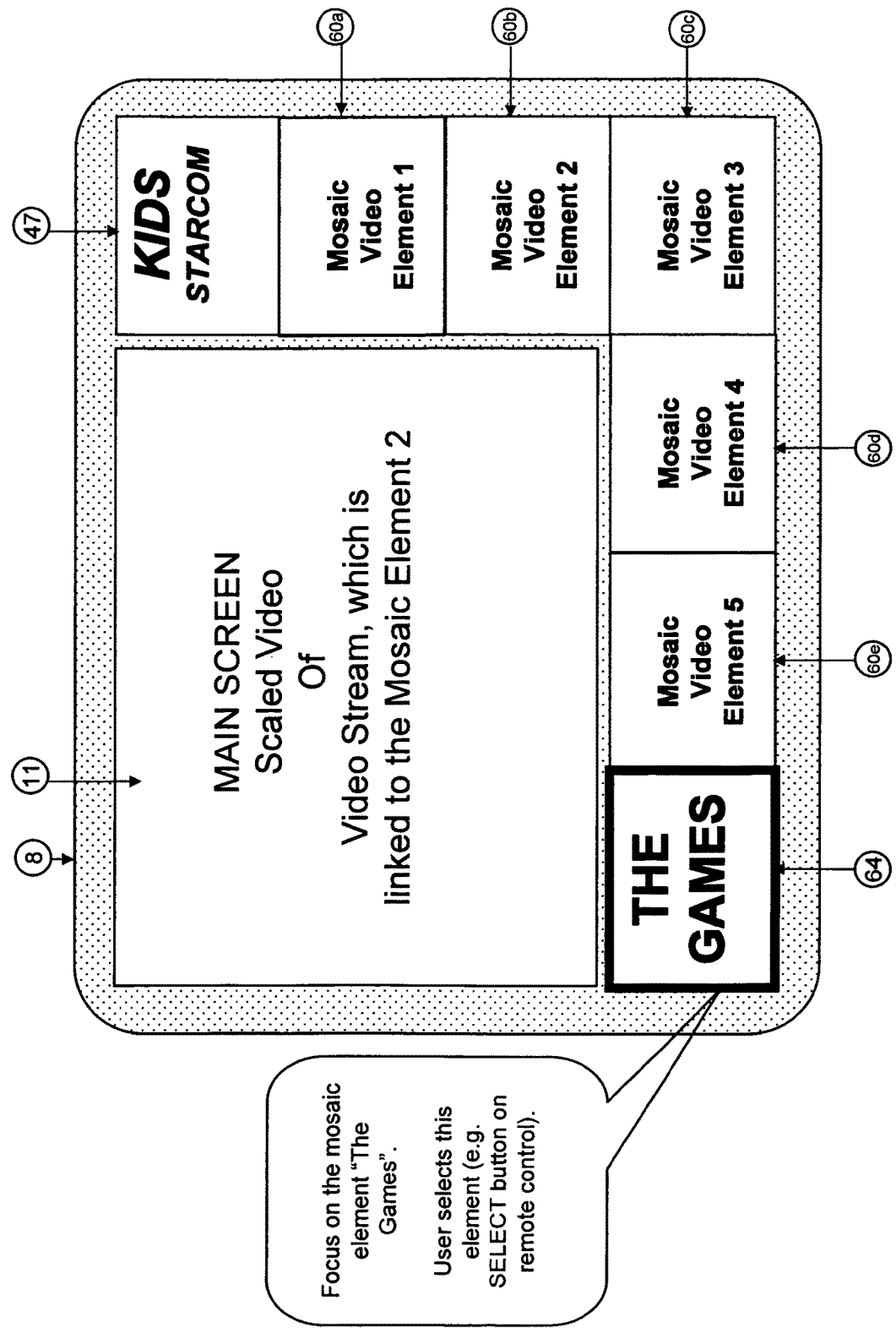
Figure 75:
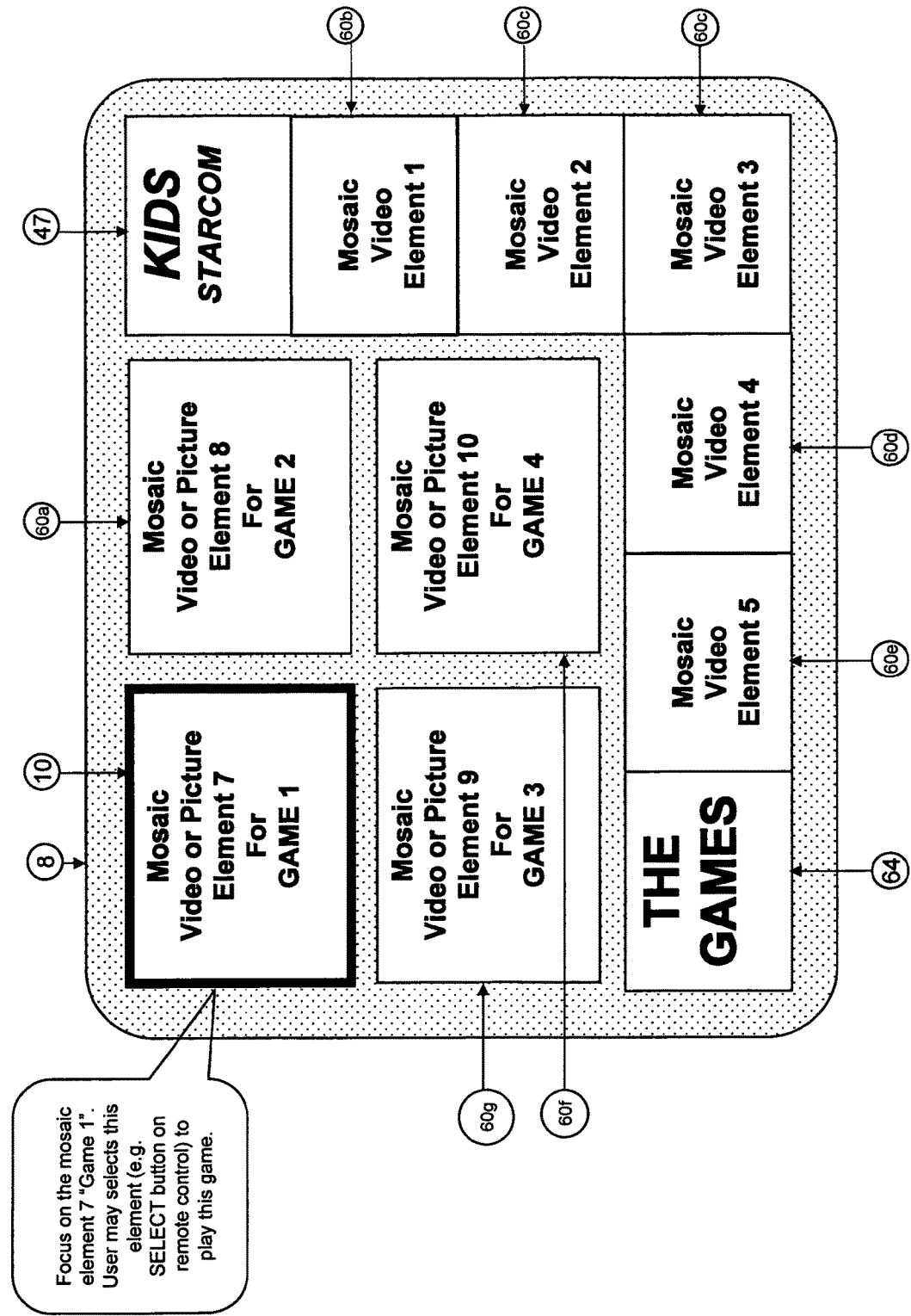

FIGS. 74 and 75 show a sequence when the focus is changed to the GAMES ME. As can be seen in FIG. 75 the main screen is replaced with a set of MEs for different games that can be accessed.

Figure 76:
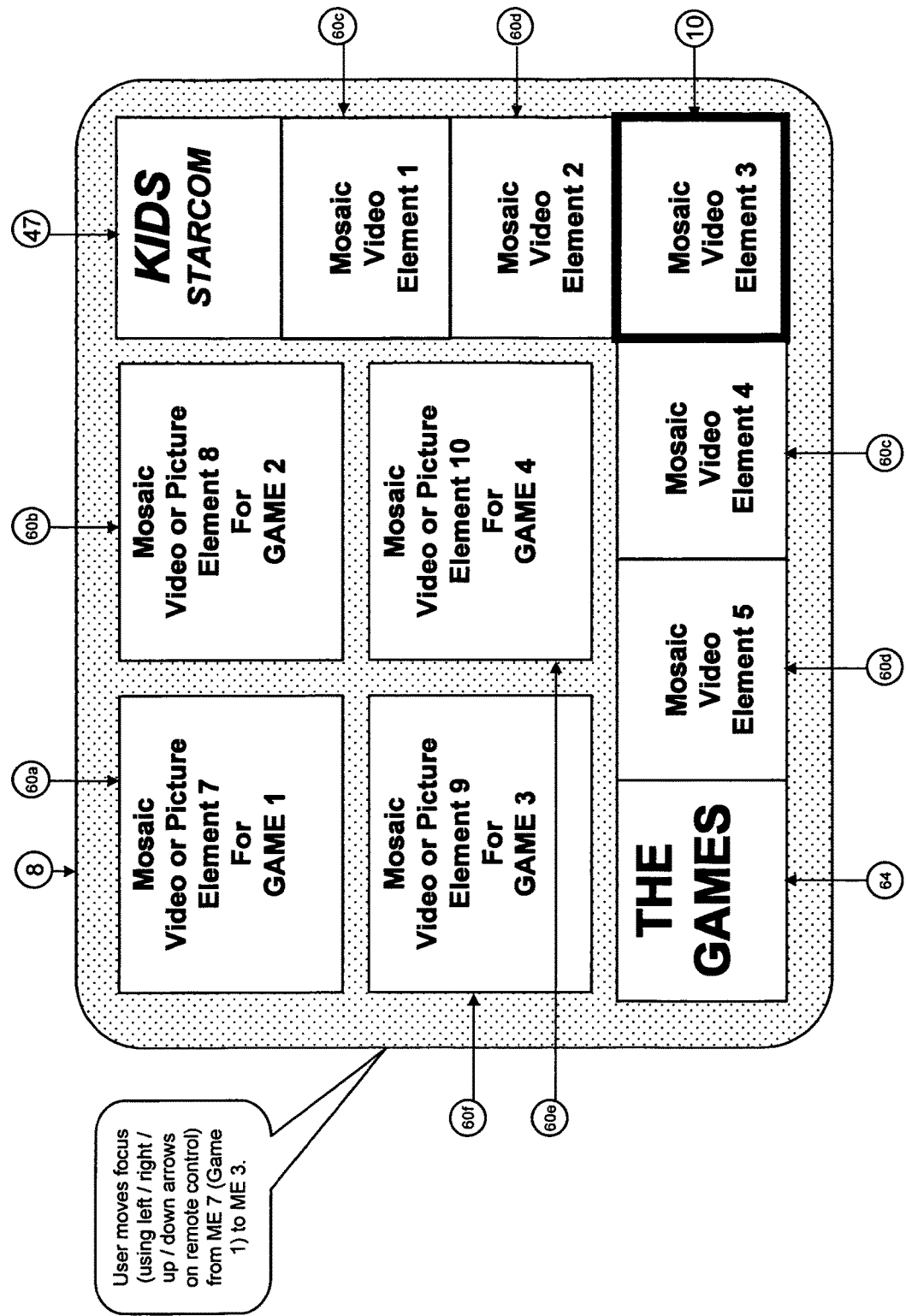

FIG. 76 shows that the user can navigate from a game ME to a non-game ME. For example, FIG. 75 shows that the game ME for Game 1 was in focus. In FIG. 76, the user can navigate to ME3 by using the arrows keys on the remote.

Figure 77:
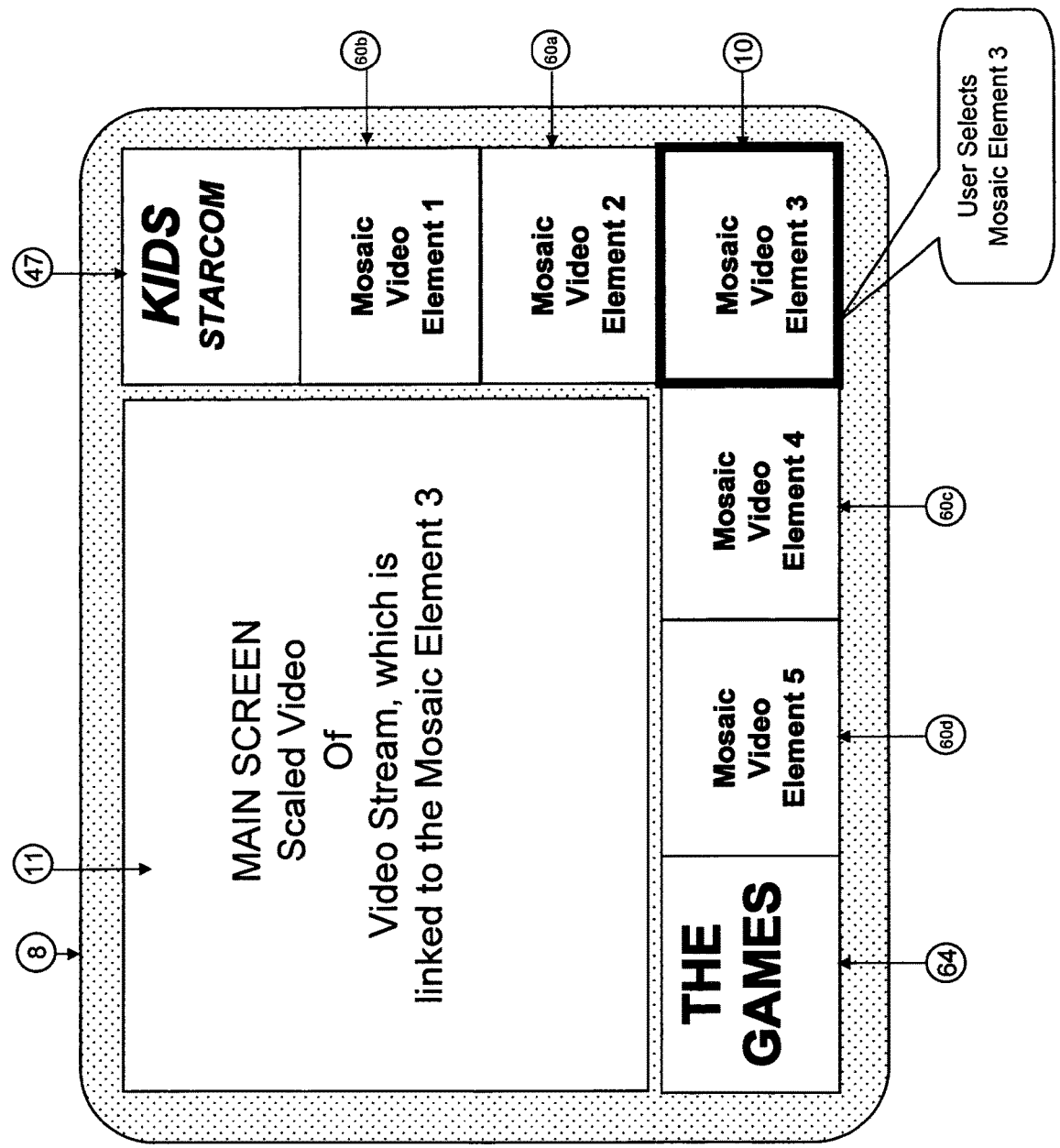

FIG. 77 shows that the main screen can be once again replaced with the scaled video when the SELECT button is pressed for the in-focus ME.

Figure 78:
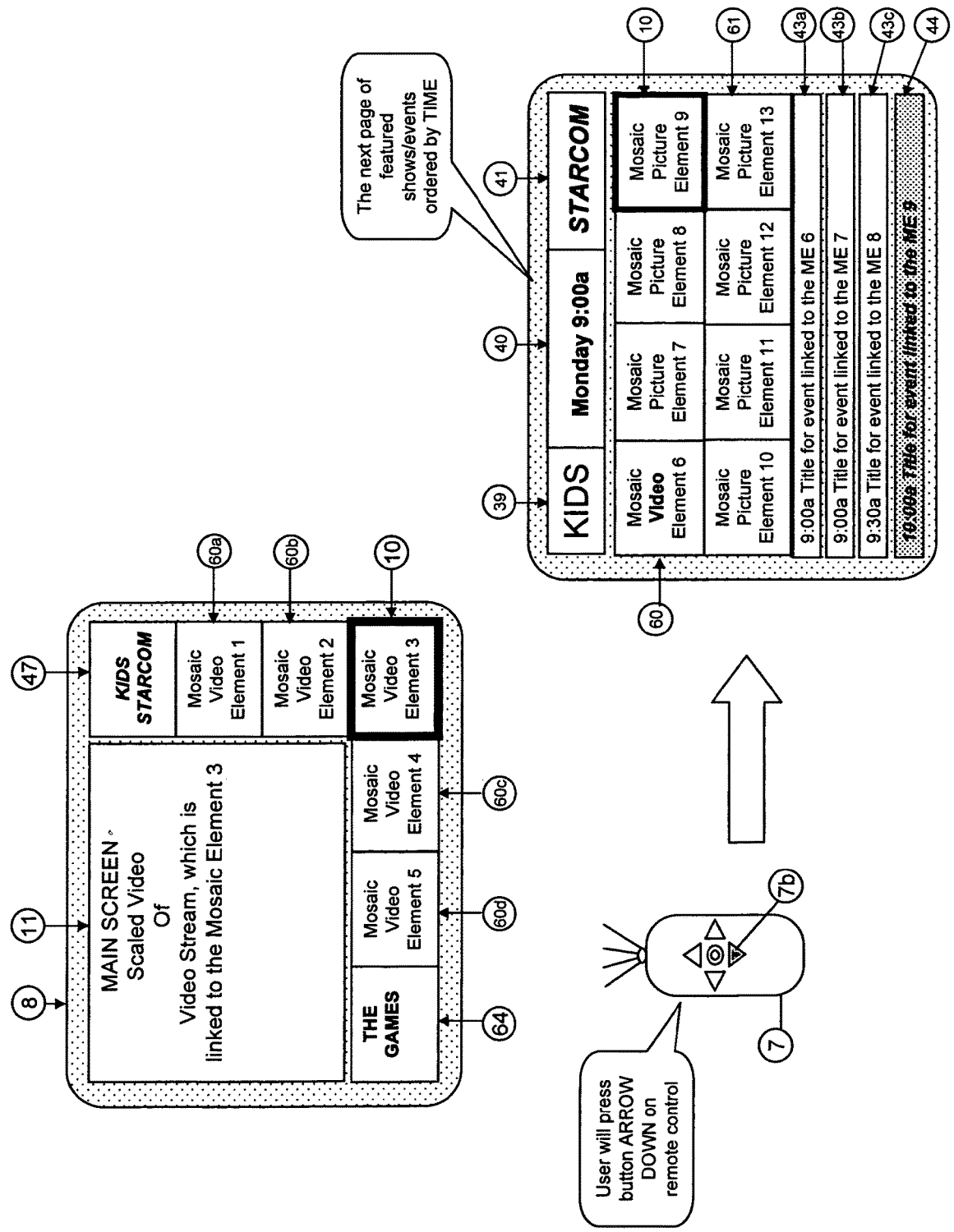

FIG. 78 shows example of UI and navigation of DMXEPG created for specific content category (Kids)

Figure 79:
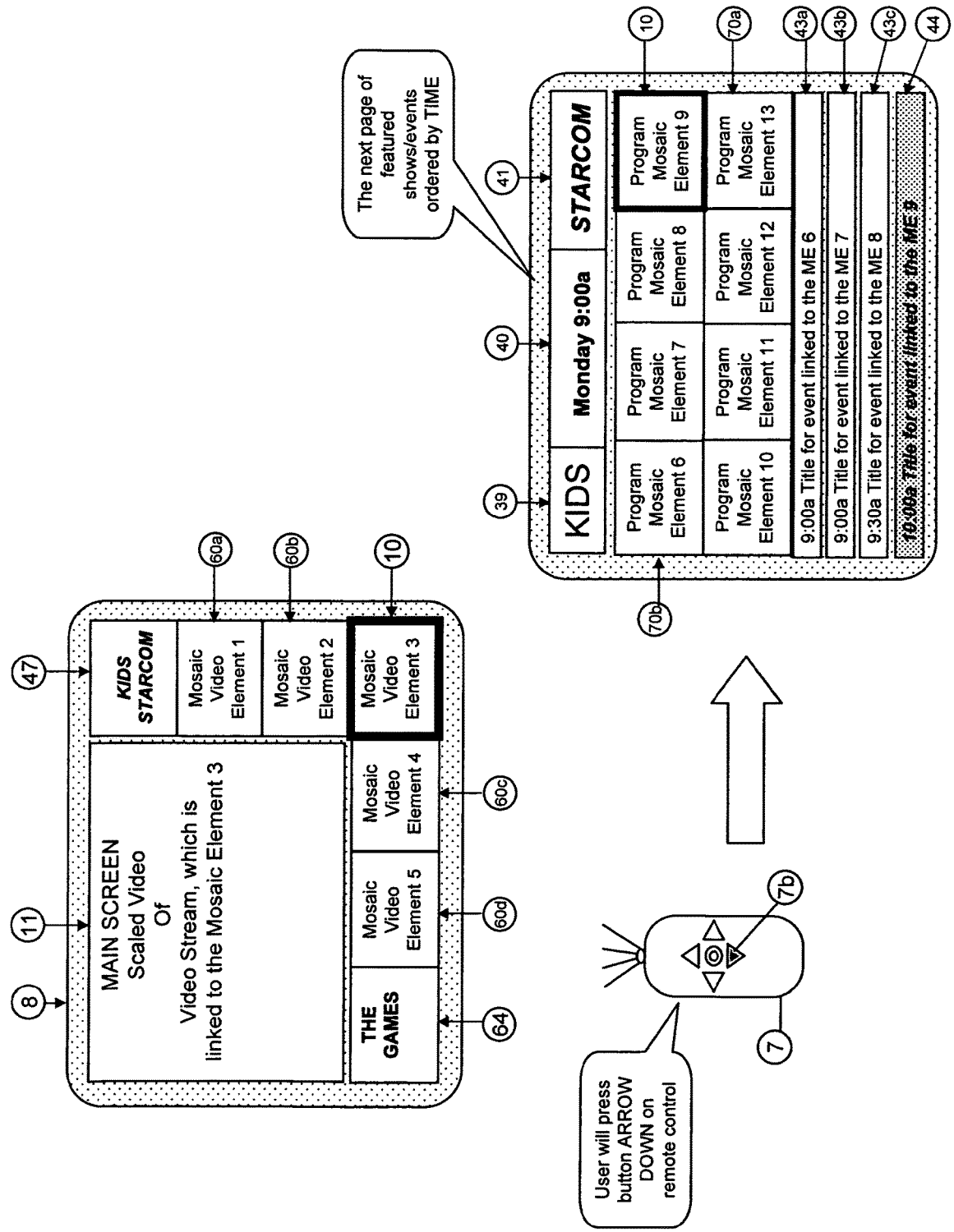

FIG. 79 shows example of UI and navigation of DMXEPG created for specific content category (Kids)

Figure 80:
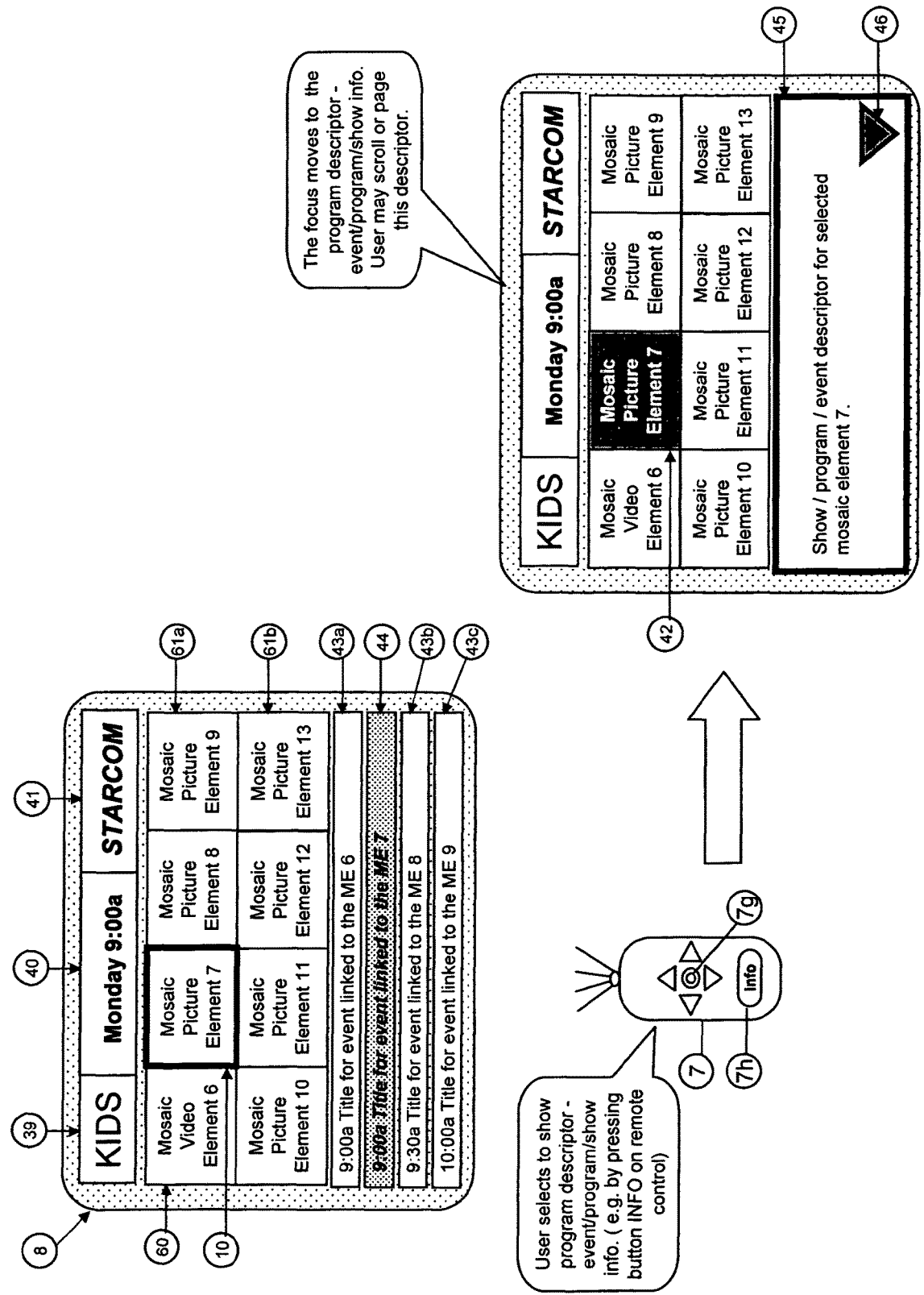

FIG. 80 shows example of UI and navigation of DMXEPG created for specific content category (Kids)

Figure 81:
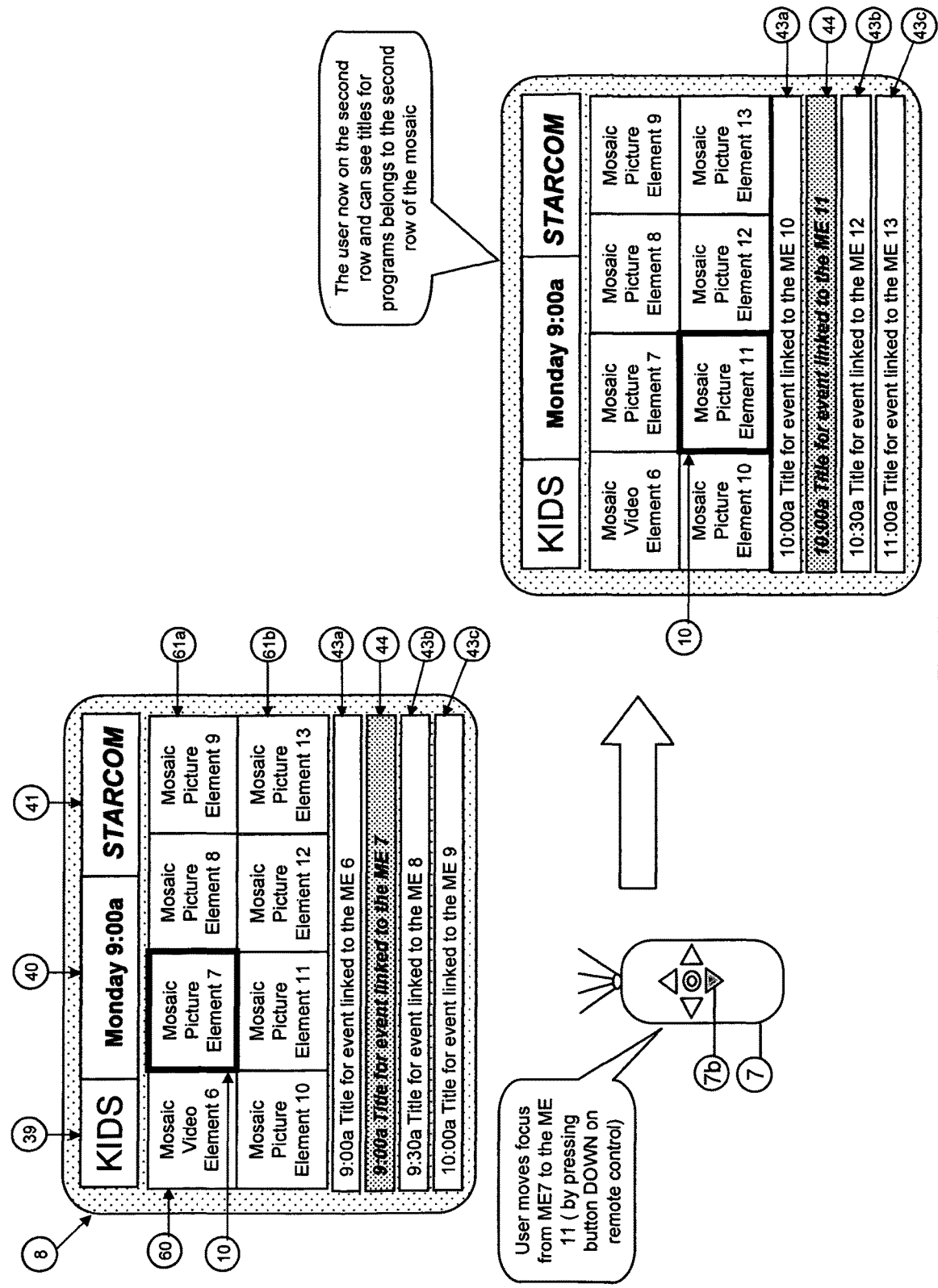

FIG. 81 shows example of UI and navigation of DMXEPG created for specific content category (Kids)

Figure 82:
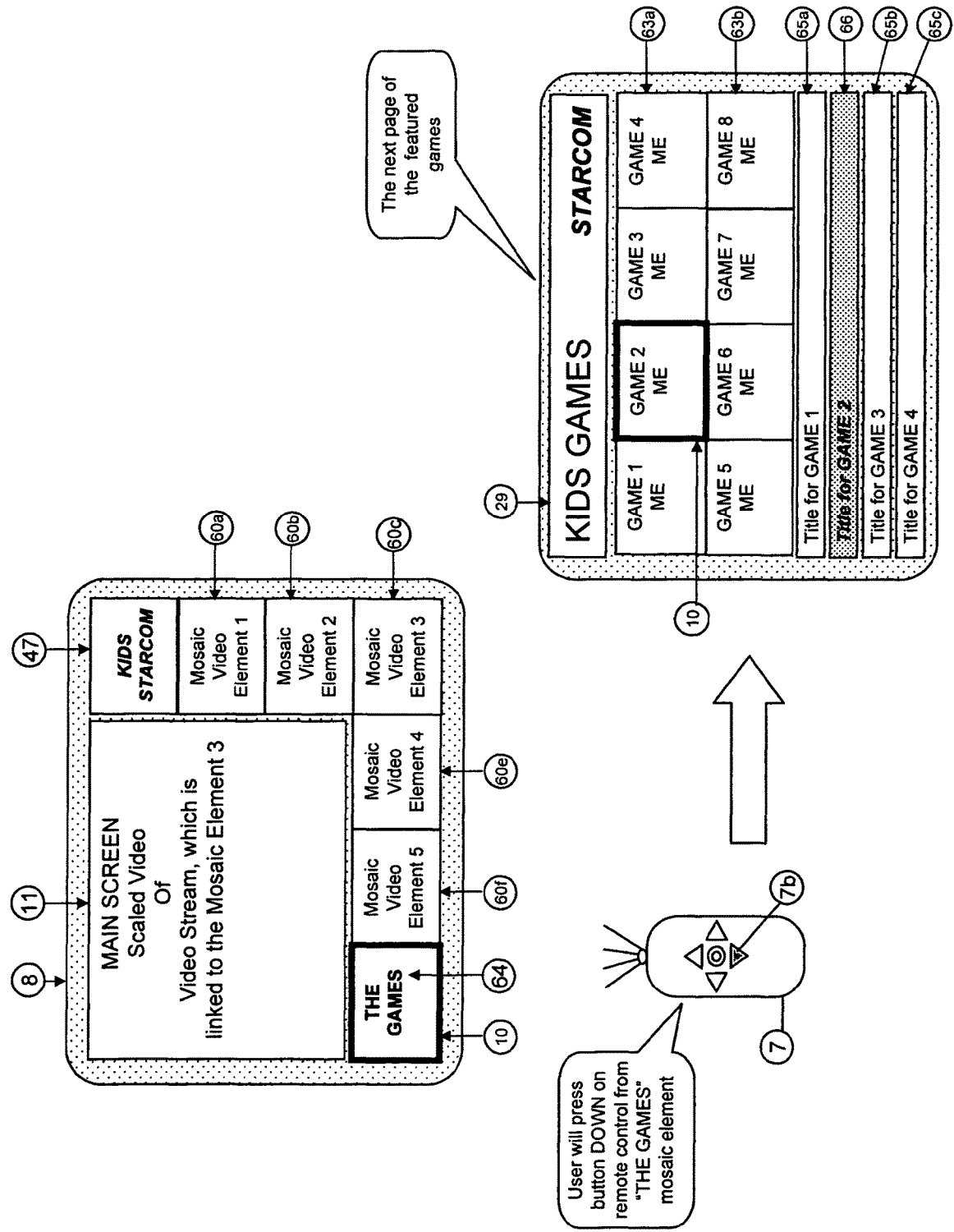

FIG. 82 shows example of UI and navigation of DMXEPG created for specific content category (Kids)

Figure 83:
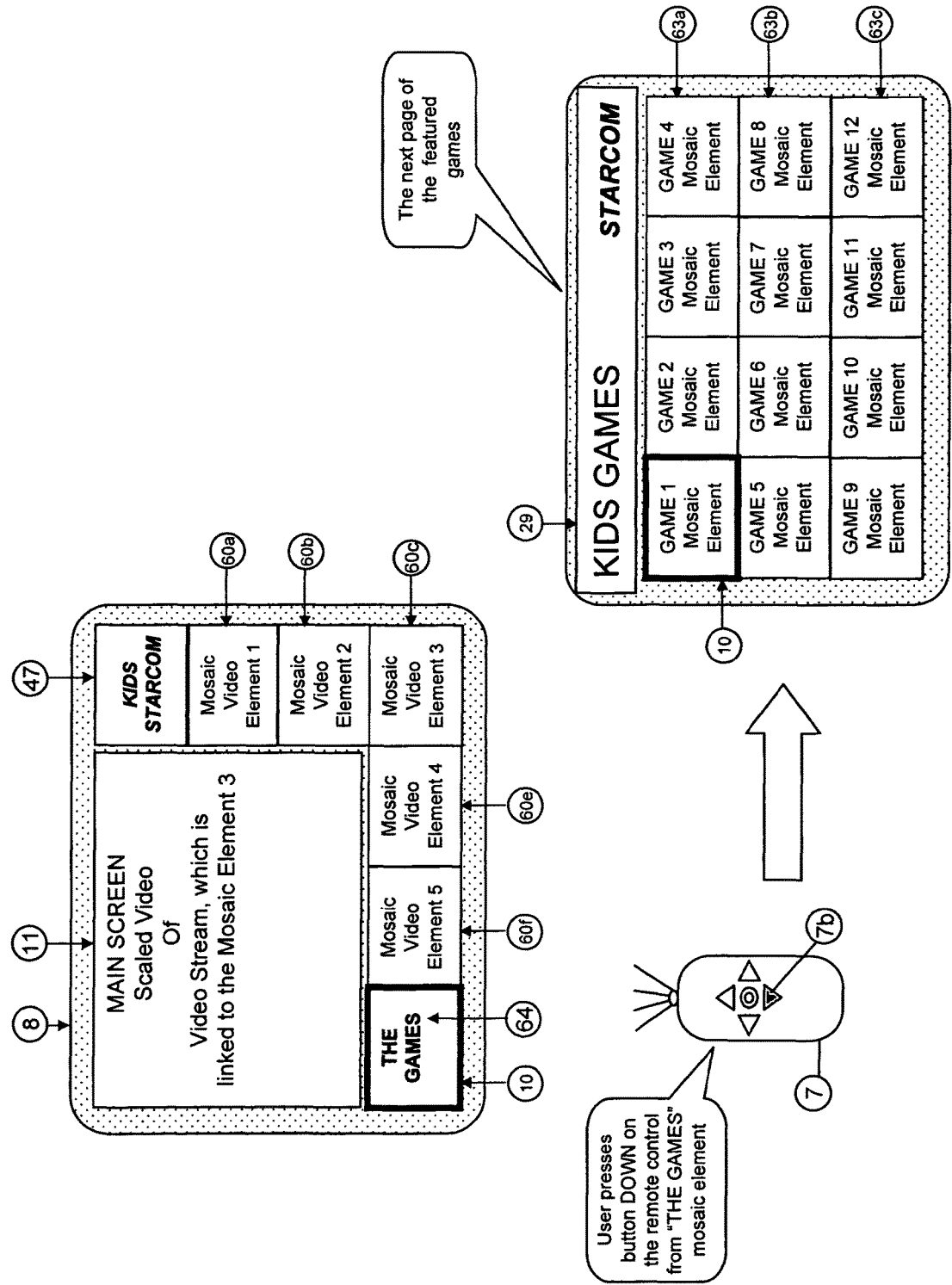

FIG. 83 shows example of UI and navigation of DMXEPG created for specific content category (Kids)

Figure 84:
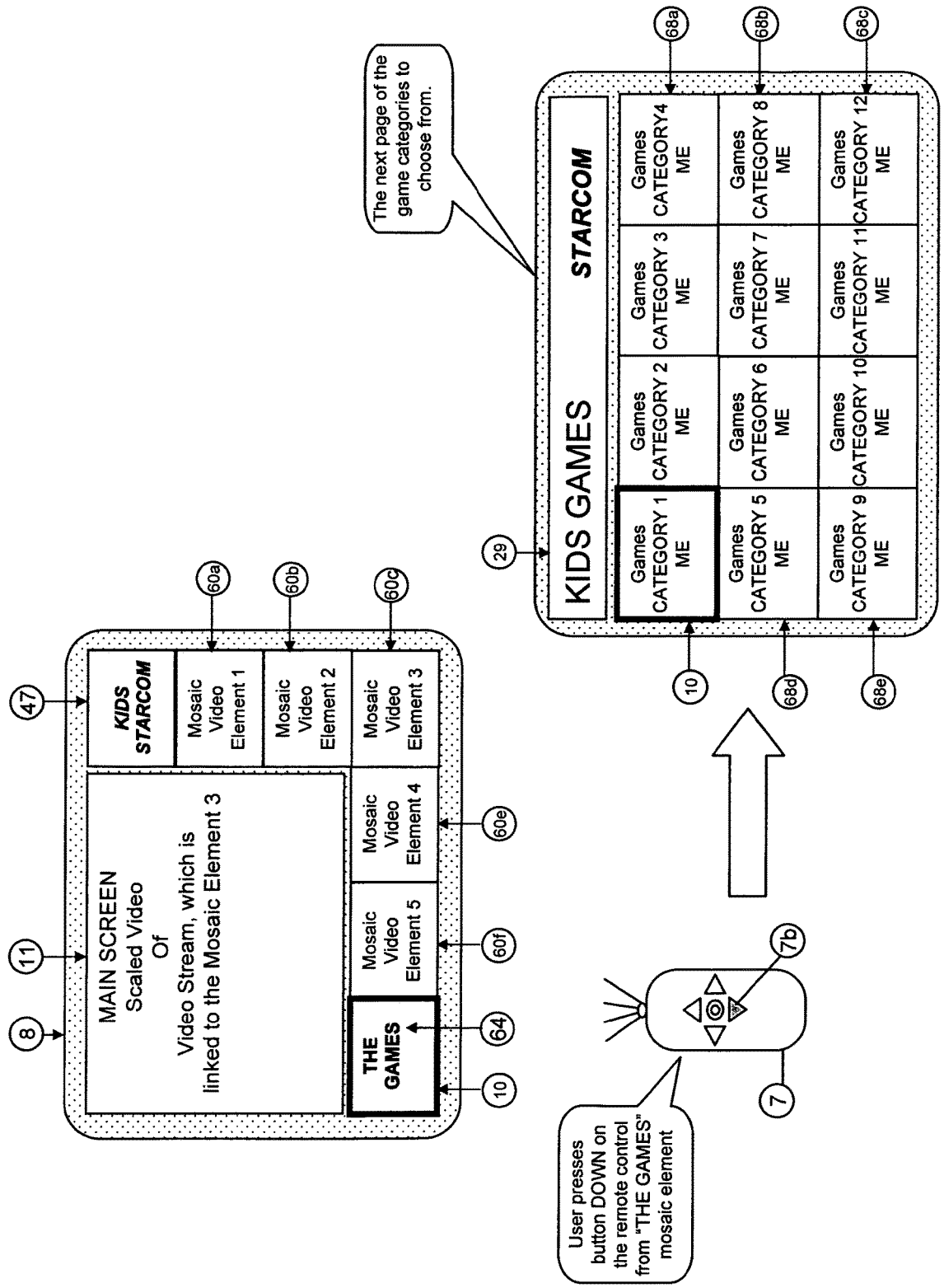

FIG. 84 shows example of UI and navigation of DMXEPG created for specific content category (Kids)

Figure 85:
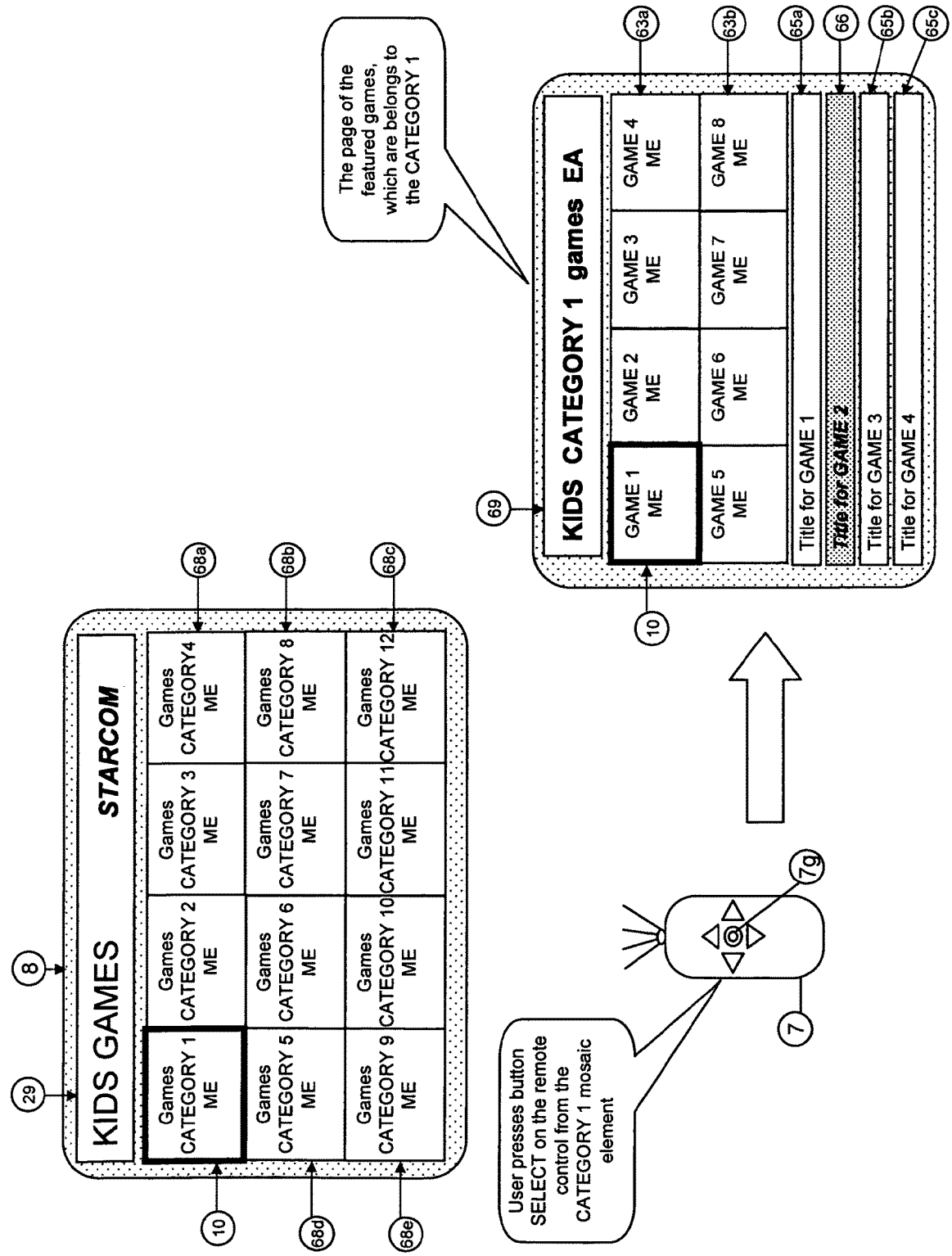

FIG. 85 shows example of UI and navigation of DMXEPG created for specific content category (Kids)

Figure 86:
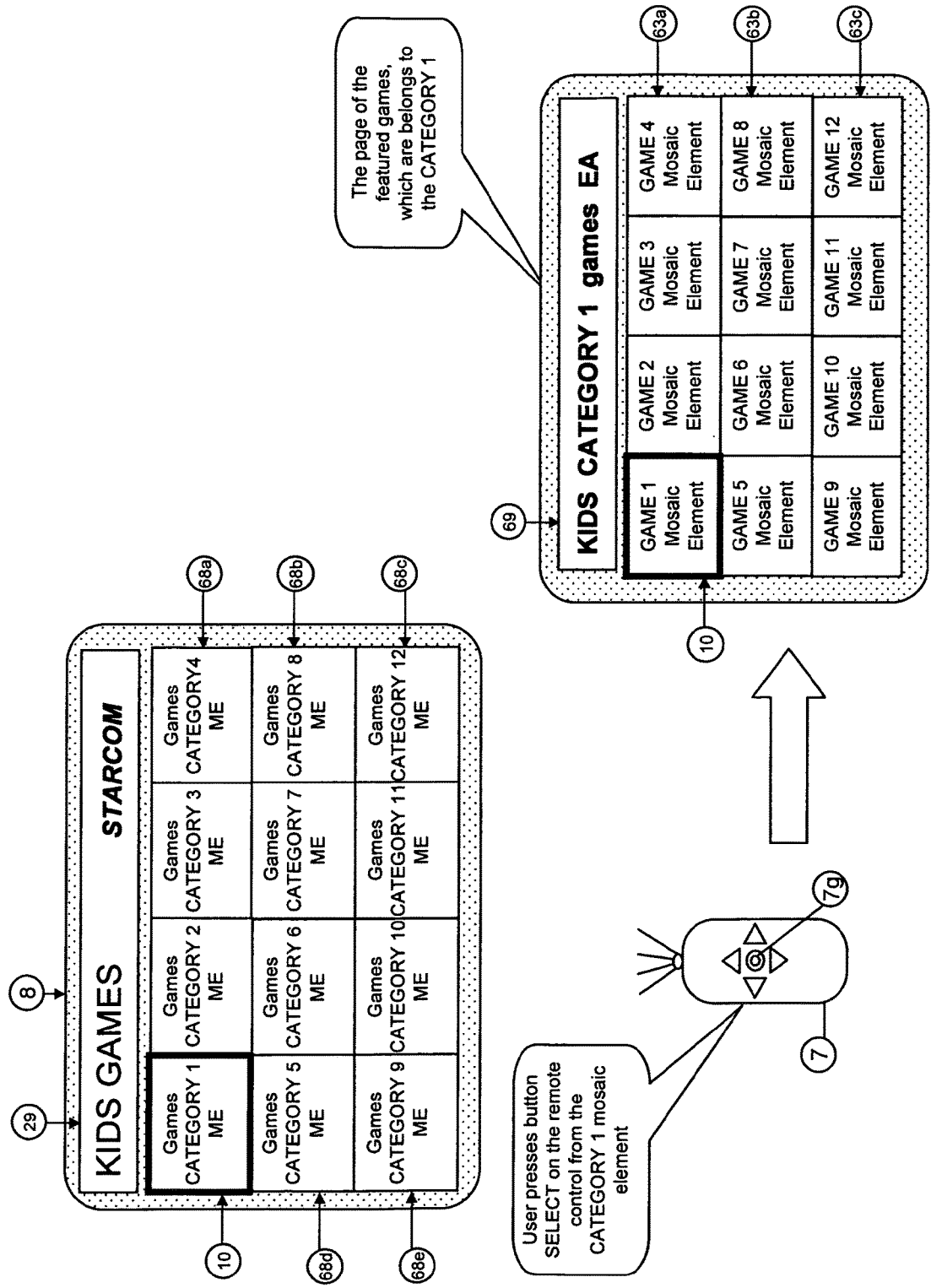

FIG. 86 shows example of UI and navigation of DMXEPG created for specific content category (Kids)

Figure 87:
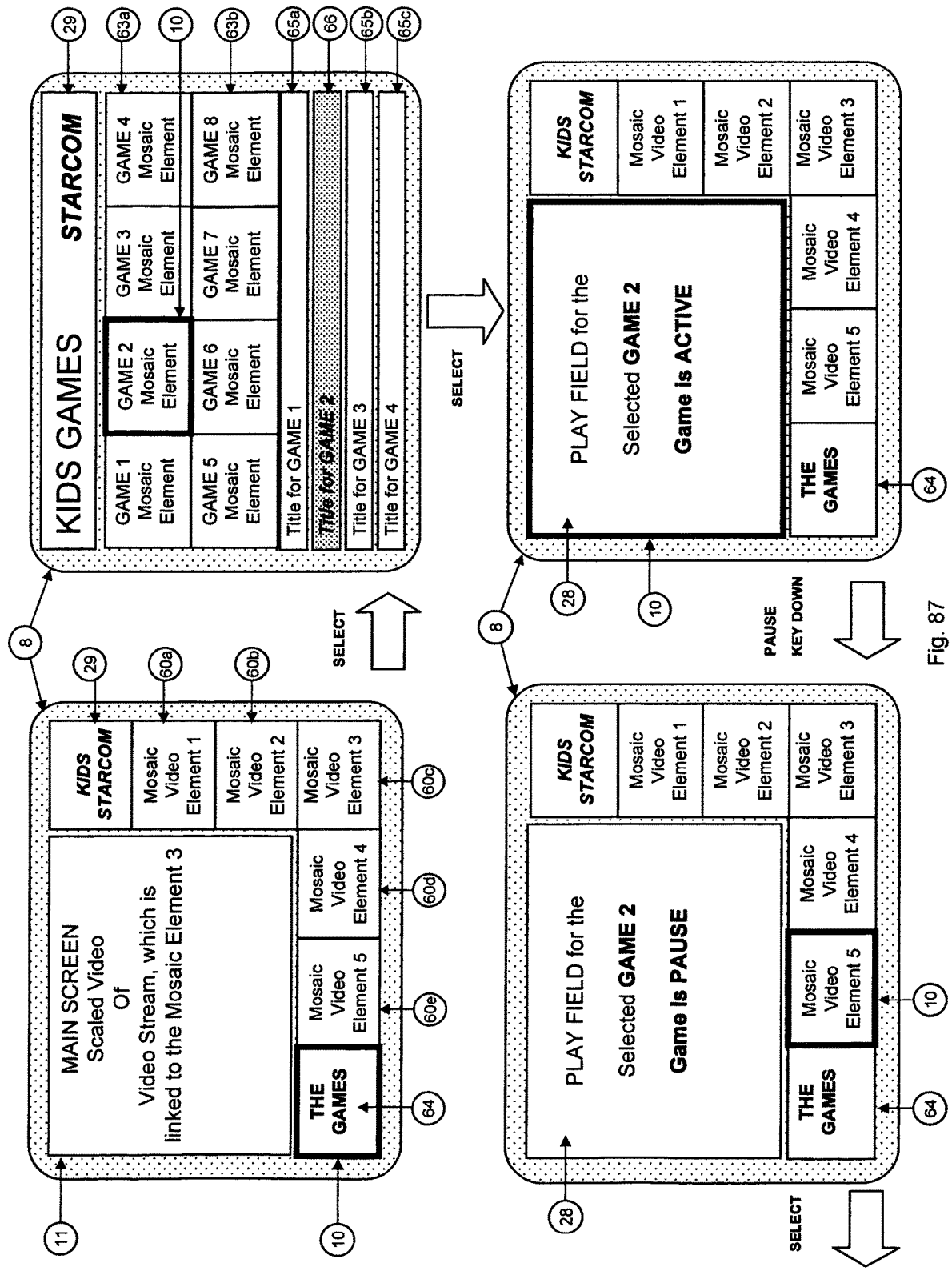

FIG. 87 shows example of UI and navigation of DMXEPG created for specific content category (Kids)

Figure 88:
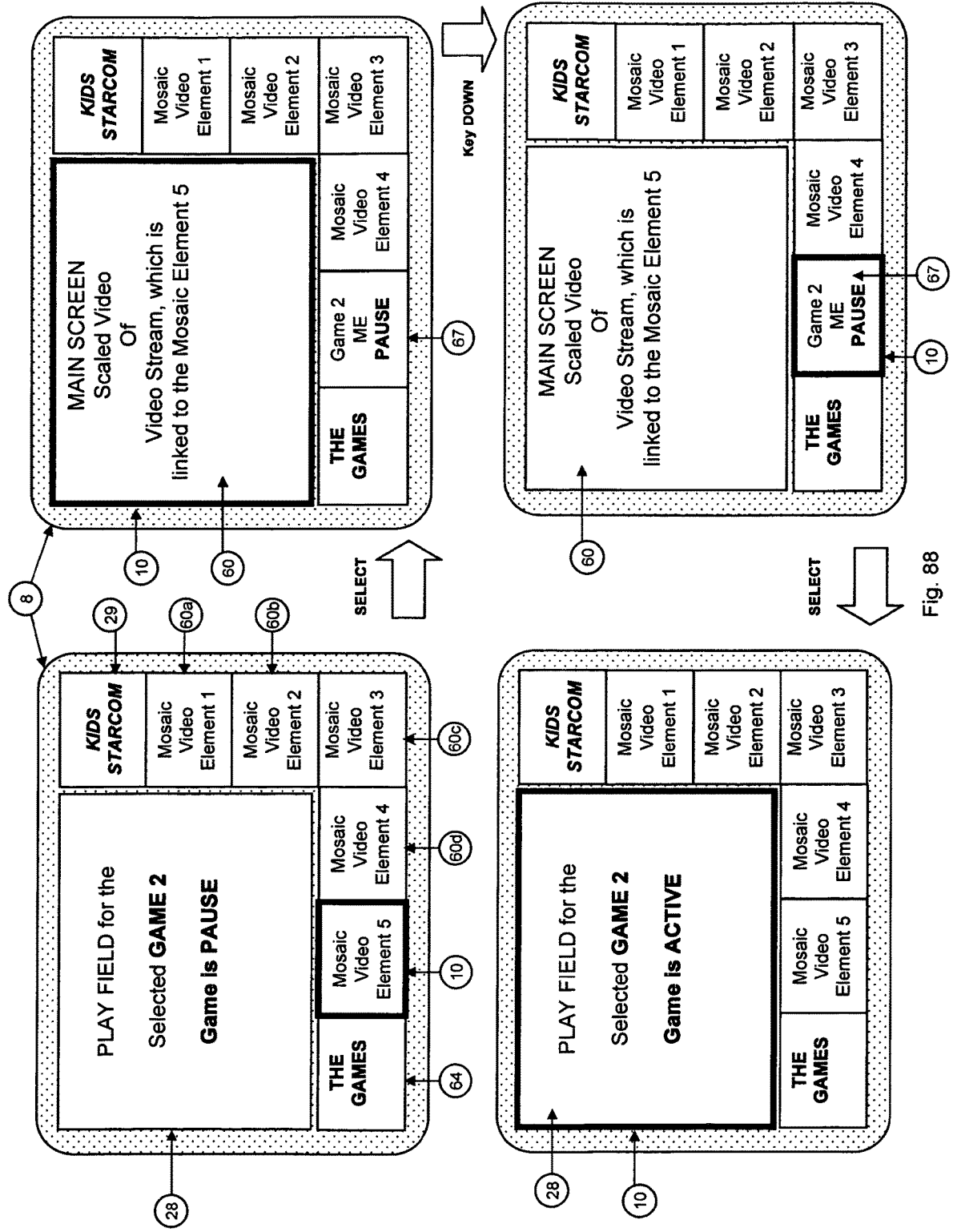

FIG. 88 shows example of UI and navigation of DMXEPG created for specific content category (Kids)

Figure 89:
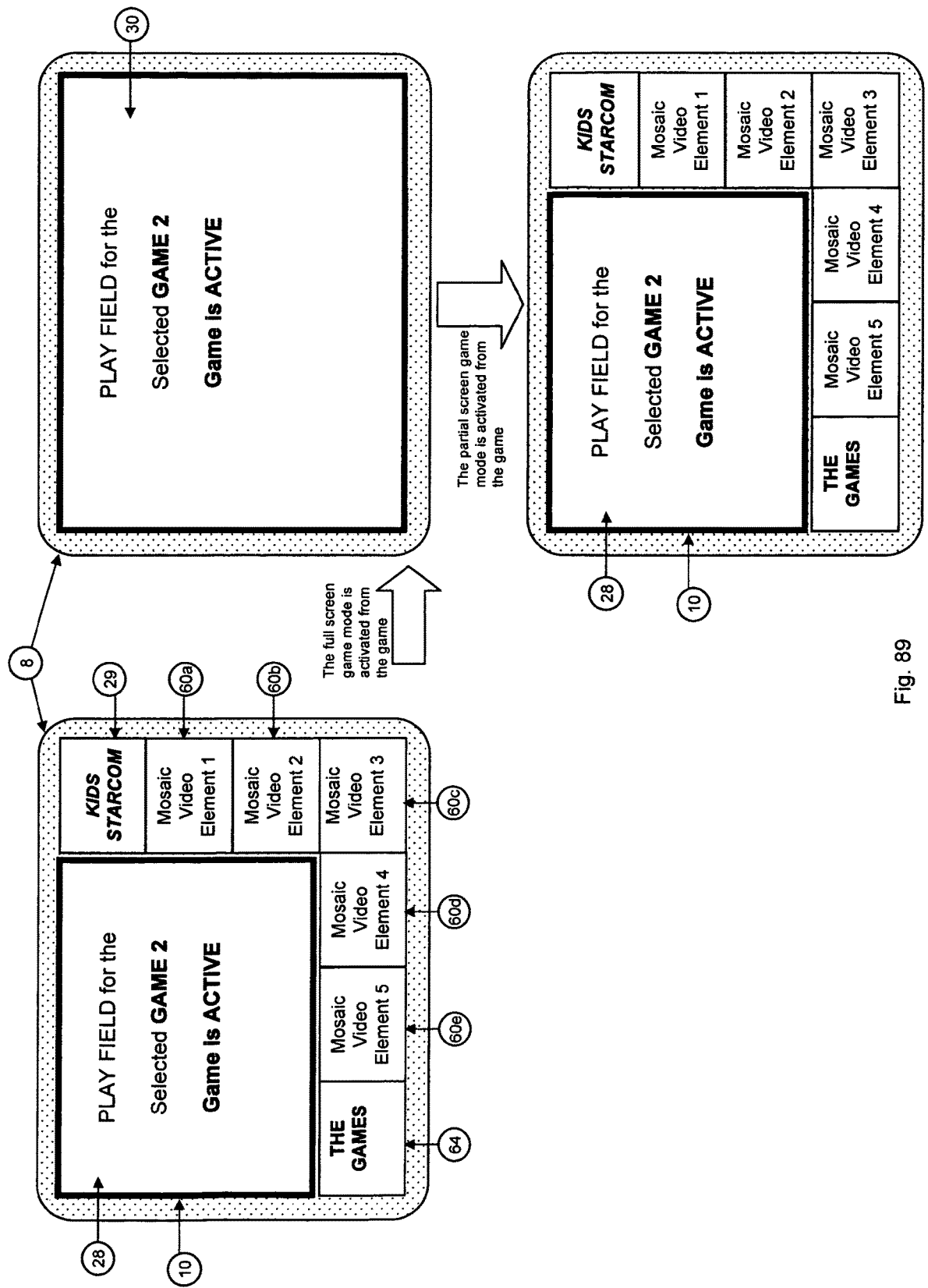

FIG. 89 shows example of UI and navigation of DMXEPG created for specific content category (Kids)

Figure 90:
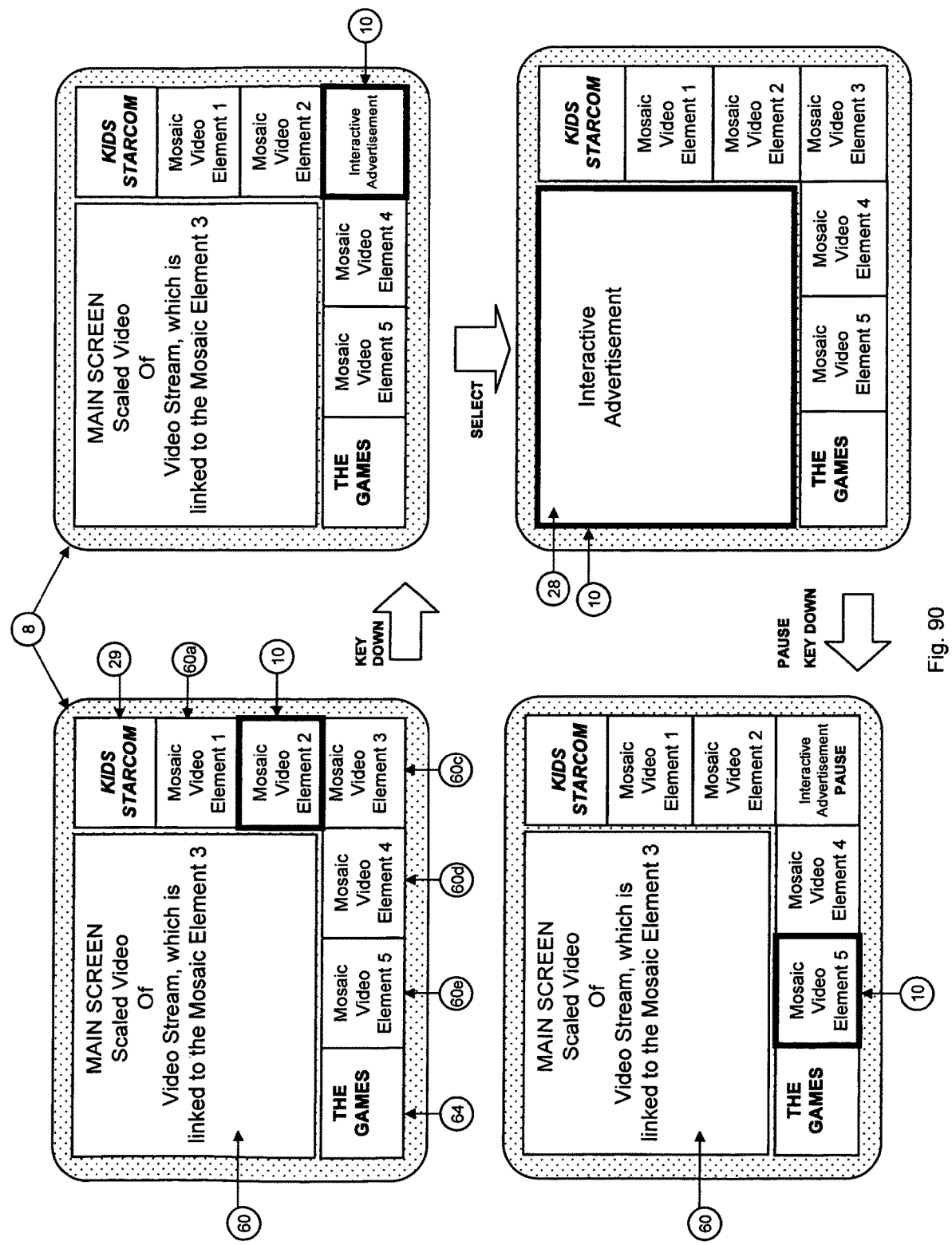
Figure 94B:
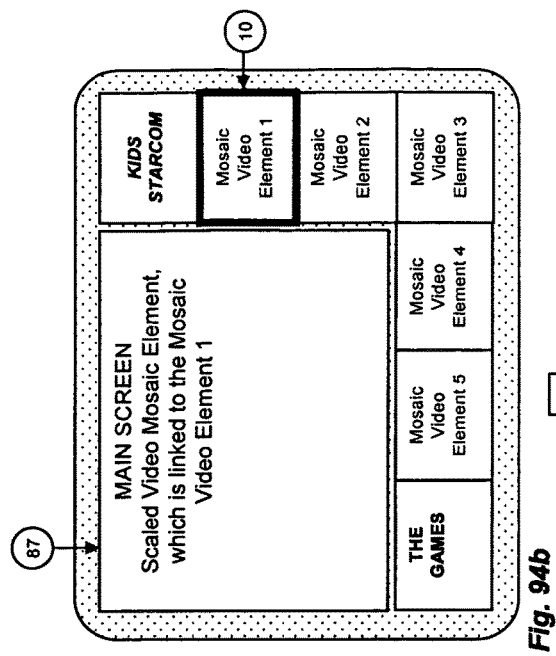
FIG. 94 shows an option for enlarging selected ME to larger portion of the screen and the full screen.
Figure 94C:
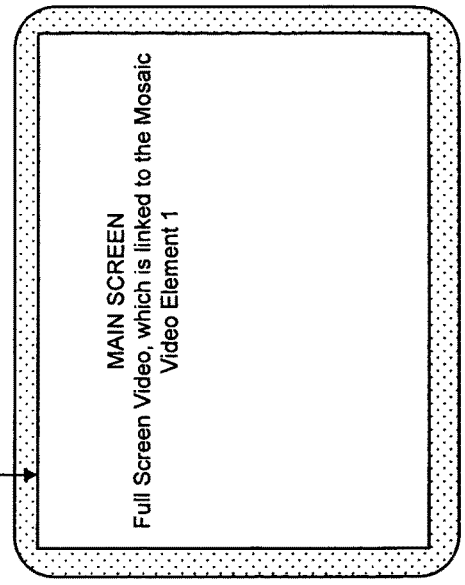
Figure 94A:
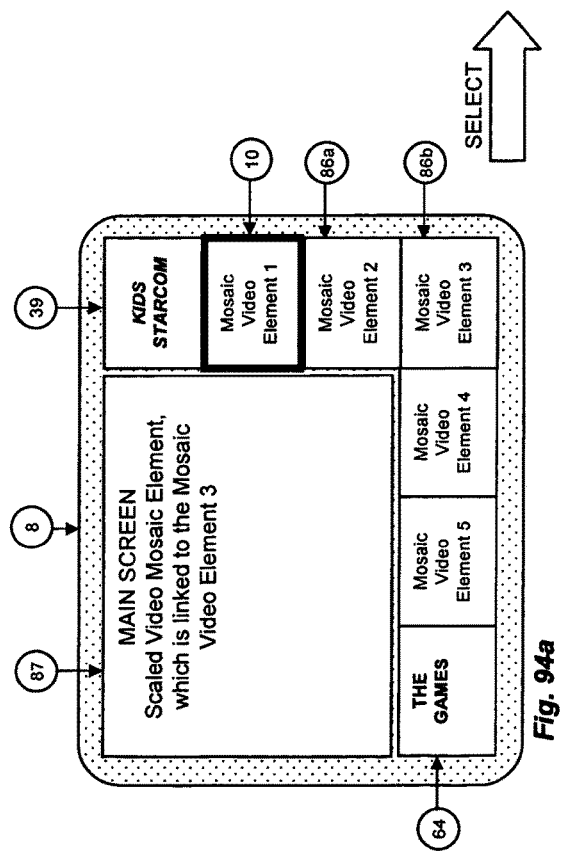
Figure 94D:
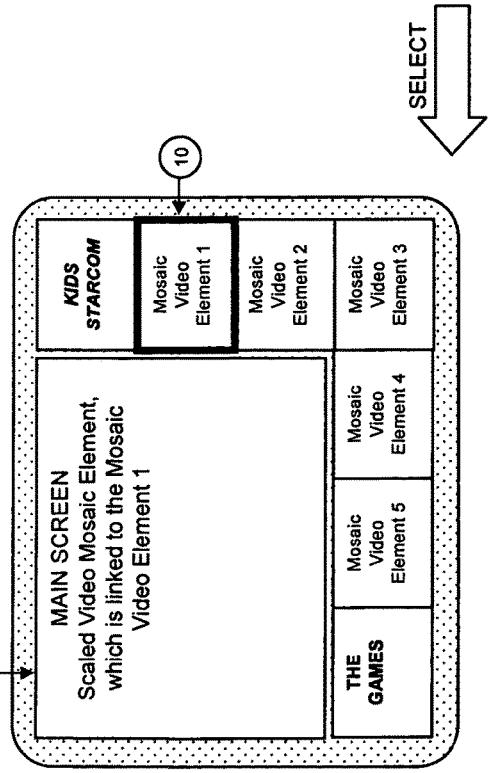
Figure 97B:
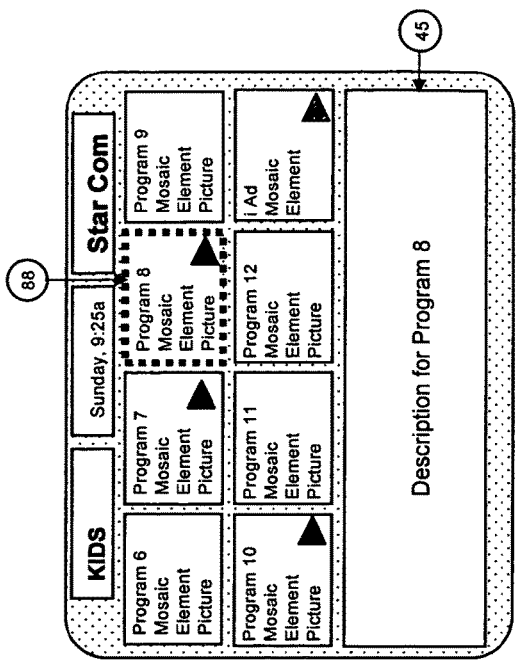
FIG. 97 shows UI and navigation of DMXEPG in program information display mode.
Figure 97C:
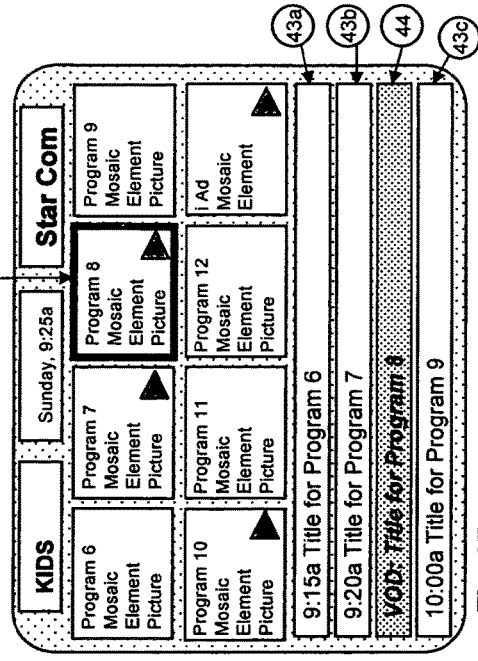
Figure 97A:
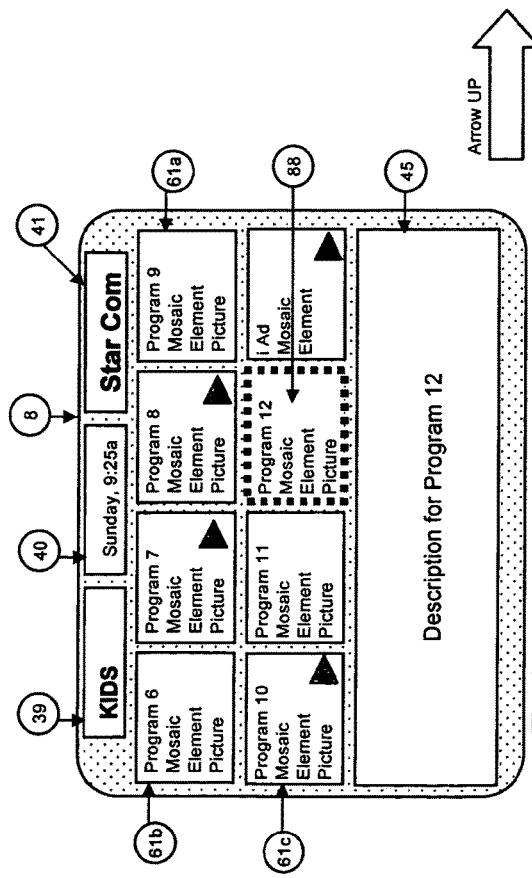
Figure 97D:
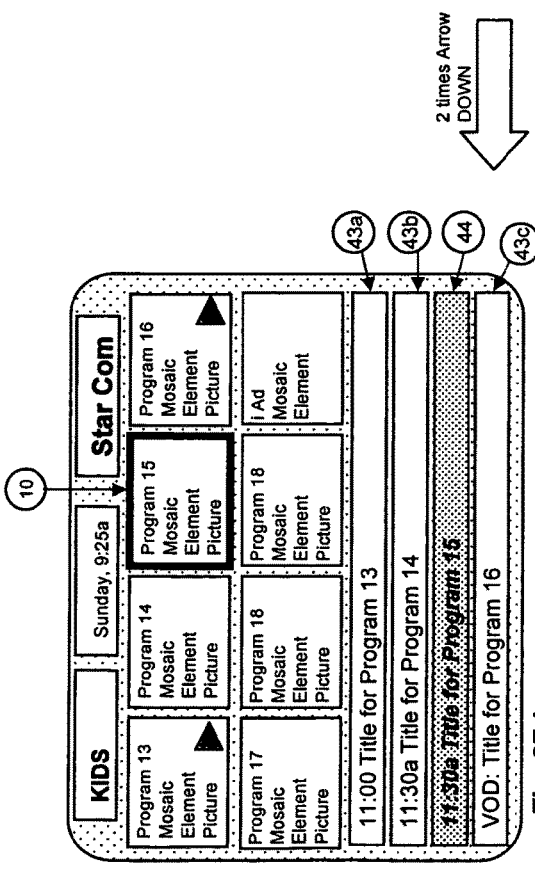
Figure 99B:
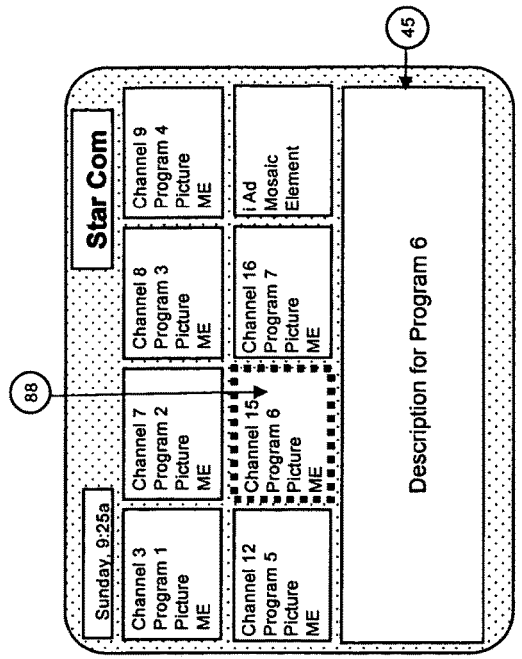
Figure 99C:
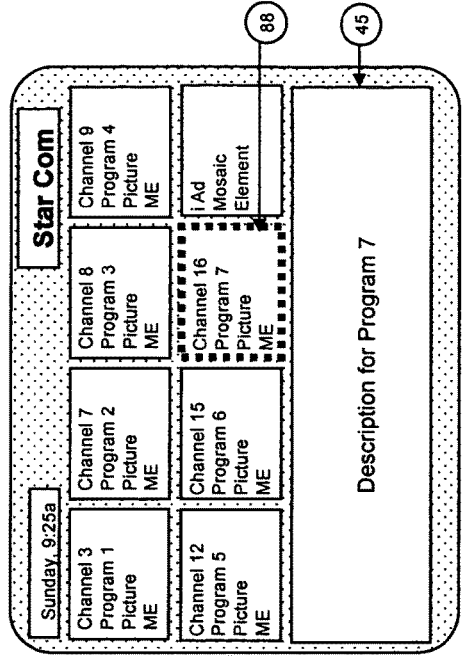
Figure 99A:
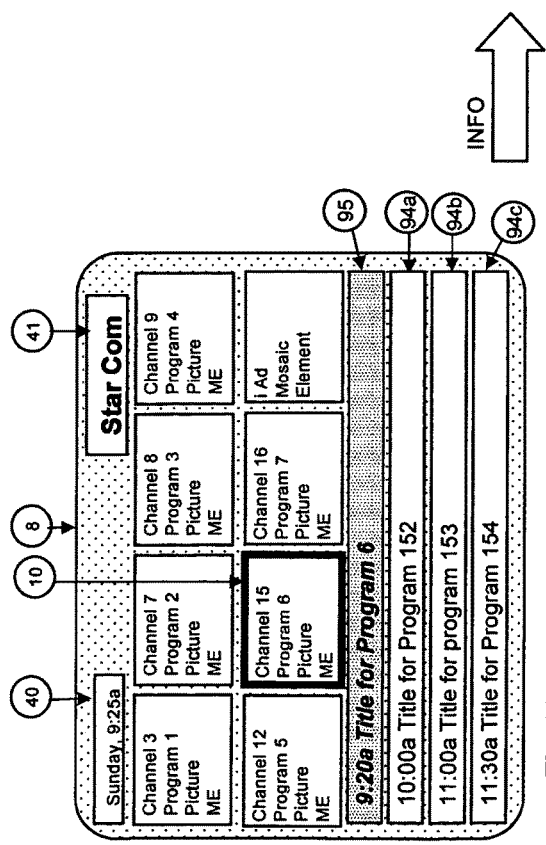
Figure 99D:
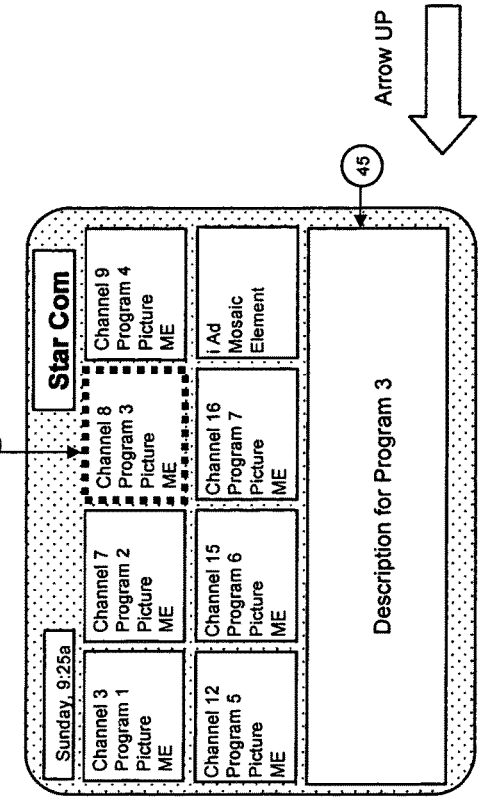
Figure 100B:
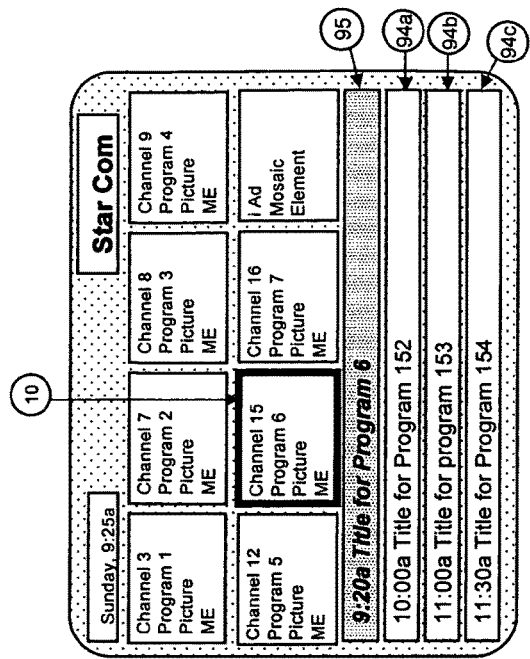
Figure 100C:
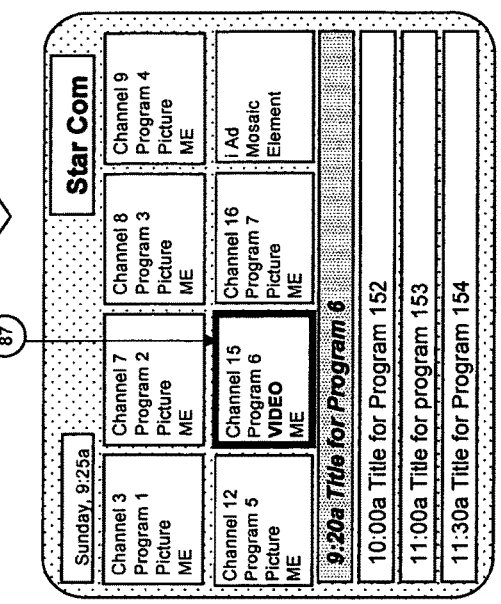
Figure 100A:
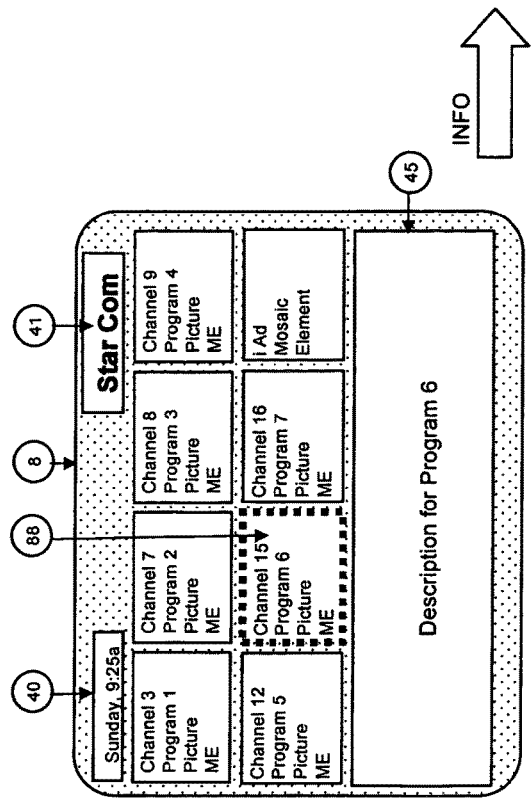
Figure 100D:
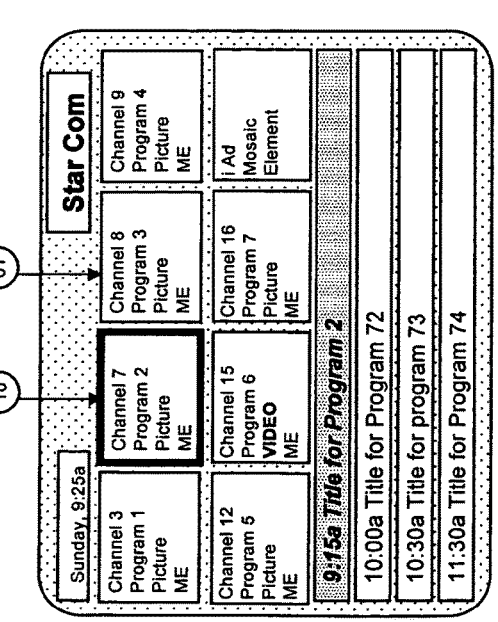
Figure 103A:
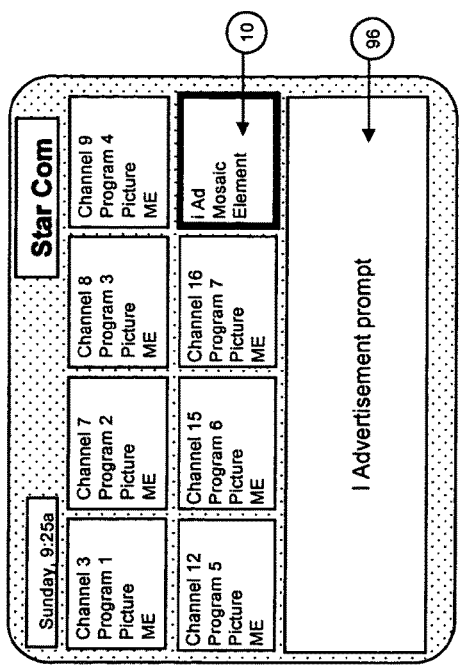
Figure 103B:
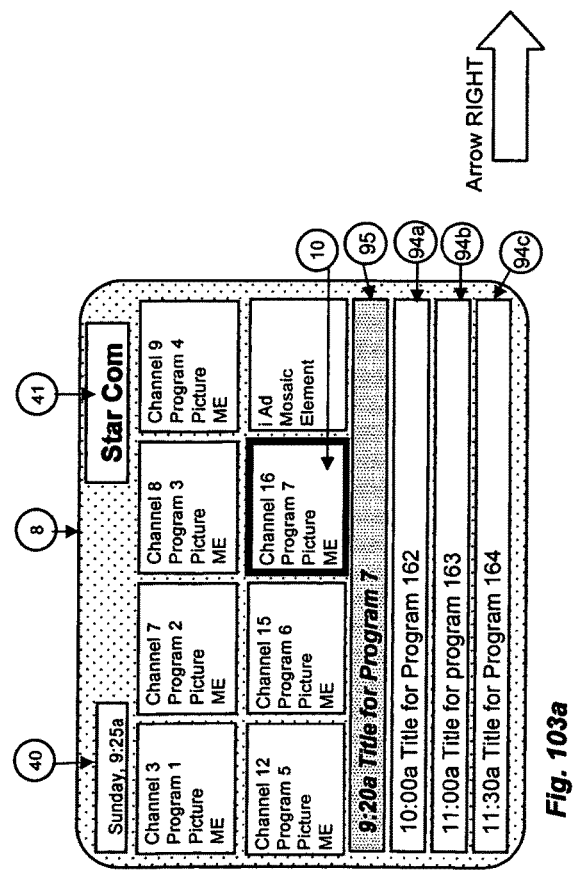
Figure 103C:
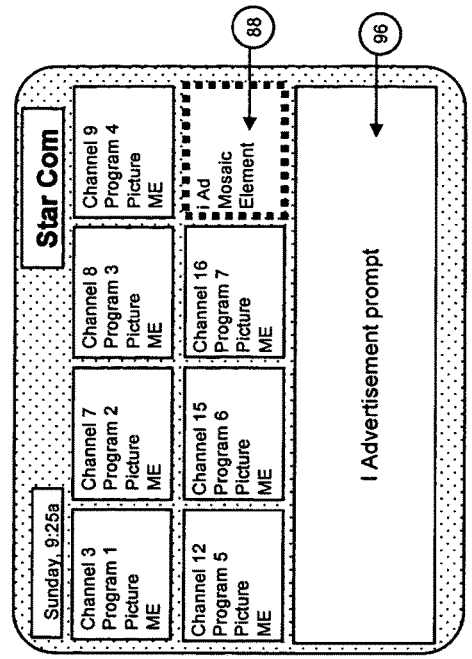
Figure 103D:
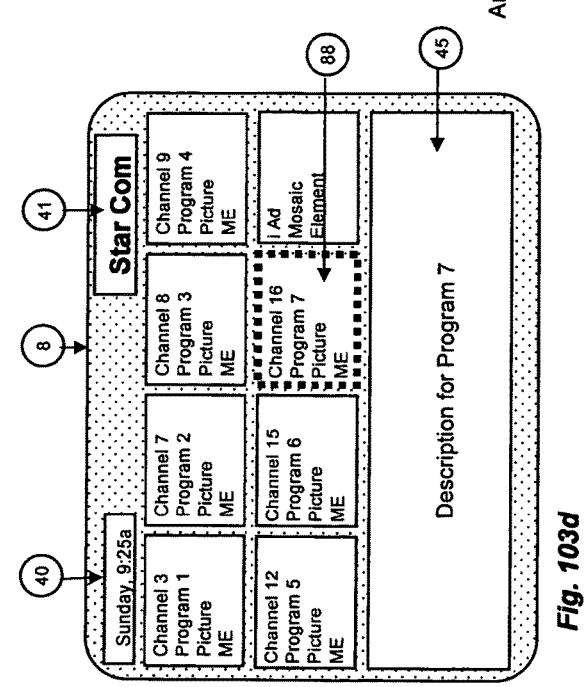
Figure 104B:
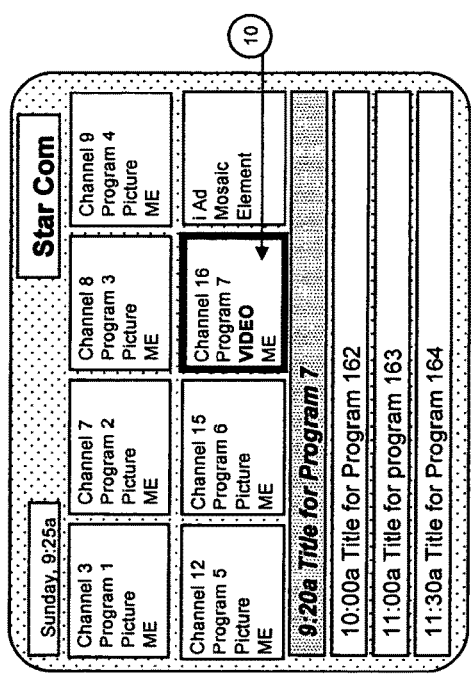
Figure 104C:
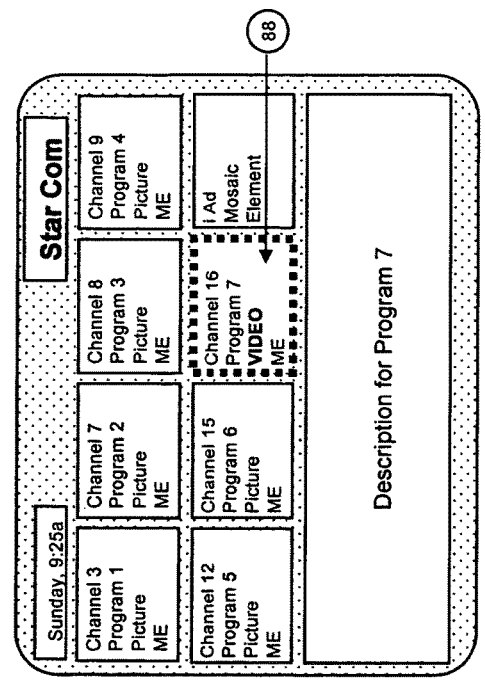
Figure 104A:
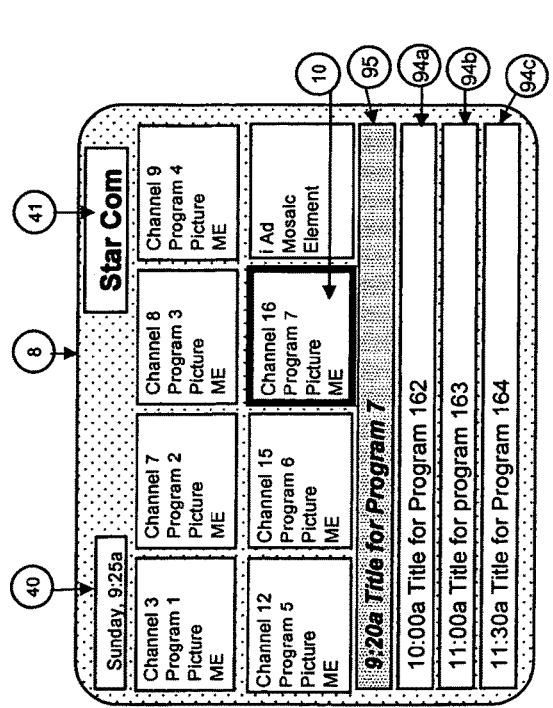
Figure 104D:
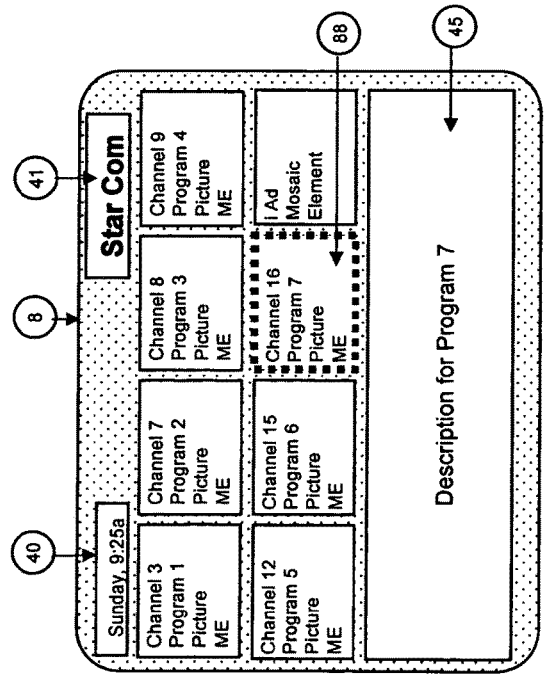
Figure 105B:
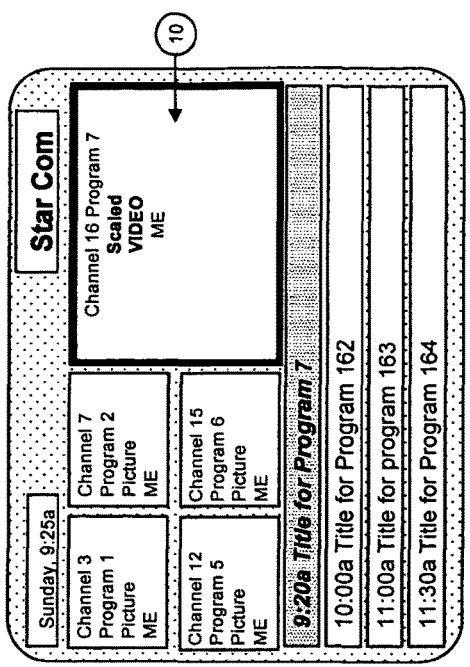
Figure 105C:
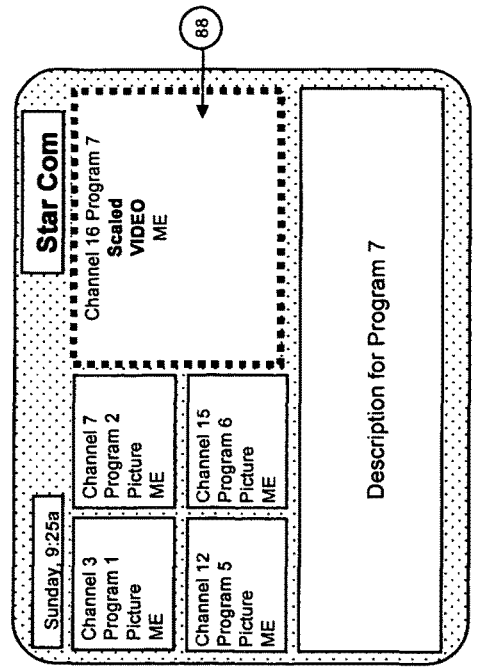
Figure 105A:
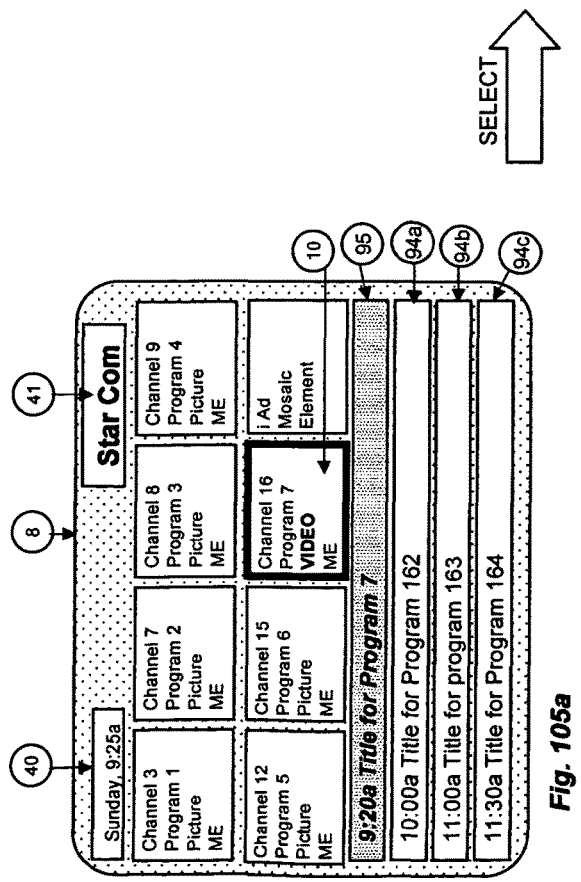
Figure 105D:
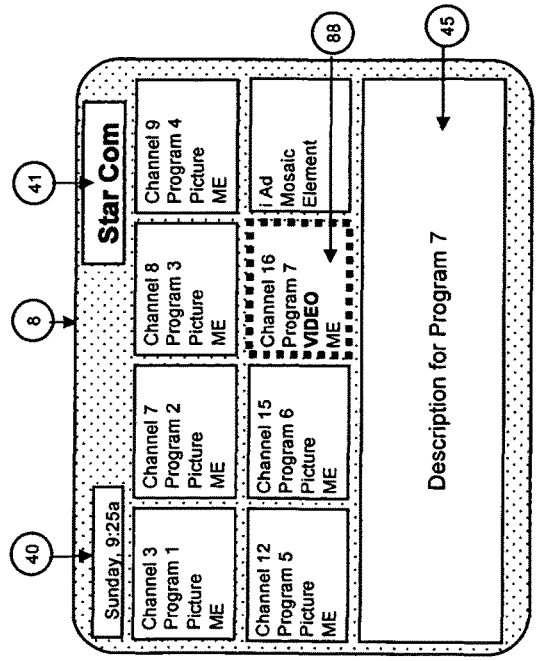
Figure 106A:
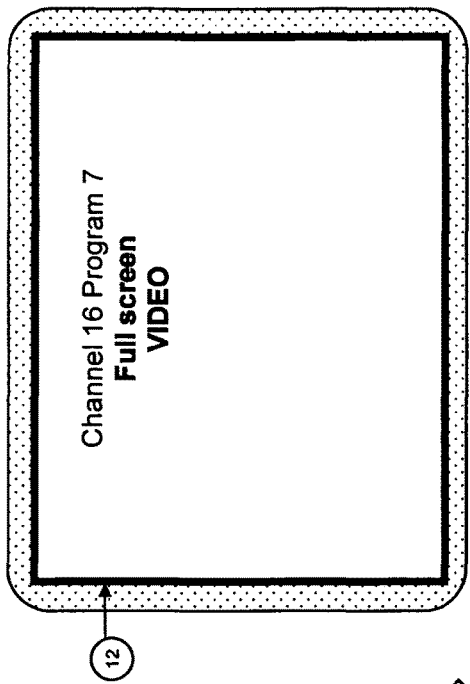
Figure 106B:
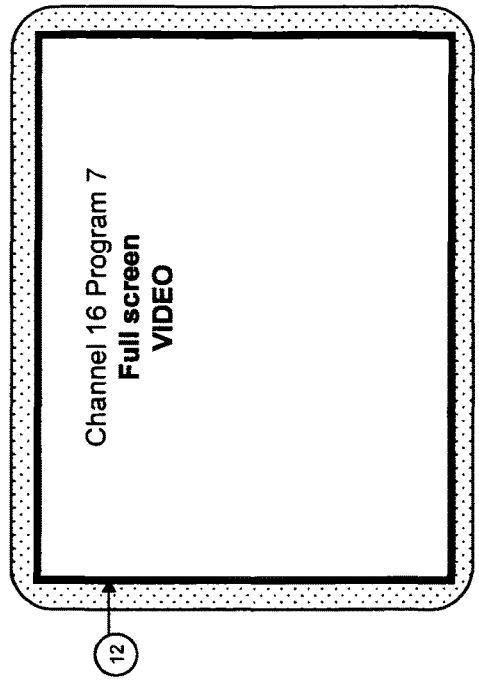
Figure 106C:
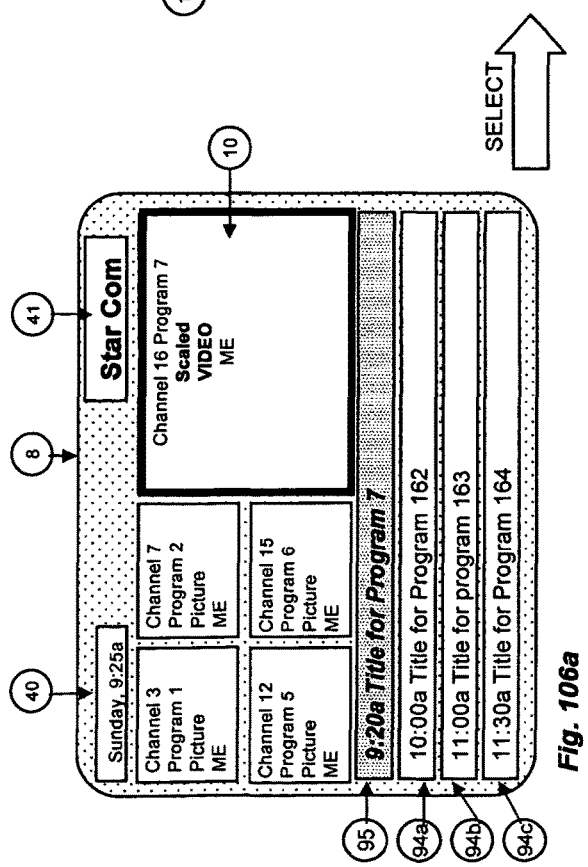
Figure 106D:
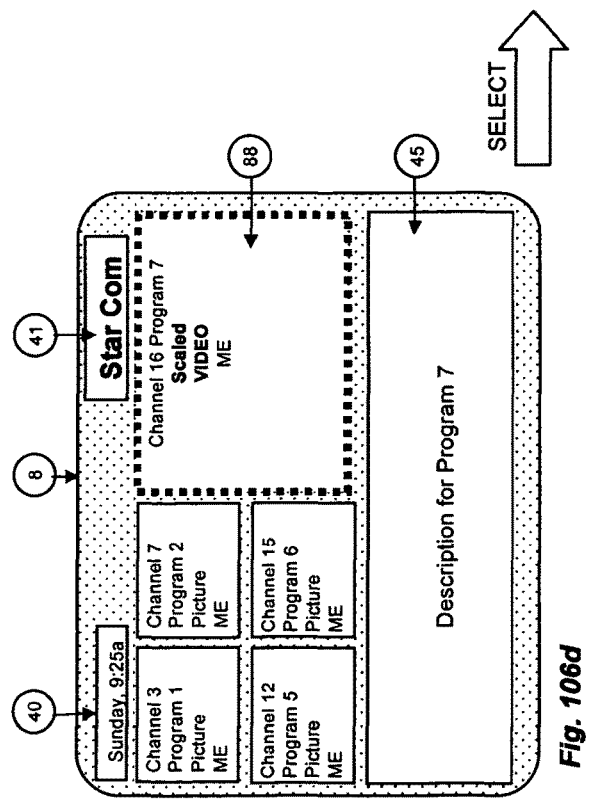
Figure 107B:
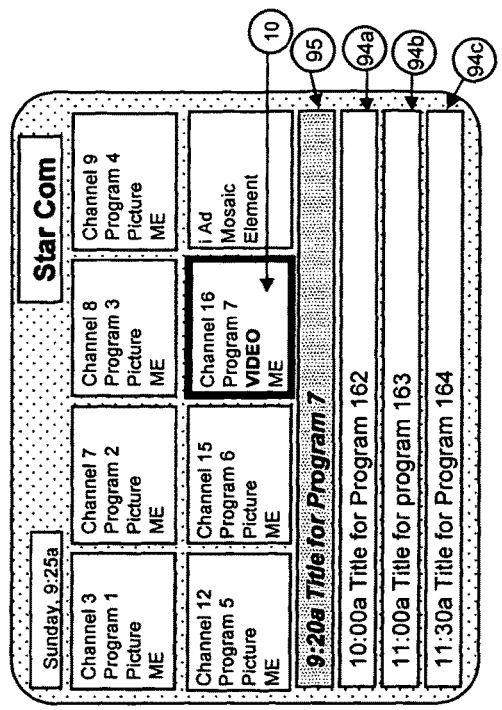
Figure 107C:
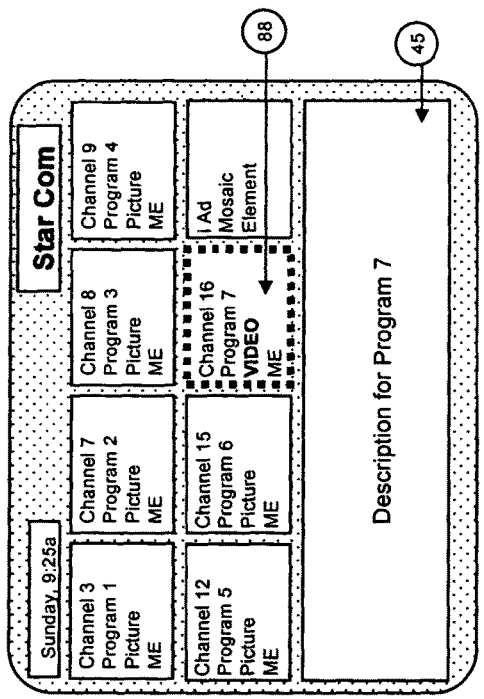
Figure 107A:
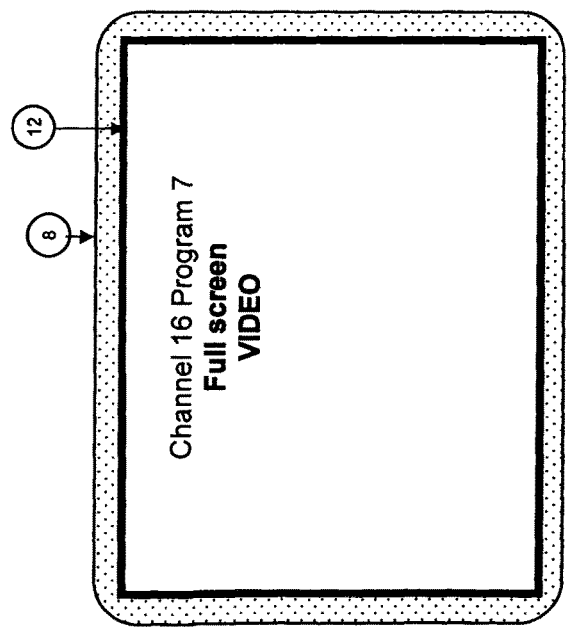
Figure 108B:
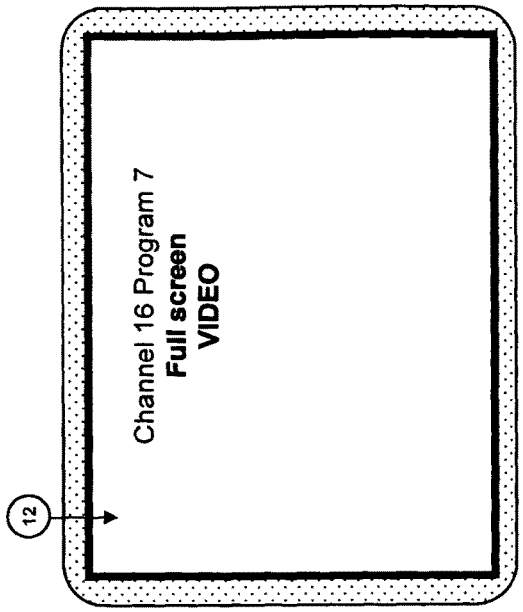
Figure 108C:
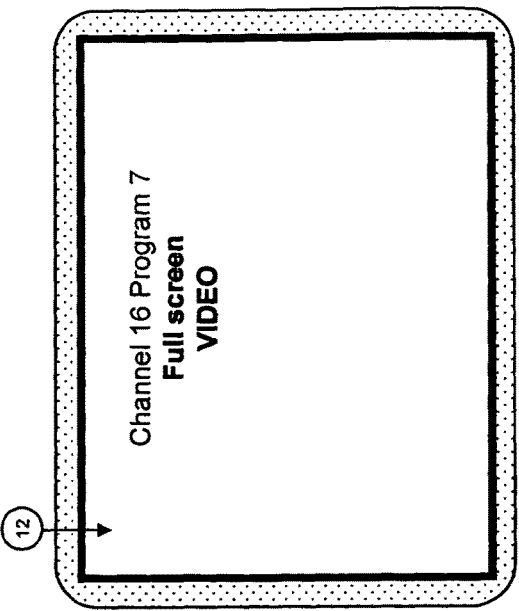
Figure 108A:
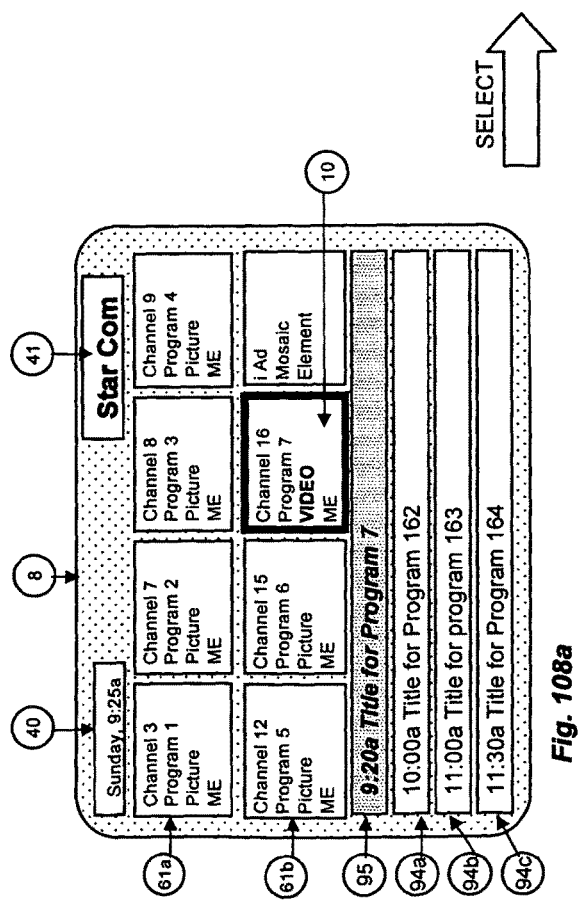
Figure 108D:
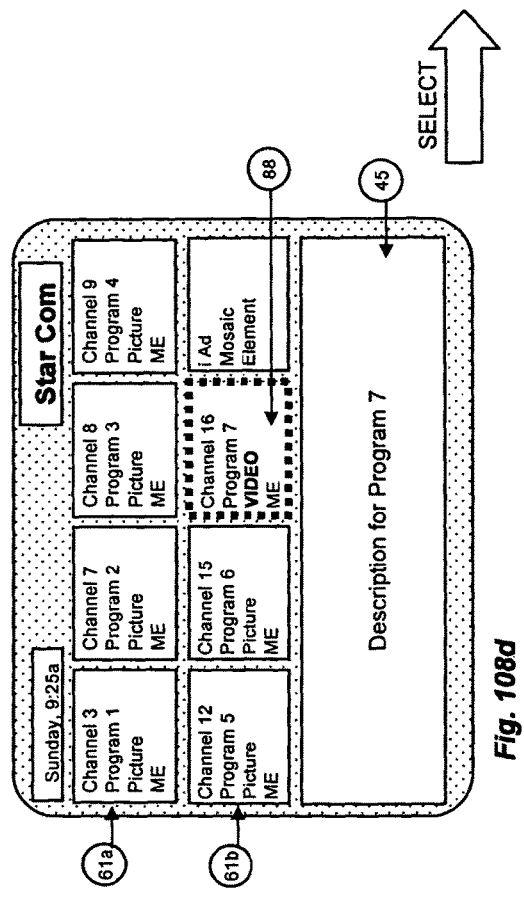
Figure 110B:
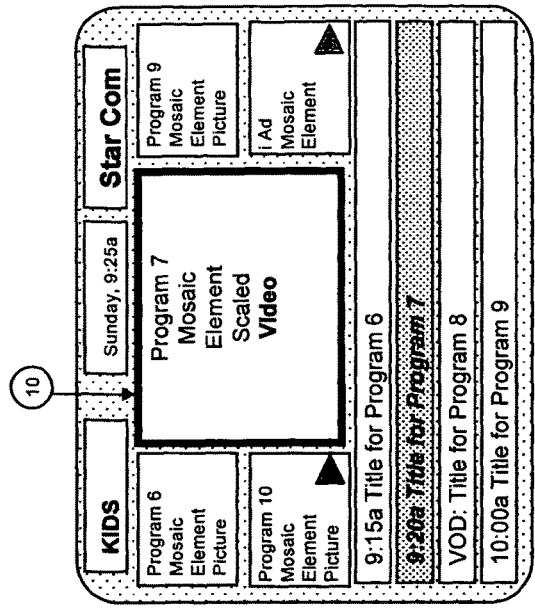
Figure 110C:
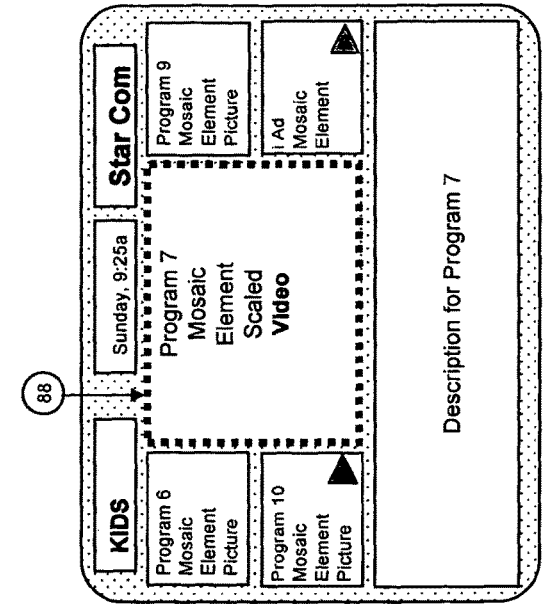
Figure 110A:
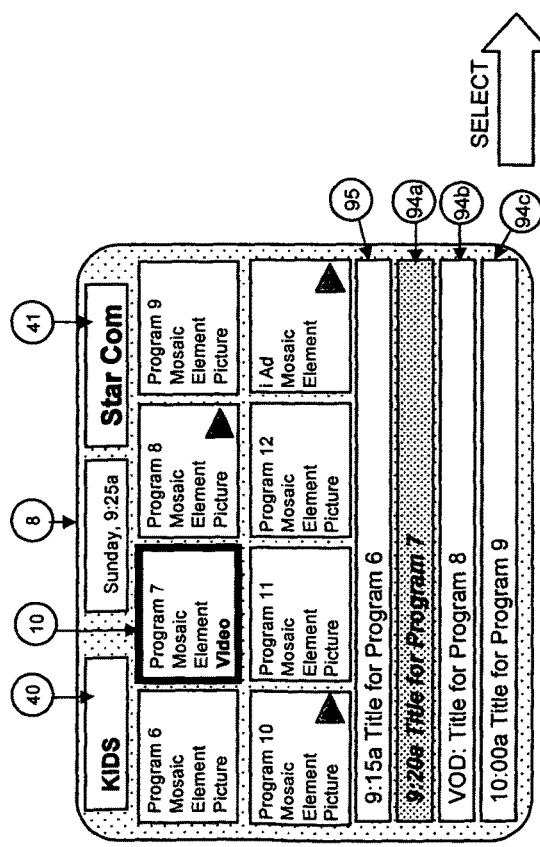
Figure 110D:
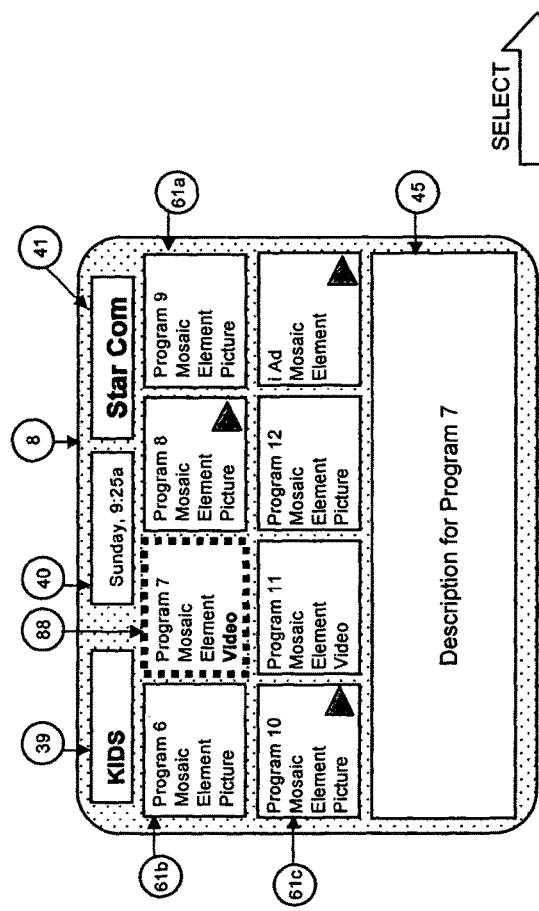
Figure 113A:
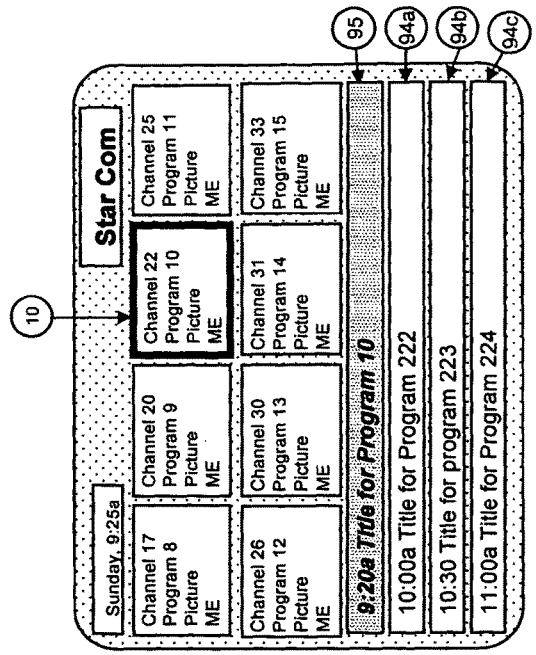
Figure 113B:
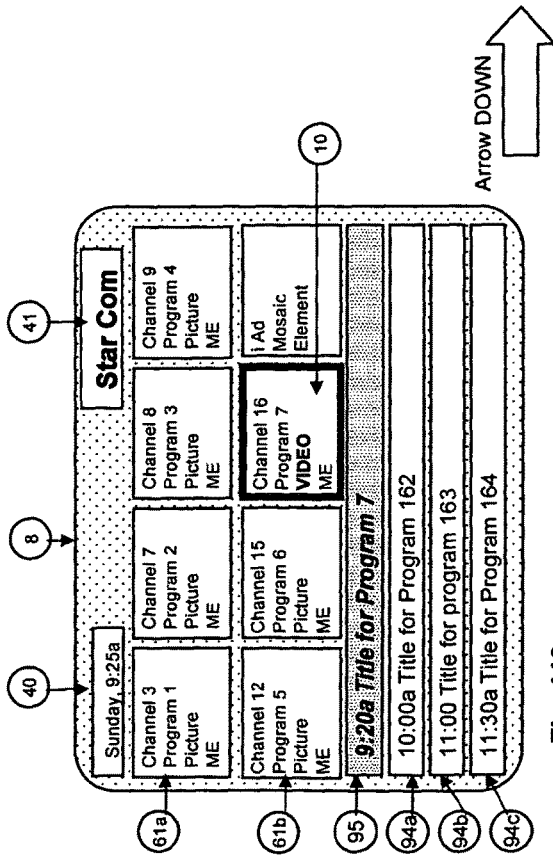
Figure 113C:
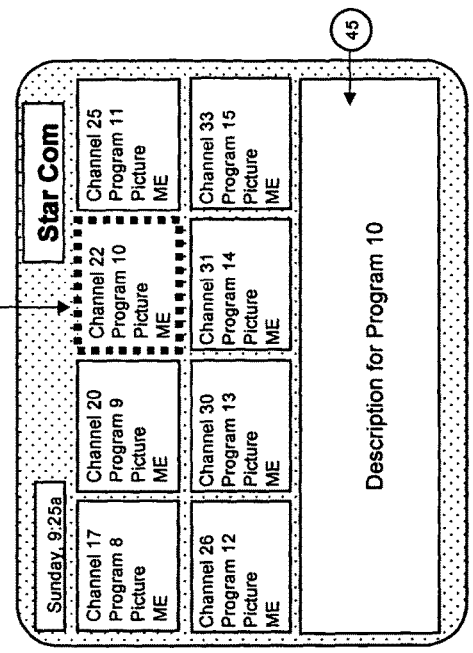
Figure 113D:
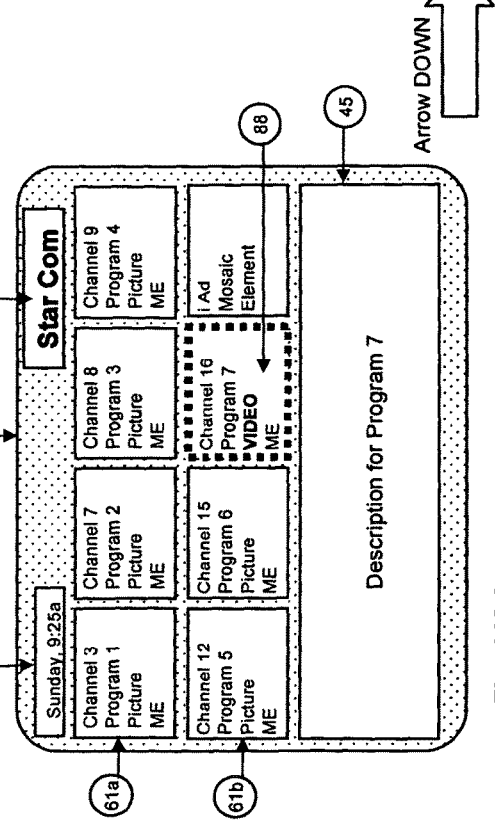
Figure 116B:
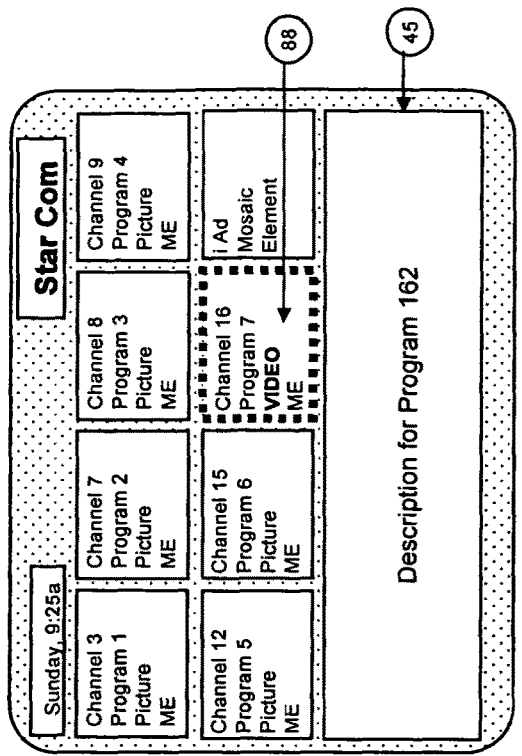
Figure 116A:
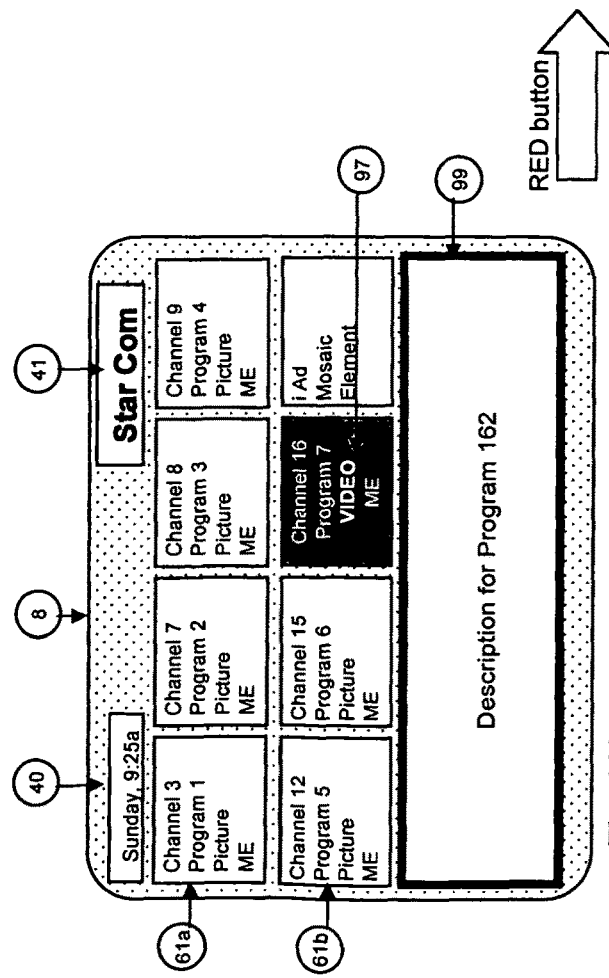
Figures 117A, 117B:
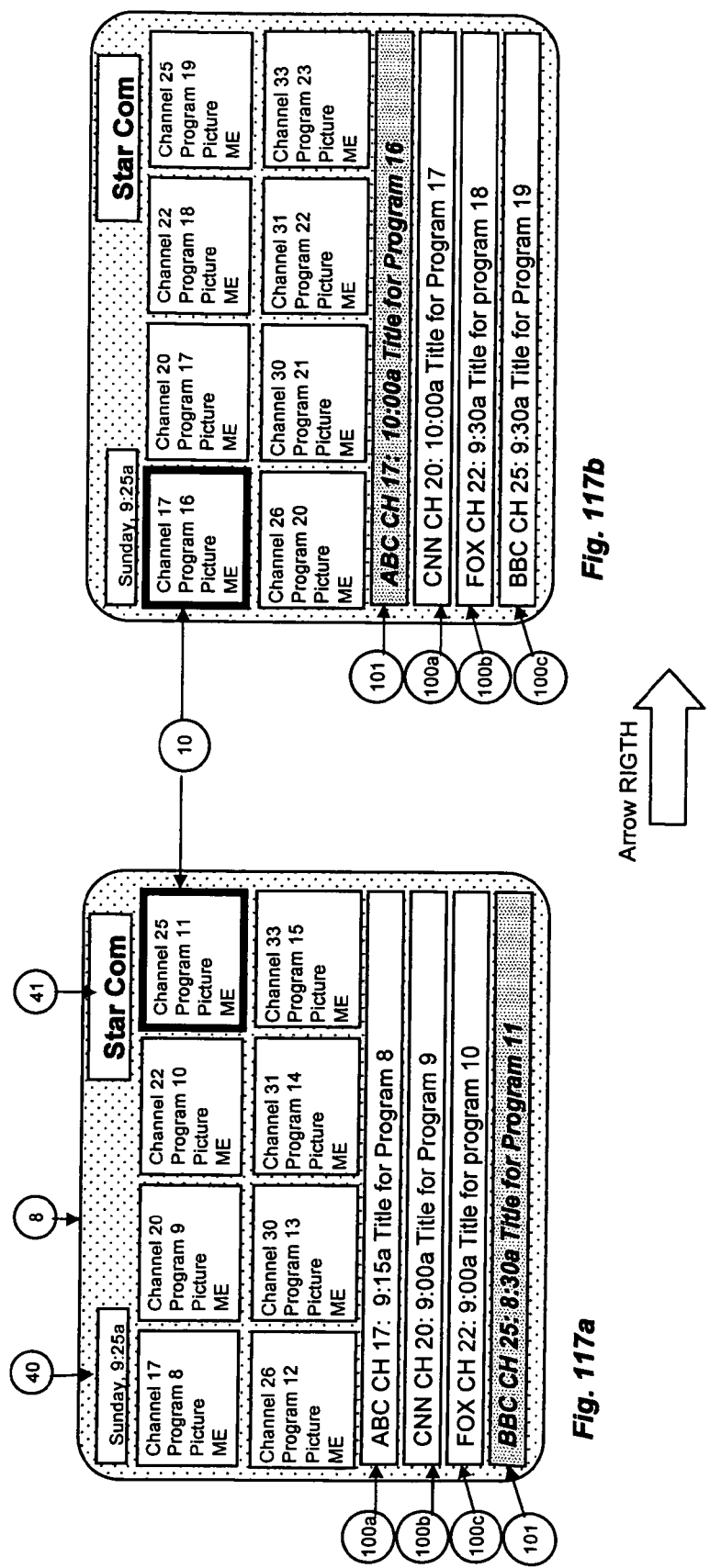

FIG. 90 shows example of UI and navigation of DMXEPG created for specific content category (Kids)

FIG. 91*a* shows example of UI and navigation of DMXEPG portal

FIG. 91*b*, 91*c*, 91*d* show DMXEPG UI navigation within specific content category FIG. 92*a*, 92*b*, 92*c*, 92*d* show DMXEPG UI navigation and program information following changes in focus of MEs.

FIG. 93 shows UI and navigation of DMXEPG of future programs

Figures 119A, 119B:
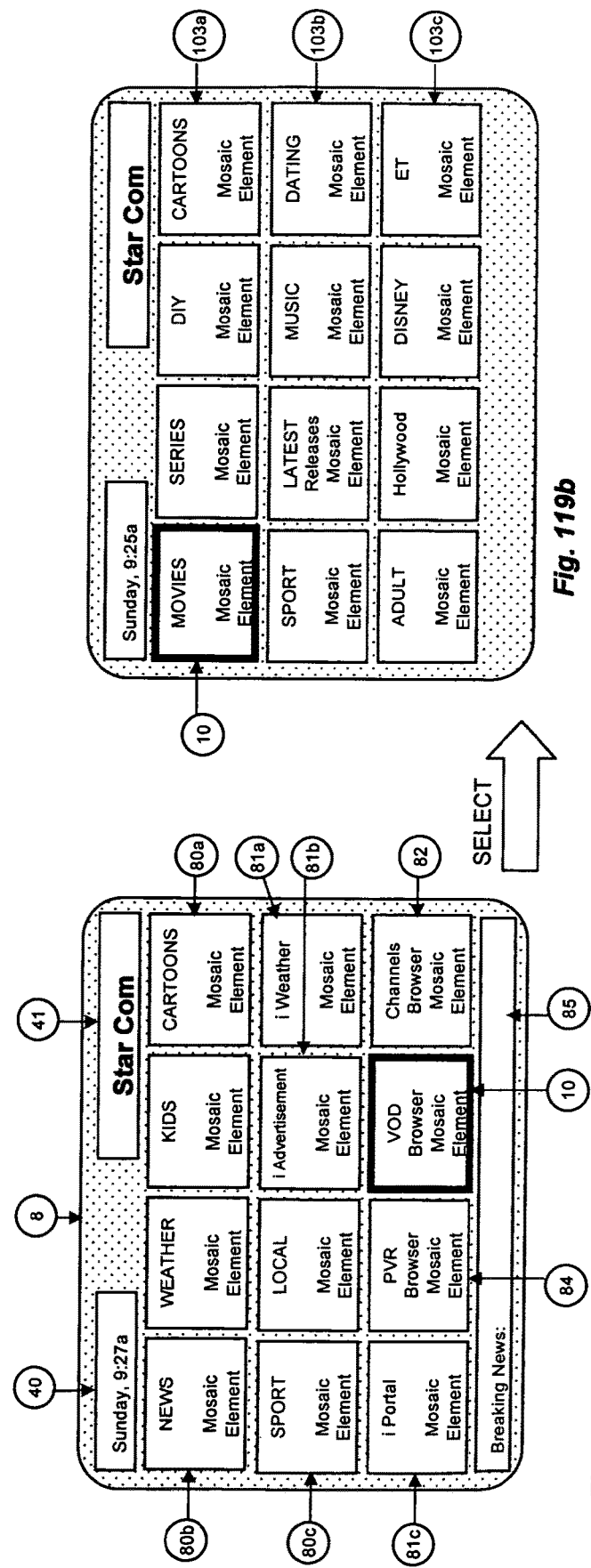
FIG. 119 shows how VOD portal is built with ME.
Figure 120B:
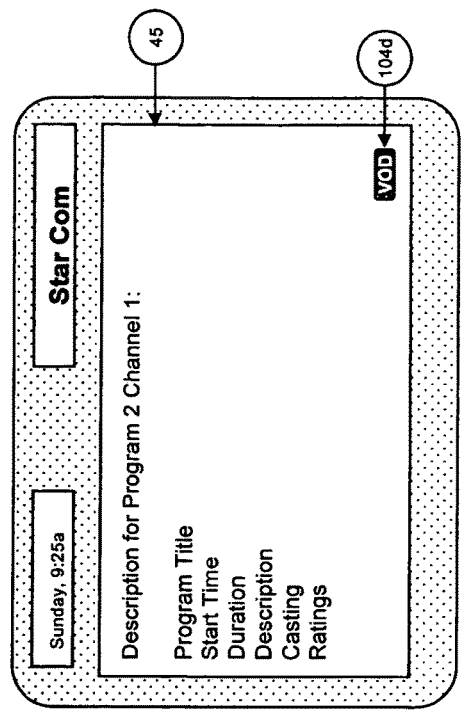
FIGS. 120 and 121 show how availability of the same or similar content on VOD system can be indicated in DMXEPG ME as well as grid based EPG.
Figure 120D:
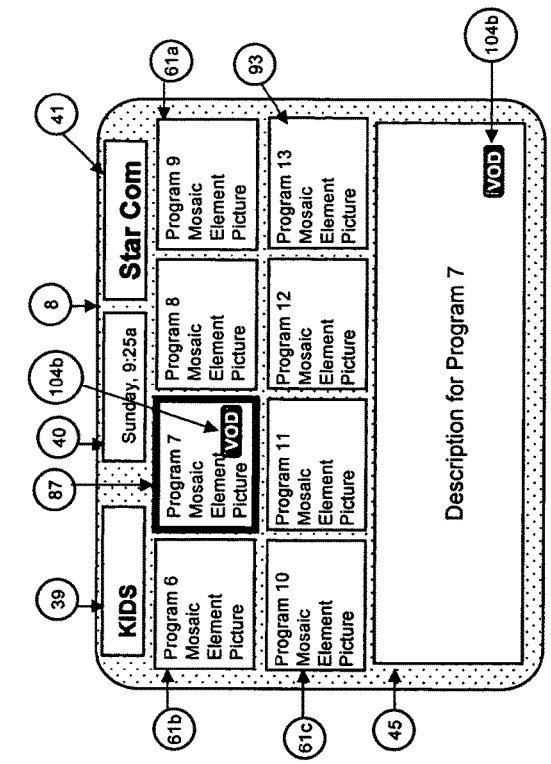
Figure 120A:
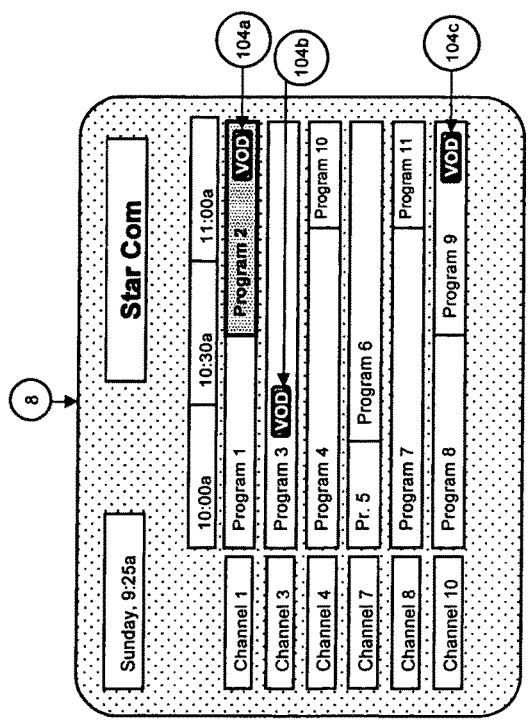
Figure 120C:
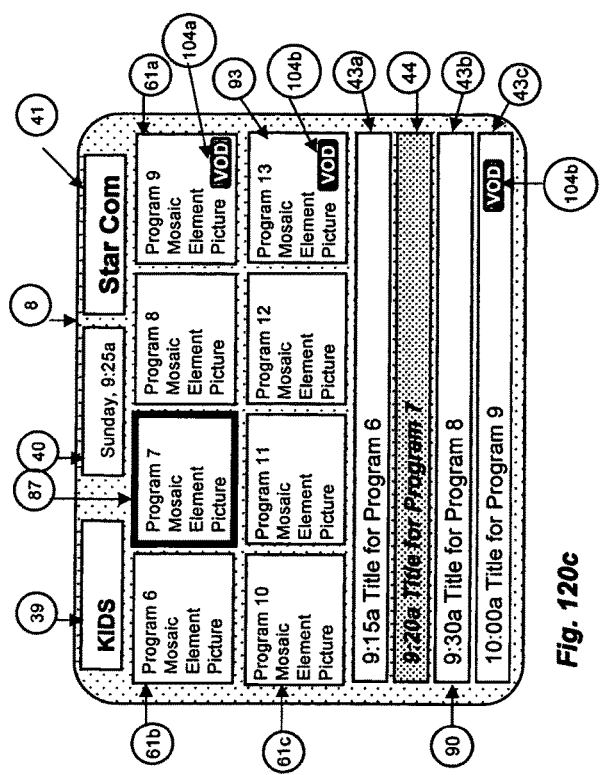
Figure 121A:
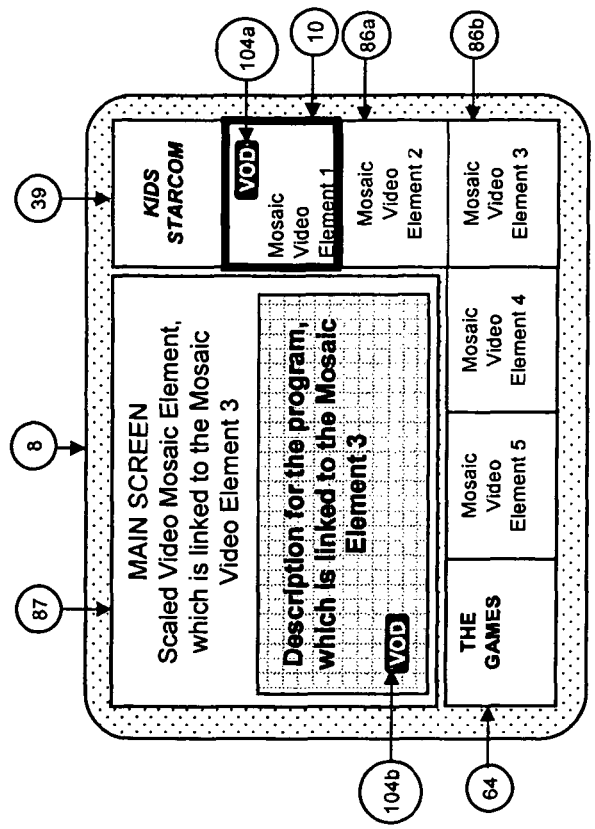
Figure 121B:
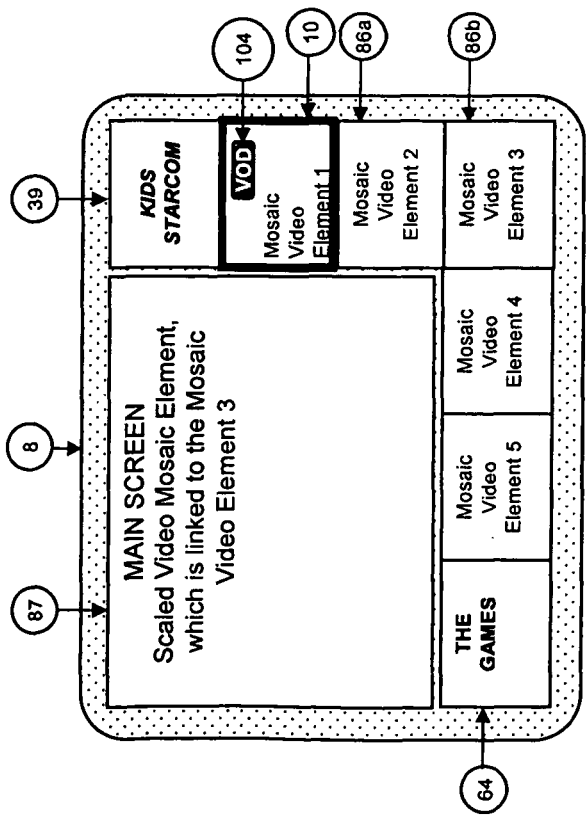
Figure 122:
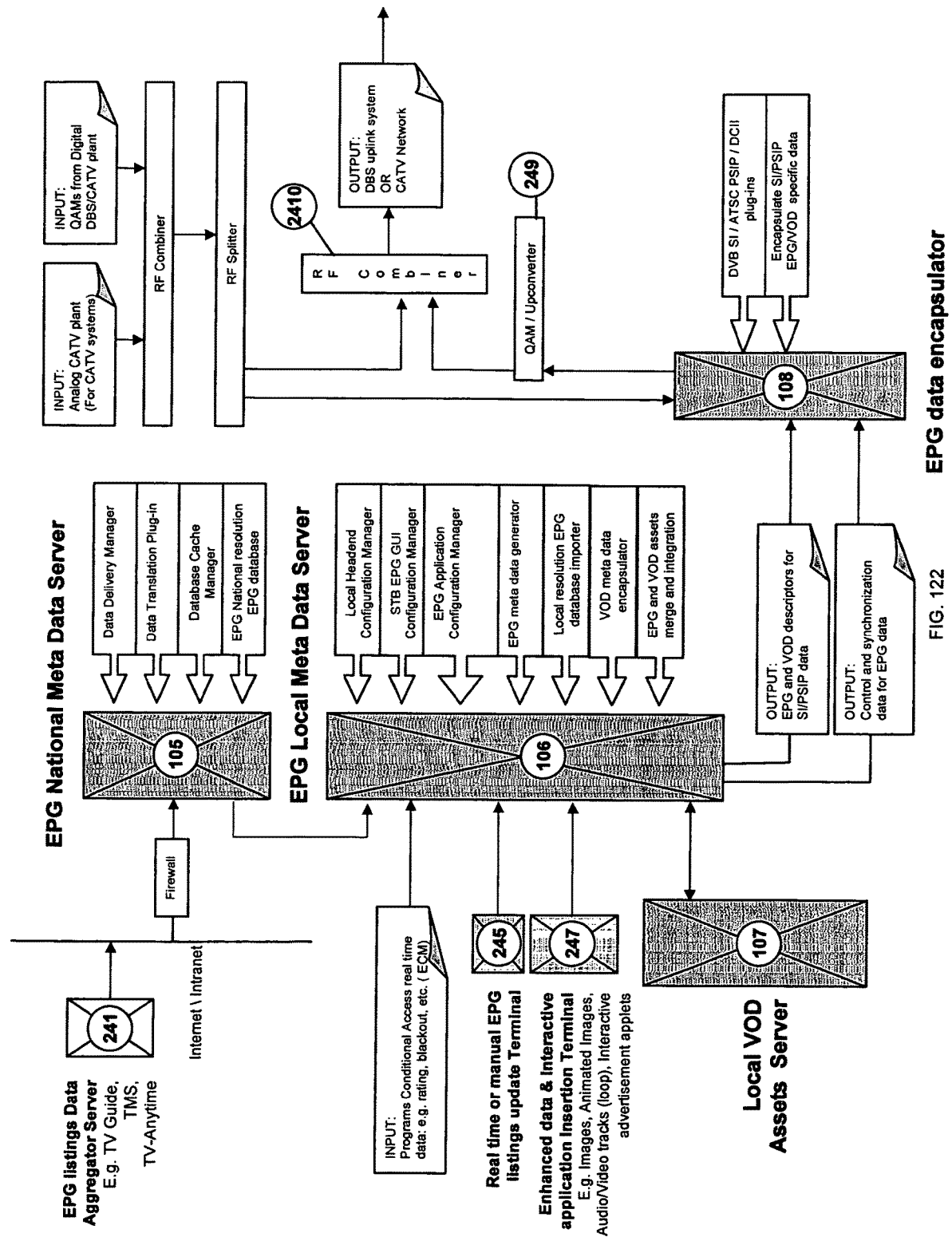
FIG. 122 shows a diagram describing process of encapsulation of VOD program metadata into DMXEPG metadata.
Figure 123:
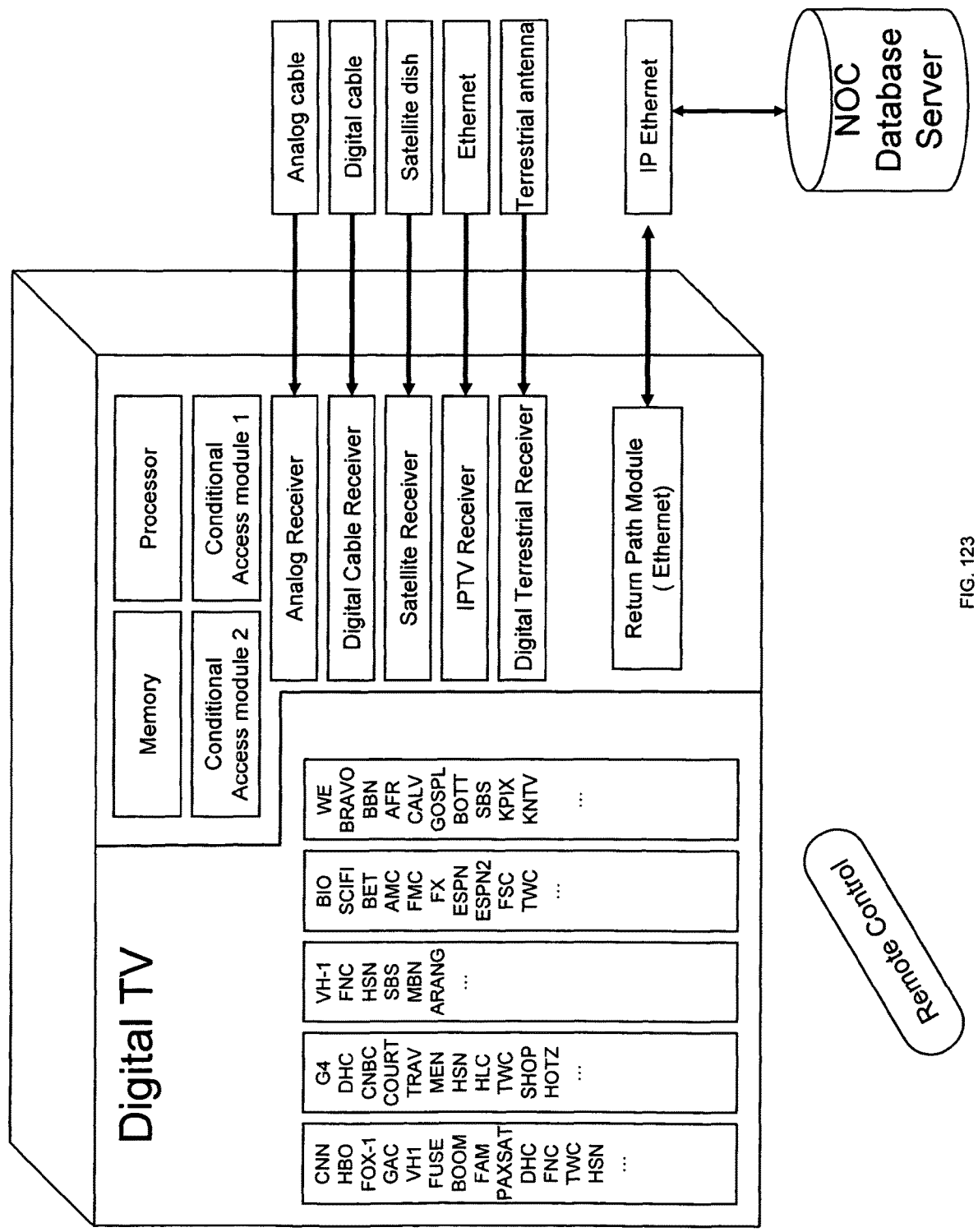
FIG. 123 shows a system that merges metadata for programs supplied by multiple digital TV service providers.
Figure 124:
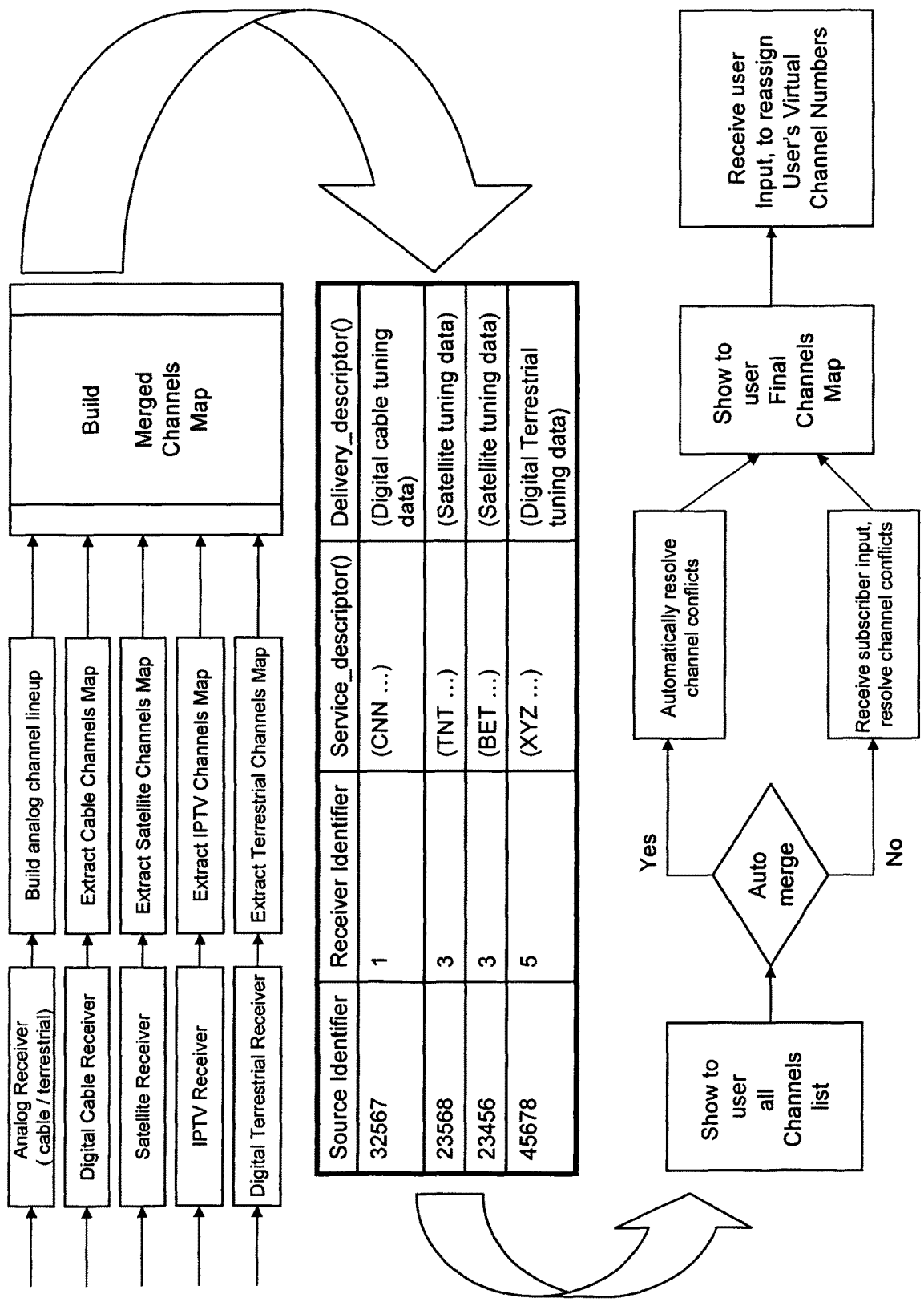
FIG. 124 shows a system that allows subscribers to select channel auto merge or perform manual channel merge for channels delivered over multiple networks.
Figure 125:
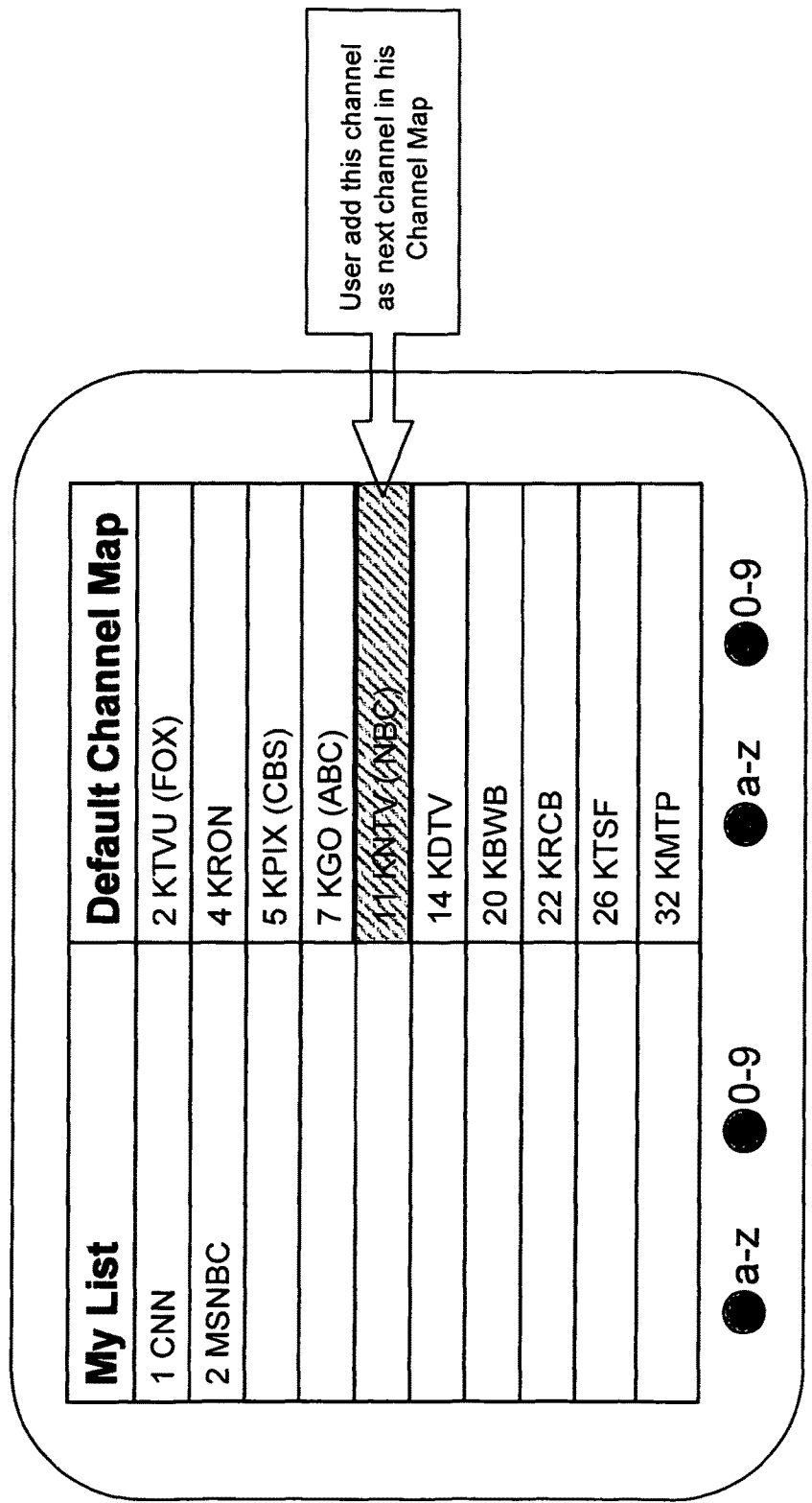
FIGS. 125, 126 show a UI subscriber can access to perform manual merge of channels delivered over multiple networks.
Figure 126:
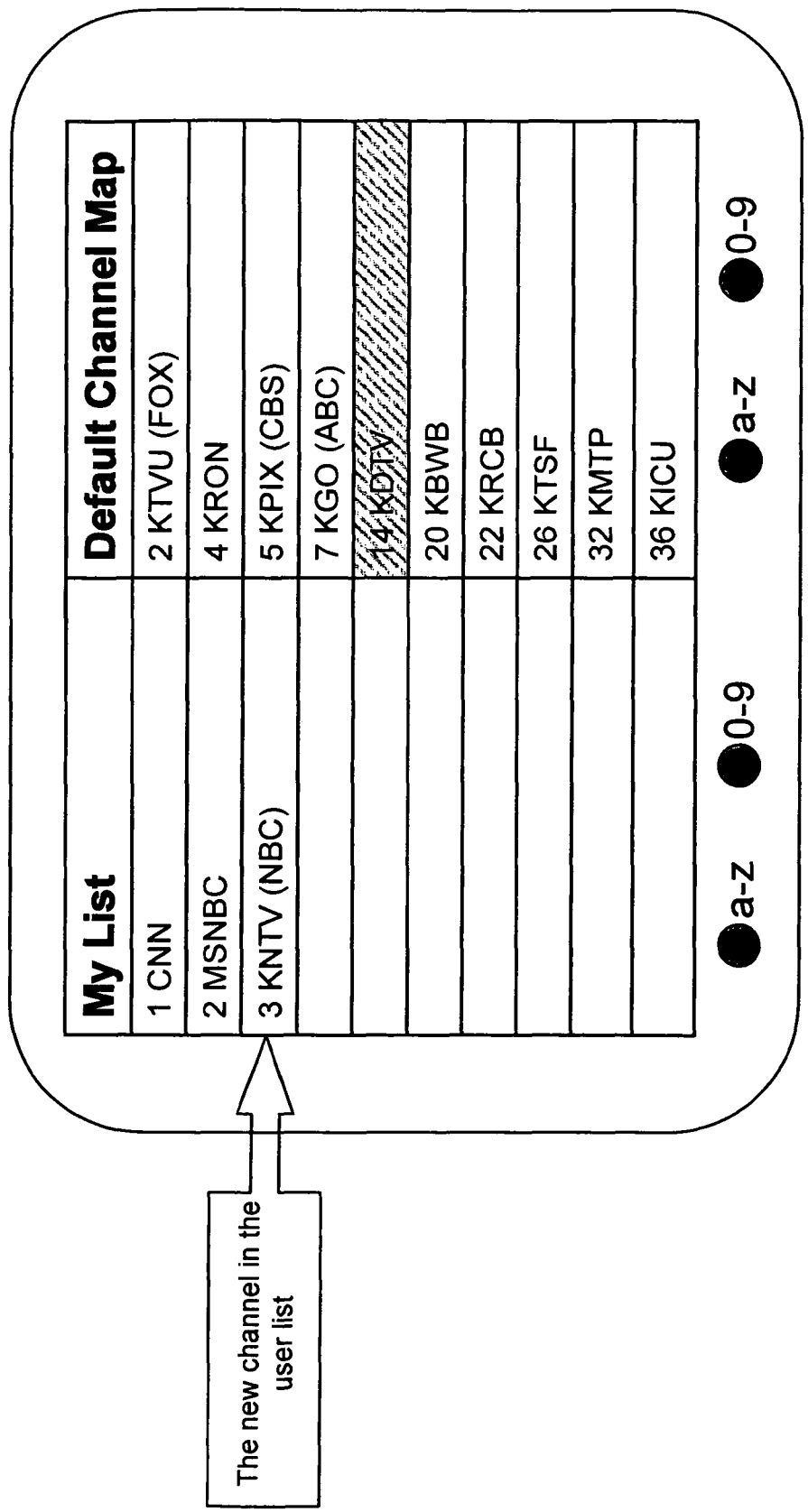

FIG. 94 shows option of enlarging selected ME to larger portion of the screen and the full screen FIG. 95, 96 shows UI and navigation of DMXEPG in program information display mode when some ME display trailers one ME is in focus and optionally continue to play trailers when focus moves to another ME FIG. 97 shows UI and navigation of DMXEPG in program information display mode FIG. 98-109 show UI and navigation of DMXEPG in channel browsing mode FIG. 110-112 show zoom in and zoom out of ME in DMXEPG in show browsing mode FIG. 113-117 show UI and navigation of DMXEPG in channel browsing mode FIG. 118 shows DMXEPG ability to enter PVR content browsing mode FIG. 119 shows how VOD portal is built with ME FIG. 120-121 shows how availability of the same or similar content on VOD system can be indicated in DMXEPG ME as well as grid based EPG FIG. 122 shows a diagram describing process of encapsulation of VOD program metadata into DMXEPG metadata FIG. 123 shows a system that merges metadata for programs supplied by multiple digital TV service providers FIG. 124 shows a system that allows subscribers to select channel auto merge or perform manual channel merge for channels delivered over multiple networks FIG. 125, 126 show UI subscriber can access to perform manual merge of channels delivered over multiple networks FIG. 127 shows how subscriber can tune to the desired channel using channel name (for example CNN, HBO, etc) or its mnemonic representation using telephone keypad—letter association.

Figure 128:
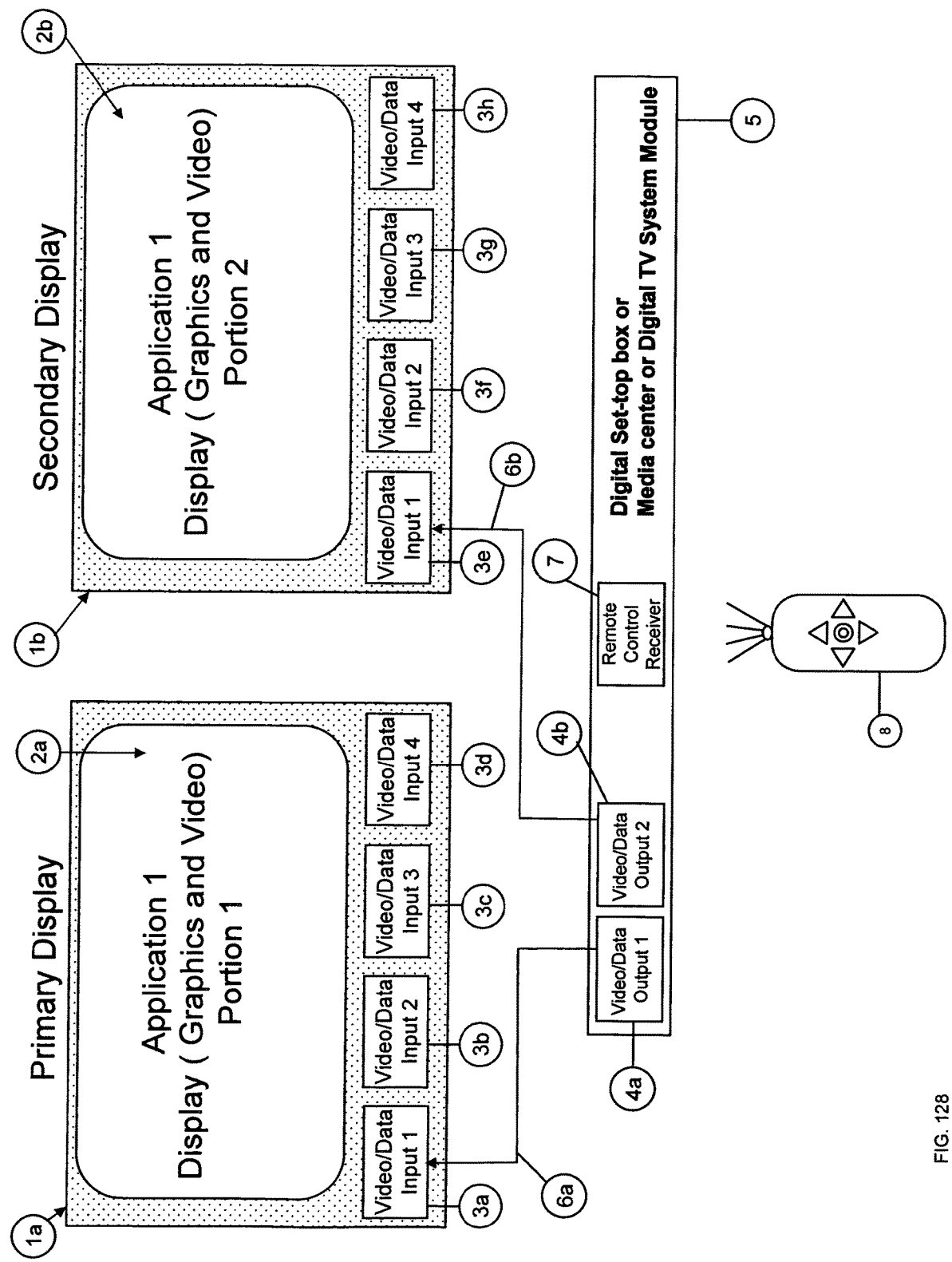
FIG. 128 shows set top box with the application that can utilize more than one display for video output, graphics output, or their combination.

FIG. 128 shows set top box with the application that can utilize more than one display for video output, graphics output, or their combination.

Figure 129:
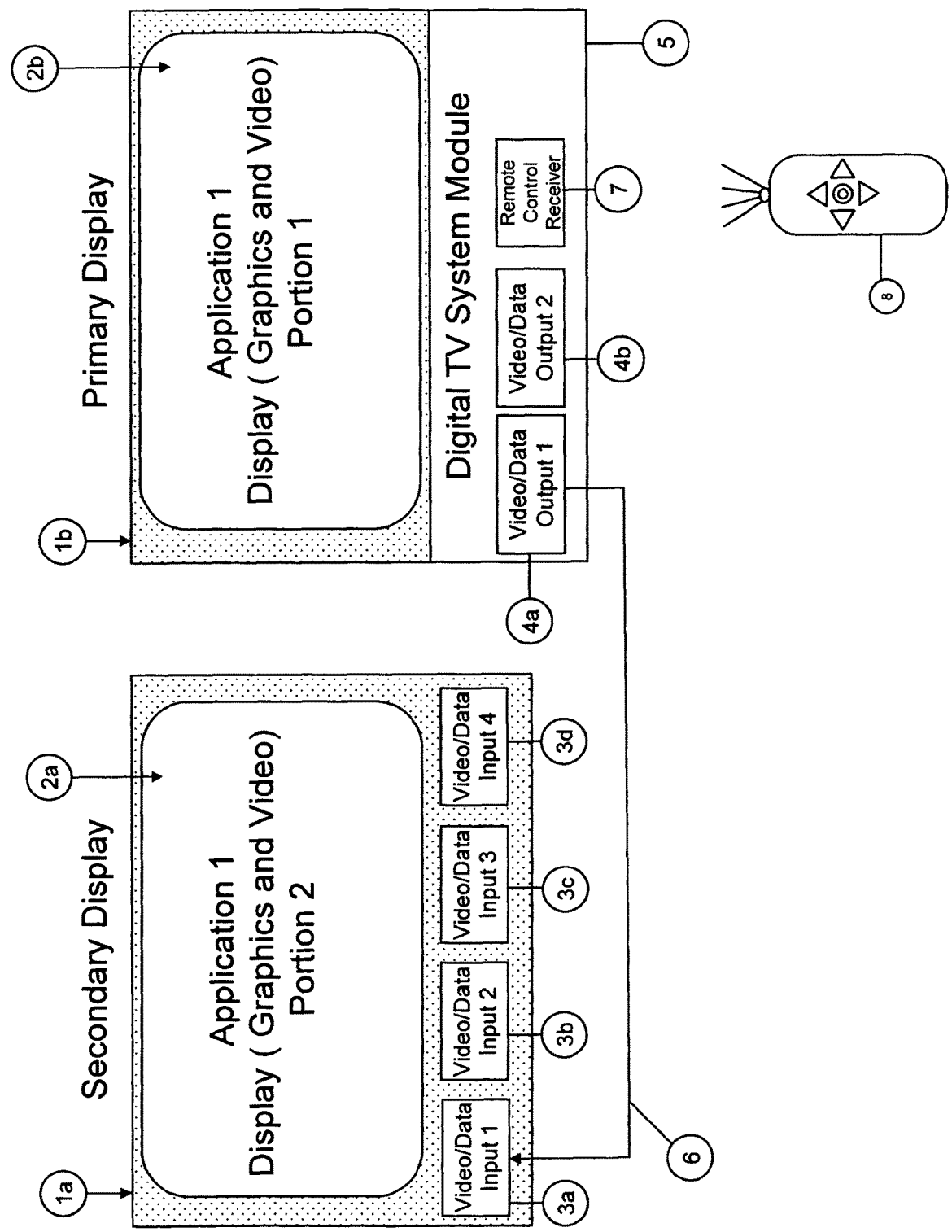
FIG. 129 shows a digital TV set with the application that can utilize more than one display for video output, graphics output, or their combination.

FIG. 129 shows digital TV set with the application that can utilize more than one display for video output, graphics output, or their combination.

Figure 130:
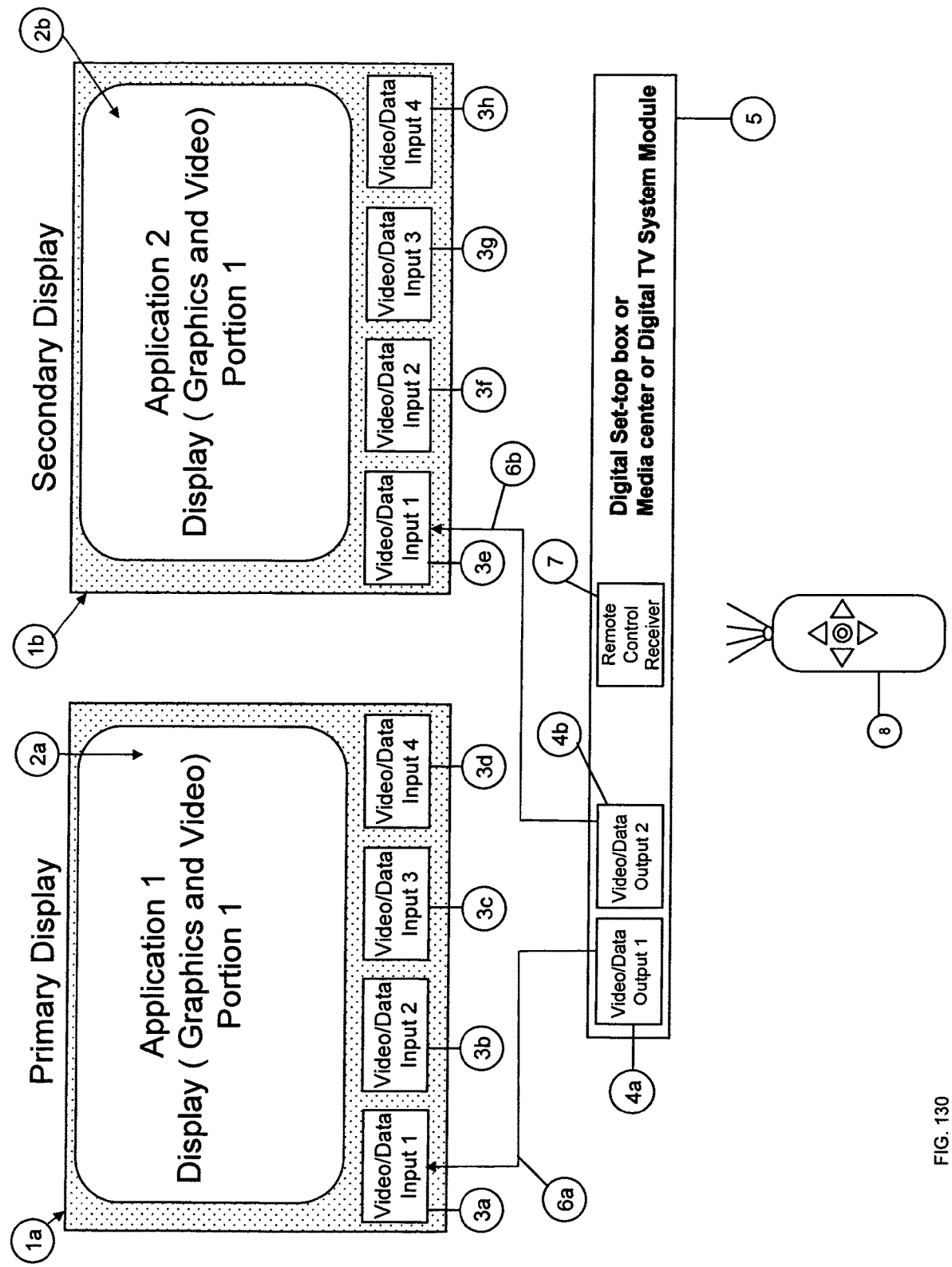
FIG. 130 shows set top box that runs two applications each of which is using separate display for video output, graphics output, or their combination.

FIG. 130 shows set top box that runs two applications each of which is using separate display for video output, graphics output, or their combination.

Figure 131:
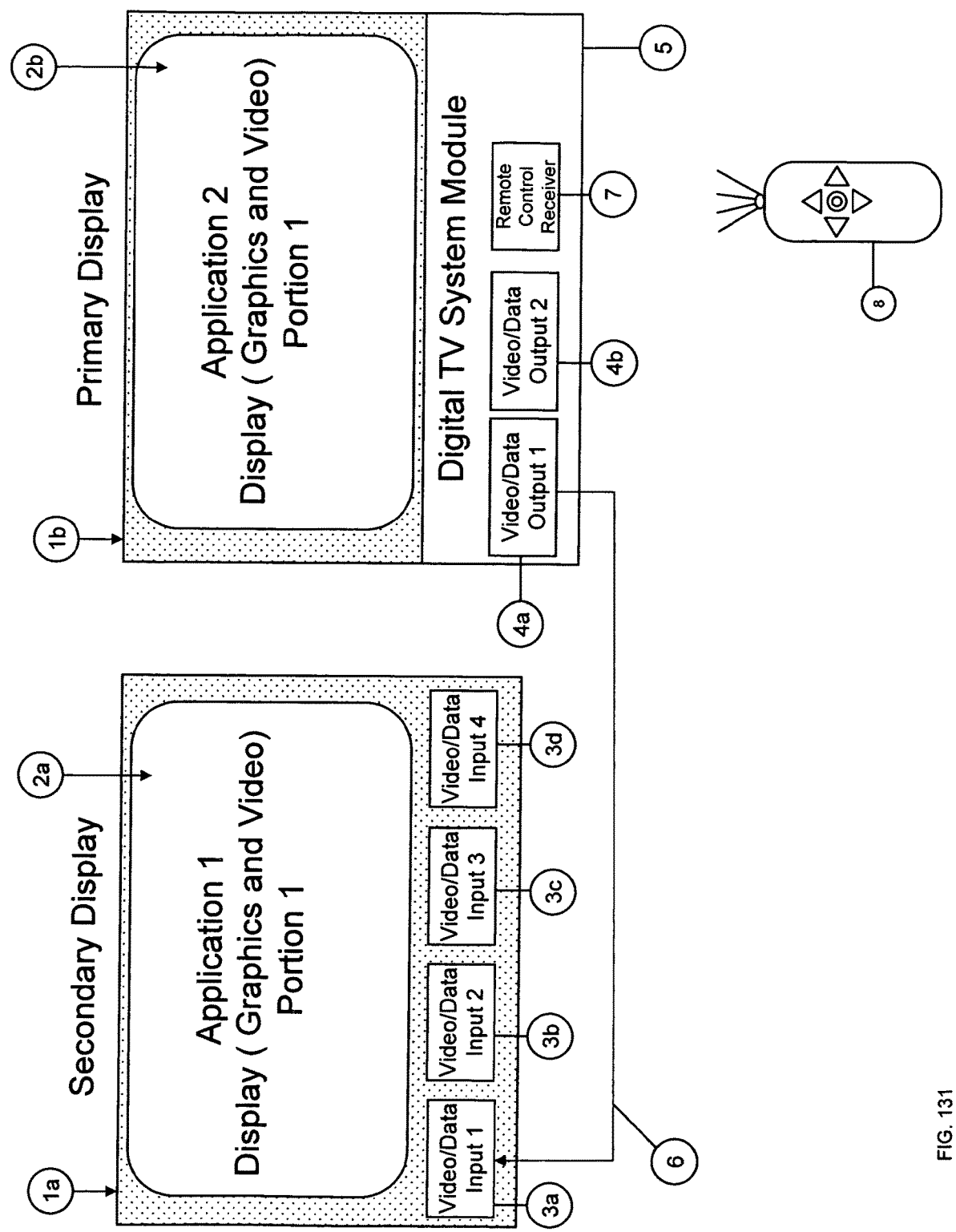
FIG. 131 shows digital TV set that runs two applications each of which is using separate display for video output, graphics output, or their combination.

FIG. 131 shows digital TV set that runs two applications each of which is using separate display for video output, graphics output, or their combination.

Figure 132:
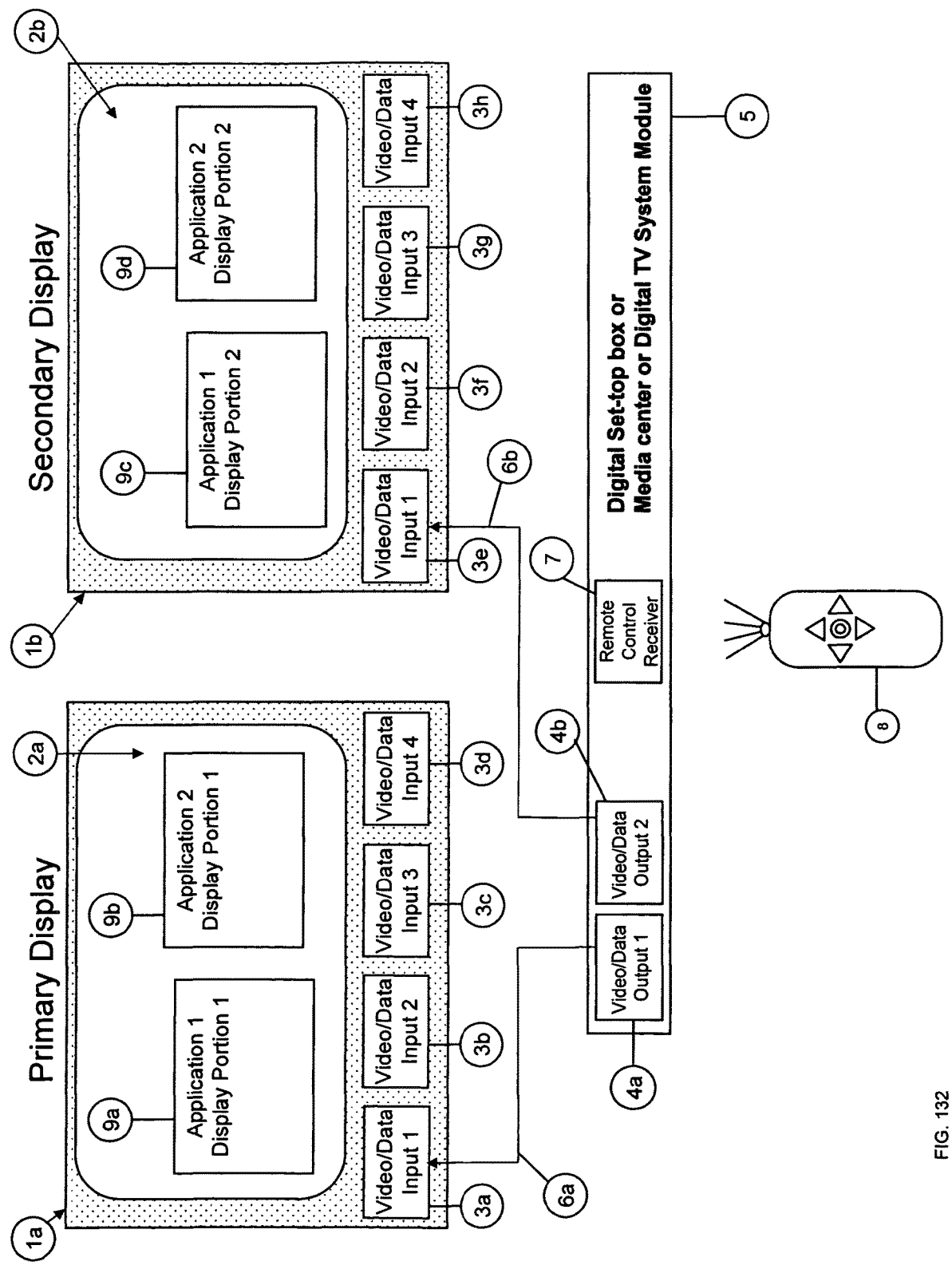
FIG. 132 shows set top box that runs two applications each of which is using a portion of multiple displays for video output, graphics output, or their combination.

FIG. 132 shows set top box that runs two applications each of which is using a portion of multiple displays for video output, graphics output, or their combination.

Figure 133:
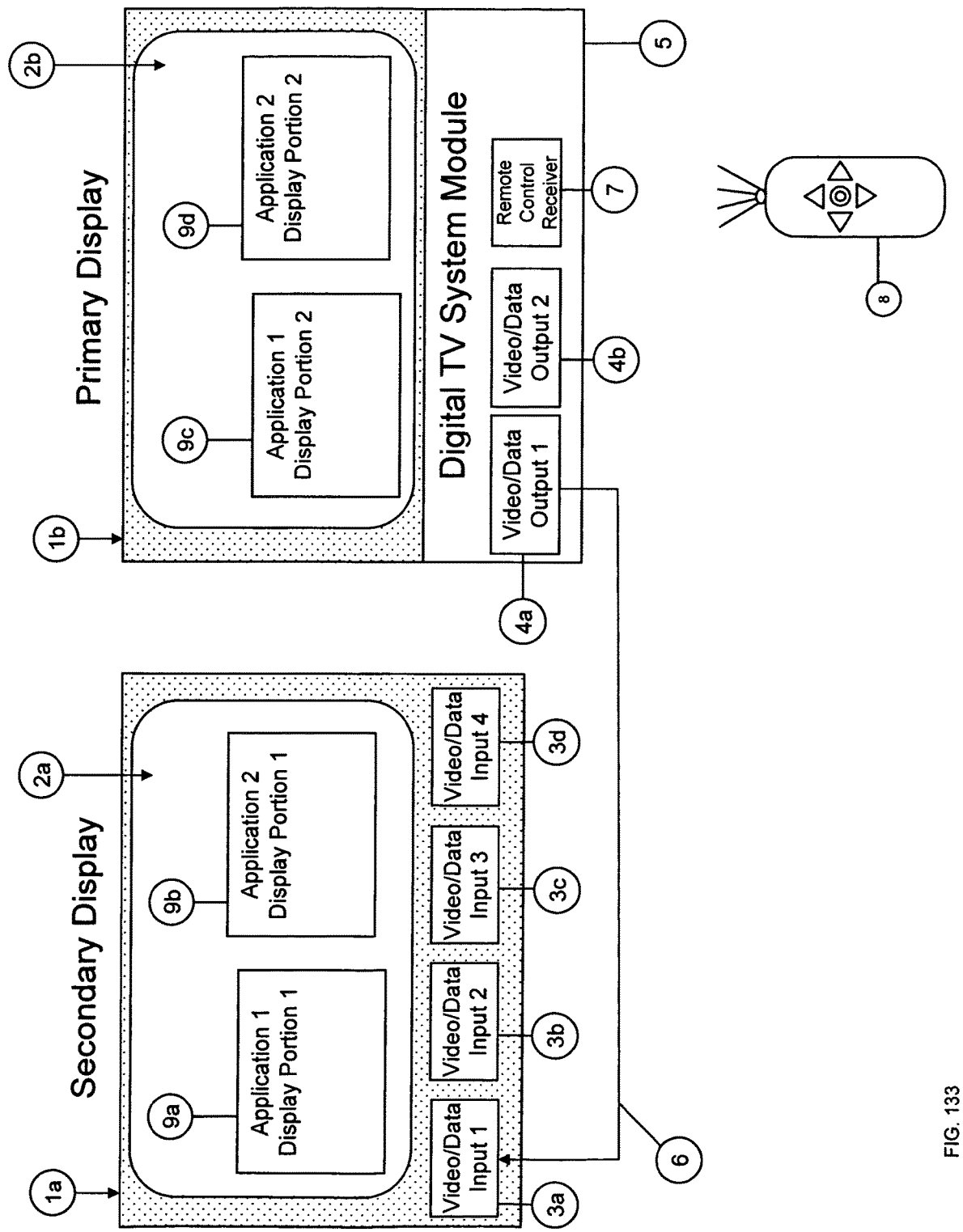
FIG. 133 shows digital TV set that runs two applications each of which is using a portion of multiple displays for video output, graphics output, or their combination.

FIG. 133 shows digital TV set that runs two applications each of which is using a portion of multiple displays for video output, graphics output, or their combination.

Figure 134:
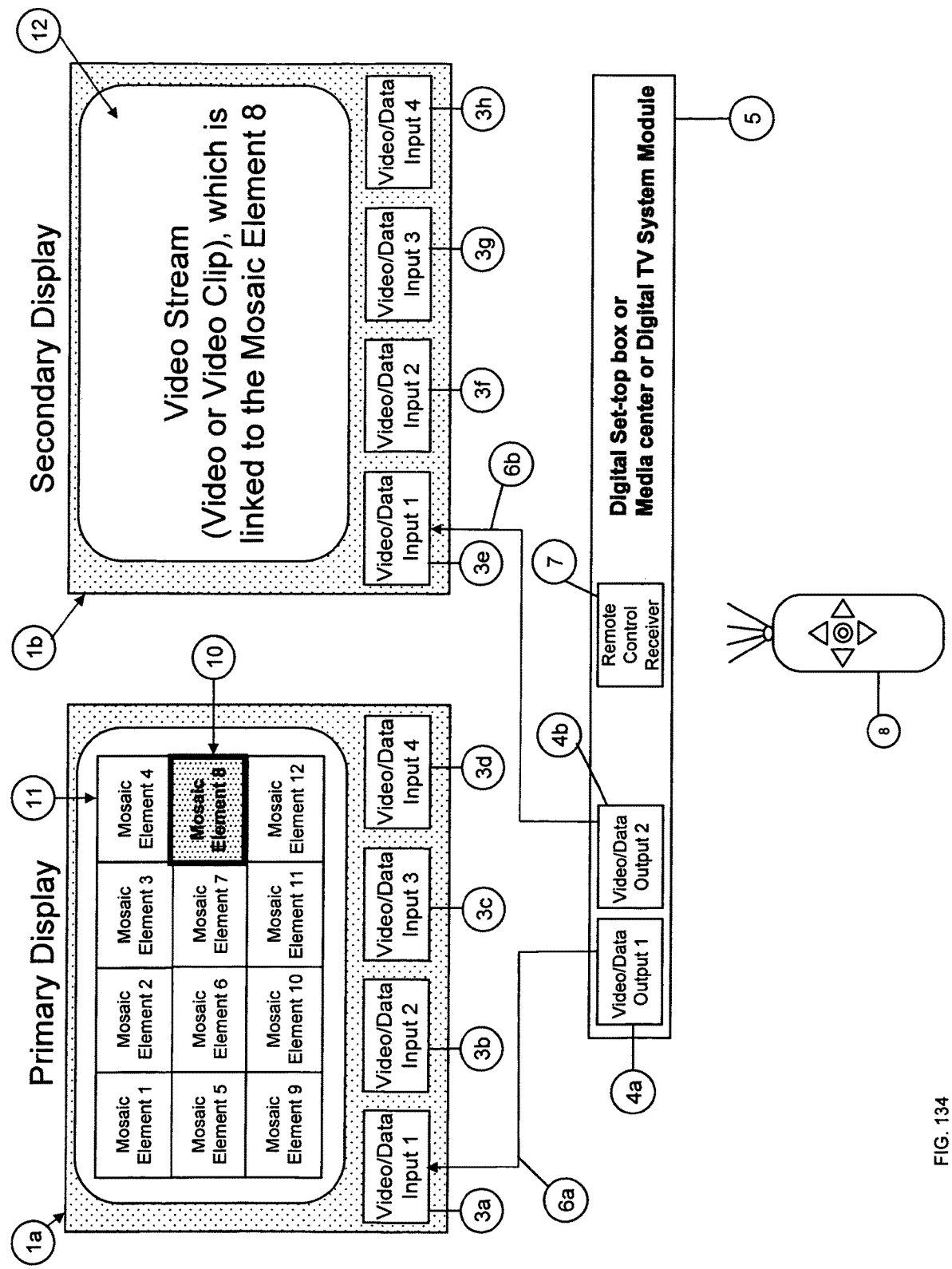
FIGS. 134-137 show examples of multi screen applications according to various aspects of the present invention.

FIG. 134 shows example of multi screen application for set top box where the Mosaic portion is directed by DMXEPG application to the Video/Data Output 1 (Secondary Display) and the Full screen Video stream is directed by DMXEPG application to the Video/Data Output 2 (Primary Display)

Figure 135:
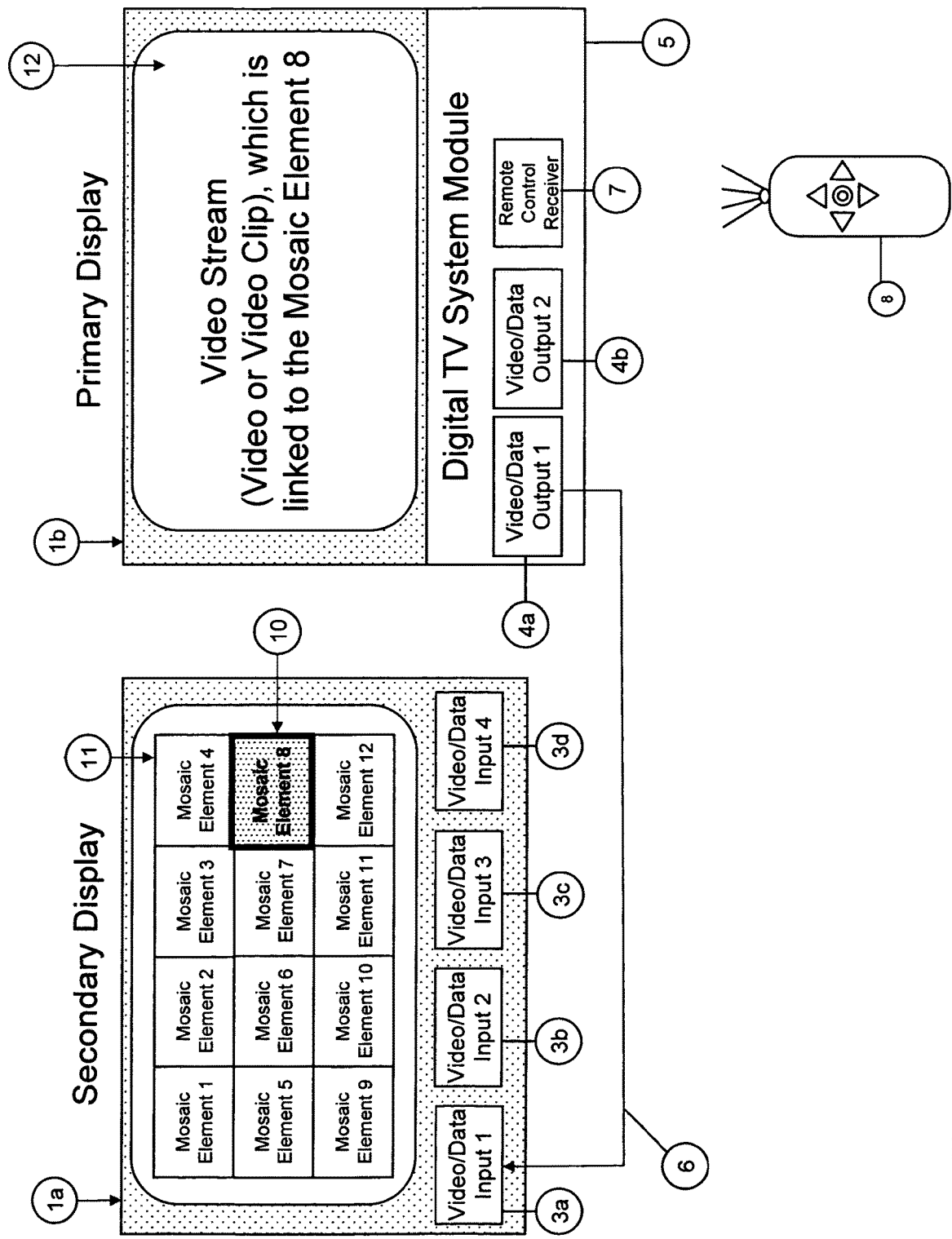

FIG. 135 shows example of multi screen application for digital TV set where the Mosaic portion is directed by DMXEPG application to the Video/Data Output 1 (Secondary Display) and the Full screen Video stream is directed by DMXEPG application to the Video/Data Output 2 (Primary Display)

Figure 136:
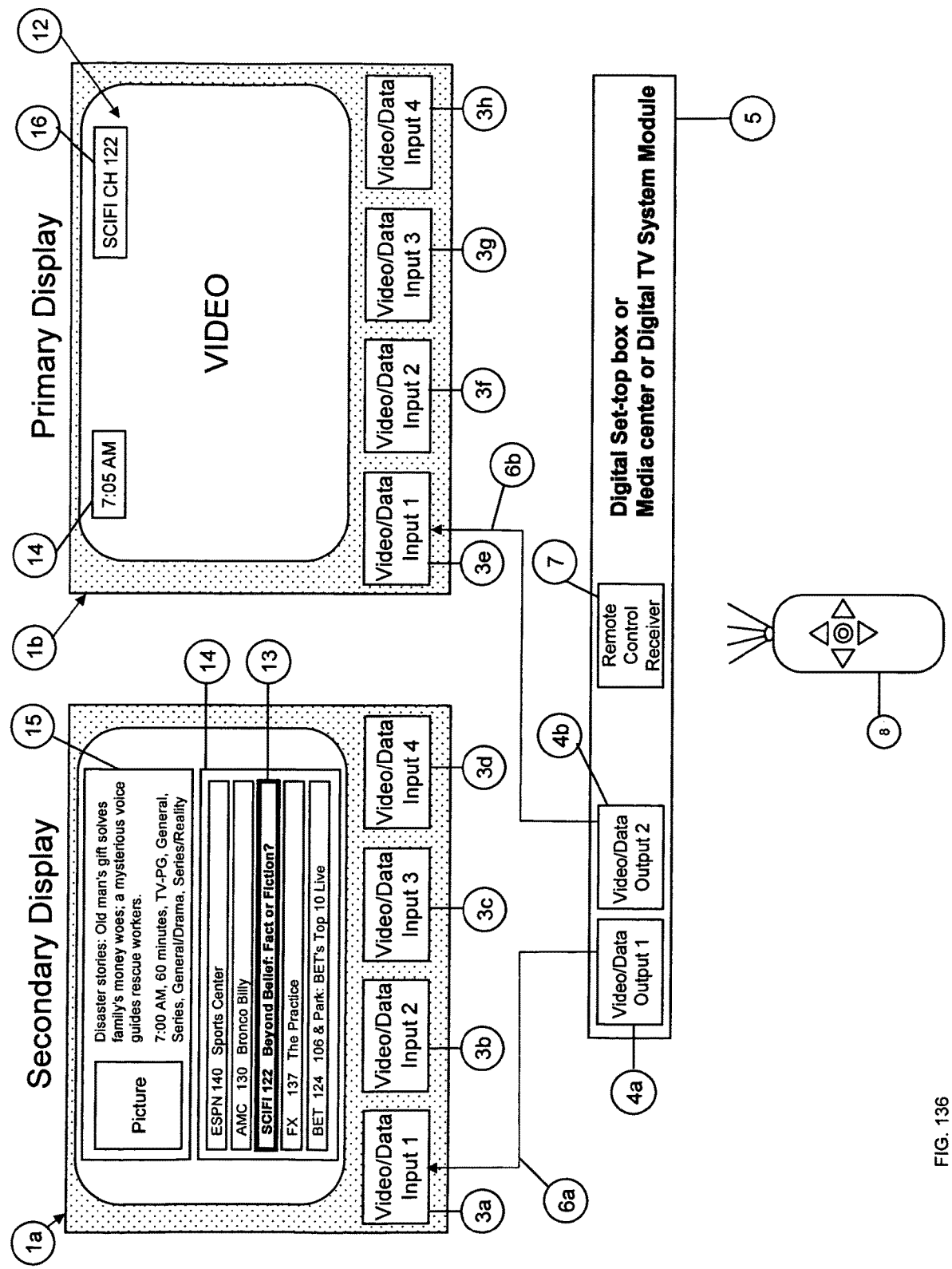

FIG. 136 shows example of multi screen application for set top box where the EPG is directed to the Video/Data Output 1 (Secondary Display) and the Full screen Video stream is directed by application to the Video/Data Output 2 (Primary Display)

Figure 137:
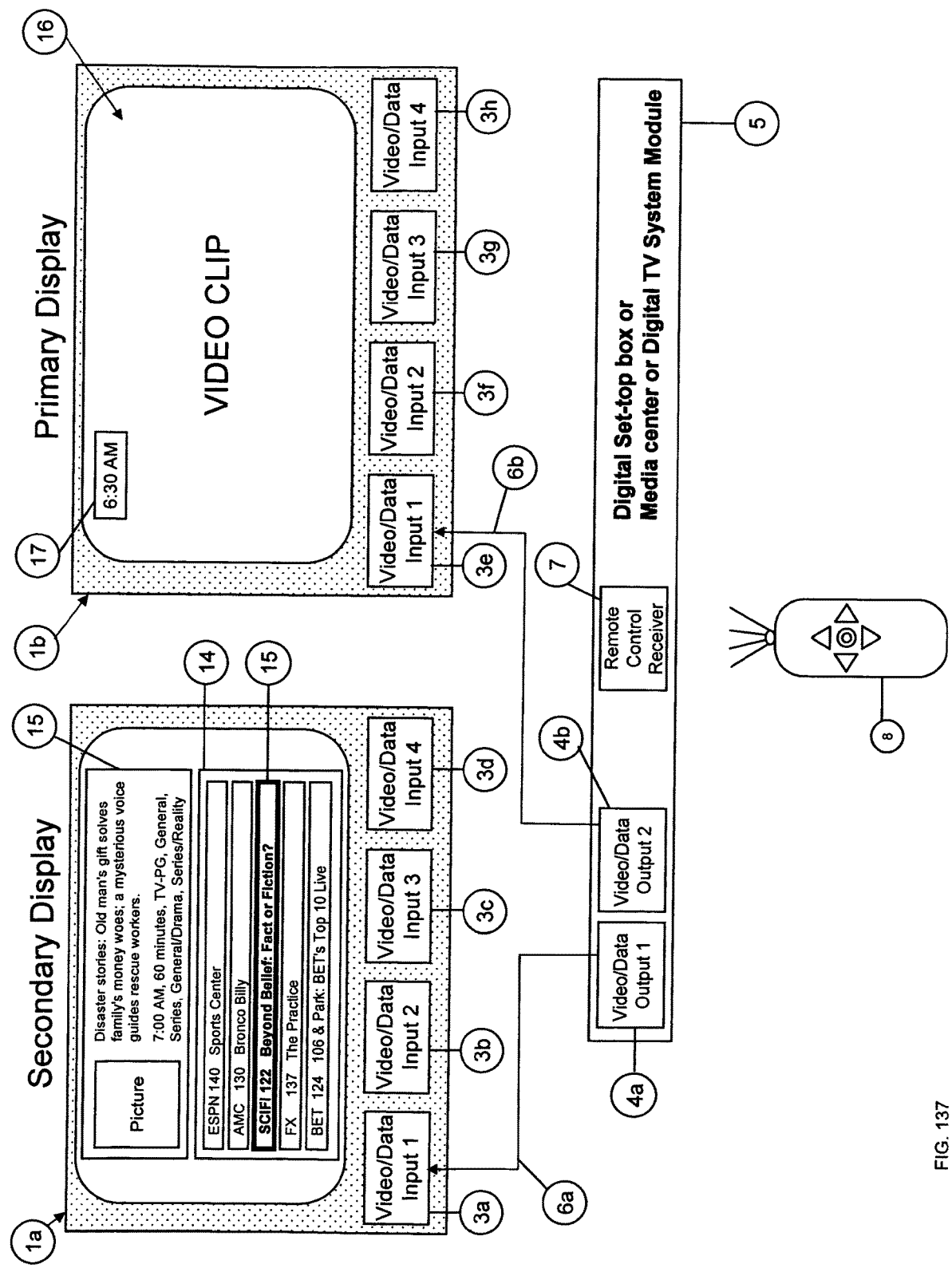

FIG. 137 shows example of multi screen application for set top box where the EPG is directed to the Video/Data Output 1 (Secondary Display) and the Full screen video clip for future program is directed by application to the Video/Data Output 2 (Primary Display)

Figure 138:
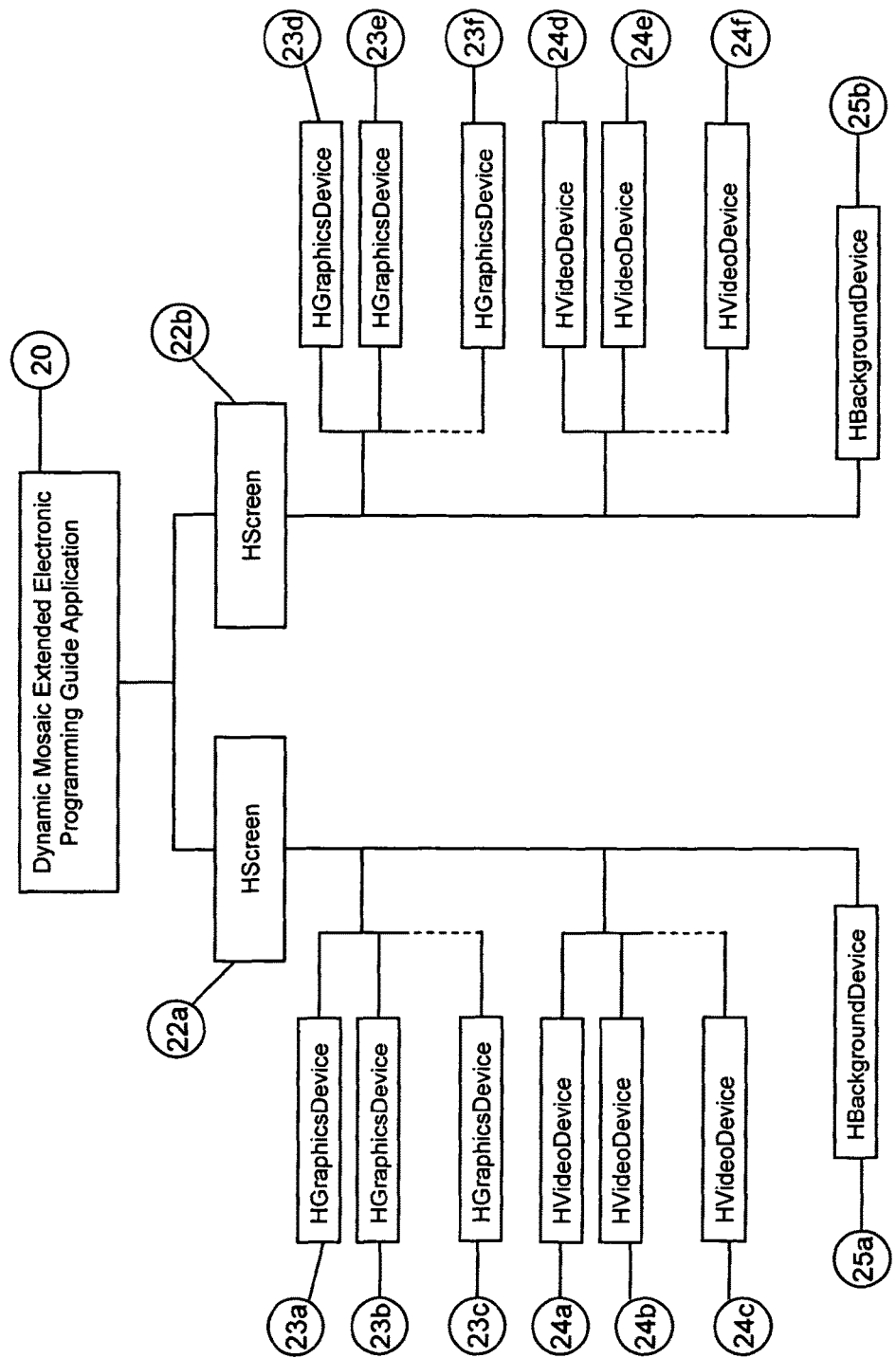
FIGS. 138 and 139 show logical structures of DMXEPG for multiple displays.

FIG. 138 shows logical structure of DMXEPG for multiple displays where

21: The instance on DMXEPG application.

22a: The HScreen instance (HScreen class which is defined by HAVi/OCAP/MHP) represents a physical primary display device.

22b: The HScreen instance (HScreen class which is defined by HAVi/OCAP/MHP) represents a physical secondary display device.

23a,23b,23c: The HScreenDevice objects, instances of HGraphicsDevice class (HGraphicsDevice class which is defined by HAVi/OCAP/MHP), represents the graphics layers that belong to the primary display device.

23d,23e,23f: The HScreenDevice objects, instances of HGraphicsDevice class (HGraphicsDevice class which is defined by HAVi/OCAP/MHP), represents the graphics layers that belong to the secondary display device.

24a,24b,24c: The HScreenDevice objects, instances of HVideoDevice class (HVideoDevice class which is defined by HAVi/OCAP/MHP), represents the video layers that belong to the primary display device.

24d,24e,24f: The HScreenDevice objects, instances of HVideoDevice class (HVideoDevice class which is defined by HAVi/OCAP/MHP), represents the video layers that belong to the secondary display device.

25a: The HScreenDevice object, instance of HBackgroundDevice class (HBackgroundDevice class which is defined by HAVi/OCAP/MHP), represents the background layer that belongs to the primary display device.

25b: The HScreenDevice object, instance of HBackgroundDevice class (HBackgroundDevice class which is defined by HAVi/OCAP/MHP), represents the background layer that belongs to the secondary display device.

Figure 139:
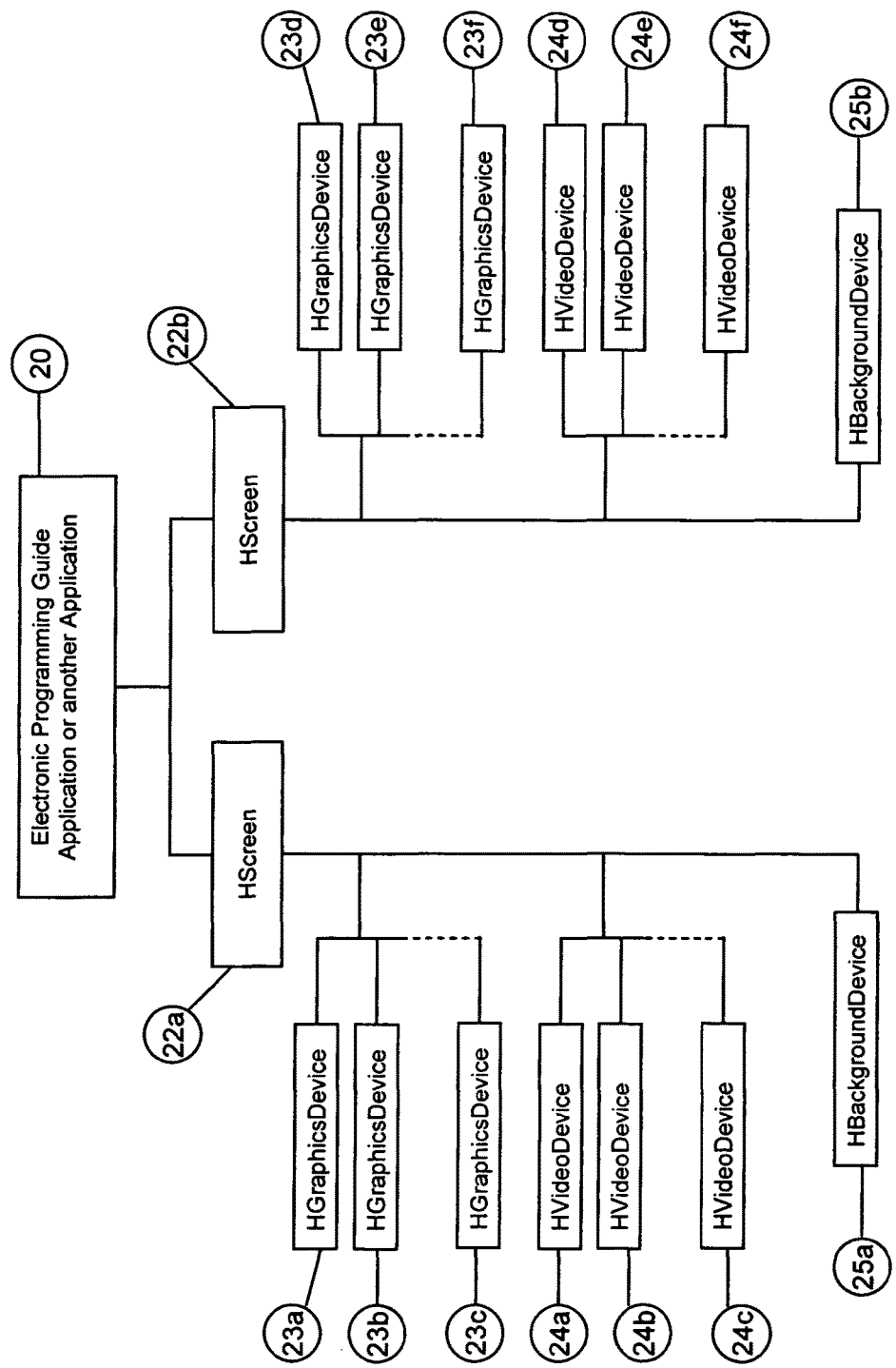
Figure 140:
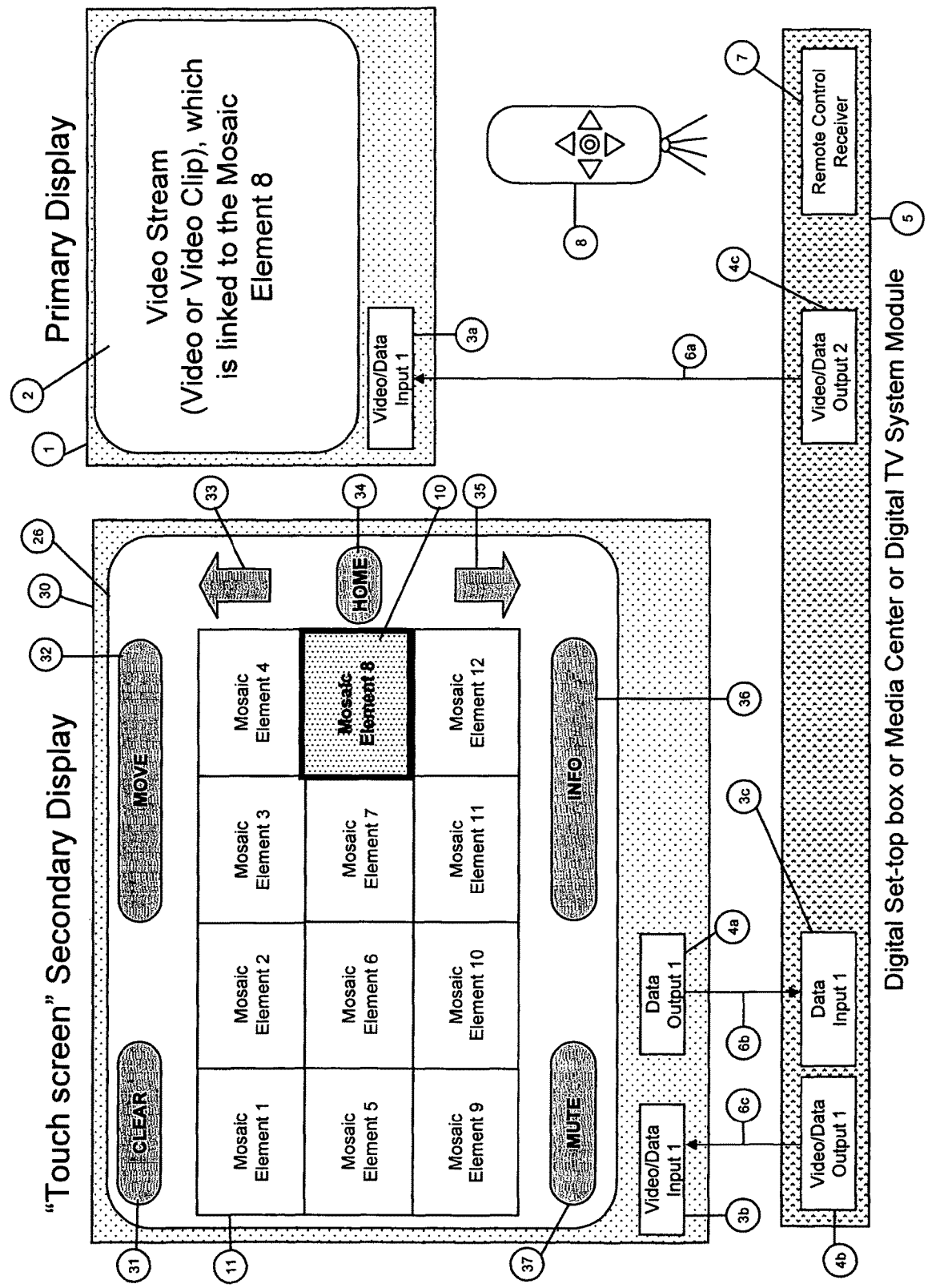
FIGS. 140-148 show system diagrams and UIs for multi-display DMXEPG application implemented with a touch sensitive display.
Figure 141:
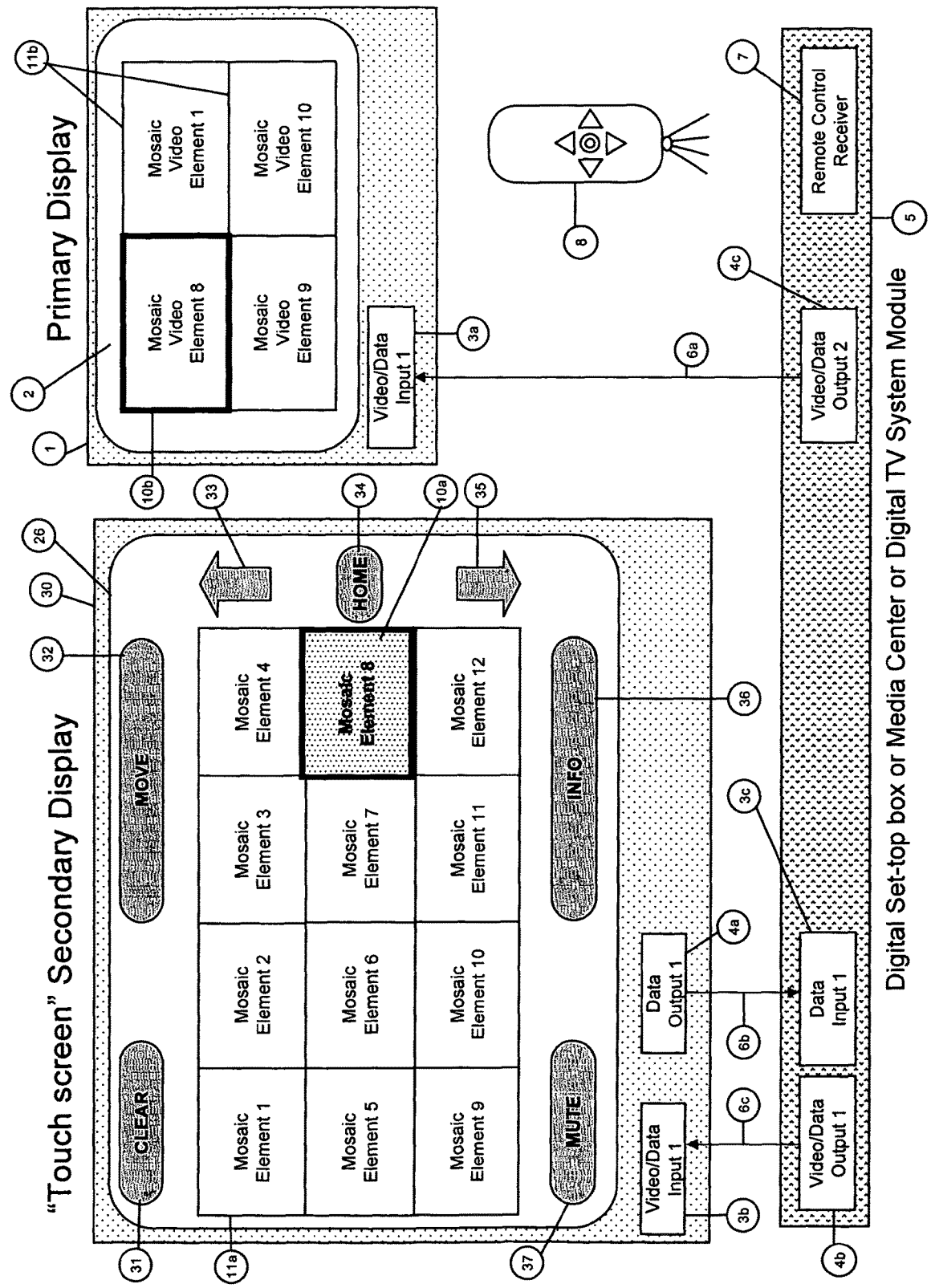
Figure 142:
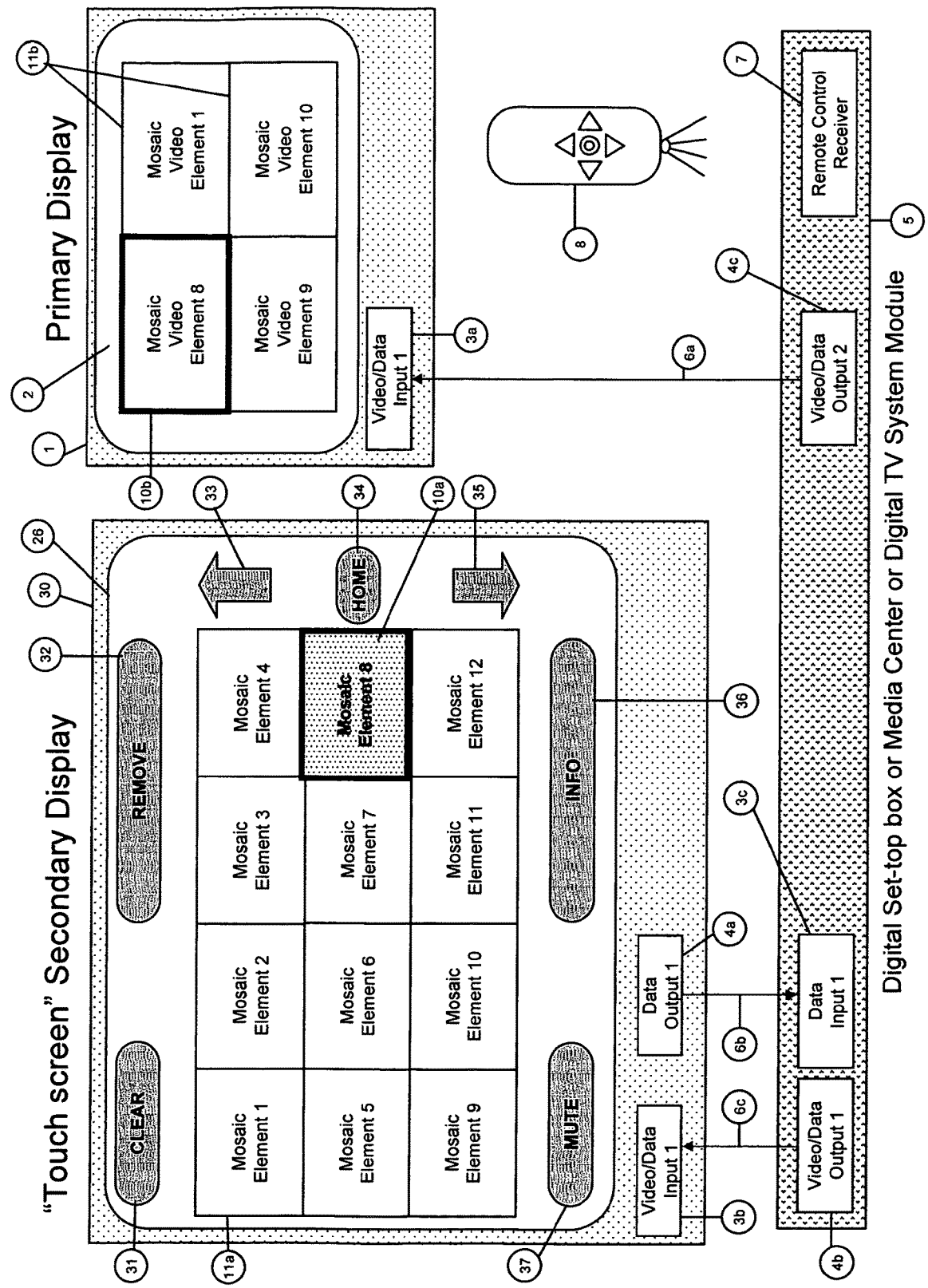
Figure 143:
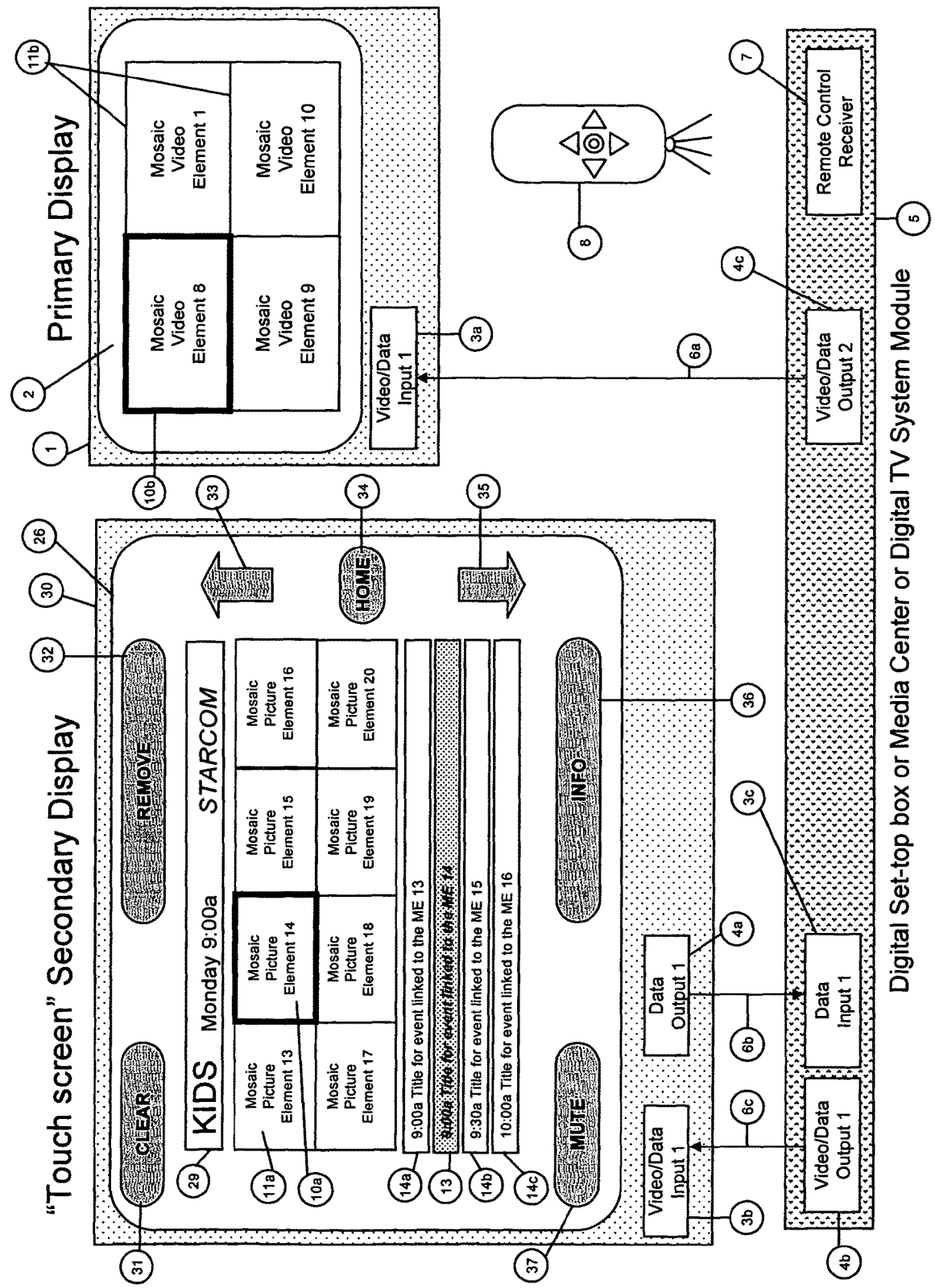
Figure 144:
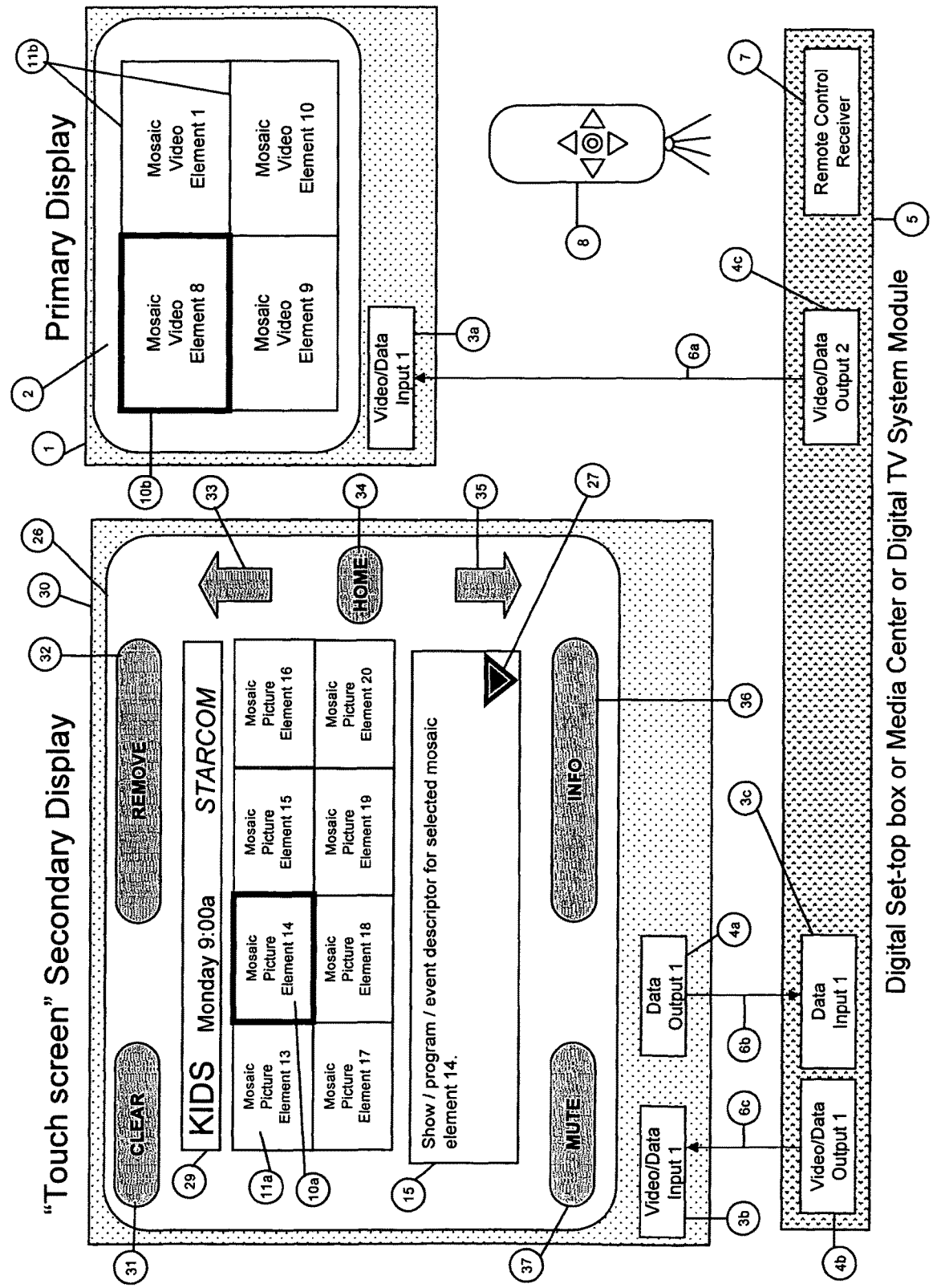
Figure 145:
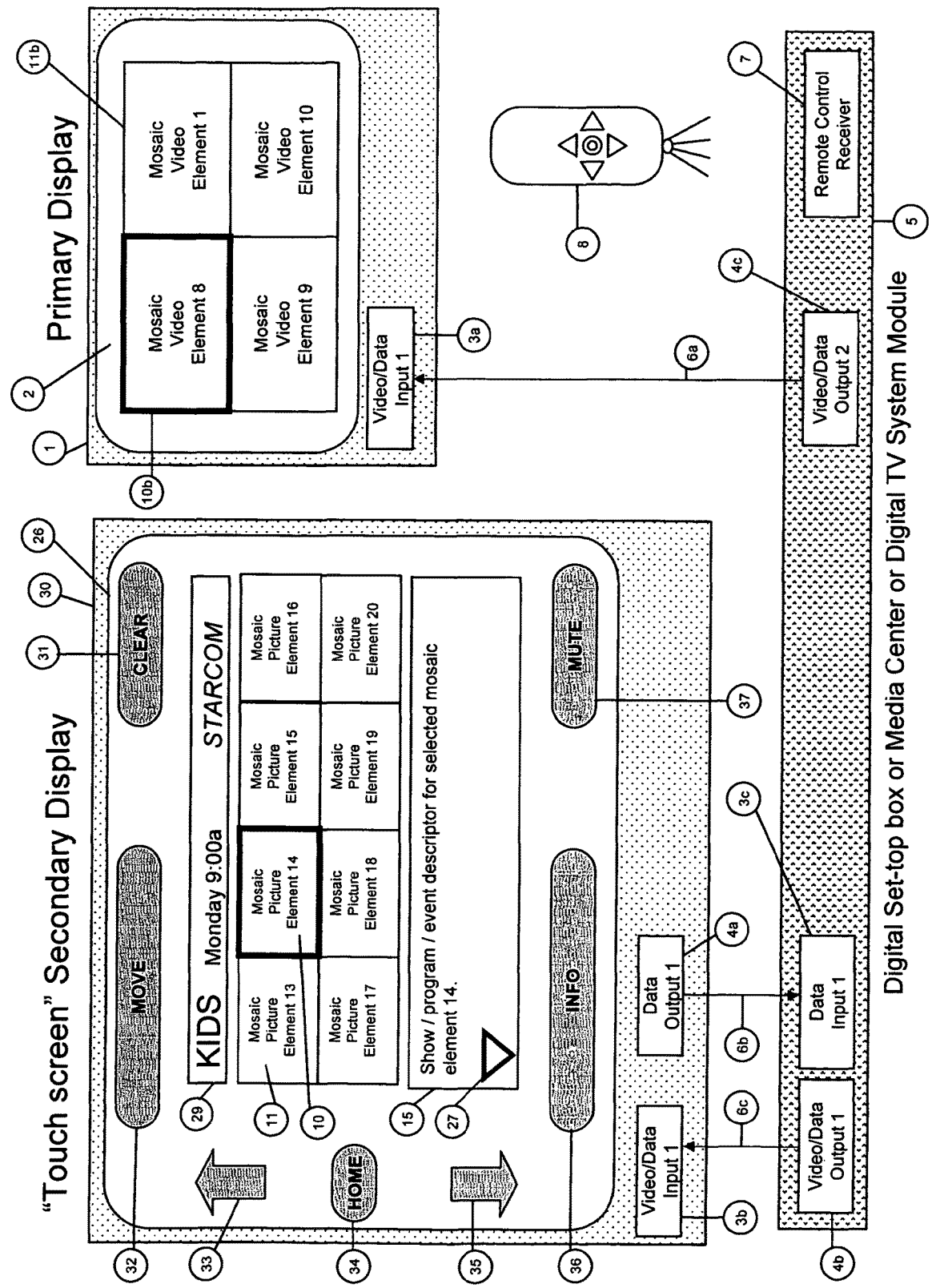
Figure 146:
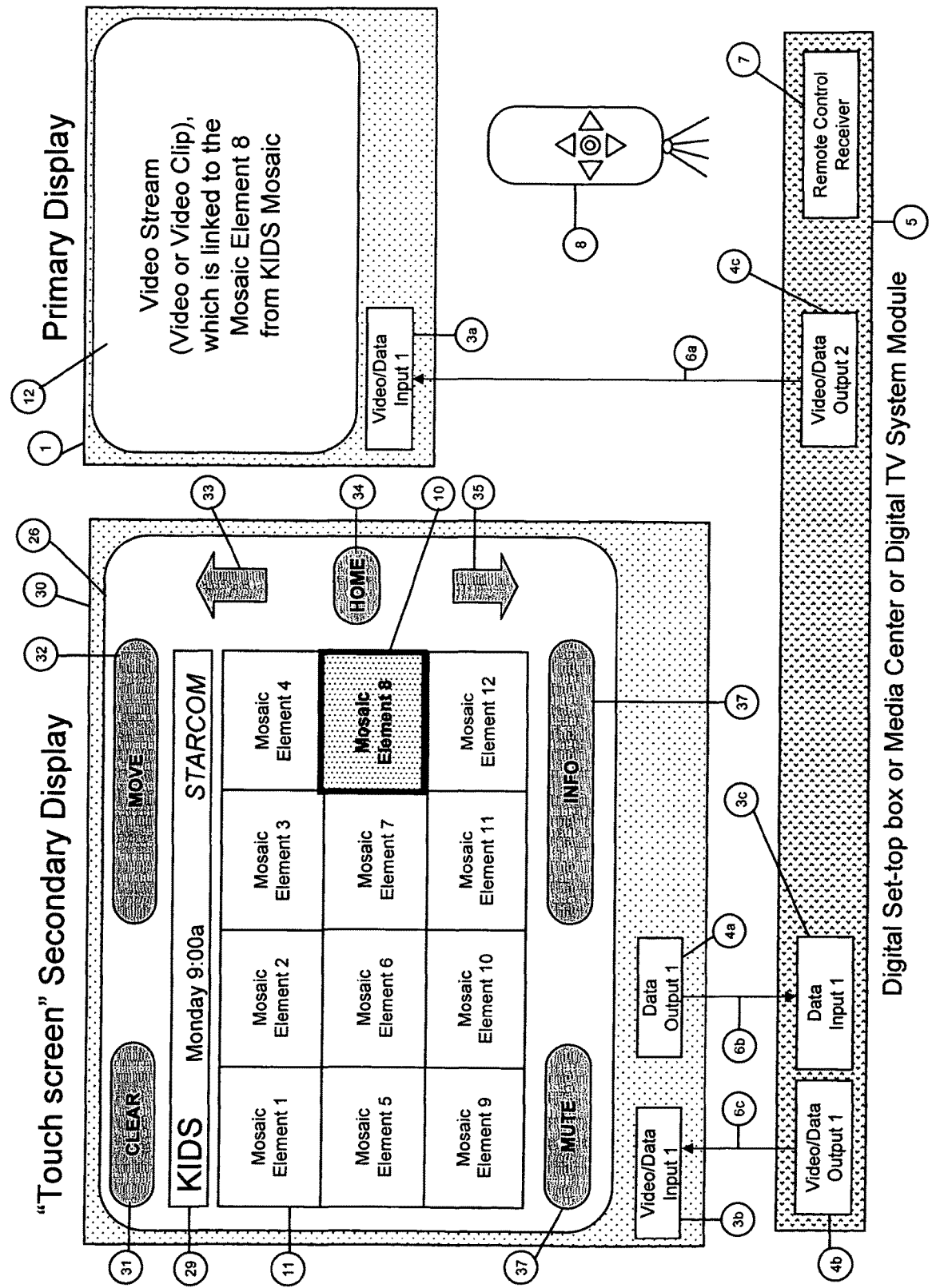
Figure 147:
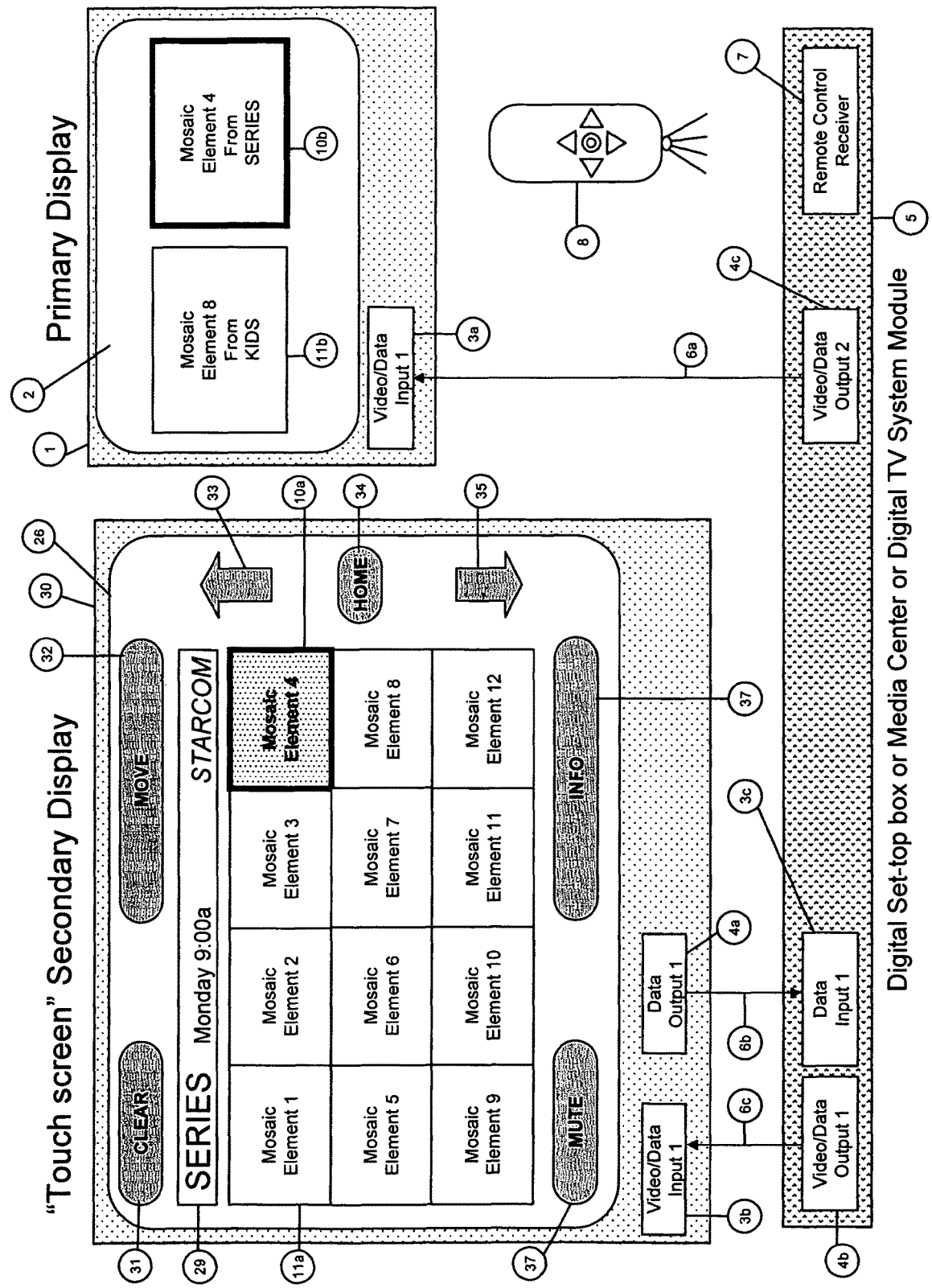
Figure 148:
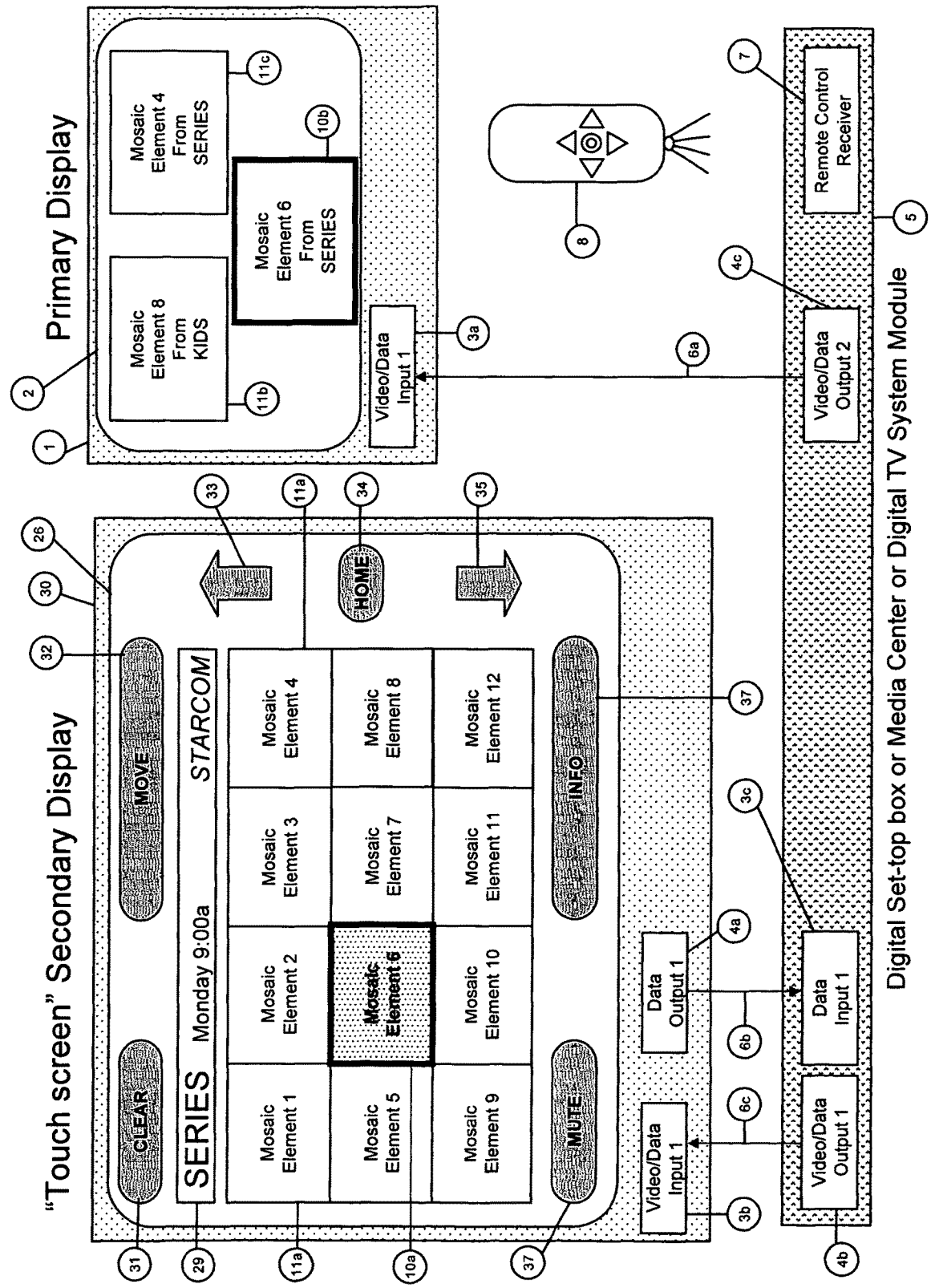

FIG. 139 same as 138 but for any application including DMXEPG

Figure 149:
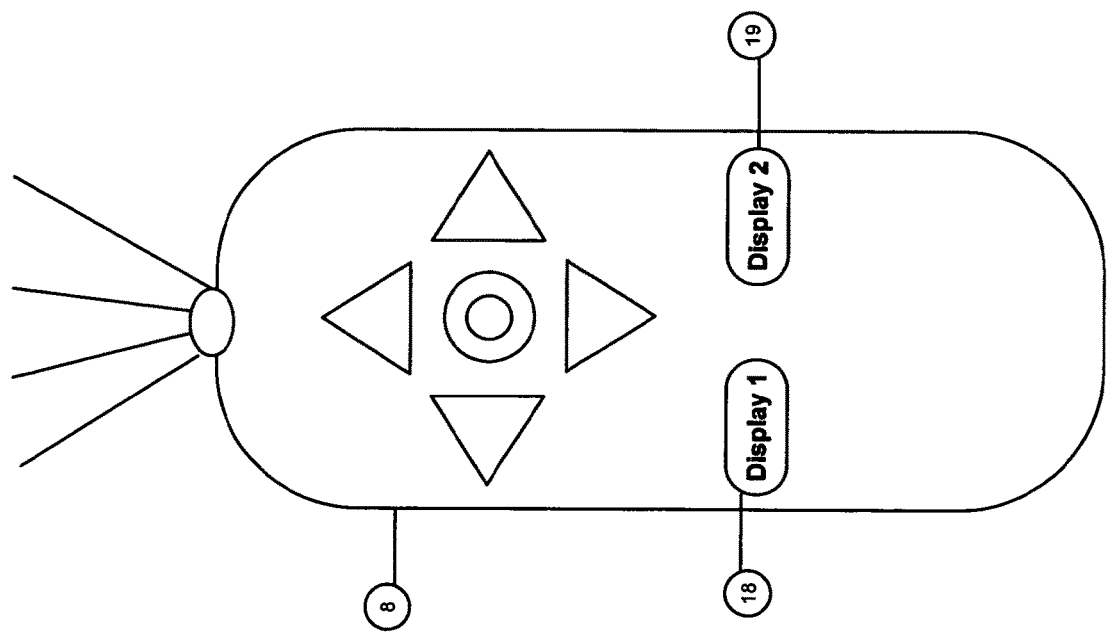
FIG. 149 shows remote control that allows subscribers to change focus from one display to another for multi-display applications.

FIG. 140-148 shows system diagram and UI for multi-display DMXEPG application implemented with touch sensitive display FIG. 149 shows remote control that allows subscribers to change focus from one display to another for multi-display applications.

Figure 150:
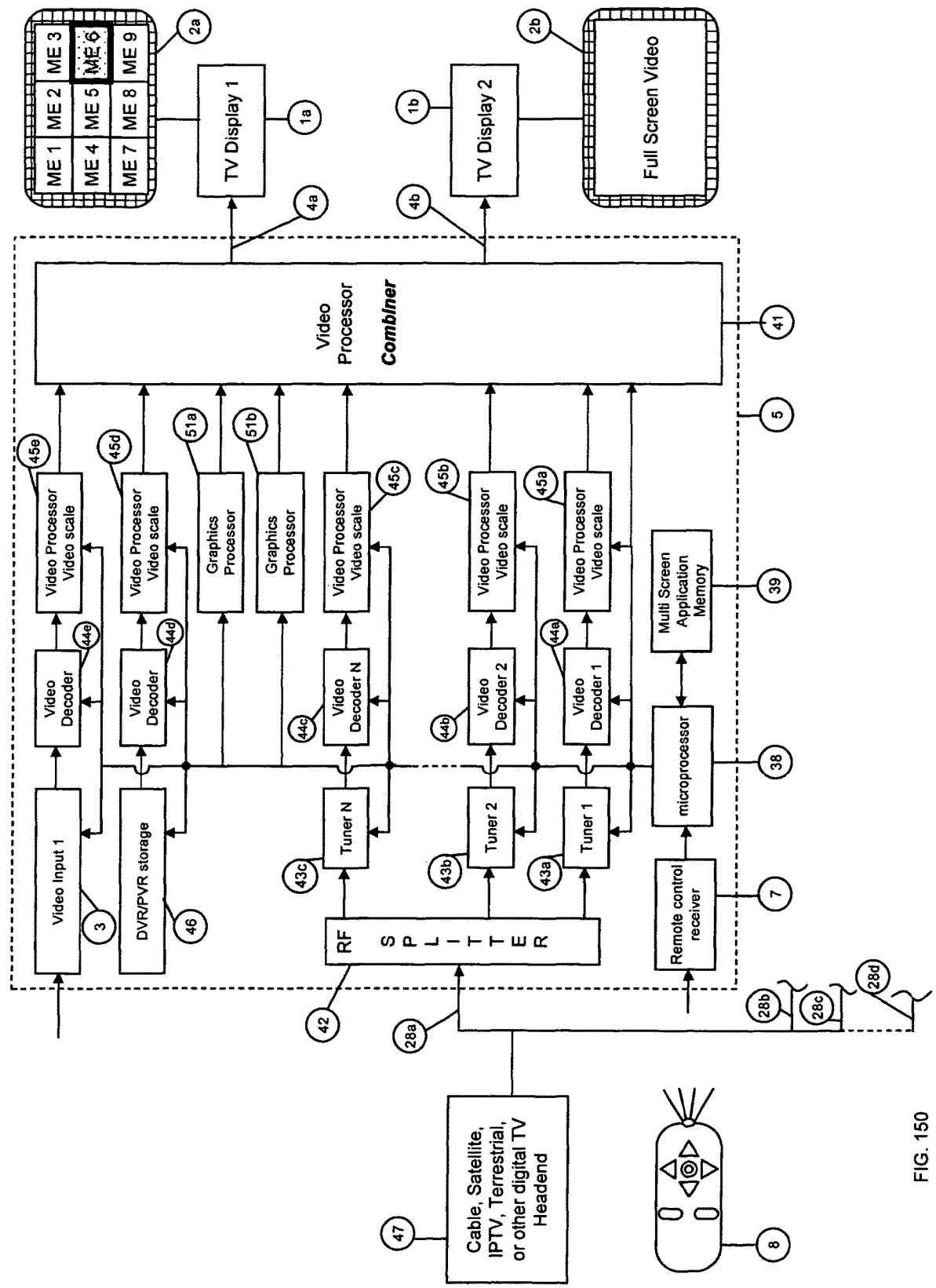
FIG. 150 shows system diagram of a digital TV set or set top box which enable applications with multi-display functionality.

FIG. 150 shows system diagram of a digital TV set or set top box which enable applications with multi-display functionality.

Figure 151:
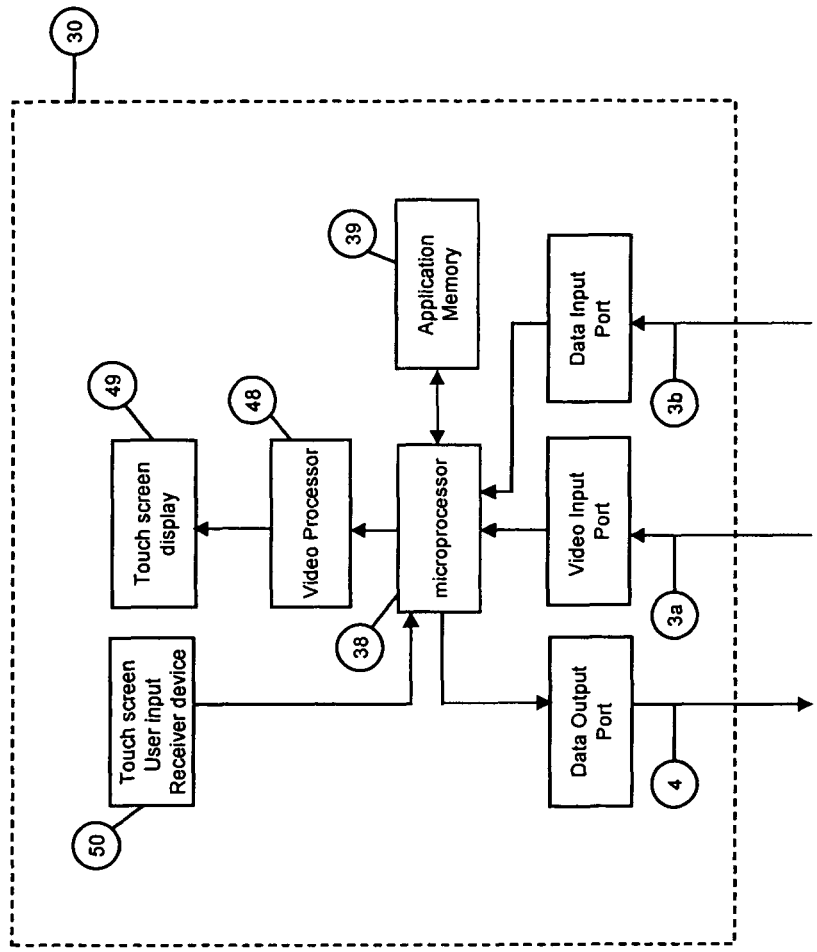
FIG. 151 shows a system diagram for a touch screen display that can be used with systems that support multi-display DMXEPG.
Figure 152:
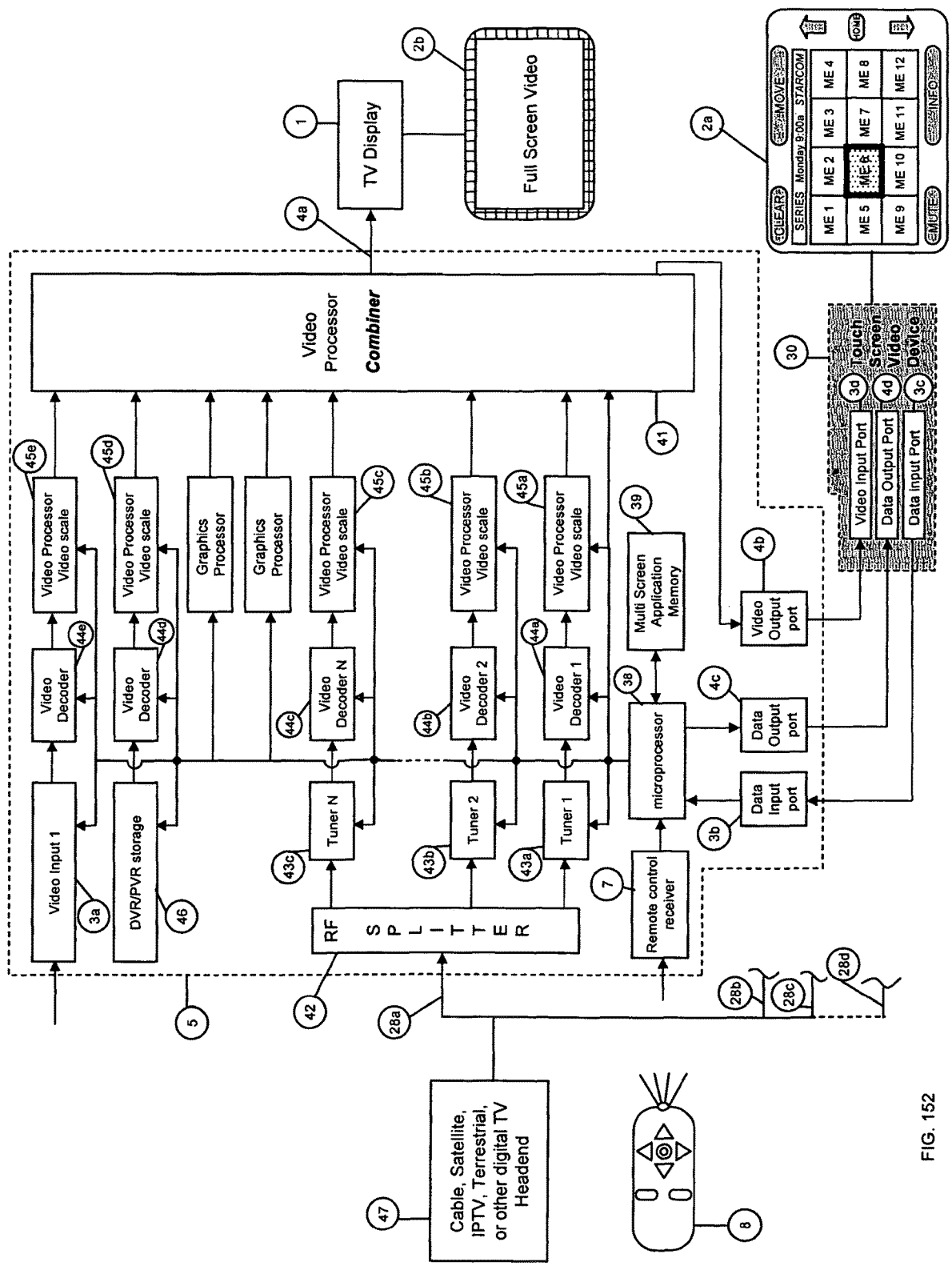
FIG. 152 shows system diagram of a digital TV set or set top box utilizing touch screen display for multi-display DMXEPG or other multi-screen applications.

FIG. 151 shows system diagram for touch screen display that can be used with systems that support multi-display DMXEPG FIG. 152 shows system diagram of a digital TV set or set top box utilizing touch screen display for multi-display DMXEPG or other multi-screen applications.

Figure 153:
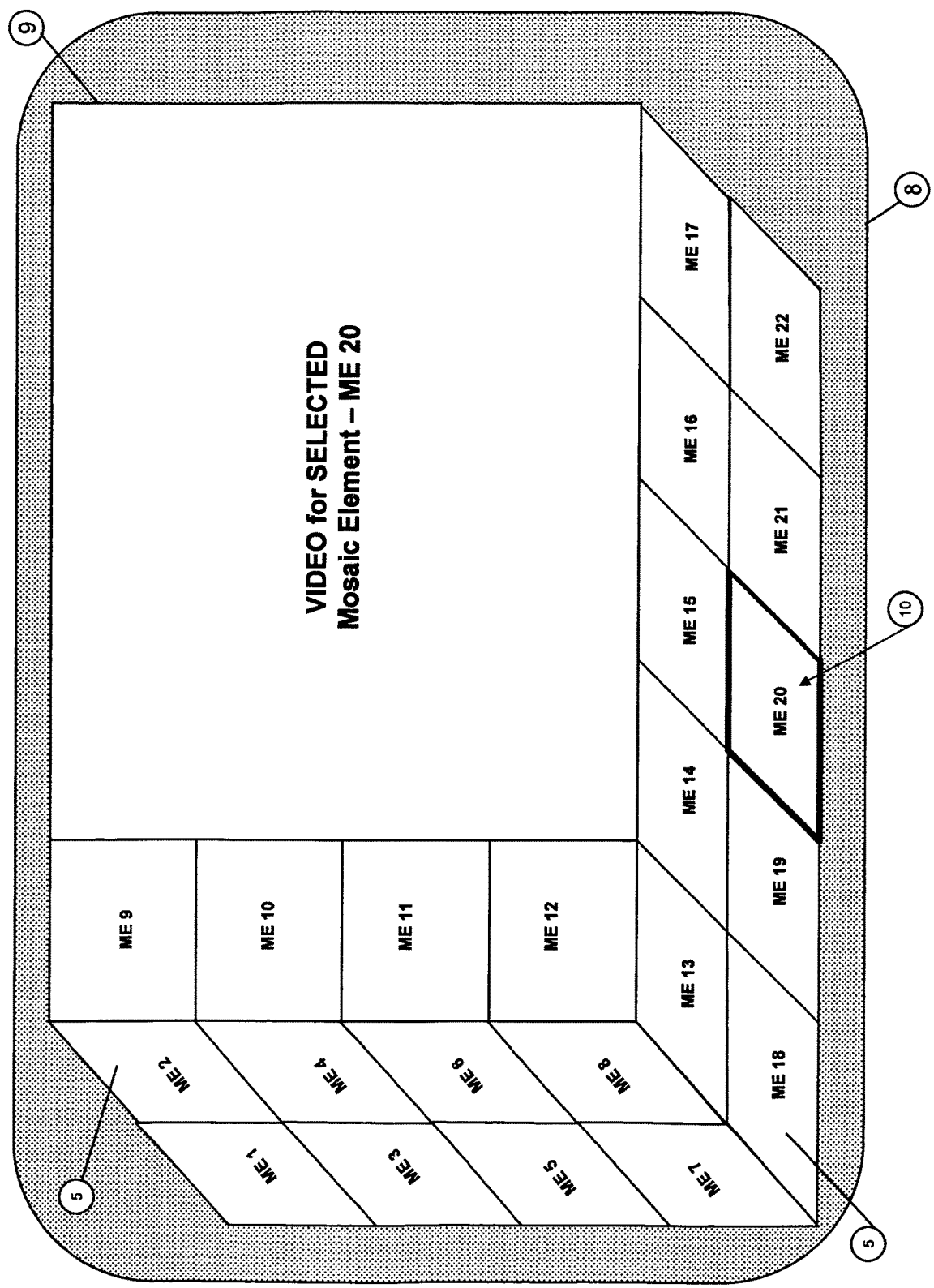
FIG. 153 shows DMXEPG screen displayed in three dimensions.

FIG. 153 shows DMXEPG screen displayed in three dimensions either on display with two or three dimensional rendering capabilities.

Figure 154:
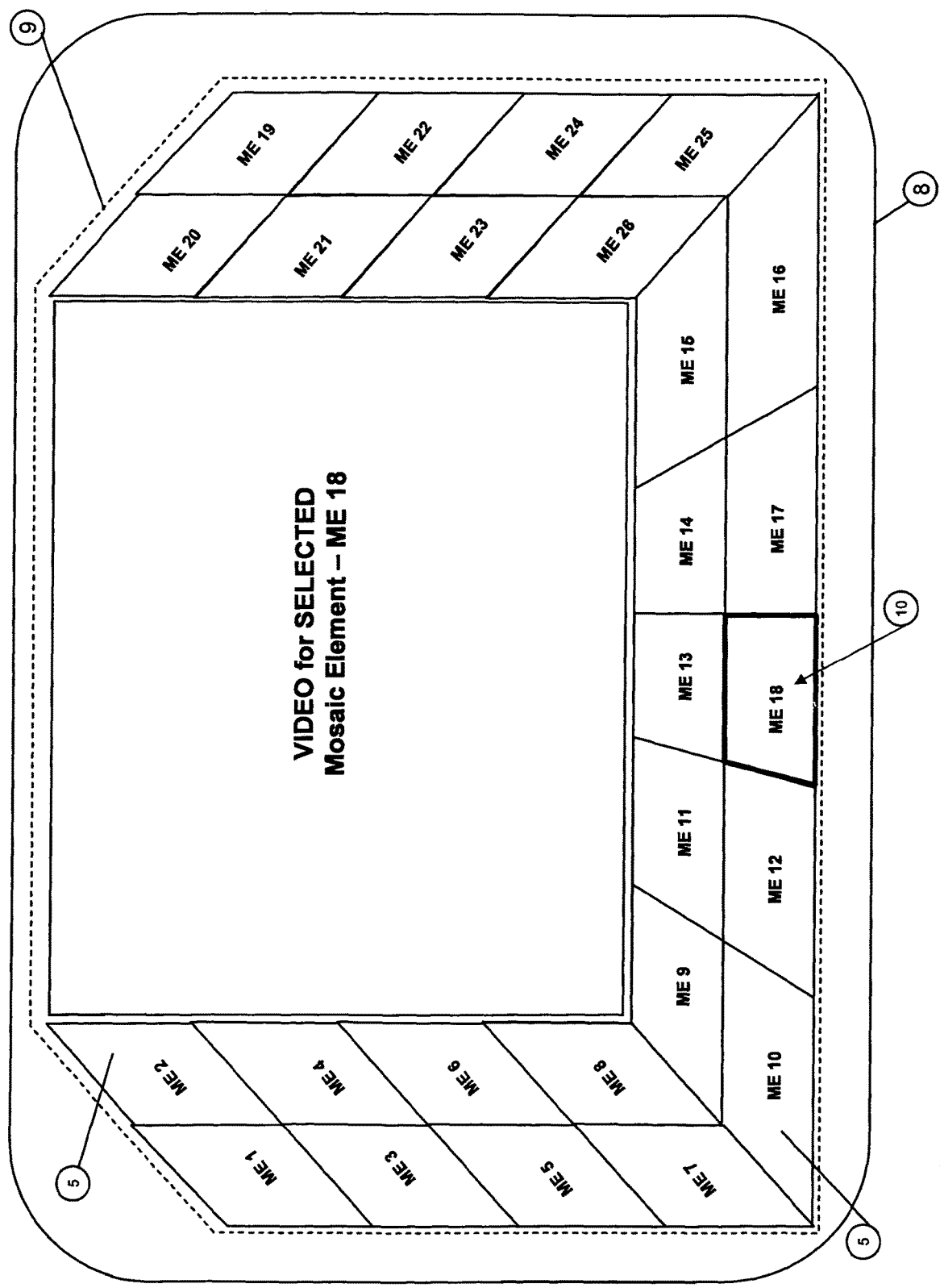
FIG. 154 shows DMXEPG screen displayed in three dimensions.

FIG. 154 shows DMXEPG screen displayed in three dimensions either on display with two or three dimensional rendering capabilities. DMXEPG can be shown using different perspectives.

Operation

A subscriber, in accordance with the invention, accesses DMXEPG main page which displays content categories grouped by genre, language, broadcaster name, geographical location of the broadcaster, or other pre-set criteria. For example, content can be grouped by genre in "News", "Movies", "Sitcoms", "Cartoons", "Sports", and "Favorite" categories FIG. 7. Subscriber can observe displayed content and switch to the corresponding audio track by navigating to the desired mosaic element using remote control's available buttons—in most cases "UP", "DOWN", "LEFT", "RIGHT" or, proposed in the invention, optional rotating element FIG. 30 which allows to move focus from one mosaic element to the next in one continuous motion in accordance with the direction of the turn which moves the focus with every pre-defined degree of the rotation.

If subscriber wants to observe more choices in a particular content category, he can press "ENTER" button on the remote control or depress optional rotating element 301 which brings subscriber to another DMXEPG page FIG. 2 that displays mosaic of real time video feeds for the corresponding content category. Similarly to the previous screen, subscriber can switch audio tracks, or select desired program to view it in the "full screen" mode. Also, service providers might choose to display DMXEPG page with incongruent mosaic elements, allocating more space for one or more ME, while still allowing subscribers to switch audio tracks by navigating to the corresponding ME. Furthermore, service providers might choose to create DMXEPG pages that reflect user content preferences associated with the different time of the day, day of the week, age, sex, income, geographical location, and other subscriber demographic data and use conditional access system to match user profile to specific DMXEPG pages. FIG. 6 shows DMXEPG page generated for the morning hours to match viewing preferences subscribers in selected ZIP codes.

With the set-top box with 2 or more tuners, in accordance with the invention, subscriber, after accessing mosaic DMXEPG landing page, selecting content category, and viewing corresponding DMXEPG page is given the option of selecting any video stream, including video from other sources like DVD player, on one ME while observing DMXEPG elements on the rest of the screen FIG. 10. Similarly to other DMXEPG pages, subscriber can switch corresponding audio track by navigating to the corresponding mosaic element. Subscriber can also move position of mosaic element displaying subscriber selected video stream including video from other sources (e.g. VCR, DVD player, video camera, digital camera, etc.) to uncover hidden DMXEPG elements. This setup can be applied to any predefined content category or DMXEPG page.

With the set-top box with 2 or more tuners, in accordance with the invention, subscriber, after accessing DMXEPG screen, can optionally select size of ME in focus by pressing "ENTER" or any other button assigned to that function. In case of subscriber device capable of three dimensional rendering, subscriber can also choose Z coordinate of ME.

Service Provider, in accordance with the invention, can dynamically change rules responsible for dynamic association of channels with the mosaic DMXEPG elements. For the main landing page, service providers can choose to change displayed content categories, advertisement, or other visual or audio data depending on the time of the day, day of the week, customer demographic data, capabilities of customer premises equipment, and capabilities of the head-end equipment, as well as its business needs.

What is claimed is:

1. A multiple display device control system comprising:
   a client device comprising:
   a plurality of receivers configured to receive a plurality of video content streams, each video content stream comprising video content to be displayed;

a first video and data output interface port configured to provide, for display on a first display device, one of (i) the video content of the plurality of video content streams and (ii) electronic program guide (EPG) application data comprising a plurality of selectable elements each associated with the video content of one of the plurality of video content streams;

a second video and data output interface port configured to provide, for display on a second display device remote from the first display device, the other of the video content and the EPG application data for simultaneous display with the one of the video content and the EPG application data on the first display device;

a remote control receiver device configured to receive a plurality of user input selections; and a processor in communication with the plurality of receivers and the remote control receiver device; and a remote control device, in communication with the remote control receiver device of the client device, comprising a first user input selector provided on the remote control device and a second user input selector provided on the remote control device separate from the first user input selector, wherein configured to receive a first user input selection of the plurality of user input selections, provided via the first user input selector, changes a focus to one of the first display device and a second user input selection of the plurality of user input selections, provided via the second user input selector, changes the focus to the second display device, wherein the change in focus, responsive to the first user input selection, enables selection of one of the plurality of selectable elements displayed on the first display device and disables selection of one of the plurality of selectable elements displayed on the second display device and the change in focus, responsive to the second user input selection, enables selection of one of the plurality of selectable elements displayed on the second display device and disables selection of one of the plurality of selectable elements displayed on the first display device, and selection of the one of the plurality of selectable elements displayed on one of the first display device and the second display device causes the video content associated with the one selectable element to be displayed on the other of the first display device and the second display device by tuning one of the receivers for the video content associated with the one selectable element.

2. The system of 1, wherein
the first display device is a touch screen display device,
the second display device is a television display device, and
the client device is remote from the first display device and the second display device.

3. The system of 1, wherein the first display device is a television display device and the first display device comprises the client device.

4. A method of controlling display of electronic program guide (EPG) application data on multiple display devices, the method comprising:

receiving, at a plurality of receivers of a client device, a plurality of video content streams, each video content stream comprising video content to be displayed;

providing, for display on a first display device, one of (i) the video content of the plurality of video content streams and (ii) the EPG application data comprising a plurality of selectable elements each associated with the video content of one of the plurality of video content streams;

providing, for display on a second display device remote from the first display device, the other of the video content and the EPG application data for simultaneous display with the one of the video content and the EPG application data on the first display device;

receiving, at a remote control device comprising a first user input selector provided on the remote control device and a second user input selector provided on the remote control device separate from the first user input selector, a first user input selection, provided via the first user input selector, to change a focus to the first display device and a second user input selection, provided via the second user input selector, to change the focus to the second display device, receiving, at a remote control receiver device of the client device in communication with the remote control device, one of the first user input selection and the second input selection to change the focus to the other one of the first display device and the second display device, wherein the change in focus, responsive to the first user input selection, enables selection of one of the plurality of selectable elements displayed on the first display device and disables selection of one of the plurality of selectable elements displayed on the second display device and the change in focus, responsive to the second user input selection, enables selection of one of the plurality of selectable elements displayed on the second display device and disables selection of one of the plurality of selectable elements displayed on the first display device, and selection of the one of the plurality of selectable elements displayed on the the one of the first display device and the second display device causes the video content associated with the one selectable element to be displayed on the other of the first display device and the second display device by tuning one of the receivers for the video content associated with the one selectable element.

* * * * *